INVENTORS
WILLIAM H. RHODES
JAMES G. BRENZA
WAYNE D. WINGER
ROBERT C. JACKSON

BY

Carl C. Kling

ATTORNEY

FIG. 2

ADDRESS UNITS DIGIT (columns); ADDRESS TEN-THOUSANDS, THOUSANDS, HUNDREDS, TENS DIGITS (rows)

| | 0 | 1 | 2 | 3 | 4 | 5 | 6 | 7 | 8 | 9 |
|---|---|---|---|---|---|---|---|---|---|---|
| 0030 | 0 | 1 | 2 | 3 | 4 | 5 | 6 | 7 | 8 | 9 |
| 0031 | 1 | 2 | 3 | 4 | 5 | 6 | 7 | 8 | 9 | 0! |
| 0032 | 2 | 3 | 4 | 5 | 6 | 7 | 8 | 9 | 0! | 1! |
| 0033 | 3 | 4 | 5 | 6 | 7 | 8 | 9 | 0! | 1! | 2! |
| 0034 | 4 | 5 | 6 | 7 | 8 | 9 | 0! | 1! | 2! | 3! |
| 0035 | 5 | 6 | 7 | 8 | 9 | 0! | 1! | 2! | 3! | 4! |
| 0036 | 6 | 7 | 8 | 9 | 0! | 1! | 2! | 3! | 4! | 5! |
| 0037 | 7 | 8 | 9 | 0! | 1! | 2! | 3! | 4! | 5! | 6! |
| 0038 | 8 | 9 | 0! | 1! | 2! | 3! | 4! | 5! | 6! | 7! |
| 0039 | 9 | 0! | 1! | 2! | 3! | 4! | 5! | 6! | 7! | 8! |

FIG. 3

ADDRESS UNITS DIGIT (columns); ADDRESS TEN-THOUSANDS, THOUSANDS, HUNDREDS, TENS DIGITS (rows)

| | 0 | 1 | 2 | 3 | 4 | 5 | 6 | 7 | 8 | 9 |
|---|---|---|---|---|---|---|---|---|---|---|
| 0010 | 0 | 0 | 0 | 0 | 0 | 0 | 0 | 0 | 0 | 0 |
| 0011 | 0 | 0 | 0 | 0 | 2 | 0 | 3 | 0 | 4 | 0 |
| 0012 | 0 | 0 | 2 | 0 | 4 | 0 | 6 | 0 | 8 | 0 |
| 0013 | 0 | 0 | 3 | 0 | 6 | 0 | 9 | 0 | 2 | 1 |
| 0014 | 0 | 0 | 4 | 0 | 8 | 0 | 2 | 1 | 6 | 1 |
| 0015 | 0 | 0 | 5 | 0 | 0 | 1 | 5 | 1 | 0 | 2 |
| 0016 | 0 | 0 | 6 | 0 | 2 | 1 | 8 | 1 | 4 | 2 |
| 0017 | 0 | 0 | 7 | 0 | 4 | 1 | 1 | 2 | 8 | 2 |
| 0018 | 0 | 0 | 8 | 0 | 6 | 1 | 4 | 2 | 2 | 3 |
| 0019 | 0 | 0 | 9 | 0 | 8 | 1 | 7 | 2 | 6 | 3 |
| 0020 | 0 | 0 | 0 | 0 | 0 | 0 | 0 | 0 | 0 | 0 |
| 0021 | 5 | 0 | 6 | 0 | 7 | 0 | 8 | 0 | 9 | 0 |
| 0022 | 0 | 1 | 2 | 1 | 4 | 1 | 6 | 1 | 8 | 1 |
| 0023 | 5 | 1 | 8 | 1 | 1 | 2 | 4 | 2 | 7 | 2 |
| 0024 | 0 | 2 | 4 | 2 | 8 | 2 | 2 | 3 | 6 | 3 |
| 0025 | 5 | 2 | 0 | 3 | 5 | 3 | 0 | 4 | 5 | 4 |
| 0026 | 0 | 3 | 6 | 3 | 2 | 4 | 8 | 4 | 4 | 5 |
| 0027 | 5 | 3 | 2 | 4 | 9 | 4 | 6 | 5 | 3 | 6 |
| 0028 | 0 | 4 | 8 | 4 | 6 | 5 | 4 | 6 | 2 | 7 |
| 0029 | 5 | 4 | 4 | 5 | 3 | 6 | 2 | 7 | 1 | 8 |

Aug. 14, 1962 W. H. RHODES ET AL 3,049,295

MULTIPLYING COMPUTER

Filed Dec. 20, 1960 156 Sheets-Sheet 4

Aug. 14, 1962 W. H. RHODES ETAL 3,049,295

MULTIPLYING COMPUTER

Filed Dec. 20, 1960 156 Sheets-Sheet 5

Aug. 14, 1962 W. H. RHODES ET AL 3,049,295

MULTIPLYING COMPUTER

Filed Dec. 20, 1960 156 Sheets-Sheet 9

Aug. 14, 1962 W. H. RHODES ETAL 3,049,295

MULTIPLYING COMPUTER

Filed Dec. 20, 1960 156 Sheets-Sheet 12

MARS WIRING DIAGRAM

MARS BIT DRIVERS UNIT ORDER

MAR BIT DRIVERS TENS ORDER

FIG. 17 MARS BIT DRIVERS HUNDREDS ORDER
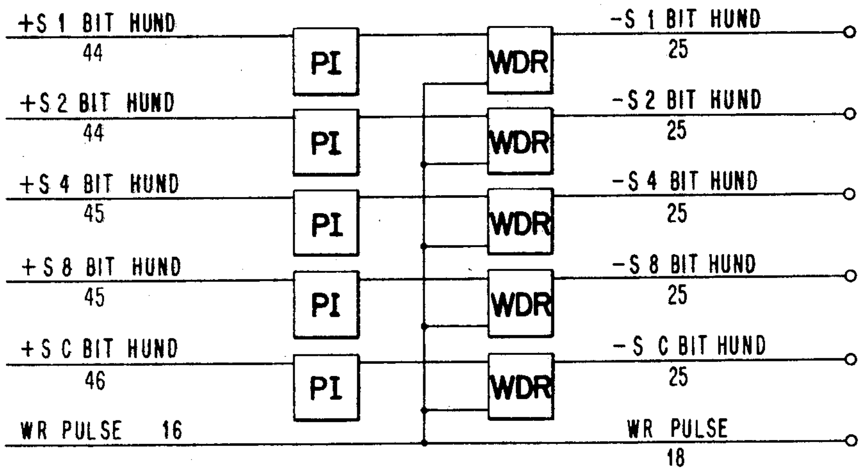
FIG. 18 MARS BIT DRIVERS THOUSANDS ORDER
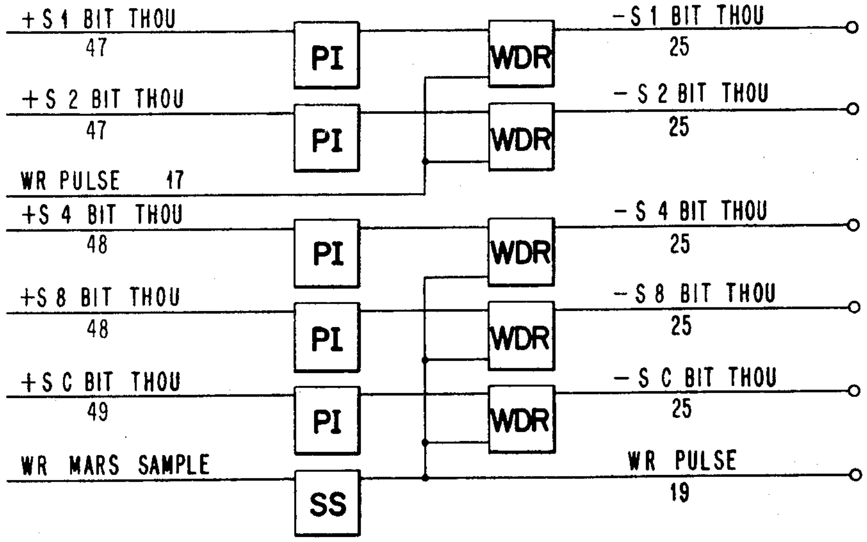
FIG. 19 MARS BIT DRIVERS TEN THOUSANDS ORDER
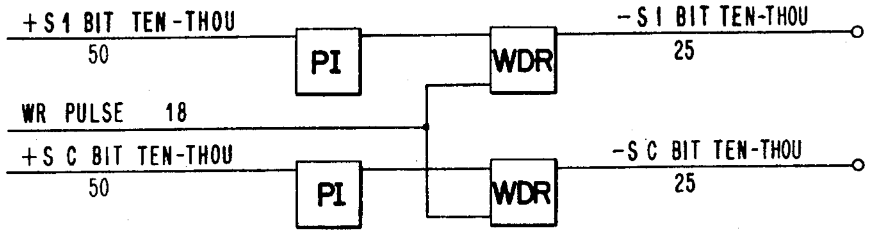

Aug. 14, 1962 W. H. RHODES ETAL 3,049,295

MULTIPLYING COMPUTER

Filed Dec. 20, 1960 156 Sheets-Sheet 17

Aug. 14, 1962 W. H. RHODES ETAL 3,049,295

MULTIPLYING COMPUTER

Filed Dec. 20, 1960 156 Sheets-Sheet 19

Aug. 14, 1962 W. H. RHODES ETAL 3,049,295

MULTIPLYING COMPUTER

Filed Dec. 20, 1960 156 Sheets-Sheet 21

MARS CONNECTIONS

MARS CONNECTIONS

IR NO 1 READ, WRITE DRIVERS GATE POINT

IR NO 2 READ, WRITE DRIVERS GATE POINT

OR NO 1 READ DRIVER GATE POINT

OR 1 WRITE DRIVER GATE POINT

OR 2 READ DRIVER GATE POINT

OR 2 WRITE DRIVER GATE POINT

Aug. 14, 1962 W. H. RHODES ETAL 3,049,295

MULTIPLYING COMPUTER

Filed Dec. 20, 1960 156 Sheets-Sheet 26

PR NO'S 1,2&3 READ DRIVER GATE POINTS

PR NO'S 1,2&3 WRITE DRIVER GATE POINTS

BYPASS INCREMENT SWITCH POINT
FIG. 36
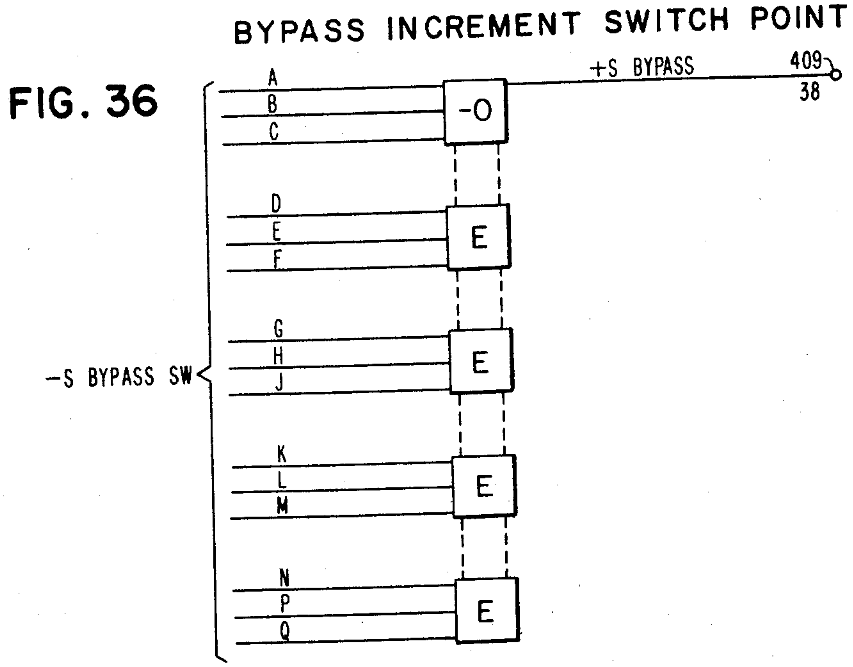
FIG. 37 DRU-DRT GATE POINT TO MARS
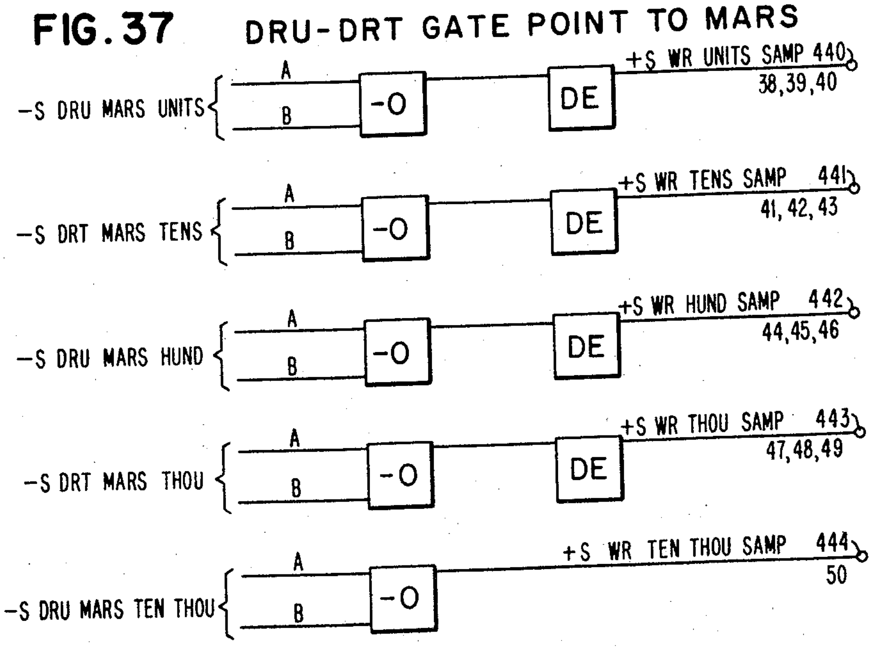

Aug. 14, 1962 W. H. RHODES ETAL 3,049,295

MULTIPLYING COMPUTER

Filed Dec. 20, 1960 156 Sheets-Sheet 28

MARS ENTRY UNITS 4,8 BIT

Aug. 14, 1962 W. H. RHODES ETAL 3,049,295

MULTIPLYING COMPUTER

Filed Dec. 20, 1960 156 Sheets-Sheet 30

FIG. 40 MARS ENTRY UNITS C BIT

MARS ENTRY TENS 4,8 BITS

MARS ENTRY TENS C BIT

Aug. 14, 1962 W. H. RHODES ETAL 3,049,295

MULTIPLYING COMPUTER

Filed Dec. 20, 1960 156 Sheets-Sheet 35

MARS ADDRESS ENTRY HUND C BIT

Aug. 14, 1962 W. H. RHODES ETAL 3,049,295

MULTIPLYING COMPUTER

Filed Dec. 20, 1960 156 Sheets-Sheet 37

MARS ENTRY THOU 1,2 BIT

Aug. 14, 1962 W. H. RHODES ETAL 3,049,295

MULTIPLYING COMPUTER

Filed Dec. 20, 1960 156 Sheets-Sheet 38

MARS ENTRY THOU 4,8 BITS

Aug. 14, 1962 W. H. RHODES ETAL 3,049,295

MULTIPLYING COMPUTER

Filed Dec. 20, 1960 156 Sheets-Sheet 39

MARS ENTRY THOU C BIT

T/C SWITCH 408

Aug. 14, 1962 W. H. RHODES ETAL 3,049,295

MULTIPLYING COMPUTER

Filed Dec. 20, 1960 156 Sheets-Sheet 42

C BIT CORRECTORS

DECODE SWITCH UNITS POWERING

DECODE SWITCH UNITS

DECODE SWITCH TENS POWERING

DECODE SWITCH TENS

DECODE SWITCH HUND POWERING

DECODE SWITCH HUND

DECODE SWITCH THOU POWERING

DECODE SWITCH THOU

Aug. 14, 1962 W. H. RHODES ETAL 3,049,295

MULTIPLYING COMPUTER

Filed Dec. 20, 1960 156 Sheets-Sheet 49

Aug. 14, 1962 W. H. RHODES ETAL 3,049,295

MULTIPLYING COMPUTER

Filed Dec. 20, 1960 156 Sheets-Sheet 50

SENSE AMPLIFIERS EVEN

SENSE AMPLIFIER GATES

INHIBIT DRIVERS ODD

Aug. 14, 1962 W. H. RHODES ETAL 3,049,295

MULTIPLYING COMPUTER

Filed Dec. 20, 1960 156 Sheets-Sheet 52

Aug. 14, 1962 W. H. RHODES ETAL 3,049,295

MULTIPLYING COMPUTER

Filed Dec. 20, 1960 156 Sheets-Sheet 60

MBRO VRC

Aug. 14, 1962 W. H. RHODES ETAL 3,049,295

MULTIPLYING COMPUTER

Filed Dec. 20, 1960 156 Sheets-Sheet 61

FIG.79 MBRE VRC

FIG. 82
MEMORY SENSE AMPLIFIER CONTROL
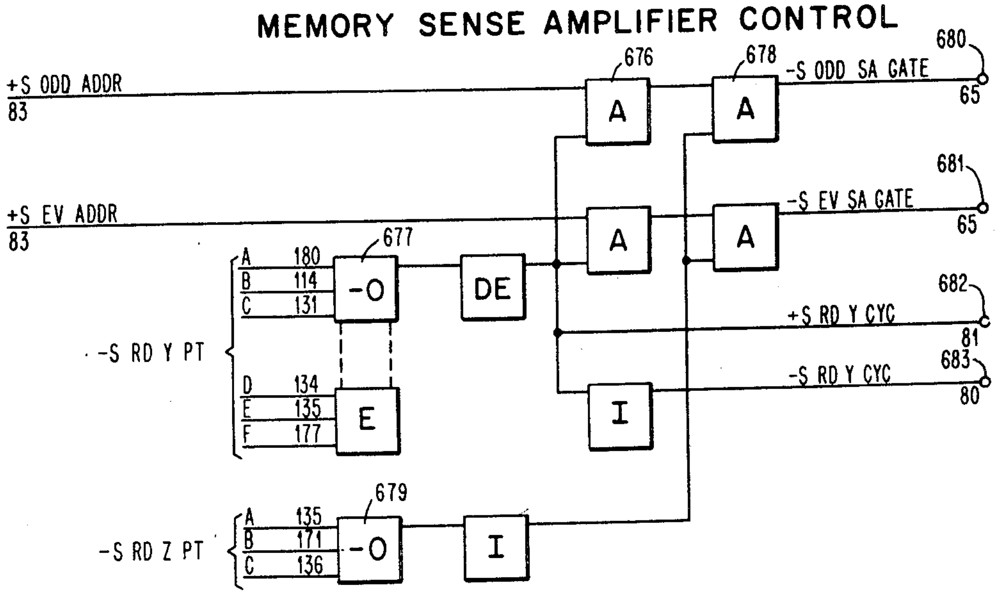
FIG. 83 ODD EVEN ADDRESS DATA CONTROL
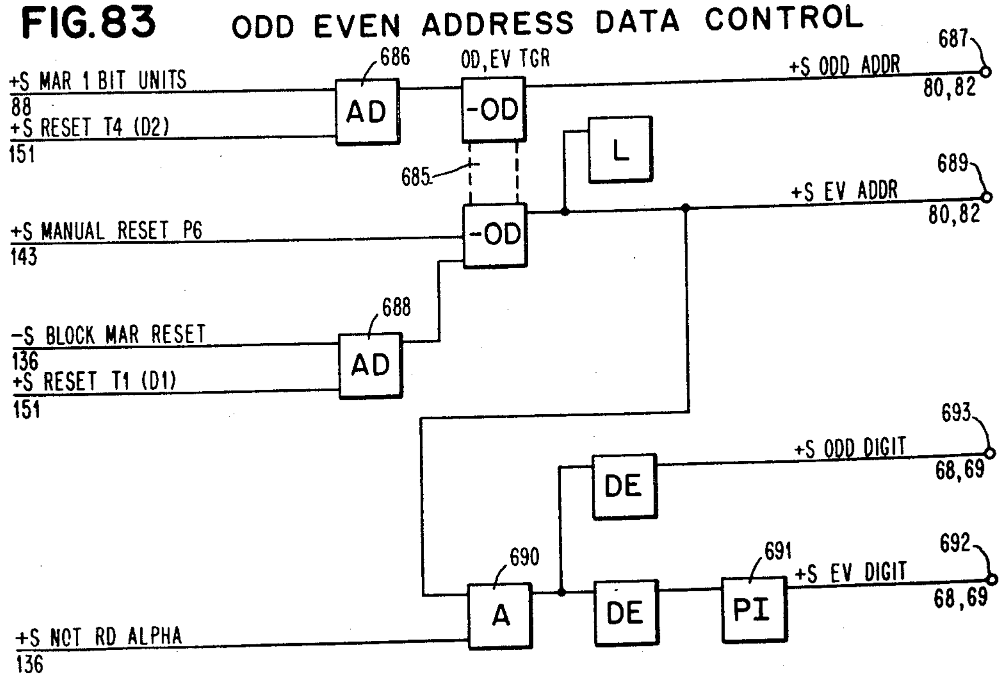

Aug. 14, 1962 W. H. RHODES ETAL 3,049,295

MULTIPLYING COMPUTER

Filed Dec. 20, 1960 156 Sheets-Sheet 66

Aug. 14, 1962 W. H. RHODES ETAL 3,049,295

MULTIPLYING COMPUTER

Filed Dec. 20, 1960 156 Sheets-Sheet 67

PLUS ONE SWITCH AND BYPASS

Aug. 14, 1962 W. H. RHODES ETAL 3,049,295

MULTIPLYING COMPUTER

Filed Dec. 20, 1960 156 Sheets-Sheet 69

PLUS ONE SWITCH AND BYPASS

Aug. 14, 1962 W. H. RHODES ETAL 3,049,295

MULTIPLYING COMPUTER

Filed Dec. 20, 1960 156 Sheets-Sheet 72

Aug. 14, 1962 W. H. RHODES ETAL 3,049,295

MULTIPLYING COMPUTER

Filed Dec. 20, 1960 156 Sheets-Sheet 75

Aug. 14, 1962 W. H. RHODES ETAL 3,049,295

MULTIPLYING COMPUTER

Filed Dec. 20, 1960 156 Sheets-Sheet 77

MAR VRC UNITS, TENS

Aug. 14, 1962 W. H. RHODES ETAL 3,049,295

MULTIPLYING COMPUTER

Filed Dec. 20, 1960 156 Sheets-Sheet 78

MAR VRC HUNDS, THOUS

FIG.97 MAR VRC TEN THOU
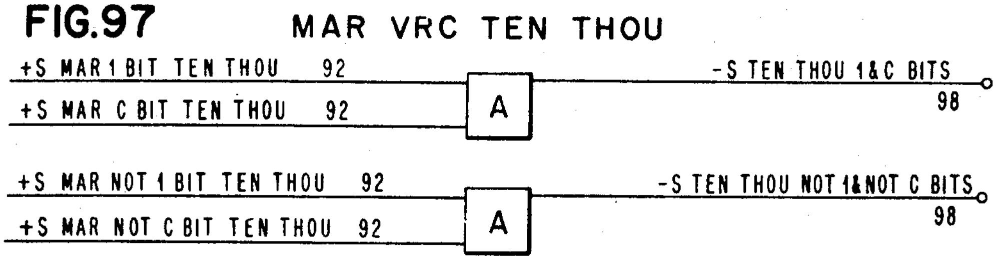
FIG.98 MAR VRC
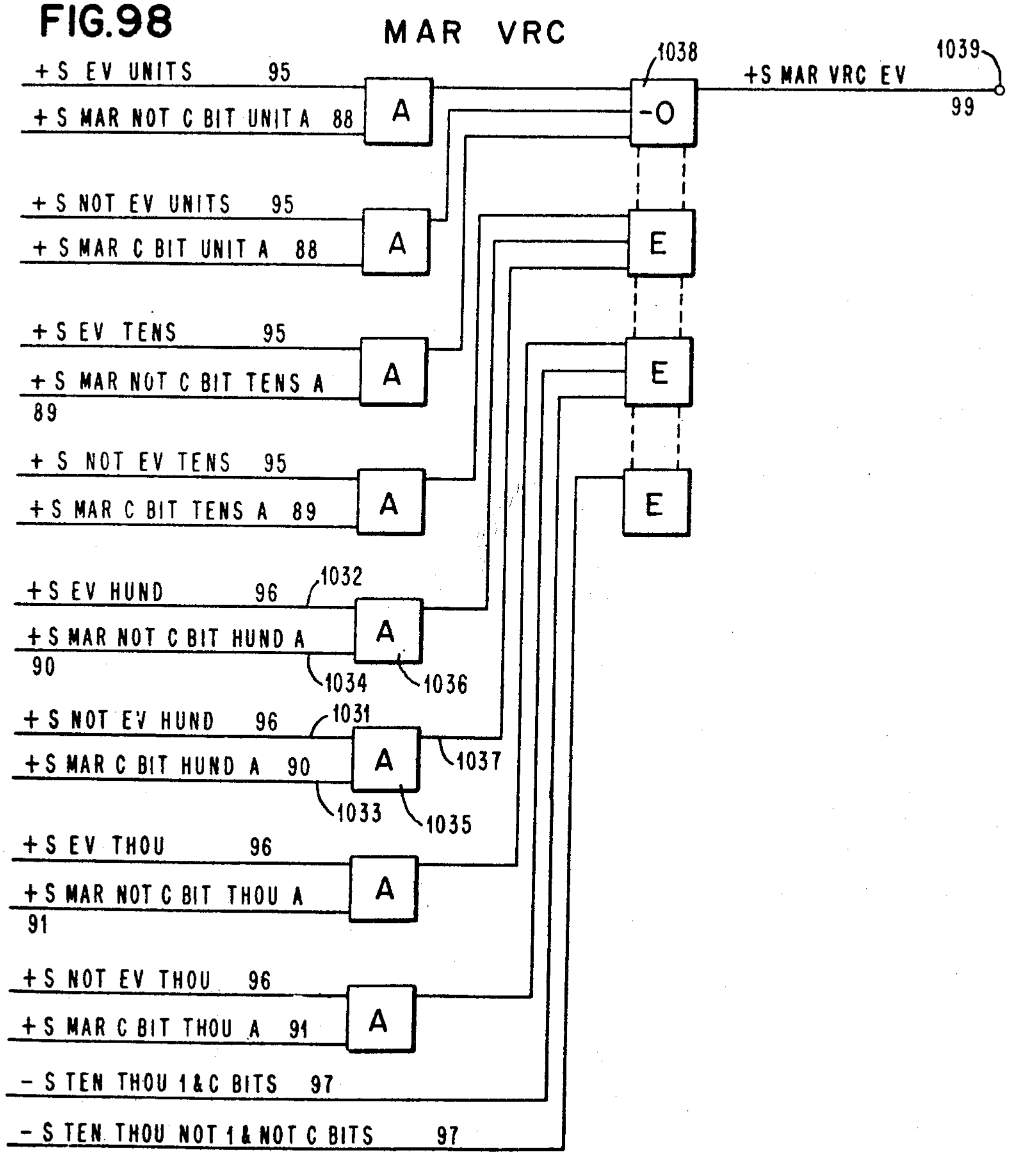

I CYCLE TRIGGER 1

I CYCLE TRIGGER 2

I CYCLE TRIGGER 5

I CYCLE TRIGGER 6

I CYCLE TRIGGER 7

I CYCLE TRIGGER 8

Aug. 14, 1962 W. H. RHODES ETAL 3,049,295

MULTIPLYING COMPUTER

Filed Dec. 2[illegible], 1960 156 Sheets-Sheet 85

INCREMENT DECREMENT TRIGGER

Aug. 14, 1962 W. H. RHODES ETAL 3,049,295

MULTIPLYING COMPUTER

Filed Dec. 20, 1960 156 Sheets-Sheet 86

ADD SUB COMP PROGRAM

ADD SUB COMP PROGRAM

ADD SUB COMP PROGRAM

FIG. 114 ADD SUB COMP PROGRAM
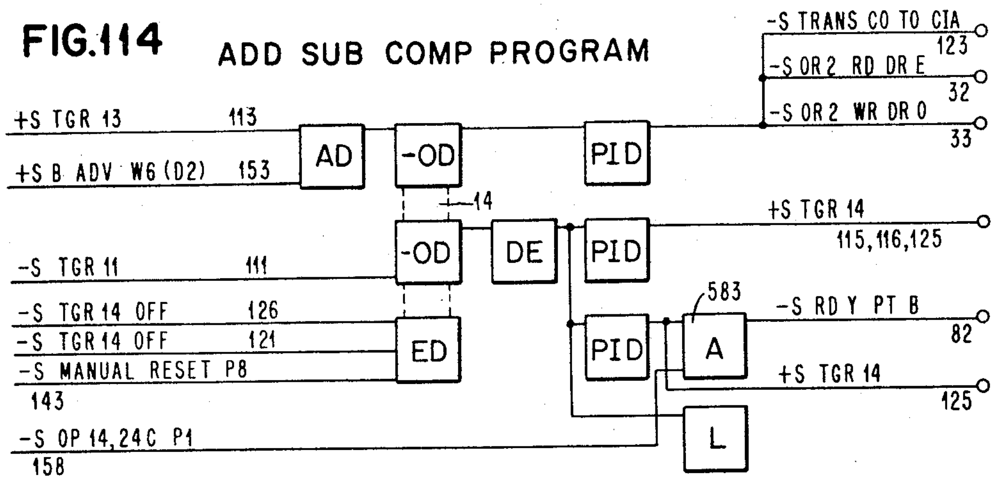
FIG. 115 ADD SUB COMP FLAG CONTROL
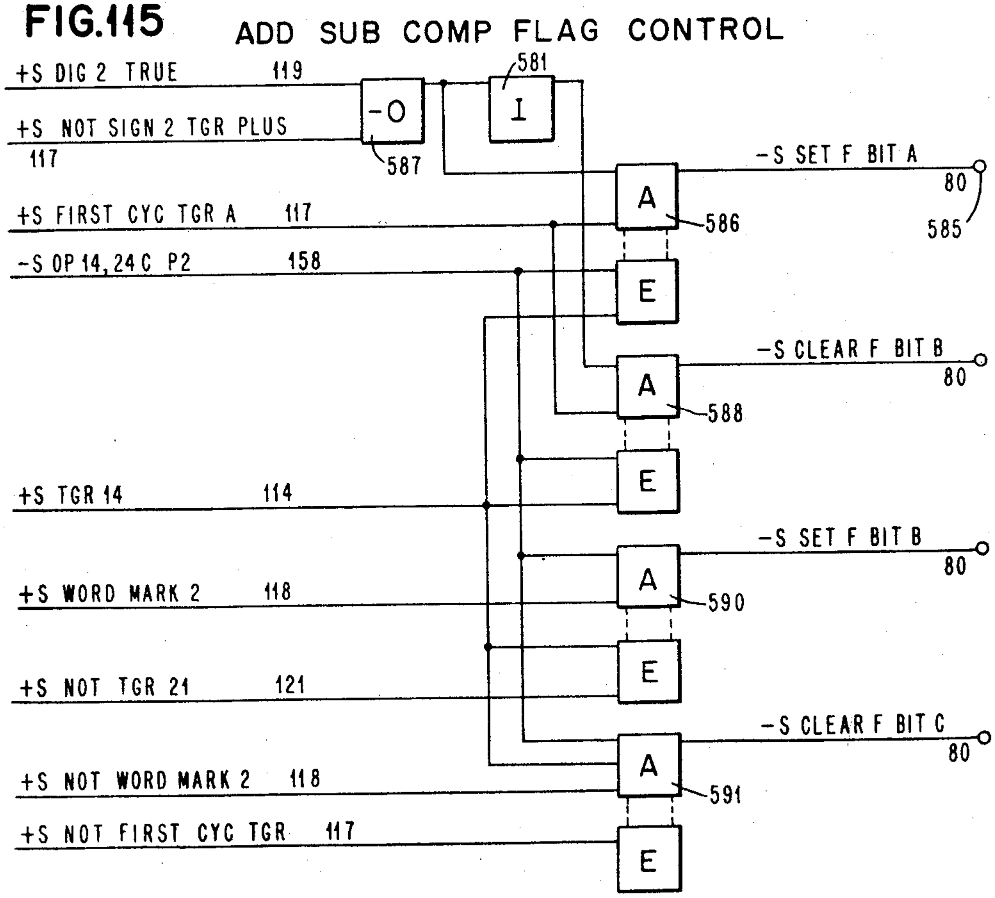

ADD SUB COMP END CONTROL

Aug. 14, 1962 W. H. RHODES ET AL 3,049,295

MULTIPLYING COMPUTER

Filed Dec. 20, 1960 156 Sheets-Sheet 92

ADD SUB COMP WORD MARK TRIGGERS

Aug. 14, 1962 W. H. RHODES ETAL 3,049,295

MULTIPLYING COMPUTER

Filed Dec. 20, 1960 156 Sheets-Sheet 94

E CYCLE DUMMY TRIGGERS

FIG.122
RECORD MARK TRIGGER
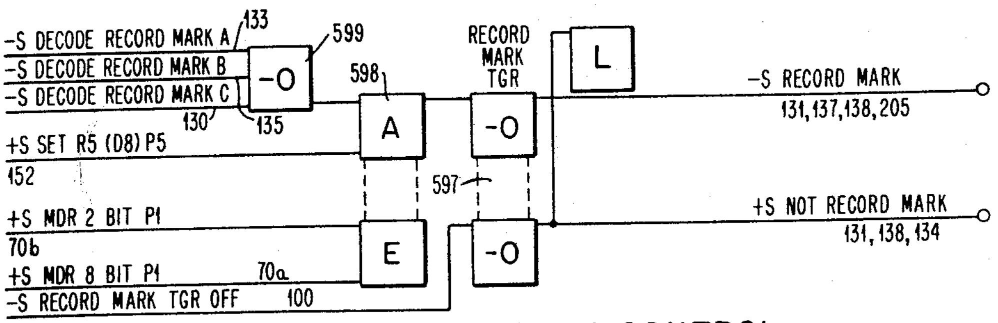
FIG.123 ADD SUB COMP CARRY CONTROL
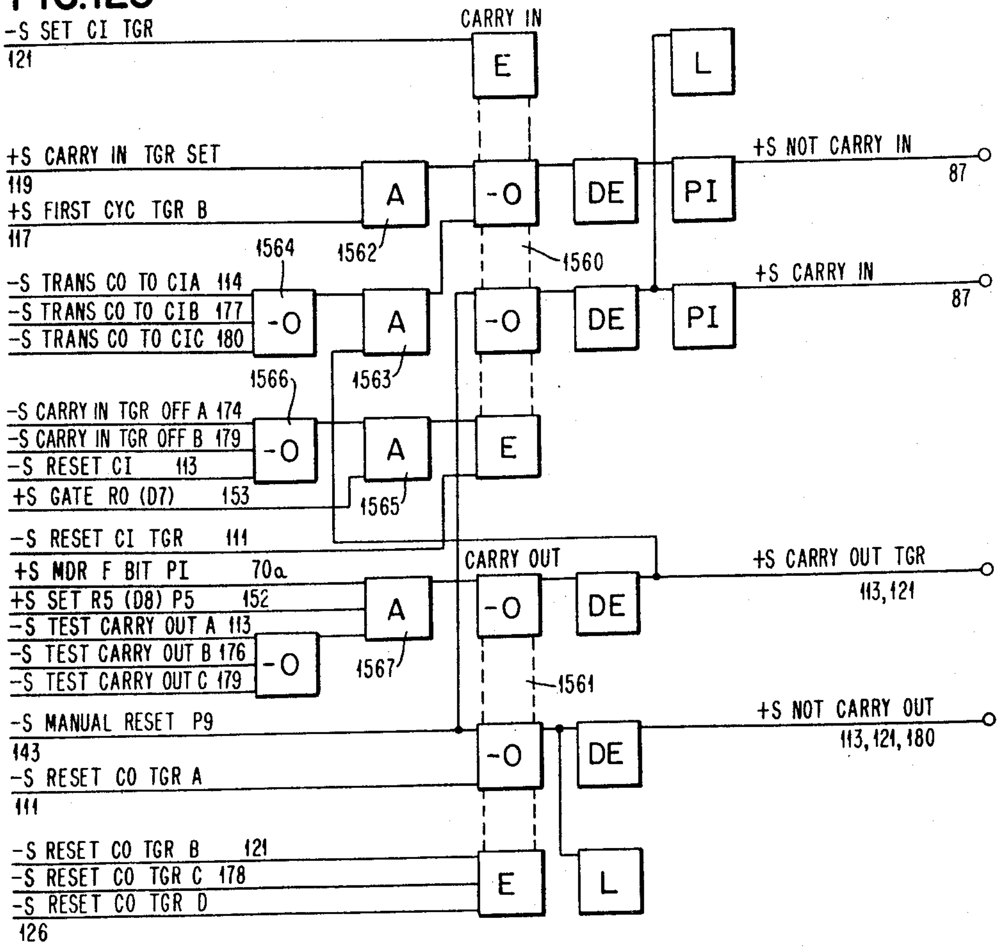

FIG.124 OVERFLOW HIGH PLUS EQUAL ZERO TRIGGERS
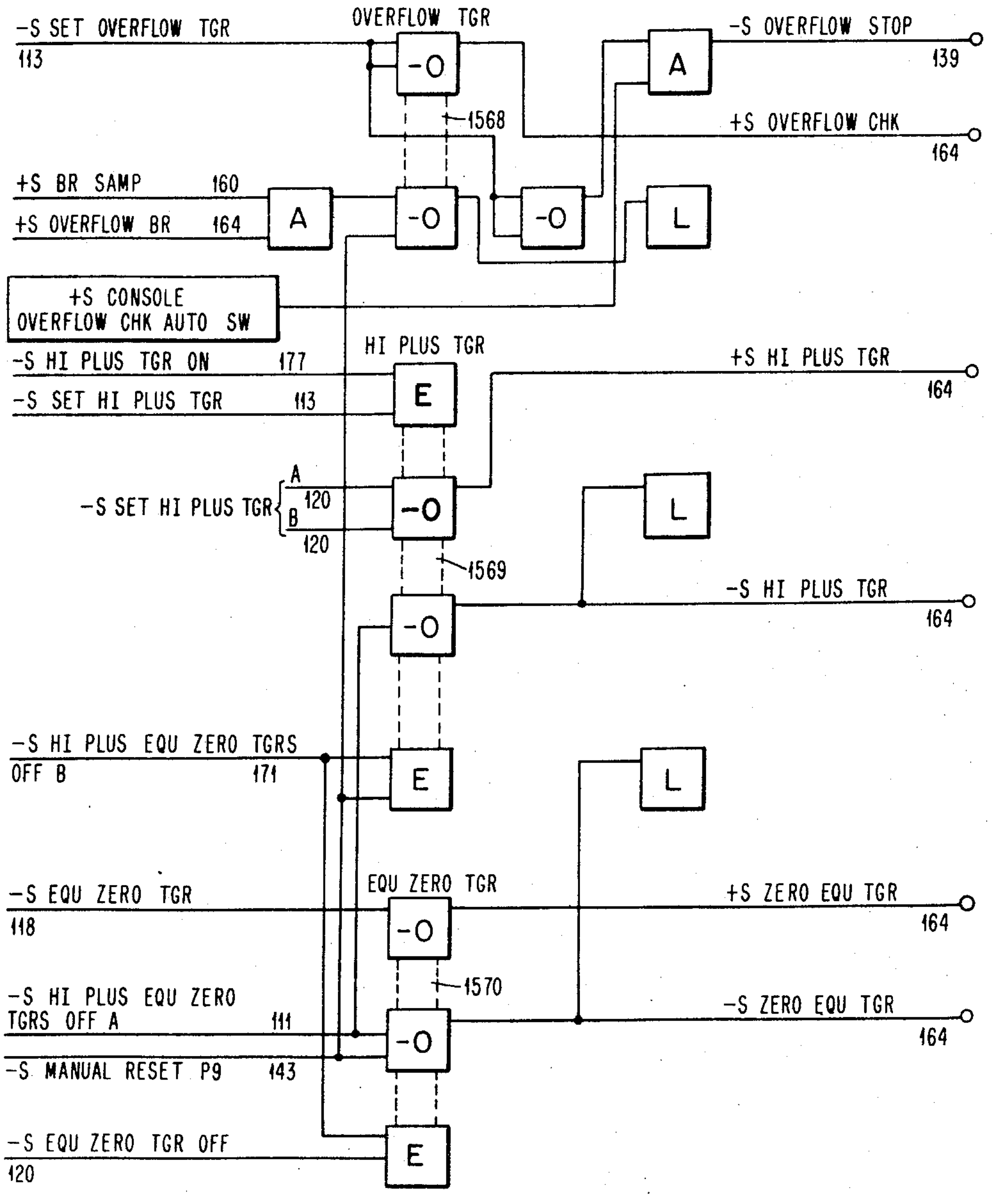

FIG.126 RECOMPLEMENT PROGRAM
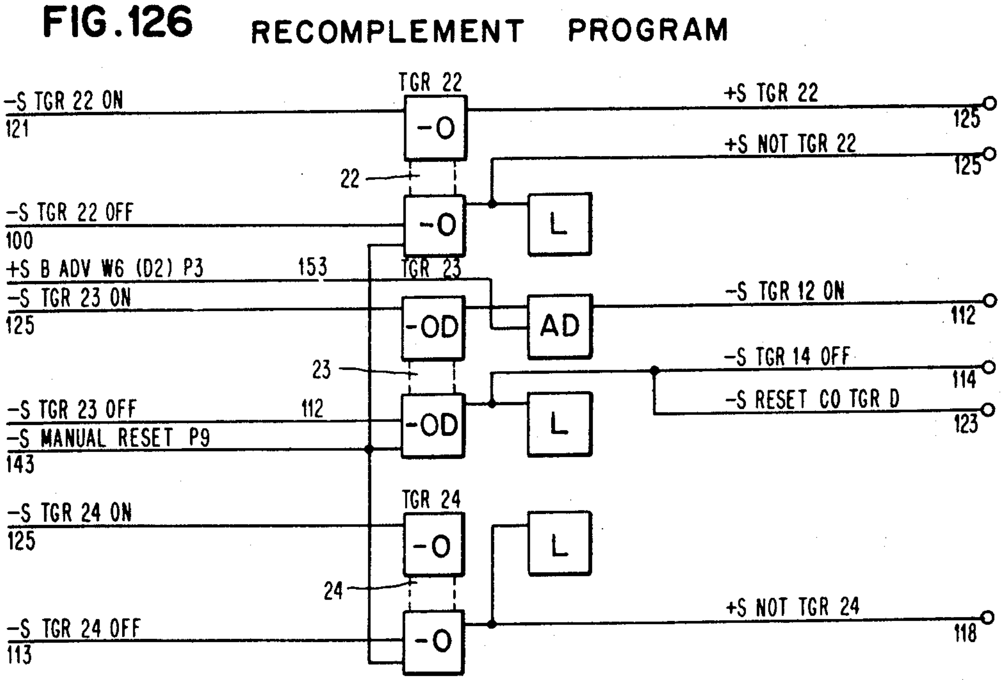
FIG.127 BT PROGRAM
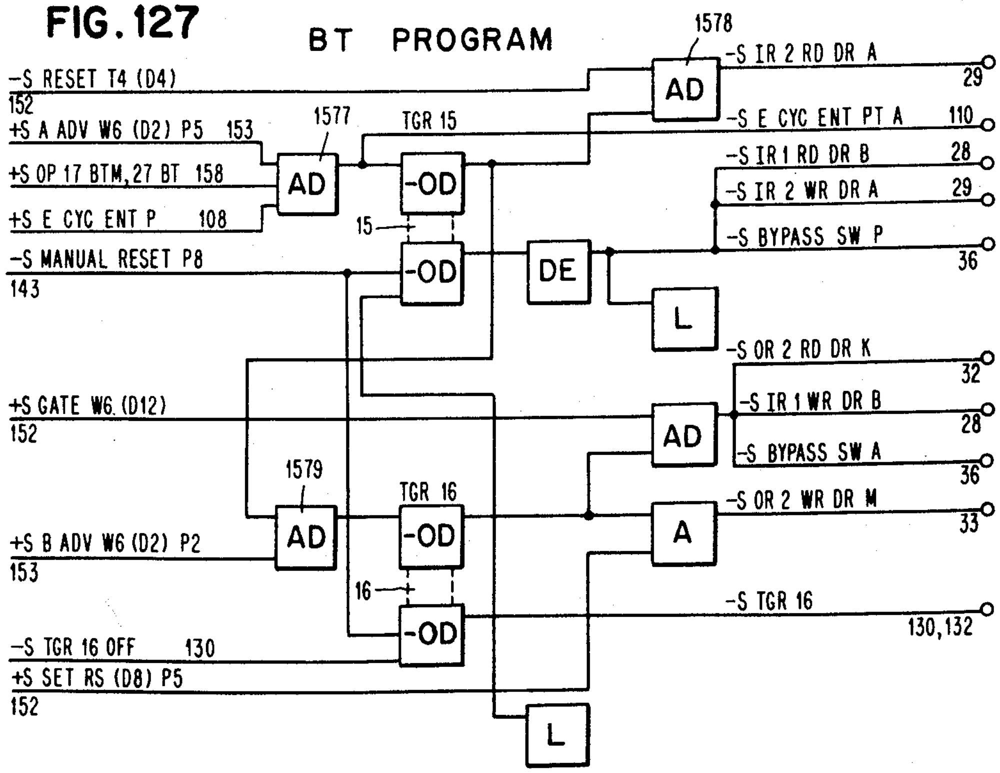

Aug. 14, 1962 W. H. RHODES ETAL 3,049,295

MULTIPLYING COMPUTER

Filed Dec. 20, 1960 156 Sheets-Sheet 100

B B PROGRAM

TRANSMIT PROGRAMS

TRANSMIT PROGRAMS

DELAY TRANSMIT TRIGGERS

FIG.135 I/O CONTROL PROGRAM

I/O CONTROL PROGRAM

FIG. 138 I/O CONTROL PROGRAM

CONSOLE SAVE

FIG.142 CONSOLE START

Aug. 14, 1962 W. H. RHODES ETAL 3,049,295

MULTIPLYING COMPUTER

Filed Dec. 20, 1960 156 Sheets-Sheet 114

CONSOLE I/O STOP

CONSOLE SINGLE INST

Aug. 14, 1962 W. H. RHODES ETAL 3,049,295

MULTIPLYING COMPUTER

Filed Dec. 20, 1960 156 Sheets-Sheet 115

FIG.146 CONSOLE DISPLAY ADDRESS

CLOCK CONTROL

CLOCK 1-4 TRIGGERS

CLOCK 5-8 TRIGGERS

Aug. 14, 1962 W. H. RHODES ETAL 3,049,295

MULTIPLYING COMPUTER

Filed Dec. 20, 1960 156 Sheets-Sheet 118

CLOCK 9-11 TRIGGERS

Aug. 14, 1962 W. H. RHODES ETAL 3,049,295

MULTIPLYING COMPUTER

Filed Dec. 20, 1960 156 Sheets-Sheet 119

TIMING SAMPLE GENERATION

TIMING SAMPLE GENERATION

Aug. 14, 1962 W. H. RHODES ET AL 3,049,295

MULTIPLYING COMPUTER

Filed Dec. 20, 1960 156 Sheets-Sheet 121

Aug. 14, 1962 W. H. RHODES ETAL 3,049,295

MULTIPLYING COMPUTER

Filed Dec. 20, 1960 156 Sheets-Sheet 124

OP DECODER TENS

Aug. 14, 1962 W. H. RHODES ETAL 3,049,295

MULTIPLYING COMPUTER

Filed Dec. 20, 1960 156 Sheets-Sheet 125

OP CODES 11 TO 29

OP CODES 42 TO 49

Aug. 14, 1962 W. H. RHODES ETAL 3,049,295

MULTIPLYING COMPUTER

Filed Dec. 20, 1960 156 Sheets-Sheet 127

SENSE AND BRANCH REG CONTROL

SENSE AND BRANCH REG 1

SENSE AND BRANCH REG 2

Aug. 14, 1962 W. H. RHODES ET AL 3,049,295

MULTIPLYING COMPUTER

Filed Dec. 20, 1960 156 Sheets-Sheet 130

SENSE AND BRANCH DECODER

Aug. 14, 1962 W. H. RHODES ETAL 3,049,295

MULTIPLYING COMPUTER

Filed Dec. 20, 1960 156 Sheets-Sheet 131

SENSE AND BRANCH TEST

DATA CHECK TEST

Aug. 14, 1962 W. H. RHODES ETAL 3,049,295

MULTIPLYING COMPUTER

Filed Dec. 20, 1960 156 Sheets-Sheet 135

MULTIPLY CYCLE CONTROL

MULTIPLY PROGRAM STAGE 1
CLEAR ACCUMULATOR

MULTIPLY PROGRAM STAGE 2
READ MULTIPLIER DIGIT

MULTIPLY PROGRAM STAGE 3
READ MULTIPLICAND DIGIT

FIG. 177 MULTIPLY PROGRAM STAGE 7
WRITE SUM DIGIT INTO ACCUMULATOR
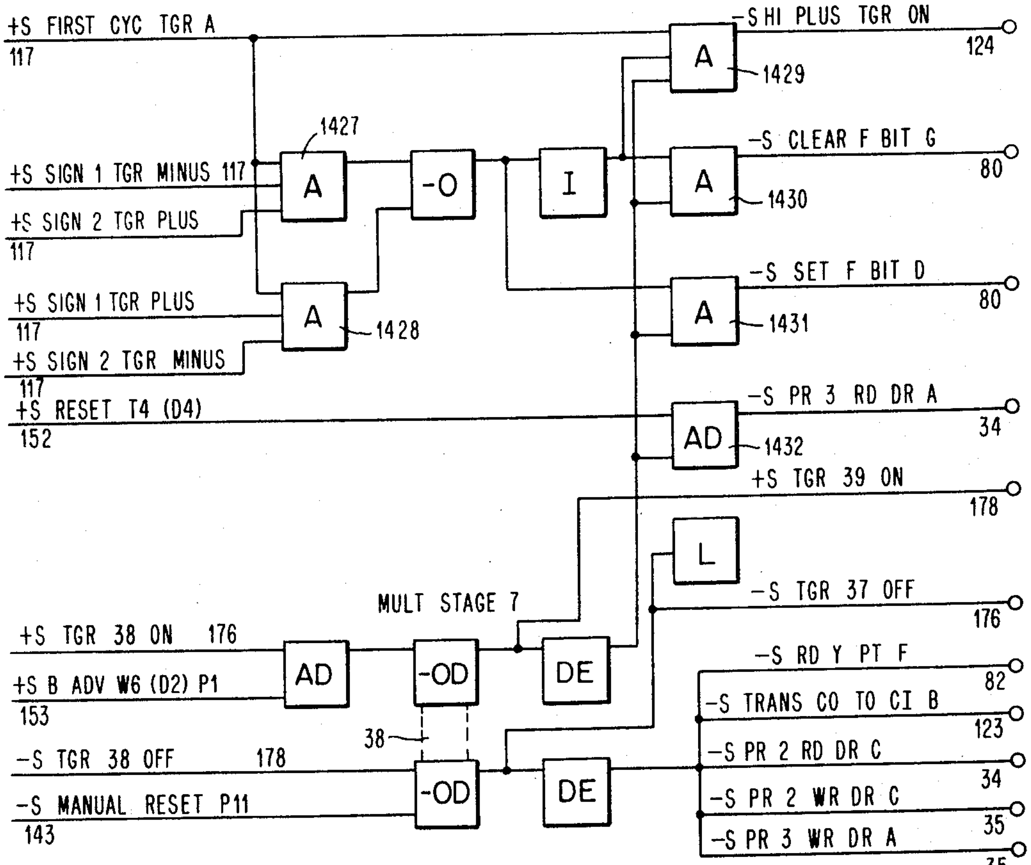
FIG. 178 MULTIPLY PROGRAM STAGE 8
READ OUT ACCUMULATOR DIGIT
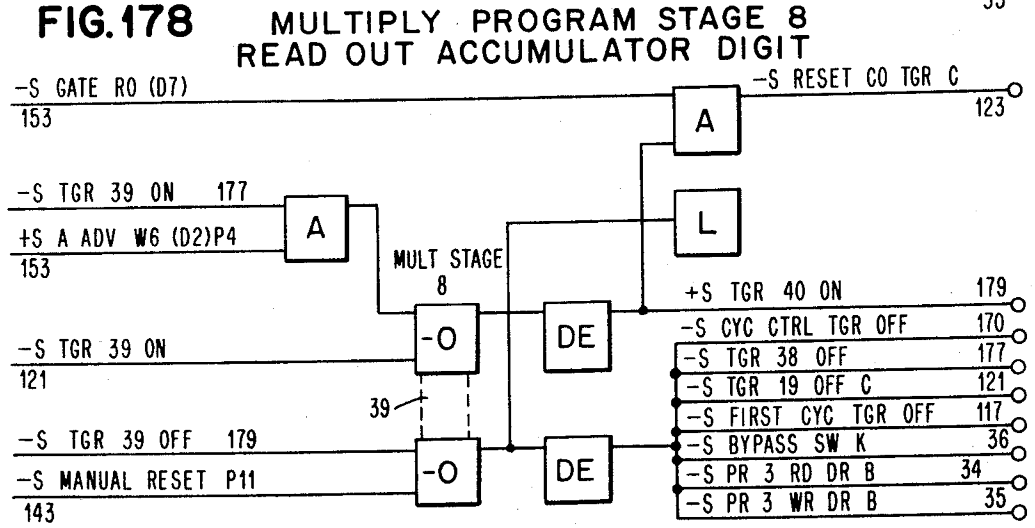

MULTIPLY PROGRAM STAGE 9
READ OUT ADD TABLE

MULTIPLY PROGRAM STAGE 10
WRITE SUM DIGIT INTO ACCUMULATOR

Aug. 14, 1962 W. H. RHODES ETAL 3,049,295

MULTIPLYING COMPUTER

Filed Dec. 20, 1960 156 Sheets-Sheet 141

SELECT

SELECT

FIG. 184 CONDITION SEL AND GATE CONTROL
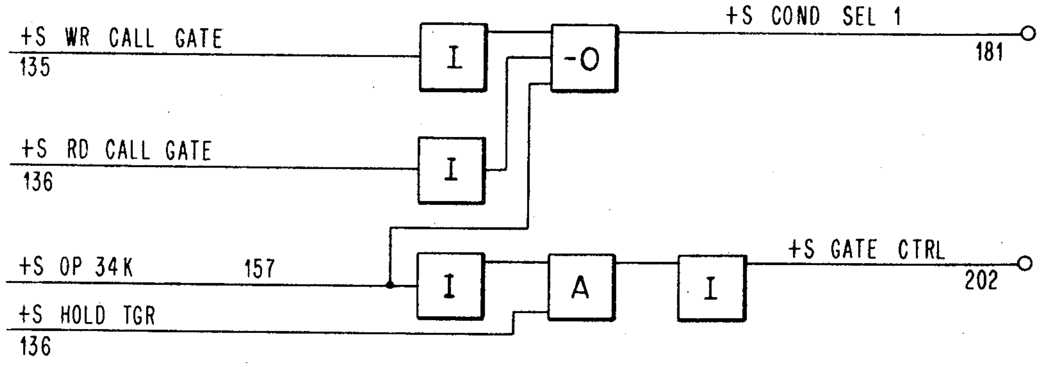
FIG. 185 C BIT CORRECTION
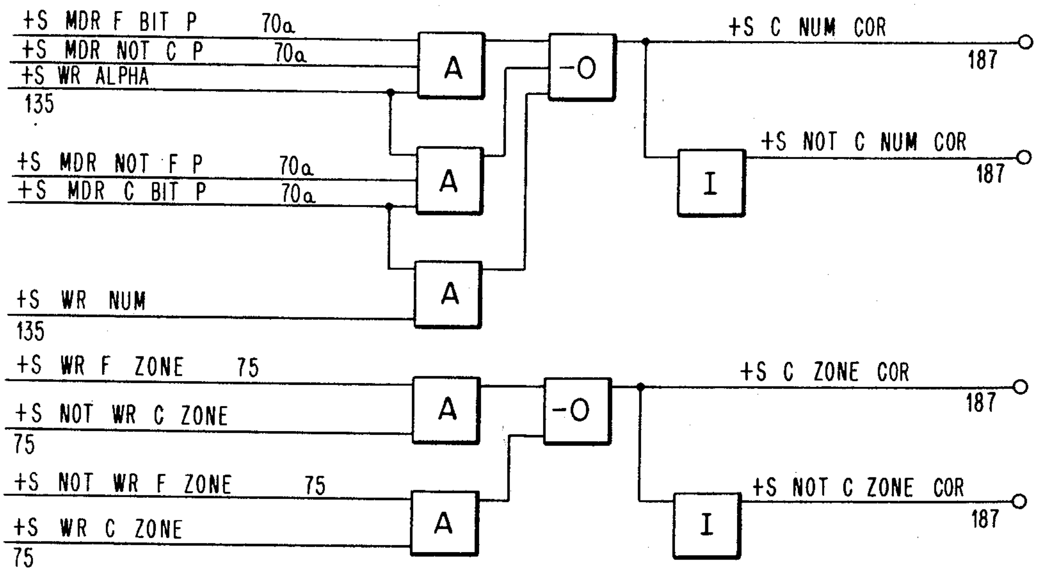
FIG. 186 ZERO DECODE
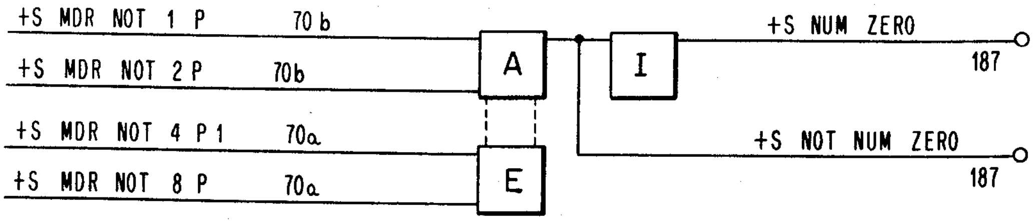

Aug. 14, 1962 W. H. RHODES ET AL 3,049,295
MULTIPLYING COMPUTER
Filed Dec. 20, 1960 156 Sheets-Sheet 144
FIG. 187 OUTPUT TRANSLATION
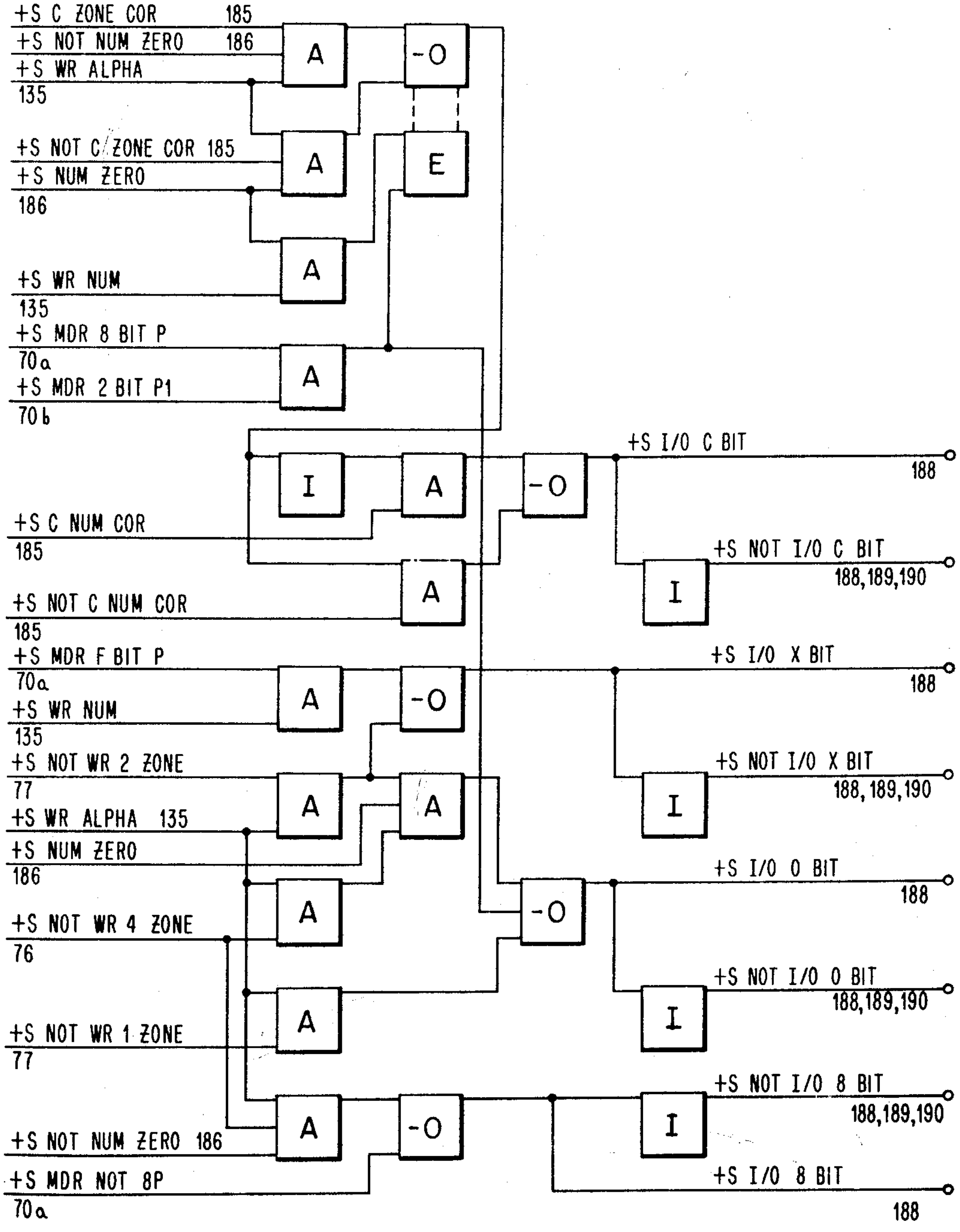

Aug. 14, 1962 W. H. RHODES ETAL 3,049,295
MULTIPLYING COMPUTER
Filed Dec. 20, 1960 156 Sheets-Sheet 145
FIG.188 I/O WR CODE CHECK
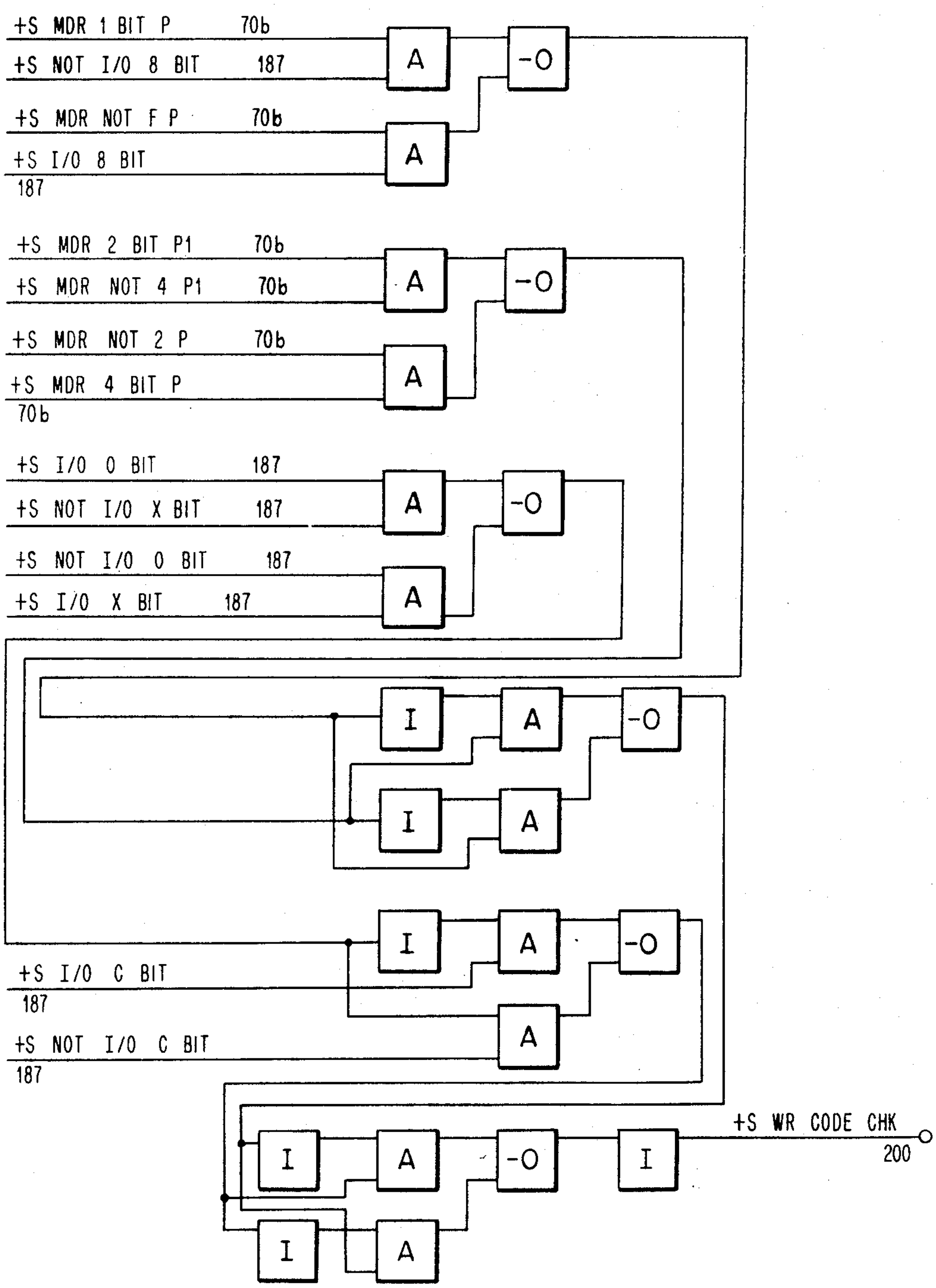

FIG. 189 TYPEWRITER RELAY DRIVE
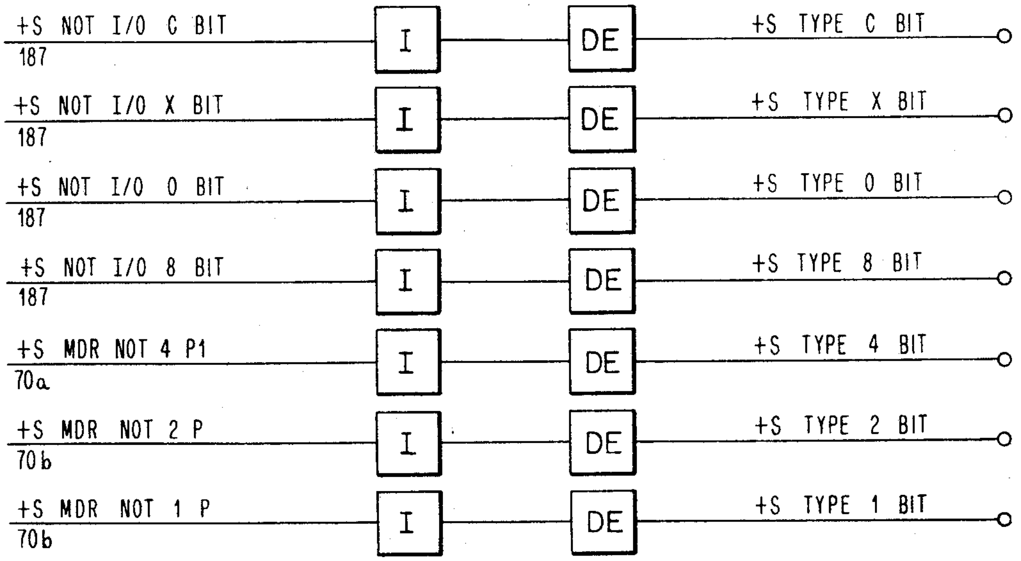
FIG. 190 PUNCH DATA GATE
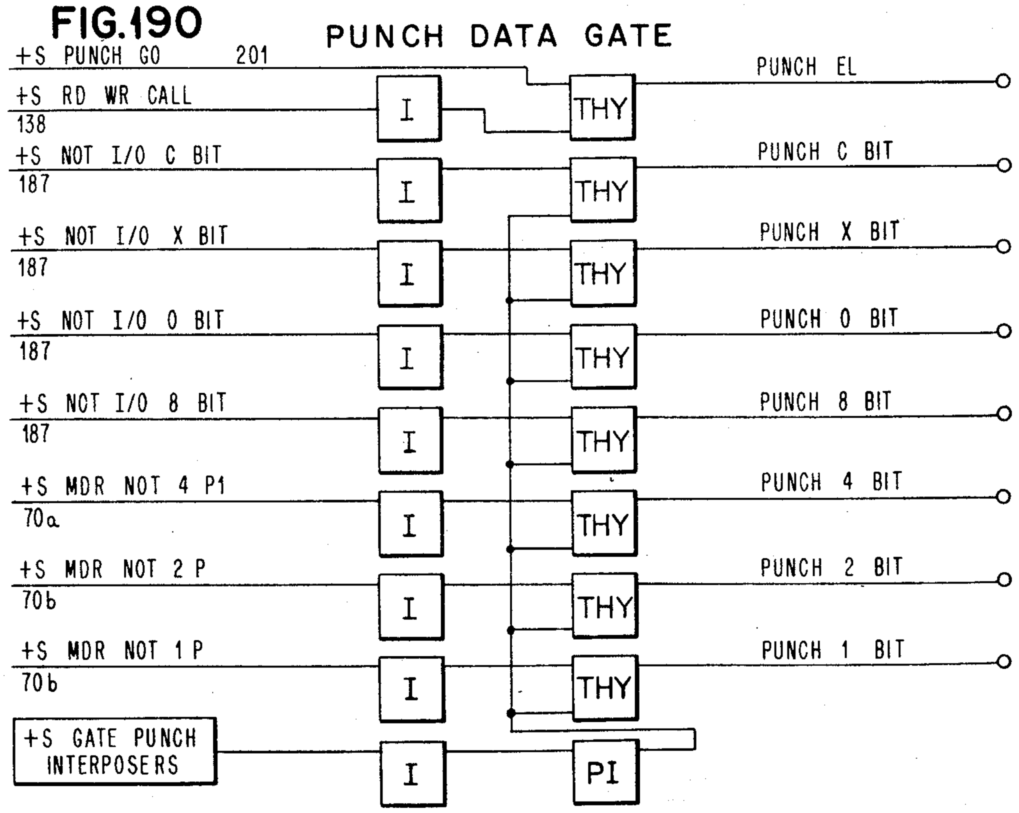

Aug. 14, 1962 W. H. RHODES ETAL 3,049,295

MULTIPLYING COMPUTER

Filed Dec. 20, 1960 156 Sheets-Sheet 147

KEYBOARD CONTROL

I/O READ CODE CHECK

I/O READ CODE CHECK

INPUT TRANSLATOR C BIT CONTROL

INPUT TRANSLATOR C BIT

RD ALPHA C BIT CORRECTION

INPUT TRANSLATOR ZONE AND NUM

FIG. 200 READ-WRITE CHECK
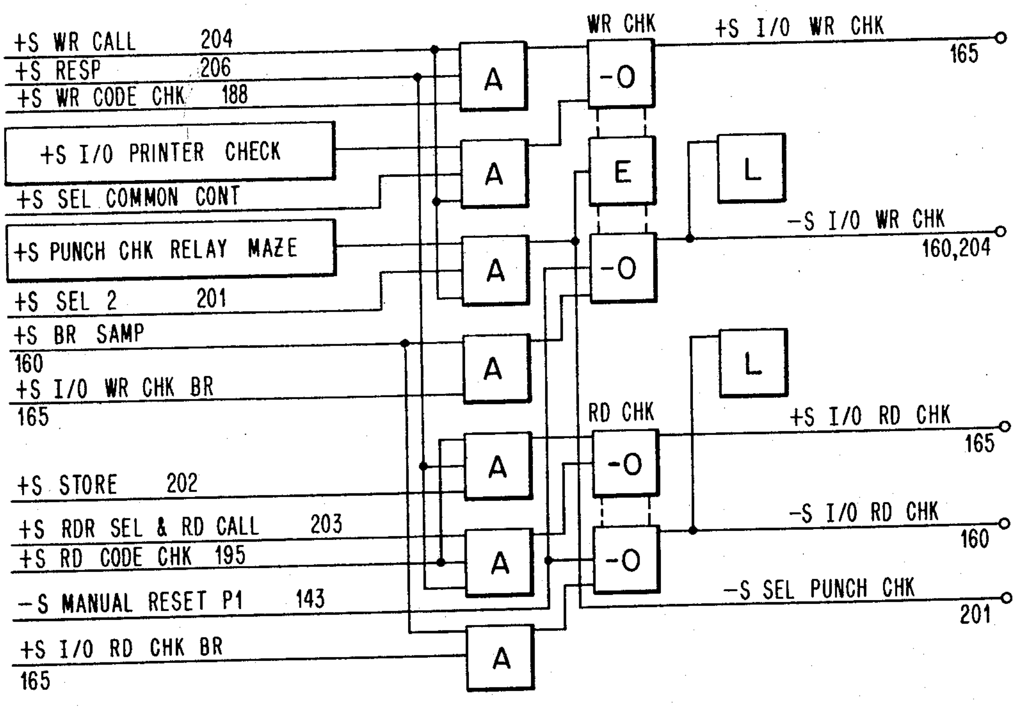
FIG. 201 PUNCH CONTROL
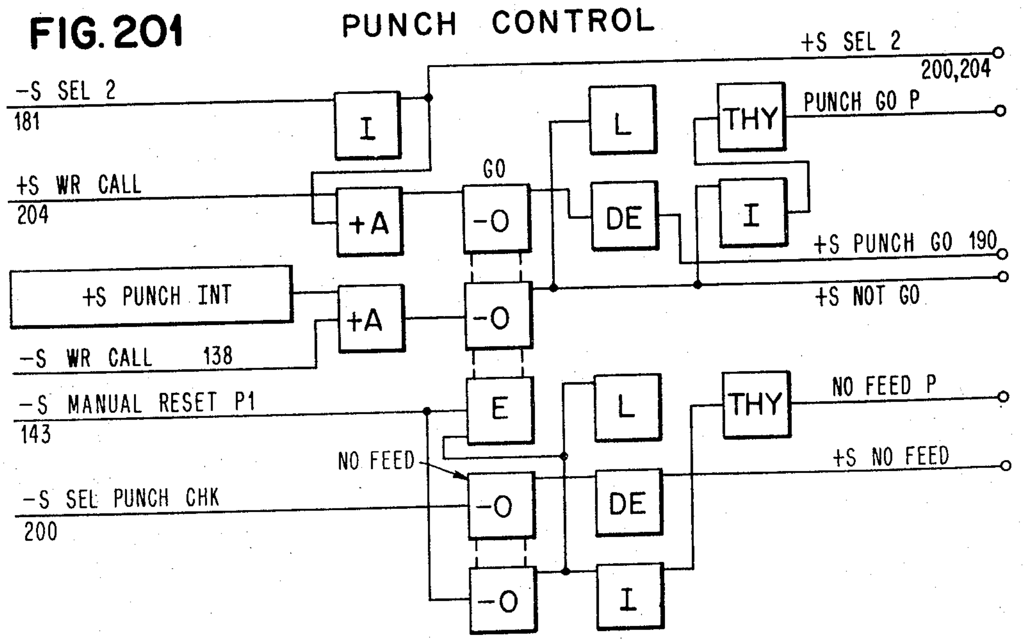

TYPEWRITER CONTROL

PAPER TAPE READER CONTROL

FIG. 204 RESPONSE CONTROL
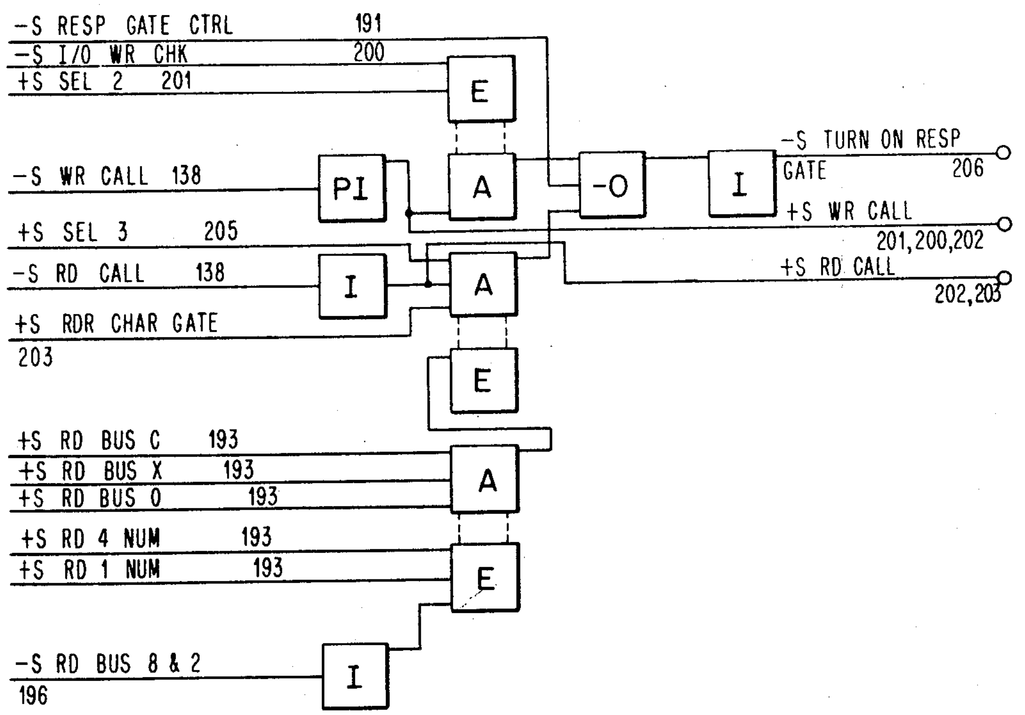
FIG. 205 DISCONNECT CONTROL
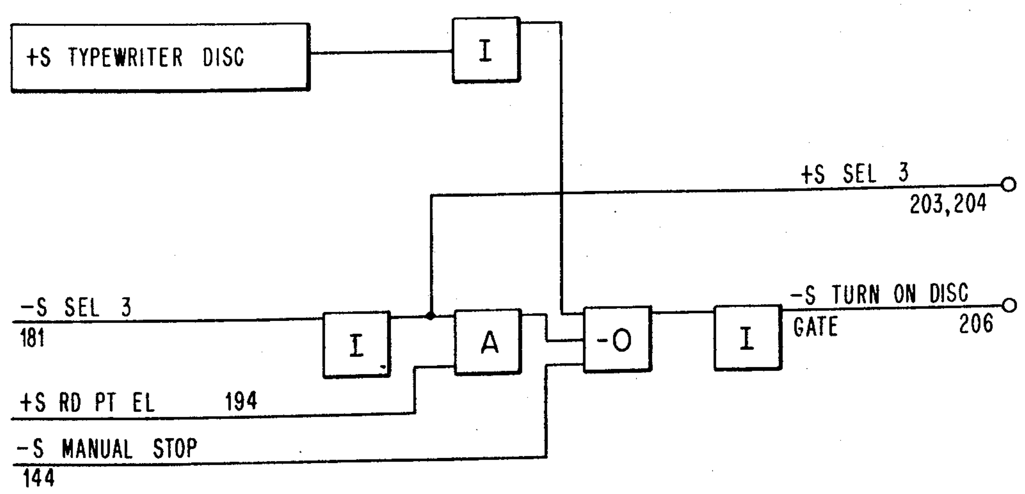

Aug. 14, 1962 W. H. RHODES ETAL 3,049,295

MULTIPLYING COMPUTER

Filed Dec. 20, 1960 156 Sheets-Sheet 156

RESPONSE AND DISCONNECT

United States Patent Office 3,049,295

Patented Aug. 14, 1962

3,049,295

MULTIPLYING COMPUTER

William H. Rhodes, Poughkeepsie, James G. Brenza, Lake Carmel, and Wayne D. Winger and Robert C. Jackson, Poughkeepsie, N.Y., assignors to International Business Machines Corporation, New York, N.Y., a corporation of New York Filed Dec. 20, 1960, Ser. No. 77,120
21 Claims. (Cl. 235—156)

SECTION A—INTRODUCTION

This invention relates to a digital computer, and more particularly to a low cost, memory-centered, multiplying computer. This is a continuation-in-part of copending United States application Serial Number 847,306, now abandoned, of William H. Rhodes, James G. Brenza, and Wayne D. Winger, filed October 19, 1959, entitled "Computer."

Prior art digital computers have generally multiplied by schemes such as over-and-over addition, halving the multiplier and doubling the multiplicand, addition of multiples of the multiplicand, or passing multiplicand digits through complex multiplying matrixes which are set according to a multiplier digit. Such multiplying computers have achieved great success due to their prodigious capabilities and high accuracies; the very nature of such computers, however, makes them expensive. Small business and scientific organizations have indicated a need for a stored program computer which can handle complex scientific and business multiplications, at a reasonable speed, and at a low cost for the machine. These organizations require multiplying ability and accuracy comparable to that of giant computers, but they simply cannot afford such giant computers. Since sacrifice of calculating ability is not acceptable, sacrifice of speed and shortcut arithmetic must be depended upon for the vast cost reduction which is mandatory. Accurate and dependable low speed electronic components are not sufficiently cheaper than equivalent high speed components to accomplish effective cost reduction by direct substitution of cheaper components. This invention presents a novel approach to multiplying, which eliminates whole sections of standard computer subassemblies, accomplishing the same final result, somewhat less speedily but at greatly reduced machine cost, by requiring subassemblies to accomplish multiple functions, making use of each subassembly in as many functions as possible.

Prior digital computers may generally be described as serial or parallel, depending upon the handling of multi-digit words during arithmetic operation. For example, a parallel computer generally adds by storing the augend in a multi-order accumulator and superimposing the addend digit values concurrently onto the values stored in the related accumulator stages. Carries are handled together at a later or carry time. A serial computer generally adds by placing addend and augend in registers, and concurrently shifting out the digit values of equal orders of the registers, through an adder, into an accumulator. The adder, which accepts the augend digit value and the addend digit value as inputs, stores the carry, which is delayed one digit cycle and then fed to the adder on the following cycle as a third input together with the next higher digit order values of augend and addend.

The parallel computer has speed advantages; the serial computer, slightly slower normally, effects savings in circuitry and can handle words of variable length. Both serial and parallel computers in the prior art have had adders, i.e., devices which accept two equal order digits and the carry from the previous order and produce a sum and carry. In serial binary machines the adder is quite simple; in parallel decimal machines the adder (or accumulator which comprises a plurality of adders) may be very complex.

Such computers have revolutionized many phases of scientific and business operations through their vast capacities and speeds. The cost of such computers, however, limits their use to the small number of organizations which possess great quantities of problems for computation as well as the funds.

Prior art computers operate on pure binary, binary-coded decimal, biquinary decimal, pure decimal and many other configurations and combinations of bits making up a digit. The binary-coded decimal (BCD) format includes four bits valued at 1–2–4–8, each bit being either present (1) or absent (0). The 1–2 combination is the digit 3; 1–2–4 is the digit 7; and 1–8 is the digit 9. In addition to the 1–2–4–8 bits, a parity check bit, which, when added to the other bits present, always results in an odd total number of bits, is often included. Other bits may be included in the digit format, such as zone bits for alphameric characters, or logical indicator bits (flags) which may be used for sign control, word-end marks, or for controlling other non-digital functions.

*Objects*

The primary object of the invention is to provide a multiplying computer at low cost.

Another object of the invention is to provide a memory-centered multiplier.

A further object of the invention is to provide a memory-centered multiplier which operates by repetitive memory references.

A still further object of the invention is to provide memory referencing means for controlling table lookup type multiplication operations in a memory-centered computer.

Another object of the invention is to provide improved mechanism for decoding the flag to more completely utilize the flag for function control during multiplying.

Still another object is to provide memory-centered computer table lookup mechanism in which the table area of 200 locations in memory can be addressed directly by a single digit of the multiplier and a single digit of the multiplicand.

A more specific object is to provide a memory centered multiplier which operates in conjunction with a memory-centered table lookup computer by time-sharing of hardware.

*Summary of the Invention*

The invention is a memory-centered, low cost multiplying computer, in which operations are performed by multiple references to memory. The memory has stored in it an add table, each location being adapted to store a 4-bit BCD digit and a flag denoting the sum and carry, respectively, of two decimal digits which make up the address of the location. For example, units digits 7 and 6 of addend 37 and augend 46, when added together, equal 13. Memory address . . . 76 contains a flagged 3 (3 and carry). The sum digit is available from the table by addressing the location according to the addend digit and augend digit as address digits, according to table lookup add procedure. This table lookup add operation takes place many times during the multiply operations as partial products are accumulated to form the final product.

The memory is set up to read out of a pair of digits upon addressing of either digit. Addressing an even numbered location references the addressed location and the next higher odd addressed location; addressing an odd numbered location references the addressed location and the next lower even addressed location. An even addressed location and its adjacent higher odd addressed location form a memory location pair. A multiply table, made up of two-digit products of a single digit of the multiplicand and a single digit of the multiplier, is spread over 200 addresses in memory, or 100 memory location pairs. Since the two digits (multiplier and multiplicand) can directly form only addresses for 100 table locations, the digits cannot be used directly to address the memory table as in the table lookup add operation.

The multiplier digit is doubled, forming a units digit and a carry digit. The units digit is used to form the units address of the table in memory; the carry is used to form the hundreds address of the table in memory. The multiplicand digit is used directly to form the tens digit of the address. In this manner, the two digits provide a 200-address spread of 100 even-numbered addresses such as 000–198, which carry along their adjacent odd adddressed memory locations as memory pairs. Accordingly, upon addressing the multiply table at the location called for by the multiplicand and the doubled multiplier digit, the memory location pair holding the product (two digits) of the multiplier digit and multiplicand digit is made available. In the preferred embodiment described herein, a 1 is always inserted in the hundreds digit of the multiply table address, and the multiply table is in memory locations 00100–00299. The table addresses generated by the multiplier, multiplicand and insert digits are 00100–00102–00104–0016 . . . 00198.

The multiply sequency of memory references is controlled by a program timer, which operates memory addressing means including a memory address register and a plurality of memory address retaining storage registers. Memory locations and location pairs involved in the multiply sequence are referenced in turn to set up the multiply mechanism, produce the operands, generate partial products, accumulate and store the partial products and finally to call for the next instruction.

A feature of the invention is the combination of a doubler and two-digit-readout memory to provide for table lookup of partial products through manipulation of the multiplier and multiplicand digits involved.

An advantage is the use of ordinary memory to accomplish functions normal to more expensive registers and logic.

Another advantage is the compatibility of table lookup multiply with other operations of a memory-centered computer.

The foregoing and other objects, features and advantages of the invention will be apparent from the following more particular description of a preferred embodiment of the invention, as illustrated in the accompanying drawings.

SECTION B—DRAWINGS

In the drawings:

FIG. 1*a* is a functional block diagram illustrating data flow in a preferred embodiment of the computer.

FIG. 1*b* is a conversion diagram for relating FIG. 1 to FIG. 11 and following figures.

FIG. 2 is a chart of the add table which is stored in memory.

FIG. 3 is a chart of the multiply table.

Figure 15:
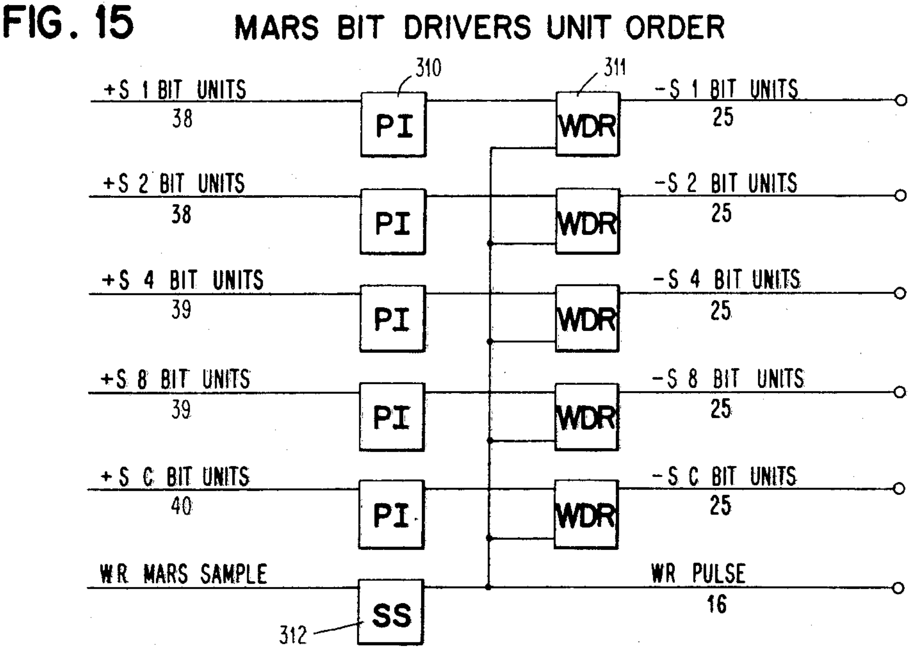
Figure 16:
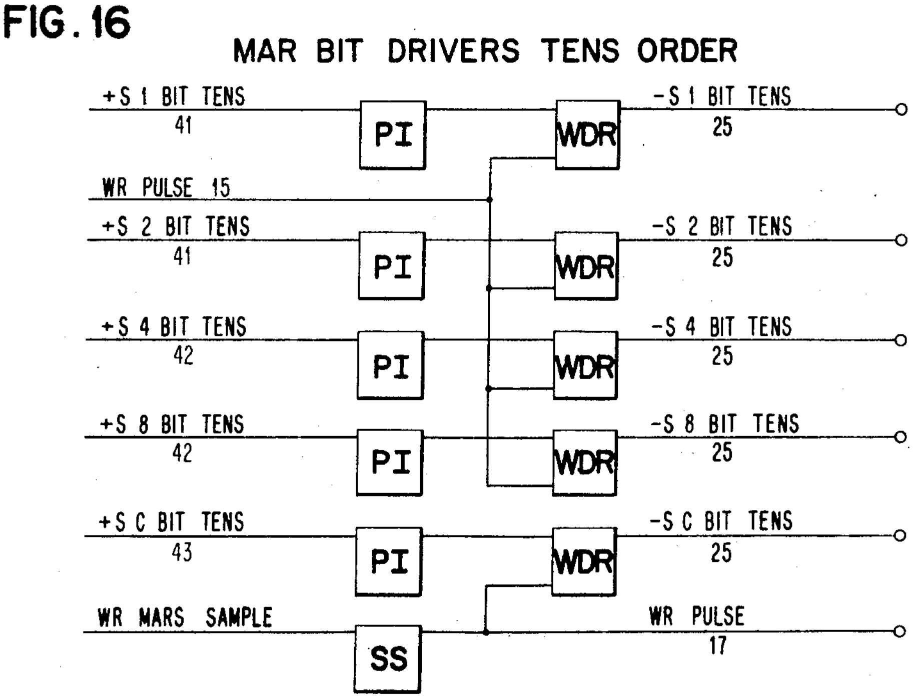

FIG. 15 and following figures are block diagrams of the circuits forming the preferred embodiment.

*Logic Flow*

Figure 1A:
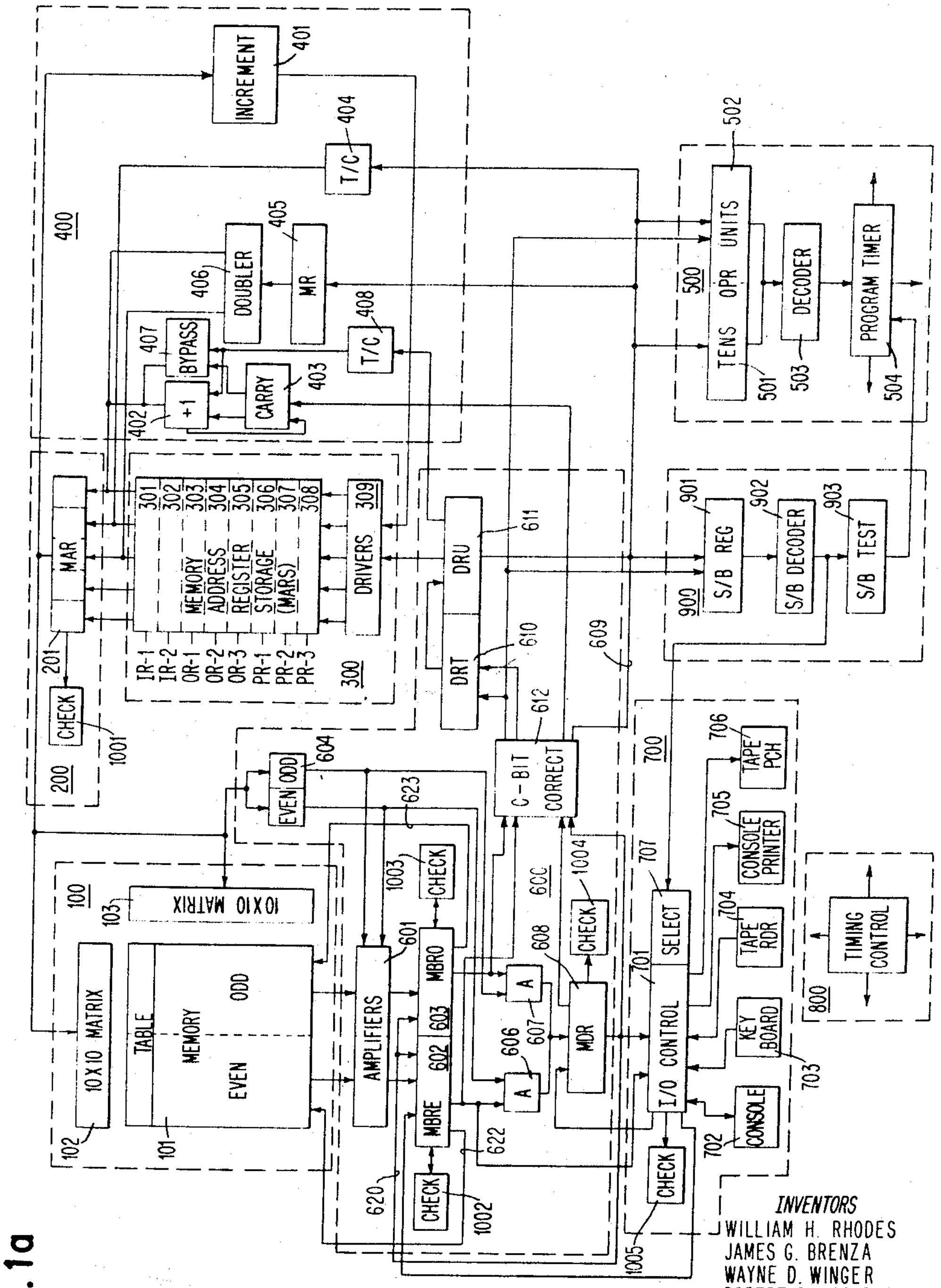
Figure 4:
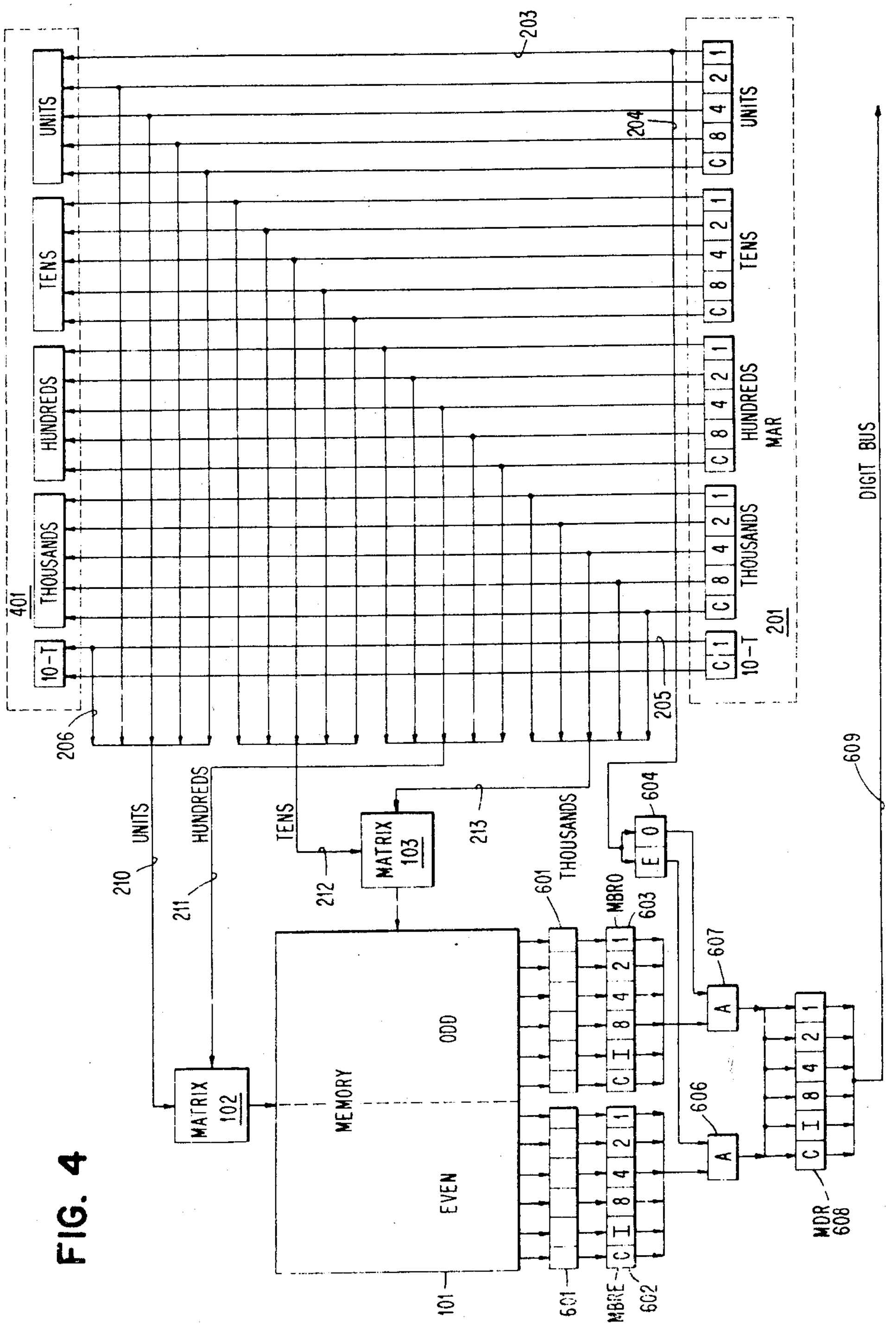
FIG. 4 is a more detailed functional block diagram of memory addressing area 200 and memory readout area 600 of FIG. 1*a*.
Figure 6:
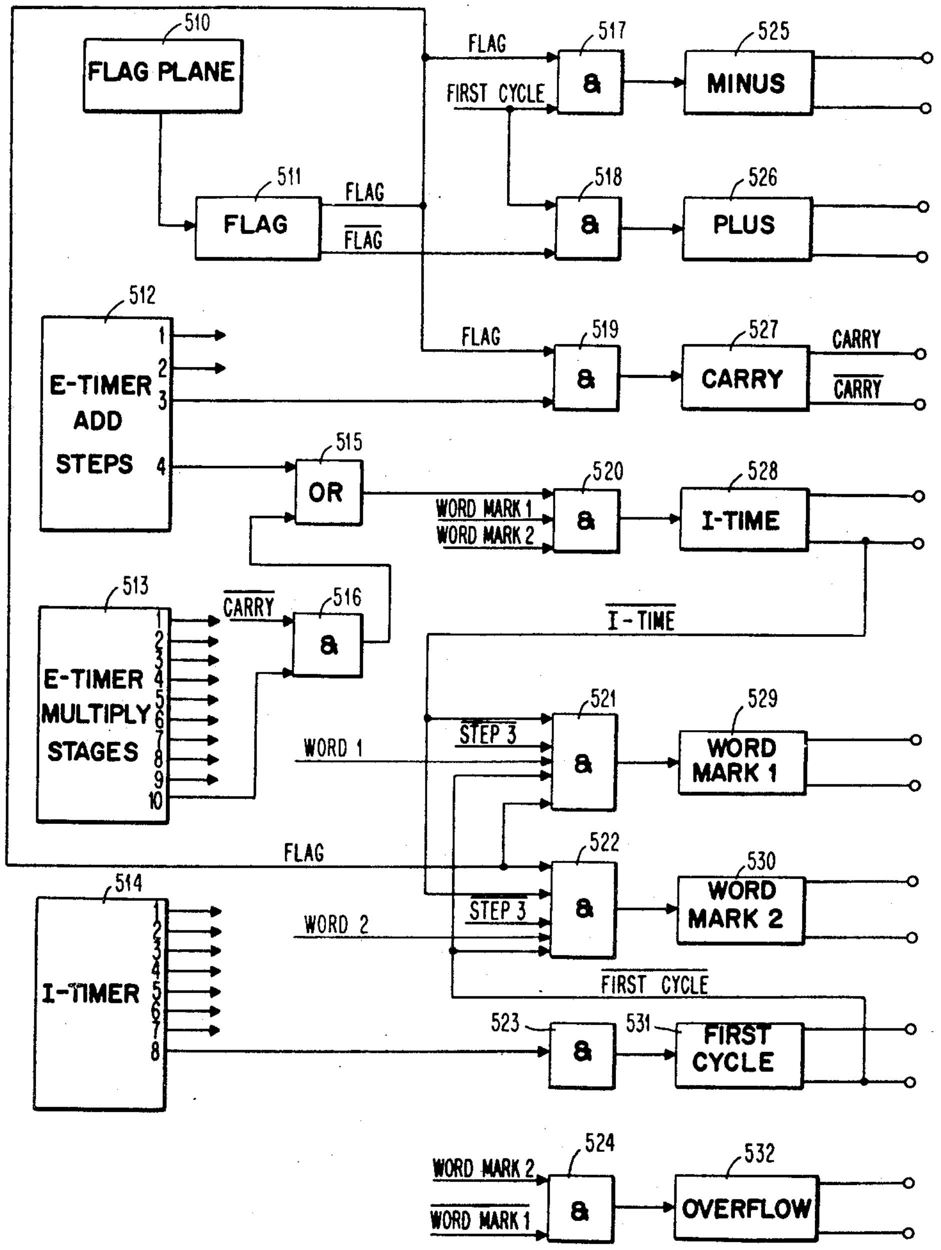
FIG. 6 is a block diagram illustrating flag decoding.

Logic flow in FIGS. 1*a*, 4 and 6 is in the direction indicated by arrowheads on the lines connecting functional blocks.

In other figures, logic flow is from left to right on each sheet of drawing, except where otherwise indicated by arrowheads. Input lines are labeled with a functional description and with the figure number of the corresponding logically preceding output line. Each circuit block is designated with a type designation such as A, PI, etc., which describes its logical function.

Most figures are supplied with descriptive titles. Because of the complexity of the circuitry, there is no attempt to make output lines match input lines for paste-up type composite drawings; the drawings are especially designed for convenient circuit tracing from page to page.

The unitary functional devices (FIG. 10) are shown as plural circuit blocks connected by dotted lines wherever they appear throughout the other figures.

Inverting transistor-resistor logic blocks are used throughout the preferred embodiment. Most lines are therefore labeled either +S or —S, indicating the relative polarity of the line when it is conditioned for the designated function. There is no relationship between current flow and logic flow as shown by line direction or arrowheads.

SECTION C—INDEX

SECTION INDEX

| | | | |
|---|---|---|---|
| Section A | Introduction | Section E | Multiply |
| Section B | Drawings | Section F | Devices |
| Section C | Index | Section G | Construction |
| Section D | Arithmetic Operation | Claim Section | Claims |

FUNCTIONAL UNITS INDEX

| *Functional Unit* | *Figures* | *Reference No.* |
|---|---|---|
| Memory | 1, 4, 11, 12 | **101** |
| MBRE (Memory Buffer Register Even) | 1, 4, 75–77 | **602** |
| MBRO (Memory Buffer Register Odd) | 1, 4, 72–74 | **603** |
| MDR (Memory Data Register) | 1, 4, 68–70 | **608** |
| MARS (Memory Address Retaining Storage) | 1, 4, 13–35 | **300** |
| MAR (Memory Address Register) | 1, 4, 88–92 | **201** |
| Incrementer | 1, 36–50 | **401** |
| Digit Registers (DRT–DRU) | 1, 4, 84–85 | **610, 611** |
| T/C Switches | 1, 4, 51–52 | **408, 404** |
| MR (Multiplier Register) | 1, 168 | **405** |
| OPR (Operation Register) | 1, 154–155 | **501, 502** |
| S/B REG (Switch Branch Register) | 1, 160–162 | **901** |
| I-Timer | 6, 100–108 | **514** |
| E-Timer | 6, 110–180 | **512** |
| Console | 1 | **702** |
| Timing Control | 1 | **800** |

COMPONENT CIRCUIT BLOCK INDEX

| *Name* | *Description* | *Figures* | *Reference No.* |
|---|---|---|---|
| DE-block | Emitter Follower | 9*a* | 1 |
| PID-block | Power Inverter, Drift Transistor | 9*b* | 2 |
| PI-block | Power Inverter | 9*c* | 3 |
| A-block<br>–O-block<br>I-block<br>E-block | AND, OR or Extender | 9*d* | 4 |
| AD-block<br>–OD-block<br>ID-block<br>ED-block | AND, OR or Extender, Drift Transistor | 9*e* | 5 |
| L-block | Lamp Driver | 9*f* | 6 |
| SA-block | Sense Amplifier | 9*g* | 7 |
| OSC-block | Oscillator | 9*h* | 8 |
| SPG-block | Sample Pulse Gate | 9*i* | 9 |
| SS-block | Single Shot | 9*j* | 10 |
| RDR-block<br>WDR-block<br>ZDR-block | Read, Write or Inhibit Driver | 9*k* | 11*f* |
| THY-block | Thyratron | 9*l* | 12*f* |
| RC-block | Resistor | 9*m* | 13*f* |
| SAD-block | Sense Amplifier, Drift Transistor | 9*n* | 14*f* |
| IS-block | Current Source | 9*o* | 15*f* |
| IDR-block | Current Driver | 9*p* | 16*f* |
| DSW-block | Decoder Switch | 9*q* | 17*f* |

*Devices*

| | | | |
|---|---|---|---|
| A-block<br>\|\|<br>E-block | AND With Extender | 10*a* | 1<br>\|\|<br>1 |
| –O-block<br>\|\|<br>–O-block | Trigger (Latch Type) | 10*b* | 1<br>\|\|<br>1 |
| TV-block<br>\|\|<br>TV-block | Trigger (Voltage Mode) | 10*c* | 18*f*<br>\|\|<br>18*f* |

FIGURES INDEX

| | |
|---|---|
| Functional Block Diagram of System | 1*a* |
| Conversion Diagram | 1*b* |
| Add Table | 2 |
| Multiply Table | 3 |
| Functional Block Diagram of Memory Referencing | 4 |
| Timing Chart | 5 |
| Flag Decoding | 6 |
| Add Program Timer | 7 |
| Multiply Program Timer | 8 |
| Component Circuit Blocks | 9 |
| Devices | 10 |
| Memory | 11 |
| Memory Core | 12 |
| MARS Core | 13 |
| MARS Wiring Diagram | 14 |
| MARS Bit Drivers | 15–19 |
| MARS Read Drivers | 20 |
| MARS Write Drivers | 21 |
| MARS Sense Amplifier Positions | 22, 23 |
| MARS Connections | 24–27 |

FIGURES INDEX—Continued

| | |
|---|---|
| IR1 Read Write Drivers Gate Point | 28 |
| IR2 Read Write Drivers Gate Point | 29 |
| OR1 Read Driver Gate Point | 30 |
| OR1 Write Driver Gate Point | 31 |
| OR2 Read Driver Gate Point | 32 |
| OR2 Write Driver Gate Point | 33 |
| PR1, 2 and 3 Read Driver Gate Points | 34 |
| PR1, 2 and 3 Write Driver Gate Points | 35 |
| Bypass Increment Switch Point | 36 |
| DRU–DRT Gate Point to MARS | 37 |
| MARS Entry | 38–50 |
| T/C Switch **408** | 51 |
| T/C Switch **404** | 52 |
| C BIT Correctors | 53 |
| Matrix Switch Drivers | 54 |
| Decode Switch | 55–62 |
| Sense Amplifiers | 63–65 |
| Inhibit Drivers | 66–67 |
| Memory Data Register | 68–70 |
| MDR VRC | 71 |
| MBRO | 72–74 |
| MBRE | 75–77 |
| MBRO VRC | 78 |
| MBRE VRC | 79 |
| MDR—MBR Control | 80–81 |
| Memory Sense Amplifier | 82 |
| Odd-Even Address Data Control | 83 |
| DRU | 84 |
| DRT | 85 |
| DRU–DRT Control | 86 |
| +1 Switch and Bypass | 87 |
| MAR | 88–92 |
| MAR Set Control | 93 |
| MAR Data Entry Increment 2 Switch | 94 |
| MAR VRC | 95–99 |
| I-Cycle Triggers | 100–108 |
| Increment Decrement Trigger | 109 |
| E-Cycle Entry Point and Trigger | 110 |
| Add Subtract Compare Program | 111–117 |
| Add Subtract Compare Word Mark Triggers | 118 |
| Add Subtract Compare T/C Control | 119 |
| Compare | 120 |
| E-Cycle Dummy Triggers | 121 |
| Record Mark Triggers | 122 |
| Add Subtract Compare Carry Control | 123 |
| Overflow High Plus Equal Zero Triggers | 124 |
| Recomplement | 125–126 |
| Branch Programs | 127–129 |
| Transmit Programs | 130–132 |
| Miscellaneous Programs | 133–134 |
| I/O Control Program | 135–138 |
| Console | 139–146 |
| Clock | 147–153 |
| OPR Tens | 154 |
| OPR Units | 155 |
| Op Decoder | 156–159 |
| Sense and Branch | 160–167 |
| Multiplier Register | 168 |
| Doubler | 169 |
| Multiply Program | 170–180 |
| Input/Output | 181–206 |

SECTION D—ARITHMETIC OPERATION

The computer operates on a stored program of an indeterminate number of twelve-digit two-address instructions. The first two digits form the operation code (op code). The next five digits are a P address; the final five digits are a Q address; as follows:

| | | |
|---|---|---|
| $O_2$ $O_1$ | $P_5$ $P_4$ $P_3$ $P_2$ $P_1$ | $Q_5$ $Q_4$ $Q_3$ $Q_2$ $Q_1$ |
| Op Code | P-Number | Q-Number |

The op code, in machine language, comprises two decimal digits. For convenience in understanding programming, mnemonic representations of the operations, as normally used by the programmer, are used herein whereever appropriate.

The 5-digit P-number is for most instructions the address of the location in memory at which a digit is stored. The P-addressed digit is for many instructions the units order of the P-field, which includes locations P and lower-addressed adjacent locations extending to that location at which the flagged high order digit of the P field is located. The P-addressed digit is for certain other instructions the beginning of record. The record includes the P-addressed digit and adjacent higher-addressed memory locations extending to and including the location at which the record end mark is stored. In certain other instructions the P-number is treated as a number, i.e., as digital data.

The 5-digit Q-number may similarly be treated as an address or as data. The op code determines the treatment of the P-number and Q-number during the instruction. Either the P-number and Q-number, or both, may be modified during the execution of the instruction.

In machine language, mnemonic, text, and explanatory text, instructions include the following:

| | |
|---|---|
| 21 A ADD | Add Q-field to P-field. |
| 11 AM ADD (IMMEDIATE) | Add Q-number to P-field. |
| 22 S Subtract | Subtract Q-field from P-field. |
| 12 SM Subtract Immediate | Subtract Q-number from P-field. |
| 23 M Multiply | Multiply Q-field by P-field. |
| 13 MM Multiply Immediate | Multiply Q-number by P-field. |
| 28 D Divide | Divide Q-field by P-field. |
| 25 TD Transmit Digit | Transmit digit from Q to P. |
| 15 TDM Transmit Digit Immediate | Transmit $Q_1$ to P-location. |
| 26 TF Transmit Field | Transmit Q-field to P-field. |
| 16 TFM Transmit Field Immediate | Transmit Q-number to P-field. |
| 31 TR Transmit Record | Transmit Record at Q to P-field. |
| 36 RN Read Numerically | Read from Q-device to P-record. |
| 32 SF Set Flag | Set flag bit into P-location. |
| 33 CF Clear Flag | Reset flag bit in P-location to zero. |
| 24 C Compare | Compare Q-field with P-field and determine if P-field is high or equal. |
| 14 CM Compare Immediate | Compare Q-number with P-field and determine if P-field is high or equal. |
| 34 K Control | Execute the control function specified by $Q_4$–$Q_3$ on the input/output device specified by $Q_2$. |
| 35 DN Dump Numerically | Transmit P-address through location 19998 to output device specified by Q-address. |
| 36 RN Read Numerically | Transmit numeric data from Q-number specified input device to P-location and upward. |

| | |
|---|---|
| 37 RA Read Alphanumerically | Transmit alphanumeric data from Q-number specified input device to P-location and upward. |
| 38 WN Write Numerically | Transmit numeric data from P-location upward to the Q-number specified output device. |
| 39 WA Write Alphanumerically | Transmit alphanumeric data from P-location upward to Q-number specified output device. |
| 27 BT Branch and Transmit | Branch unconditionally to the P-addressed instruction; transmit Q-field to (P–1) field. Save address of next instruction. |
| 17 BTM Branch and Transmit Immediate | Branch unconditionally to the P-addressed instruction. Transmit Q-number to (P–1) field. Save address of next instruction. |
| 42 BB Branch Back | Branch unconditionally to the instruction at a previously-stored address. |
| 43 BD Branch on Digit | Test Q-addressed digit and branch to P-addressed instruction on non-zero. |
| 44 BNF Branch No Flag | Test Q-addressed digit and branch to P-addressed instruction if no flag. |
| 45 BNR Branch No Record Mark | Test the digit in the location specified by a previously-stored address and branch to P-addressed instruction if digit is not a record mark. |
| 46 BI Branch Indicator | If Indicator specified by Q-number is on, branch to P-addressed instruction. |
| 47 BNI Branch No Indicator | If Indicator specified by Q-number is off, branch to P-addressed instruction. |
| 48 H Halt | Stop automatic operation. |
| 49 B Branch | Branch unconditionally to the P-addressed instruction. |
| 50–99 NOP No Operation | Proceed, ignoring instruction. |

Most instructions require an instruction period (I-cycle) and an execution period (E-cycle). The I-cycle, for most instructions, comprises a fixed 7 memory references and a dummy cycle, which results in setup of the computer to execute the op code instruction upon the contents of the P and Q addresses. The E-cycle varies with the operation, and may be zero, one, several or many memory references according to the complexity of the operation.

The digit format is binary-coded decimal (BCD)—four bits; check bit; and flag bit. Data words are variable length. Beginning of word (Word Mark) of data words is signalled by a flag in the high order position; a flag in the low order position indicates a negative number. The flag has various meanings depending on its location in the word and upon the particular operation and step of the operation being performed.

*Data Flow—FIG. 1*

The computer comprises ten major functional areas numbered 100–200, etc., blocks within major functional areas being numbered 101–102, etc.

The major functional areas are as follows:

100—Memory Area
200—Memory Addressing Area
300—Memory Address Register Storage Area
400—Memory Address Modification Area
500—Operation Control Area
600—Memory Read-out Area
700—Input-Output Area
800—Timing Control Area
900—Sense-Branch Area
1000–2000—Check and Miscellaneous Area Memory area 100 comprises a 120,000 magnetic core memory of 20,000 six-bit digit locations, each location having a unique address 00000–19,999. The memory is divided into an odd section and an even section; since a row of cores in memory contains 12 cores, the contents of a pair of locations (12 cores or 2 digits) are read out simultaneously, the pair always including an even addressed location and the higher adjacent odd addressed location. A pair of digits is normally read out and regenerated during a memory reference cycle. The memory is subject to vertical half-selection by a 10×10 matrix switch 102 and horizontal half-selection by a similar 10×10 matrix switch 103. These two addressing matrices control 10,000 combinations, i.e., the 10,000 even addressed locations and their odd pairs.

Memory addressing area 200 controls the memory location involved in any memory reference. Memory address register 201 (MAR) connects to matrices 102 and 103 to select the address in memory according to the content of MAR.

Memory address register storage area 300 (MARS) is an array of eight 5-digit magnetic core registers 301–308, denominated instruction registers (IR1 and IR2), operand registers (OR1, OR2 and OR3) and product registers (PR1, PR2 and PR3). These registers serve to store the addresses in memory at which instructions, operands and products are to be found; the particular MARS register or registers involved in any memory reference cycle is chosen by the program timer 503. A set of drivers 309 provides power to set the register cores.

Memory address modification area 400 is instrumental in controlling the flow of each addition problem and of many other instructions through the sequence of operations. It also controls the flow of the stored program. Increment switch 401 is operable, under control of means within the operation control area, to increment by 1, increment by 2, decrement by 1, or transmit unaltered (bypass) a memory address as it is transmitted from MAR 200, and regenerate the modified address back in the proper register in MARS. The increment-2 function is useful in instruction cycles for readout of instruction control words which are set in MARS two digits at a time; decrement-1 is useful in stepping, low order to high order, through all the digits of a multi-order numeric word; increment-1 is useful in the transmission of records.

Plus-1 switch 402, bypass switch 407, carry switch 403, and true-complement switch 408 are part of the addend digit path to MAR during setup for addressing the add table in memory. Plus-1 switch 402 inserts the carry from the addition of the previous order, when carry trigger 403 is set; bypass 407 passes the addend digit when the carry switch is unset. True-complement switch 404 is part of the augend digit path to MAR during setup.

Multiplier register 405 and doubler 406 are used in the multiply operation only. To generate a three-digit number to address the multiply table in memory, the multiplicand digit is used for the tens digit of the address, and the multiplier digit is doubled to form a units position digit with an even number, and as a hundreds position digit either a 2 or a 1 depending on whether or not the doubling produced a carry.

Operation control area 500 includes two single-digit operation registers OPR tens 501 and OPR units 502, decoder 503 and program timer 504. The program timer controls other sections of the computer in sequence according to the op code as decoded by decoder 502.

Memory readout area 600 includes sense amplifiers 601, which, under control of small signals from memory cores produce pulses of sufficient power to operate memory buffer register even (MBRE) 602 and memory buffer register odd (MBRO) 603.

Memory readout places the content of an even-addressed digit location in MBRE and of the next higher odd-addressed location in MBRO, regardless of which of the two was addressed. During each normal memory reference operation, MBRE and MBRO regenerate the data they receive back into the referenced location in memory. Upon certain operations the read-in from memory to MBRE, or to MBRO, may be inhibited, during which memory reference MBRE or MBRO may be set from another source, such as MDR, via channel 620. In any case, on any memory reference, the referenced pair (even and next higher odd memory locations) may be regenerated via path 622 or 623 with the data from MBRE and MBRO, respectively. Even-odd switch (E/O) 604, however, is subject to the 1-bit position of the units order of the address, and therefore is even when the 1-bit is 0, and odd when the 1-bit is 1. The E/O controls AND circuits 606 and 607 so that only the memory location addressed feeds its content to the memory data register (MDR) 608. MBRO connects directly to digit register tens (DRT) 610; MBRE connects via AND circuit 606, MDR 608 and bus 609 to digit register units (DRU) 611. This connection makes necessary the transposition of digits of multiply products in memory; the even-addressed location digit goes to DRU; the tens digit from the next higher odd-addressed location goes to DRT. The flag is not always carried along; C-bit correct circuit 612 retains odd parity in the resulting 5-bit digits despite flag changes.

Input-output area 700 includes input-output control 701, console 702, keyboard 703, paper tape reader 704, console printer 705, paper tape punch 706, and select means 707.

Timing control area 800 includes means to generate the various timing pulses for controlling other areas of the computer.

Sense-Branch area 900 includes sense-branch register (SBR) 901, sense-branch decoder (SBD) 902, and sense-branch test (SBT) 903.

Checking and Miscellaneous area 1000 includes check blocks 1001, associated with MAR 201; 1002, associated with MBRE 602; 1003, associated with MBRO 603; 1004, associated with MDR 608; and 1005, associated with I/O control 701.

*Glossary*

Functional units are referred to by name, as shown in the following glossary.

| *Name* | *Descriptive Name* | *Number* |
|---|---|---|
| Memory | Memory | **101** |
| MBRE | Memory Buffer Register-Even | **602** |
| MBRO | Memory Buffer Register-Odd | **603** |
| MAR | Memory Address Register | **201** |
| Plus-1 | Plus-one Switch | **403** |
| Doubler | Doubler | **404** |
| MR | Multiplier Register | **405** |
| Incrementer | Increment Switch | **401** |
| OP R | Operation Register | **501** |
| Decoder | Decoder | **502** |
| Program Timer | Program Timer | **503** |
| E/O | Even/Odd Switch | **604** |
| T/C | True/Complement Switch | **403, 404** |

*Definitions*

(1) *Cycle.*—A unitary time in which a memory reference may be taken. This is the standard unit of operation which in the preferred embodiment is twenty microseconds.

(2) *E-time.*—Execution time, which may include several cycles.

(3) *Flag.*—A bit in each digit, which is used, depending upon location relative to the word, to indicate the beginning of word, negative word, or some other specified meaning.

(4) *I-Time.*—Instruction time, a period of time, including 8 cycles, during which the operation code and the various memory addresses to be involved in a particular instruction are set up preparatory to execution of the instruction during the following E-time.

(5) *Location.*—A group of 6 cores in memory having a unique address, and capable of storing a digit made up of 1–2–4–8 bits, a check bit and a flag.

(6) *Location Pair.*—An even-addressed location and the next higher odd-addressed location; or an odd-addressed location and the next lower even-addressed location.

(7) *Read.*—Drive the magnetic cores of a location to 0; those cores which store 1's emit signals as they change state. Also—Make available through gating the bit content of a register.

(8) *Write.*—Drive selected magnetic cores of a location to 1 according to 1's in data to be written. Also—Gate data to a register.

(9) *Address.*—A number by which a memory location is identified.

(10) *Regenerate.*—After having read the content of a memory location out to a register, write back into the same location the content of the register, both location and register retaining the data thereafter.

(11) *Record Mark.*—A character, normally 8–2, which is defined and interpreted as the end of record in paper tape, typewriter input, and in memory.

*Program*

Operation of the computer is explained in the context of the following sample program:

| Instruction No. | Memory location | Instruction | Function of instruction |
|---|---|---|---|
| 1 | 00000–00011 | RN-01076–00300 | Read paper tape into 01076. |
| 2 | 00012–00023 | B-01076–00000 | Branch to 01076. |
| 3 | 01076–01087 | TRP 01184–01284 | Transmit contents of 01184 to 01284. |
| 4 | 01088–01099 | N 00300–00300 | Read Add Table from Paper Tape. |
| 5 | 01100–01111 | A 01297–01300 | Add Q-field to P-field. |
| 6 | 01112–01123 | S 01302–01304 | Subtract Q from P. |
| 7 | 11124–01135 | BNF 01112–01302 | Branch No Flag. |
| 8 | 01136–01147 | RN-00100–00300 | Read Multiply Table from Paper Tape. |
| 9 | 01148–01159 | M 01202–01204 | Multiply. |
| 10 | 01160–01171 | WN 00080–00099 | Write Numerical (Printer). |
| 11 | 01172–01183 | H 00000–00000 | Halt. |

Data

| Data | Locations original | Involved transferred to— | Content |
|---|---|---|---|
| -123456 | 01184–01189 | 01284–01289 | (1!23456!) |
| 7890123 | 01190–01197 | 01290–01297 | (7!890123) |
| 247 | 01198–01200 | 01298–01300 | (2!47) |
| 03 | 01201–01202 | 01301–01302 | (0!3) |
| 02 | 01203–01204 | 01303–01304 | (0!2) |
| Record Mark | 01205 | 01305 | (≠) |

Although the computer can treat instructions as data and proceed by accomplishing arithmetic functions thereon, the distinction between instructions and data is generally retained. A group of digits which is always treated as data is herein set off by enclosing parentheses. Since the data digits are effective in addressing memory during addition, particular care should be taken to avoid confusing an address with its data content.

When the machine is first turned on, triggers assume random states, and the various registers, switches and memory locations contain random values. The operator initiates a manual reset, in which all registers are reset to an initial condition, generally a no-information condition in which all bits, including the check bits are missing. A halt status is entered. Manual reset conditions the console for a start sequence. He may push an "insert" button on the console to select typewriter input and set MAR and MARS to the decimal zero (check bit only); the first typed instruction reads into location 0 0 0 0 0. Instruction address register IR1 contains 0 0 0 0 0—after the start button is pushed, the computer commences operation with instruction 0 0 0 0 0.

The first instruction type into instruction address location 0 0 0 0 0 is a "read paper tape" instruction, RN–01076–00300, which enables the computer to read the record on paper tape into locations addressed 01076 upward when manually started. This is the means for storing the program in memory.

The second instruction is a branch instruction, B–01076-00000, which which causes the computer to take further instructions from locations addressed 01076, upward. The branch instruction results in IR1 and MAR being set to 01076.

With instructions 1 and 2 in memory locations 00000–00011 and 00012–00023, respectively, the computer is switched from manual operation to fully automatic by a single depression of a Start Key on the console.

Instruction 1, stored in location 00000, is read out, setting up operation control area for paper tape reading. After the paper tape record is completely stored in memory locations 01076 upward, instruction 2 is set up and executed.

*I-Time and E-Time*

Most instructions involve a setup time (I-time) and an execution time (E-time). Certain branching and no-op instructions eliminate E-time entirely. The program timer produces eight discrete steps during I-time, all but the last of which are memory references. It then produces a variable number of steps defining E-time.

*Programmed Operation*

Initially, MAR contains 00000, the address in memory of instruction 1, which instruction, being the standard 12-digit instruction word, extends to and includes location 00011. This instruction, in the illustrative program, is to Read Numerically (RN) into memory locations addressed by the P-number (01076) and upward, a record from paper tape as derived by paper tape reader (QQ3QQ). Successive digits from paper tape are stored in successive memory locations until the record mark is recognized. The record mark is stored in memory, tape reading stops, the computer recognizes the completion of execution of the instruction, and the computer calls for set-up of instruction 2 by initiating another I-time.

Instruction 2, B–01076–0000 (Branch to the instruction at location 01076) is taken from memory during its I-time. The execution of this branch instruction results in setup of IR1 and MAR with the address of instruction 3, which is the first of the instructions from paper tape. This address is 01076.

The performance of instruction 3 of the sample program, in complete detail, is as follows:

MAR contains 01076 at the end of the branch.

*I-Time Steps*

Step 1 of I-time of the first stored program instruction, transmit, includes the following functions:

The number in MAR causes read-out of the similarly addressed memory location and its pair; since the number is even, the next higher memory location is read concurrently. The digits 4 and 9 go into MBRE and MBRO, respectively. The digit 4 read into MBRE passes to MDR and thence to the tens digit position of the OPR; the 9 from MBRO passes directly to the units digit position of OPR, which then holds 49. As normally occurs, the instruction digits 4 and 9 are also regenerated in the memory position from which they came. Step 1 signals from the program timer condition the incrementer to increment 2, modifying the content of IR1 to read 01078. MARS is cleared to accept the P-number and Q-number. Late in step 1, MAR is set up with the address, 01078, for use on step 2.

*Step 2.*—It is desired to read out the high order pair of digits of the P address of the transmit instruction, and write them into the high order positions of OR1. These two digits, 01, appear in memory locations 01078 and 01079; since MAR is set at 01078, an even address, the pair appears in MBRE and MBRO respectively. The content of even-addressed location 01078 (0) passses through MBRE to DRU and thence along the 10,000's channel through all eight MARS registers. Since only OR1 is half-selected, the 10,000's position in OR1 will be set to zero. At the same time the 1 from memory location 01079 passes through MBRO and DRT along the 1000's channel through MARS, setting a 1 in the half-slected OR1 1000's position. Again, the incrementer is conditioned to increment-2; IR1 at this time contains 01080, which is set into MAR late in step 2.

*Step 3.*—Memory pair 01080 and 01081 is read out into MBRE and MBRO, and the contents are set into the 100's and 10's positions respectively of OR1. Selection of the 100's and 10's channels is accomplished by switching with the program timer and always occurs on step 3. The program timer also causes an increment-2, which loads IR1 with 01082, which is set into MAR late in step 3. OR1 at this time contains 01180.

*Step 4.*—MAR contains 01082. Switches set by the program timer, which controls the sequence of operations during each I-cycle, are set up to ignore the content of the odd memory location while passing the digit content of the even location to MBRE, MDR, DRU, and the units channel of MARS. The digit 4, which was in memory address 01082, is set into the units position of OR1, which at this time contains 01184. The program timer causes an increment-1 in step 4, setting IR1 to 01083, which is placed in MAR late in step 4.

*Step 5.*—MAR contains 01083. Note that this is an odd address. The format of the instruction word is such that the 10,000's position of the Q address is always in an odd location in memory; it is always paired with the units digit of the P address. When the two numbers are being set up in MARS, it is necessary to bring them together into MBRE and MBRO, respectively.

On step 5 the contents of memory location 01082 and 01083 appear in MBRE and MBRO, respectively. Since the memory address in MAR is odd, the content of MBRO passes through MDR to DRU, and, because of program timer switch setups, along the 10,000's channel through all the MARS registers, setting OR2 10,000's position (OR2 only being half-selected) to the high order Q-digit, Q5, which in the illustration is 0, OR2 at this time holds 0000. The program timer causes an increment-2 to 01085. IR1 now contains 01085, which is set in from MAR late in step 5.

*Step 6.*—MAR now holds 01085. This being an odd address, its content and the content of the next lower even address are read out together into the MBR's. The even-addressed digit (1) goes through MBRE and the digit register 10's position, along the 1000's channel to set OR2 1000's position to 1. The odd digit (2) goes through MBRO, MDR, digit register units, and along the 100's channel through MARS to set OR2 100's position to 2. OR2 at this time holds 01200. The program timer forces an increment-2; IR1 now contains 01087, which is set into MAR late in step 6.

*Step 7.*—MAR now contains 01087. The contents of memory locations 01087 and 01086 are read out into the MBR's. The even addressed digit (8) passes through MBRE, DRT, along the 10's channel to set OR2 10's position to 8. The odd addressed digit (4) passes through MBRO, MDR, DRU, along the units channel to set the (4) into OR2 units position. OR2 now holds 01284. The program timer forces an increment 1, incrementing IR 1 to 01088.

*Step 8.*—This cycle is necessary to synchronize the program timer advance pulses. The fact that OPR is set up for a transmit instruction conditions step 8 circuits to drive OR1 content into MAR to begin execution of the transmit operation. MAR contains 00184, OR2 contains 01284 and IR1 contains 01088.

*Transmit Instruction E-Cycle*

*Step 1.*—The contents of memory location 00184 and its pair, memory location 00185, pass to the MBR's. Since this is an even address the MBRE content appears in MDR. The content of OR1 is incremented 1 and replaced in OR1 as 00185; OR2 content is unchanged. The content of memory location 00184 (1!) is placed in MDR. Near the end of execute step 1, the MBR's are reset as a part of the regeneration into memory; reset of MDR is blocked. Since this is a transmit field instruction, the content of MDR is continuously scanned for a record mark interpretation; if a record mark appears, the record mark trigger is set, which causes the transmit operation to stop and calls for the next instruction per IR1. In this case the content of MDR is not a record mark. At the end of execute step 1 MAR contains 01284; OR1 contains 00185; OR2 contains 01284; MBR contains 00; and MDR contains (1!). The content of IR1, the address of the next instruction, remains unchanged all during execute time.

*Step 2.*—MAR contains 01284, an even address. OPR retains its transmit instruction. Location 01284 and its pair, location 01285, are read out of memory and presented to MBRE and MBRO, respectively, MBRE, however, is blocked. The content of MBRO is merely carried along on this step. Simultaneously with the blocked attempt to load MBRE from memory, the content of MDR (1!) is being read into MBRE. The content of MBRE and MBRO (1!—random) are regenerated into memory addresses 01284 and 01285, respectively. An increment 1 is forced. Address 01284 now contains (1!); MAR contains 00185; OR1 contains 00185; and OR2 contains 01285.

*Step 3.*—This step is another step 1; however MAR contains odd address 01185, instead of an even address. At the end of the third step, MAR contains 01285, OR1 contains 00186; OR2 contains 01285; MBR contains 00; and MDR contains (2).

*Step 4.*—This is another step 2. MAR contains 01285. At the end of the fourth step, the memory record 01284 contains (1!2), MAR contains 00186; OR1 contains 00186; and OR2 contains 01286.

The transmit operation continues by reading out from memory to MDR on transmit step 1 steps, and storing into the transmit to locations on step 2 steps the data content of MDR.

The record mark taken from location 01205 is stored in location 01305 and the transmit operation is complete; IR1 is interrogated for the address of the next instruction, 01088, at which RD 00000 00300 is stored.

I-time follows the 8-step sequence described previously. E-time comprises one step per character read from paper tape, during which MDR is loaded from tape, its content passing to the selected location via MBRE or MBRO and the regeneration path. MAR selects the memory location—the read-out to MDR from memory is blocked, and the tape data from MDR placed in the selected location via the regeneration path. When the record mark at the end of the add table is sensed, the read paper tape operation is complete; IR1 is interrogated for the address of the next instruction, 01100, at which A 01297–01300 is stored.

*Flag Decoding—FIG. 6*

FIG. 6 is a consolidated block diagram showing the operation of several control triggers which respond to the flag. The flag is subject to various interpretations depending upon its position in the word in memory and the instruction involved. The flag may be:

(1) Ignored—during I-time in most instructions.

(2) Minus sign—at the units digit position of a field.

(3) Word Mark (End of field)—at any position in a field (other than the units digit position) the flag marks the high order position, defining the field, which may extend from two to hundreds of digits.

(4) Carry—with a digit read from the add table at step 3 in an Add sequence.

Flag plane 510 of the memory, flag trigger 511, program timer elements 512, 514, and network 515–524 of gates operate flag decoder triggers 525–532 upon coincidence of inputs, as follows:

| Inputs | Trigger |
|---|---|
| Flag **511**<br>First Cycle **531** | Minus Trigger **525** |
| Not Flag **511**<br>First Cycle **531** | Plus Trigger **526** |
| Flag **511**<br>Not First Cycle **531** | Plus Trigger **526** |
| Not-I-Time **528**<br>Word 1 Word 2<br>E-Timer Add **512** Not Step 3 | Word Mark Trigger **529**<br>(**530**)<br>(End of Field) |
| Flag **511**<br>E-Timer Add **512** Step 3 | Carry Trigger **527** |

Each flag decoder trigger continues to emit its function signal, once set, until reset, after which a complementary (not function) signal is emitted. E-Timer 512 for addition, shown in the block diagram, has four steps; E-timers (i.e., 513 for multiply) for other instructions in which the flag has special meanings affect the flag decoder triggers similarly when operative. I-Timer 514 is used for each instruction. At the end of I-time, the First Cycle trigger 531 is set. First Cycle trigger 531 affects Minus trigger 525 and Plus trigger 526; if a flag appears in either the addend or augend units digit during readout in add steps 1 and 2, the flag is interpreted as a minus sign. If no flag appears, the no-flag function signal is interpreted as a plus sign. On step 3 of the add sequence for the units order, the First Cycle trigger is reset. Not First Cycle is significant in the recognition of the high order digit in addend and augend. Each field is at least two digits—a units order flag is a minus sign, and a flag in any higher order is the word mark.

*Add Instruction*

Addition is performed by references to an add table set aside in memory. FIGURE 2 illustrates the add instructions. Unflagged digits appear alone in the boxes (locations); flagged digits indicate a carry and are indicated by exclamation points. The augend digit is used as the units digit of the address and the addend digit as the tens digit. A 3 is forced into the memory addressing means hundreds position as it addresses the add table which is placed at locations 300–399. Thus, in the addition of 3 to 4, the sum 7 appears at location 00334 as (7); in adding 7 to 8, the sum 15 appears in location 00378 as (5!).

*I-Time*

The instruction (A, $P_5$ $P_4$ $P_3$ $P_2$ $P_1$ $Q_5$ $Q_4$ $Q_3$ $Q_2$ $Q_1$) is the subject of the usual 8-step I-time, during which OPR 501–502 and its decoder 503 set up the program timer for addition, OR1 is set to the Q-number, which is the addend field address, and OR2 is set to the P-number which is the augend field address. IR1 is set to the address of the next instruction; MAR is set to the P-number, which is the address of the addend units position. OR3 is also set to the P-number to retain the augend units address should recomplementing be necessary.

*E-Time*

The execution of an add instruction requires four steps per order, as follows:

*Step 1.*—Read-out addend digit from memory location specified by the content of OR1. Place digit in DRU. In shorter terms, "RO addend digit per OR1 to DRU." Decrement content of OR1.

*Step 2.*—RO augend digit per OR2 to MDR. Set MAR to 003 (augend digit) (addend digit plus carry).

*Step 3.*—RO memory add table per MAR to MDR, which accepts sum digit and flag for carry. Set carry trigger upon sensing flag.

*Step 4.*—RO augend digit location per OR2, blocking transfer to MDR, which retains sum digit. Set sum digit into augend digit location via an MBR and regeneration path. Decrement content of OR2.

The addition flows from low order to high order positions; i.e., units, tens, hundreds, etc. until the augend flag signals the completion of the operation.

Since the sum is stored in the augend location, the number of digits in the sum is equal to the number of digits in the augend. Any sums extending beyond the limits of the augend field would lose the high-order digits; an overflow is recognized should such a condition occur.

*Sample Program Add—Units Order*

After I-time, the contents of the registers, memory, and carry trigger are as follows:

| | |
|---|---|
| OPR—21 | MAR—01300 |
| IR1—01112 | 01300—(2!47) |
| OR1—01300 | 01297—(7!890123) |
| OR2—01297 | Carry—Unset |

The changes which occur during addition steps for the units order are as follows:

*Step 1.*—RO addend digit per OR1 through DRU and Bypass to MAR units; Decrement content of OR1.

| | |
|---|---|
| OR1—01299 | MAR—00007 |
| DRU—(7) | |

*Step 2.*—RO augend digit per OR2 through MDR to MAR tens. Set OR3 per OR2 to retain augend field address on first cycle only.

| | |
|---|---|
| MDR—(3) | MAR—00037 |

*Step 3.*—RO memory add table per MAR to MDR. Add table location 00337 contains 0!. The hundreds order 3 is forced by impressing signals on the 1 and 2 bit lines during Add step 3, to address the add table at its selected place in memory. Set carry switch.

| | |
|---|---|
| MRD—0! | Carry—Set |

*Step 4.*—RO augend digit location 01297 per OR2, blocking transfer of its content (3) to MDR, which retains the sum digit (0). Set sum digit (0) into augend units digit location 01297 via MBRO and regeneration path. Decrement content of OR2.

| | |
|---|---|
| 01297—(7!890120) | OR2—01296 |

*Sample Program Add—Tens Order*

| | |
|---|---|
| OR1—01299 | 01297—(7!89012/0) (Augend/Partial Sum) |
| OR2—01296 | |
| MAR—01299 | Carry—Set |
| 01300—(2!47) (Addend) | |

*Step 1.*—RO addend tens digit per OR1 through DRU and Plus-1 to MAR. Decrement content of OR1. Reset Carry Switch.

| | |
|---|---|
| OR1—01298 | MAR—00005 |
| DRU—(4) | Carry—Unset |

*Step 2.*—RO augend tens digit per OR2 through MDR to MAR tens.

| | |
|---|---|
| MDR—(2) | MAR—00025 |

*Step 3.*—RO memory add table per MAR to MDR. Add table location 00325 contains 7. The hundreds order 3 is forced automatically.

MDR—(7)

*Step 4.*—RO augend digit location 01297 per OR2, blocking transfer of its content (2) to MDR, which retains the sum digit (7). Set sum digit (7) into augend tens digit location 01296 via MBRE and regeneration path. Decrement content of OR2.

| | |
|---|---|
| 01297—(7!890170) | OR2—(01295) |

*Sample Program Add—Hundreds Order*

| | |
|---|---|
| OR1—01298 | 01300—(2!47) (Addend) |
| OR2—01295 | |
| DRU—0 | 01297—(7!8901/70) (Augend/Partial Sum) |
| DRT—0 | |
| MAR—01298 | Carry—Unset |

*Step 1.*—RO addend hundreds digit per OR1 through DRU and bypass to MAR. Decrement content of OR1.

| | |
|---|---|
| OR1—01297 | MAR—00002 |
| DRU—(2) | |

*Step 2.*—RO augend hundreds digit per OR2 through DRT to MAR tens.

| | |
|---|---|
| DRT—(1) | MAR—00012 |

*Step 3.*—RO memory add table per MAR to MDR. Add table location 00312 contains 3. The hundreds order 3 is forced automatically.

MDR—(3)

*Step 4.*—RO augend hundreds digit location 01295 per OR2, blocking transfer of its content (1) to MDR, which retains the sum digit (3). Set sum digit (3) into augend hundreds digit location 01295 via MBRO and regeneration path. Decrement content of OR2.

| | |
|---|---|
| 01297—(7!890370) | OR2—01294 |

*Sample Program Add—Addend Flag*

The addend word mark flag is sensed during the operation on the hundreds order, setting Word-Mark 1 trigger. This trigger, when set, eliminates step 2 from remaining orders in the add sequence; further additions follow a sequence of steps 2–3–4.

*Sample Program Add—Thousands Order*

| | |
|---|---|
| OR1—01297 | 01300—(2!47) (Addend) |
| OR2—01294 | |
| DRU—0 | 01297—(7!890/370) (Augend/Partial Sum) |
| DRT—0 | |
| MAR—01294 | |

*Step 1.*—Eliminated.

*Step 2.*—RO augend thousands digit (0) per OR2 through DRT to MAR tens position.

| | |
|---|---|
| DRT—(0) | MAR—00000 |

*Step 3.*—RO memory adds table per MAR to MDR. Add table location 00300 contains (0).

MDR—(0)

*Step 4.*—RO augend thousands digit location 01294 per OR2, blocking transfer of its content (0) to MDR, which retains the sum digit (0). Set sum digit into augend thousands digit location 01294 via MBRE and regeneration path. Decrement content of OR2.

01297—(7!890370) OR2—01293

*Sample Program Add—Ten Thousands Order*

OR1—01297 MAR—01293
OR2—01293 01300—(2!47) (Addend)
DRU—0 01297—(7!89/0370)
DRT—0 (Augend/Partial Sum)

*Step 1.*—Eliminated.

*Step 2.*—RO augend ten thousands digit (9) per OR2 through DRT to MAR tens position.

DRT—(9) MAR—00090

*Step 3.*—RO memory add table per MAR to MDR. Add table location 00390 contains (9).

MDR—(9)

*Step 4.*—RO augend ten thousands digit location 01293 per OR2, blocking transfer of its content (9) to MDR, which retains the sum digit (9). Decrement content of OR2. Set sum digit (9) into augend ten thousands digit location 01293 via MBRO and regeneration path.

01297—(7!890370) OR2—01292

*Sample Program Add—Hundred Thousands Order*

OR1—01297 01300—(2!47)
OR2—01292 (Addend)
DRU—0 01297—(7!8/90370)
DRT—0 (Augend/Partial Sum)
MAR—01292

*Step 1.*—Eliminated.

*Step 2.*—RO augend hundred thousands digit (8) per OR2 through DRT to MAR tens position.

DRT—(8) MAR—00080

*Step. 3.*—RO memory add table per MAR to MDR. Add table location 00380 contains (8).

MDR—(8)

*Step 4.*—RO augend hundred thousands digit location 01292 per OR2, blocking transfer of its content (8) to MDR, which retains the sum digit (8). Decrement content of OR2. Set sum digit (8) into augend hundred thousands digit location 01292 via MBRE and regeneration path.

01297—(7!890370) OR2—01291

*Sample Program Add—Millions*

OR1—01297 01300—(2!47)
OR2—01291 (Addend)
DRU—0 01297—(7!/890370)
DRT—0 (Augend/Partial Sum)
MAR—01292

*Step 1.*—Eliminated.

*Step 2.*—RO augend millions digit (7) per OR2 through DRT to MAR tens position.

DRT—(7) MAR—00070

*Step 3.*—RO memory add table per MAR to MDR. Add table location 00370 contains (7).

MDR—(7)

*Step 4.*—RO Augend millions digit location 01291 per OR2, blocking transfer of its content (7!) to MDR, which retains the sum digit (7). Decrement content of OR2. Set sum digit (7) into augend millions location 01291 via MBRO and regeneration path. The sum is complete.

*Sample Program Add—Augend Flag*

The augend word mark flag is sensed during the operation on the millions order, setting Word Mark 2 trigger.

Should Word Mark 2 trigger be set while Word Mark 1 remains unset, an overflow condition results; the programing rules require that the augend field be larger than the addend field to accept the sum.

*Sign Control—FIG. 6*

A flag in the units order of a field denotes a minus sign for the number in the field; no flag denotes a plus sign. The plus and minus triggers cooperate with the operation decoder to provide sign control throughout the execution of the instruction.

Algebraic addition includes the addition of two numbers having like signs, and addition of two numbers having unlike signs, i.e., subtraction. The various combinations of plus and minus operands are recognized and treated according to the rules prescribed by the particular instruction involved, such as Add, Subtract, Multiply, etc.

*Sign Table*

| | Add | | | | Subtract | | | | Multiply | | | |
|---|---|---|---|---|---|---|---|---|---|---|---|---|
| Possible | + | ± | ± | − | ± | + | − | ± | + | − | − | + |
| Augend/minuend OR2 | + | + | − | − | + | + | − | − | + | + | − | − |
| Addend/subtrahend OR1. | + | − | + | − | + | − | + | − | + | − | + | − |
| Forced Sign | + | − | − | − | − | + | − | − | + | − | − | + |
| T/C 408 (augend/minuend). | T | C | T | T | C | T | T | T | | | | |
| T/C 404 (addend/subtrahend). | T | T | C | T | T | T | T | C | | | | |
| Carry Out—Overflow or Minus. | O | − | − | O | − | O | O | − | | | | |
| No Carry Out—Recomplement. | | R | R | | R | | | R | | | | |
| Sign after Recomp. | | + | + | | + | | | + | | | | |

NOTE.—T—True. C—Complement. O—Overflow. R—Recomplement.

*Subtract Instruction*

I-TIME

The instruction S P-number Q-number is the subject of the usual 8-step I-time, during which OPR and its decoder set up the program timer for subtraction, OR1 is set to the Q-number, which is the address of the units digit of the subtrahend and OR2 and OR3 are set to the P-number which is the address of the units digit of the minuend.

E-TIME

Subtraction is accomplished by 10's complement addition. The execution of the subtract instruction requires four steps per order, as follows:

*Step 1.*—RO subtrahend digit per OR1 to DRU. Decrement OD1.

*Step 2.*—RO minuend digit per OR2 to DRT. Set MAR to 003 (minuend digit) (subtrahend digit plus carry).

(NOTE: The minuend digit may be complemented before it is placed in MAR, depending upon the relative signs of the minuend and subtrahend, so that the add table may be used. The subtrahend digit, which also may be complemented, is modified for carry and placed in MAR units; the minuend digit or complement is placed in MAR tens. Since T/C's 404 and 408 are 9's complementers, a carry is always forced into the units order to create the 10's complement. A minus flag is also forced in — or ± situations.)

*Step 3.*—RO memory add table per MAR to MDR which accepts difference digit and flag for carry. Set carry trigger upon sensing flag.

*Step 4.*—RO minuend digit location per OR2, blocking transfer to MDR, which retains difference digit. Set difference digit into minuend digit location via MBR and regeneration path. Decrement OR2.

Subtraction being accomplished by 10's complement addition, a recomplementing operation is necessary if there is no carry from the high order position in any ± situation, i.e., in any add operation where the signs of addend and augend are initially different and the sum is positive; or in any subtract operation where the signs of subtrahend and minuend are alike and the difference is positive. When carry out of the high order position occurs, it is used merely for sign control, since 10's complement subtraction does not use end-around carry.

*Sample Program Subtract—Units Order*

After I-time, the contents of the registers, memory, and carry trigger are as follows:

| | |
|---|---|
| OPR—22 | PR1—01304 |
| IR1—01124 | MAR—01304 |
| OR1—01304 | 01304—(0!2) (Subtrahend) |
| OR2} OR3} —01302 | 01302—(0!3) (Minuend) |

The minuend is complemented as a result of the subtract instruction and the like signs of the operands; T/C 408 is effective throughout the subtract sequence.

*Step 1.*—RO subtrahend units digit (2) per OR1 to DRU. Decrement OR1 content.

DRU—(2)     OR1—01301

*Step 2.*—RO minuend units digits (3) per OR2 to DRT. Set MAR to 003 (minuend units digit 9's complement) (subtrahend units digit plus forced carry). OR3 has been set to retain minuend field address should recomplementing be necessary.

DRT—(3)     MAR—00363

*Step 3.*—RO memory add table location 00363 per MAR to MDR. Add table location 00363 contains 9. MDR accepts difference digit 9.

*Step 4.*—RO minuend units digit location 01302 which contains (3), per OR2, blocking transfer to MDR, which retains difference digit (9). Set difference digit (9) in minuend units digit location 01302. Decrement OR2.

01302—(0!9!)     OR2—01301

*Sample Program Subtract—Tens Order*

| | |
|---|---|
| OR1—01303 | 01304—(0!2) (Subtrahend) |
| OR2—01301 | |
| Carry Trigger—Set | 01302—(0!/9!) (Minuend/Partial Difference |

*Step 1.*—RO subtrahend tens digit (0) per OR1 to DRU. Decrement OR2 content.

DRU—(0!)     OR1—01300

*Step 2.*—RO minuend tens digit (0!) per OR2 to DRT. Set MAR to 003 (minuend tens digit 9's complement) (subtrahend tens digit plus carry).

003 (9) (0)     MAR 00390

*Step 3.*—RO memory add table location 00390 per MAR to MDR. Add table location 00390 contains 9. MDR accepts difference digit 9.

MDR (9)

*Step 4.*—RO minuend tens location 01301. Decrement OR2. Set difference digit (9) in minuend tens digit location 01301.

01302—(9!9!)     OR2—(01301)

*Sample Program Subtract—Subtrahend and Minuend Flags*

The word mark flag for both operands is sensed during the tens order subtract operation, setting the word mark triggers. The carry trigger is unset—therefore a recomplement sequence is necessary to return the difference to true form.

*Recomplement*

Recomplementing, when necessary, is accomplished as follows:

The address of the units position of the augend/sum is stored during I-time in OR3. Should recomplementing be determined necessary, the program timer forces a recomplement program of add steps 2–3–4 until the word mark appears. Since this is a complement add, the units order receives a forced carry to provide the tens complement and a flag reset to show that the sum is positive. In the sample program, the arithmetic operation is as fo'lows:

Units:

6  minuend (9's complement of 3)
2  subtrahend
1 !  forced carry and flag
—
91

Tens:

9  minuend (9's complement of 0)
0  subtrahend
!  forced flag
—
9!9!  algebraic sum (Complement form—flag forced as word mark)

Failure to carry from the high order signals the need to recomplement, which occurs in the following manner:

Units:

0  algebraic sum (9's complement of 9!)
1  forced carry
—
1

Tens:

0  algebraic sum (9's complement of 9!)
!  no carry. Flag forced as word mark
—
0!  correct alegbraic sum and sign.

*Flag Controlled Branch Instruction*

At the end of the recomplement operation, the field at 01302 contains (0!1), signifying a +1 value. The sample program includes, as program step 7, a "Branch No Flag" instruction. This instruction is effective to control branching on negative values, branching on word marks, and any other occurrence of the flag including one set by means of a previous SF (Set Flag) instruction.

The flag indicating the minus sign of the field at 1302 prevents the branch, and the sample program proceeds to the next instruction.

Figure 7:
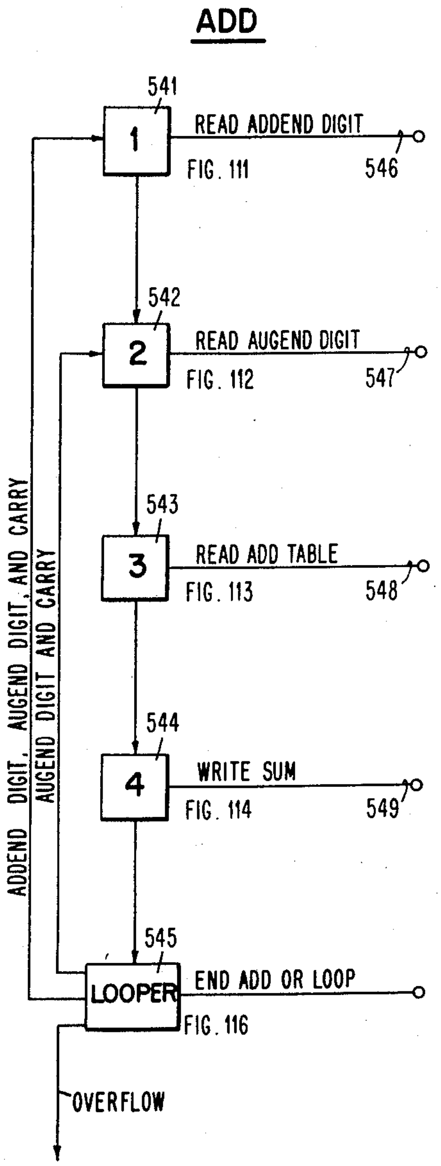
FIG. 7 is a chart illustrating the four steps and two loops involved in the add operation.

FIG. 7 is a diagram of the E-timer for addition. Four step blocks 541–544 and a looper 545 condition command signal lines designated read addend digit 546, read augend digit 547, read add table 548 and write sum 549. Command lines are marked with figure numbers where a more intensive description is given.

The programming rules specify that the augend digit length be equal to or greater than the addend digit length. Upon recognition of the augend word mark, looper 545 bypasses add step 1 block 541 for the remainder of the operation, during which carries are applied to the higher order augend digits as they are brought down.

SECTION E—MULTIPLY

Figure 8:
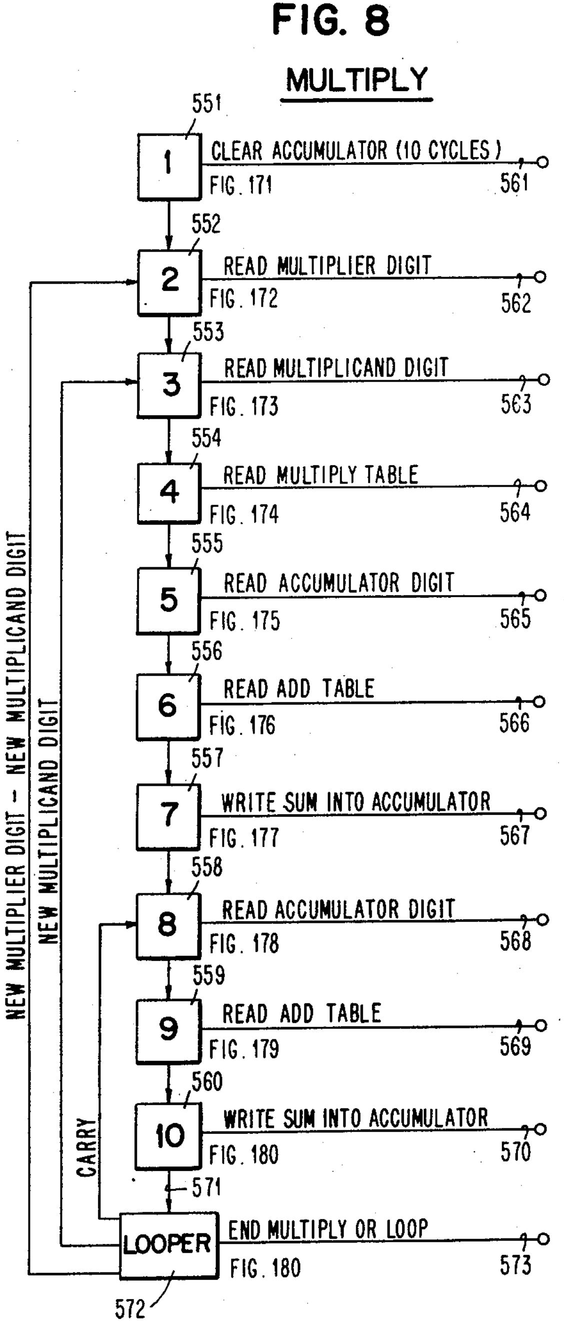
FIG. 8 is a chart illustrating the ten stages and three loops involved in multiplication.

The multiply operation comprises multiple series of memory references in each of which series a partial product of a single digit in the multiplier and a single digit in the multiplicand is developed, followed by addition sequences in which the partial product is accumulated in an accumulator section set aside in memory. FIGS. 1, 3, and 8 are involved.

*I-Time.*—I-time comprises the usual 8 steps during which OPR 501–502 is set up with the multiply instruction, OR1 is set to the Q-number, which is the multiplier field address, and OR2 is set to the P-number, which is the multiplicand field address. OR3 is set to the multiplicand units position. IR1 is set to the address of the next instruction.

A twenty-digit accumulator area, locations 00080–00099, is set aside in memory for ordinary multiplications.

The memory also has an area of 200 locations, addressed 00100–00299, set aside for a multiply table, as illustrated in FIG. 3. Flags are not used, since carries in multiplying two decimal digits together are digit values 0–8, which cannot be shown by a flag. The product of two digits generally is a two-digit number; therefore a table of all possible products of combinations of digits 0–9 requires 100 storage groups, the majority of which groups need to store two digits. For convenience in addressing, all such groups are allotted two locations. Table lookup for the product of two digits according to the digit values requires addressing the appropriate group out of the table which is spread over 200 consecutively addressed locations.

There being only 100 combinations of two decimal digits, it is necessary to modify one digit in order to accomplish the desired spread of addresses, which requires three-digit addressing of a table which in the preferred embodiment is in locations 00100–00299.

The multiplier digit is doubled, forming two digits of the address, the tens digit being either 0 (doubled 0–4) or 1 (doubled 5–9). For reasons of design the doubled multiplier digit product is used to form the hundreds and units positions of the address, and the hundreds digit is increased by 1, forming even addresses 00100–00208.

The multiplicand diigt is used to form the tens position of the address. For example, the problem $5\times7=35$ is handled as follows:

(Product Address 00254)
Doubled Multiplier (units) 00 ( ) ( ) (4)
Multiplicand (tens) 00 ( ) (5) (4)
Doubled Multiplier carry plus 1 (hundreds) 00 (2) (5) (4)

The pair of locations read out when 00 254 is addressed (00 254–00 255) contains 5 and 3, respectively. For reasons of design they appear in inverse order; the product is recognized as 35.

Multiplier register 405 (MR) is used for temporary quick-access storage of a single diigt of the multiplier during the sequence of cycles in which that multiplier digit operates on the several digits of the multiplicand. The output of MR is doubled as it passes through Doubler 406 to affect the units and hundreds positions of MAR.

The multiplicand digit passes via MDR, digit bus 609, and T/C 404 to MAR tens position. With MAR thus set up to address the multiply table, a memory reference is taken to bring out the partial product to DRU and DRT. Addition sequences then cause the product to build up within the accumulator section of memory.

Each multiplier digit remains available in MR for a number of cycles during which each digit of the multiplicand becomes available in turn to be multiplied. Partial products are retained when the high order multiplicand digit is recognized by its flag, a new multiplier digit is placed in MR and the multiplicand digits again are made available in turn to be multiplied. When both the high order multiplier digit and the high order multiplicand digit are recognized by their flags, their partial product completes the multiplication, and the computer is ready for the following instruction.

The Multiply operation makes use of all MARS registers except IR2. The program timer provides a sequence of ten stages, blocks 551–560, and ten command outputs 561–570. The sequence includes an initial clearing routine and three concentric loops, shown in FIG. 8 as follows:

(1) Clear accumulator routine.
(2) Nine-stage multiplier digit and multiplicand digit loop.
(3) Eight-stage multiplicand digit loop.
(4) Three-stage carry loop.

Many command outputs of FIG. 8 are marked with the numbers of figures which more intensely describe the mechanism for accomplishing the command.

A multiply operation affecting multi-digit operands may involve hundreds of memory reference cycles, as the various loops are followed. The cost-oriented approach, where computing ability is retained while speed alone is sacrificed, is thus fulfilled; a small number of sub-assemblies operates over and over to accomplish the final computation.

The program timer stages are as follows:

(1) Clear accumulator locations 00080–00099, under control of PR1, by readout with block regeneration. Increment-2 PR1 until 000098 is sensed on the tenth cycle; then enter stage 2.

(2) RO multiplier digit per OR1 via MDR to MR. Decrement-1 OR1.

(3) RO multiplicand digit per OR2 via MDR. Condition T/C404 true.

(4) Set up MAR to address the multiply table by:

*a.* Doubling the multiplier digit and passing the resulting even units digit to MAR units.

*b.* Placing the doubled multipler digit carry (tens digit) into MAR hundreds position. (Because the table location chosen is 00100–00299, the tens digit is increased by 1 by the connection of lines carrying it to MAR hundreds.)

*c.* Transmitting the multiplicand digit from MDR via T/C404 to MAR tens.

RO multiply table per MAR. The even-addressed digit is transmitted via MDR and the digit bus 609 to DRU. The odd-addressed digit is transmitted directly from MBRO to DRT via block 612. Since the multiply table always is addressed by an even number (as a result of the doubling), MDR always contains the even-addressed digit of the pair making up the partial product. MDR connects via the digit bus to DRU; this connection directs the units digits of the partial product to DRU, and is the reason for the transposed relationship of partial product digits in the multiply table memory pair.

(5) RO accumulator per PR1 to MDR. Set PR2=PR1, decrement-1 PR1.

(6) Add accumulation digit from MDR to partial product units digit in DRU. Set MAR to 003 (MDR content) (DRU content). RO sum from memory add table per MAR to MDR.

(7) Store sum in accumulator per PR2. Decrement-1 PR2. Set PR3=PR2.

(8) RO accumulator per PR3 (which contains the address of the higher order accumulation digit) to MDR.

(9) Transmit content of DRT to DRU. Add accumulation digit from MDR to partial product tens digit now in DRU. Set MAR to 003 (MDR content) (DRU content). RO sum from memory add table per MAR to MDR.

(10) Store sum in accumulator per PR3.

(Looper) Make decision as to which loop to make next, based on flag bits, or to end operation.

FIG. 8 illustrates the loops involved in the multiply operation. Multiply stage 1 is effective only at the start of the operation. A set 00080 trigger, a fixed address trigger which sets an 8 bit in the tens order, operates as the computer enters E-time of the multiply operation. This trigger sets MAR for the initial cycle of stage 1 and is immediately reset. Accumulator location pairs 00080–00081 is thus addressed for reset; IR1 is set to 00082 via the increment-2 path to address accumulator pair 00082–00083 on the next cycle. When, on the tenth cycle, memory pair 00098–00099 is reset, an AND circuit responsive to coincidence of an 8 bit in MAR units and a 1 bit in MAR tens signals completion of accumulator reset and conditions stage 2. (The 1 bit indicates a 9 value, since the accumulator by definition includes only locations 00080–00099.) Stage 2 is effective once for each of the several multiplier digits. Stage 3 is effective once for each multiplicand digit during each new multiplier digit loop.

The small loop including stages 8, 9 and 10 is effective to handle carries which may occur as partial product tens order digits are added to the content of the accumulator. The carry loop is necessary to add partial product digits to the accumulator; it is also available for an additional instruction which might be provided to multiply without resetting the accumulator area. For such an instruction, the program timer would begin multiply at stage 2.

A detailed explanation of structure for the preferred multiplier appears in section G, CONSTRUCTION. FIGS. 168–180 correspond to FIG. 8.

SECTION F—DEVICES

FIG. 9 illustrates the device which form functional blocks:

*9a DE-Block.*—The emitter follower 1 is a non-inverting power block inserted into logical circuits wherever necessary.

*9b PID-Block.*—The drift transistor power inverter 2 is used where power and speed are necessary.

*9c PI-Block.*—The power inverter 3 is used where speed is a secondary consideration.

*9d A-Block, –O-Block, E-Block, I-Block.*—The AND-inverter 4 is logically an inverting plus-AND (minus-OR)—the A or –O designation is used to enhance understandability. If all inputs are relatively positive +S, the output is relatively negative —S, for the logical plus-AND; if one input is —S, the output is +S (logical minus-OR.) When used as an extender (E-block), the collector of the E-block is connected to the collector of a companion A-block or –O-block, thus sharing a common load resistor to form a multi-input block. The extender connection is illustrated by broken lines connecting the E-block to its companion A or –O blocks. When only one input is connected, the block functions as an inverter.

*9e AD-Block, –OD-Block, ED-Block, ID-Block.*—The ordinary AND-inverter (A-Block) in some instances is too slow to accomplish its logic. The AD-Block is identical in logic but is faster and more powerful than the A-Block. –OD, ED and ID-blocks have similar advantages. A faster transistor such as a saturating drift mesa transistor, together with a diode clamp to ground, gives the AD, –OD, ED and ID-blocks the required features. The added cost of the saturating drift mesa transistor mandates that the use of the AD, –OD, ED and ID blocks be sparing to achieve the objective of low original machine cost.

*9f L-Block.*—The lamp driver 6 operates an included indicator lamp. A +S input (usually from the OFF side of a trigger) extinguishes the lamp—the lack of the +S signal (trigger not OFF) allows the lamp to luminesce, indicating that the trigger is not OFF, or, as interpreted, that the trigger is ON.

*9g SA-Block.*—The sense amplifier 7 receives a small core output signal as a core changes state, and presents the amplified signal at an output terminal.

*9h OSC-Block.*—The crystal controlled oscillator 8 is used as the basic timing control.

*9i SPG-Block.*—The gated sample pulse driver 9 produces a controlled output having a standard duration and a voltage level intermediate +S and —S, in response to a —S input demand.

*9j SS-Block.*—The single shot 10 produces a standard duration +S or —S pulse output in response to a +S input demand. A gate input and capacitor input are provided.

*9k RDR-Block, WDR-Block, or ZDR-Block.*—The driver block **11*f*** produces a standardized power pulse to drive cores, in response to a —S input demand and a gate pulse.

*9l THY-Block.*—The thyratron block **12*f*** produces a power pulse with thyratron-type characteristics.

*9m RC-Block.*—The resistor block **13*f*** contains from one to four resistors, generally used as load resistors.

*9n SAD-Block.*—The drift transistor sense amplifier block **14*f* is similar in function to SA-block 9*g***. It is used where speed is necessary.

*9o IS-Block.*—The current source block **15*f*** produces a constant current for use by other blocks.

*9p IDR-Block.*—The current driver block **16*f* produces a current pulse for driving cores, in response to an input demand. A drift transistor provides the output pulse. A separate gate transistor may be used as the input, as indicated by the broken line connection in the input circuit (broken line feedback loop in IDR-block 16*f*.**)

*9q DSW-Block.*—Decoder switch **17*f*** operates as a plus-OR circuit, opening the circuit between the output terminal and ground whenever any input is relatively positive.

Figures 9A, 9B, 9C, 9D, 9E, 9F:
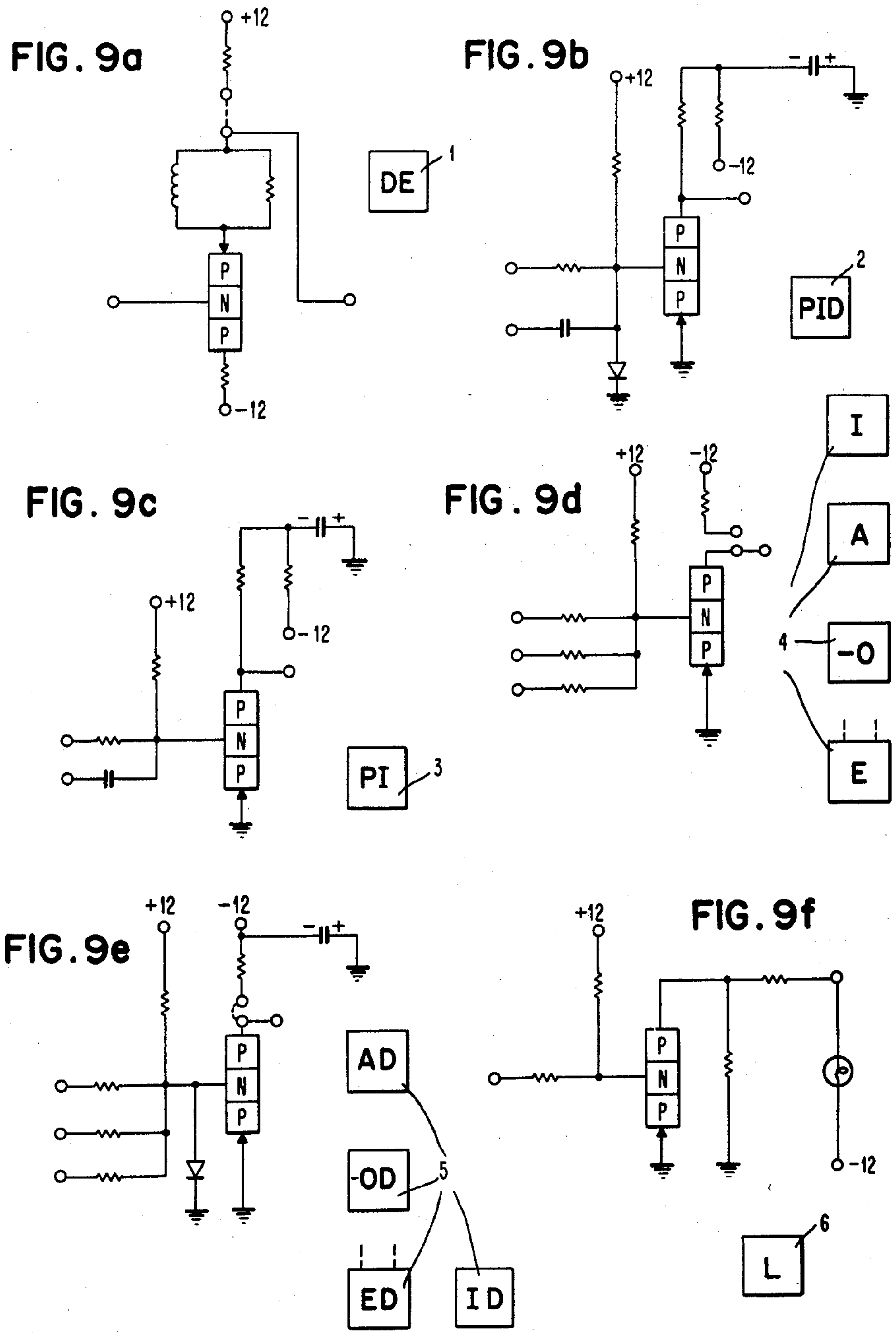
FIG. 9 is a composite diagram of the various component circuit blocks used in construction of the preferred embodiment.
Figure 9G:
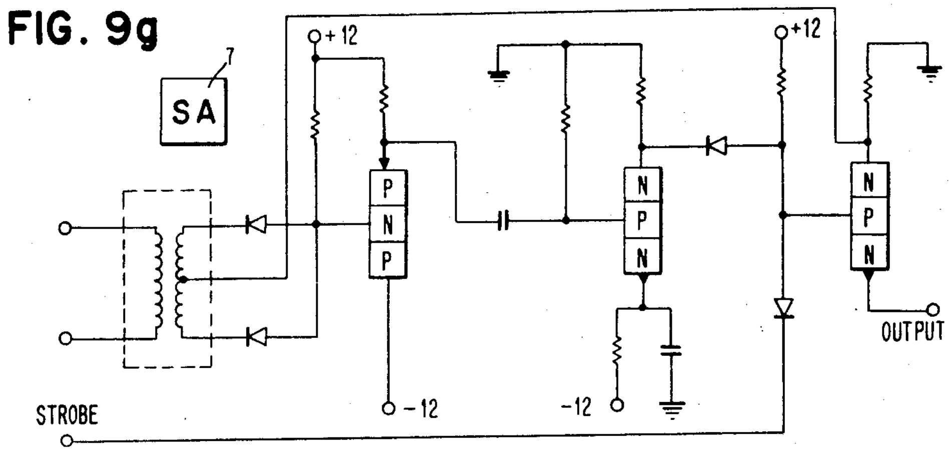
Figure 9H:
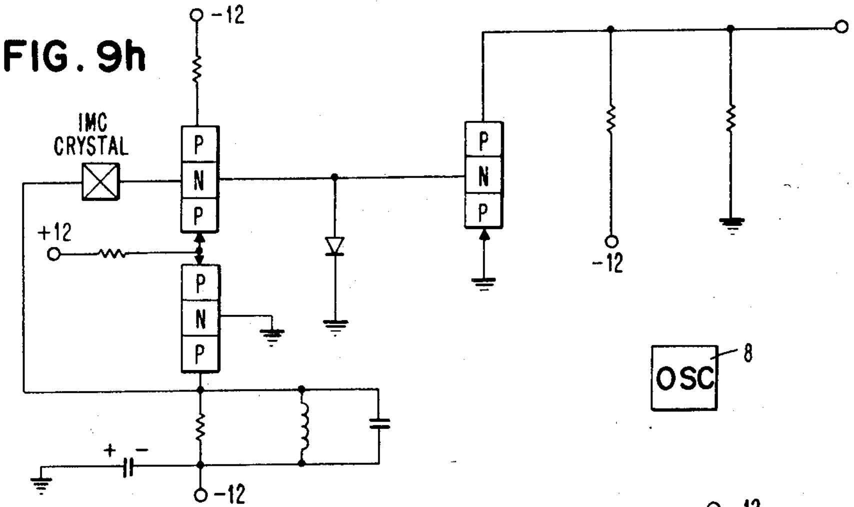
Figure 9I:
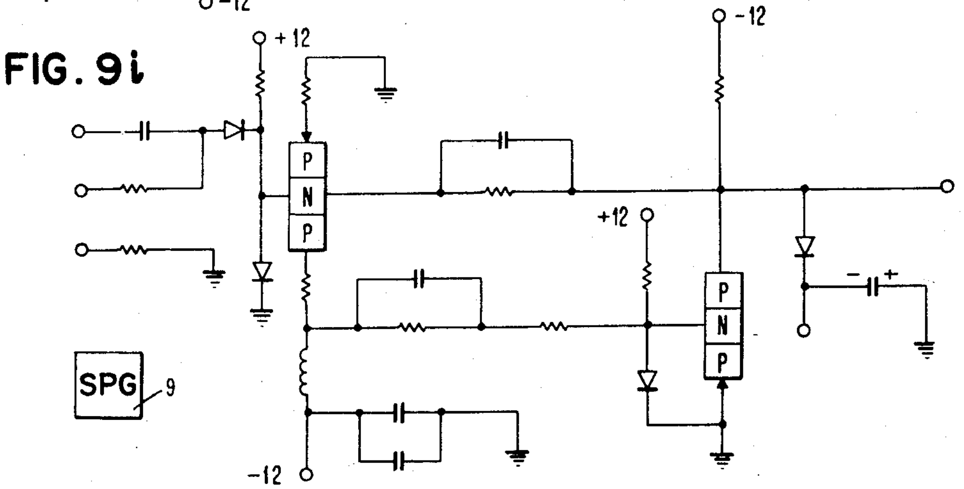
Figure 9J:
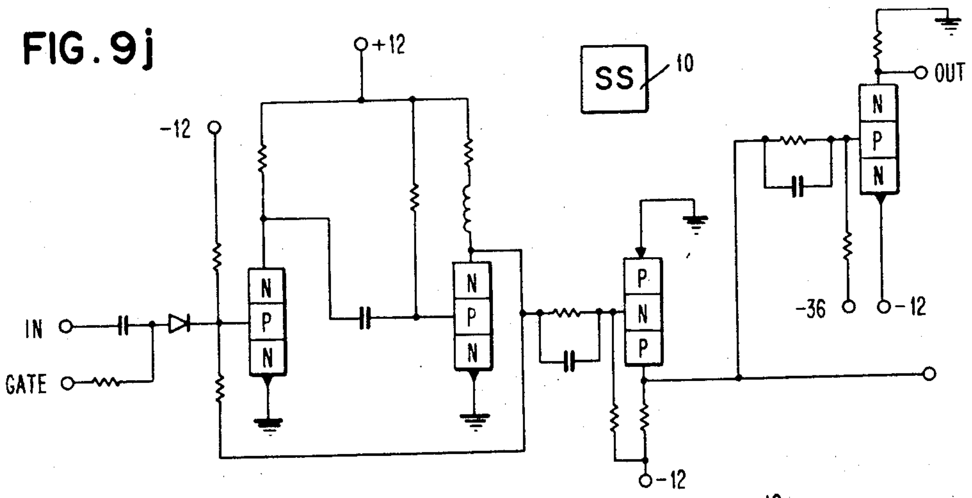
Figure 9K:
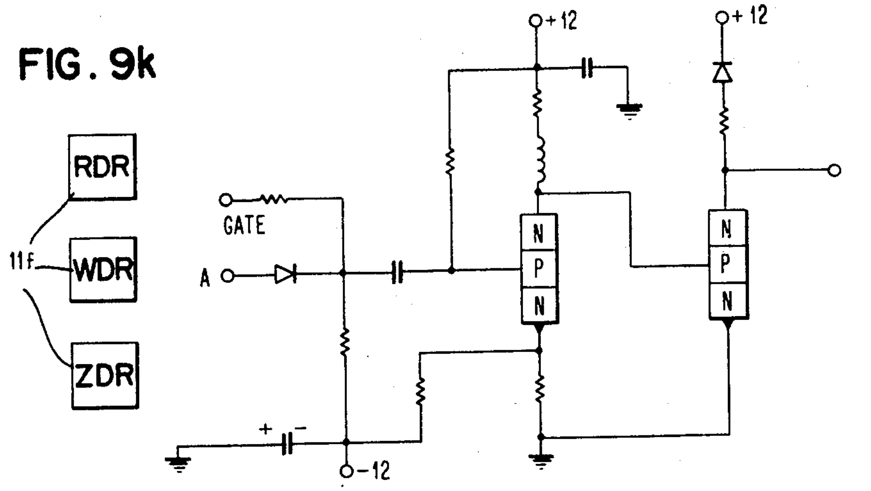
Figure 9L:
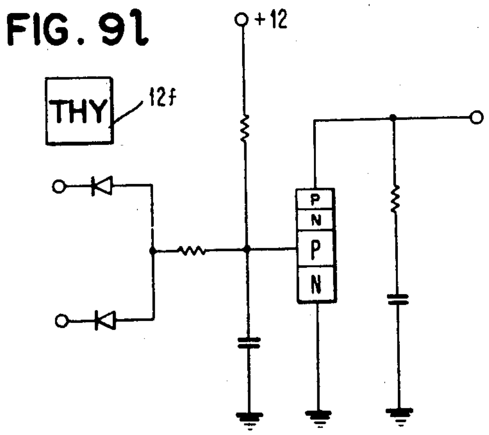
Figure 9M:
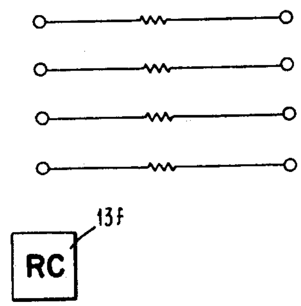
Figures 9N, 9O, 9P:
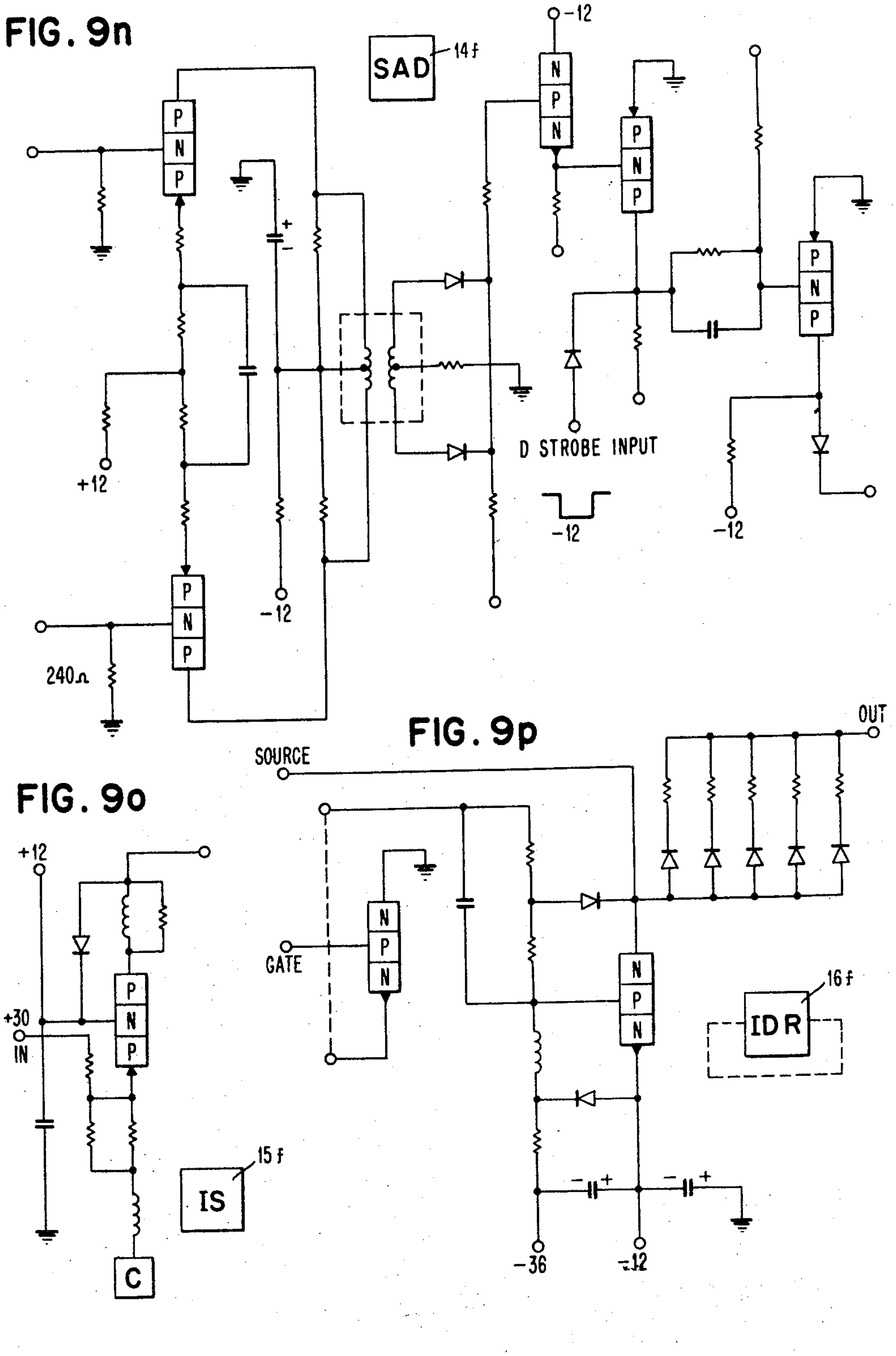
Figures 9A, 10A, 10B, 10C:
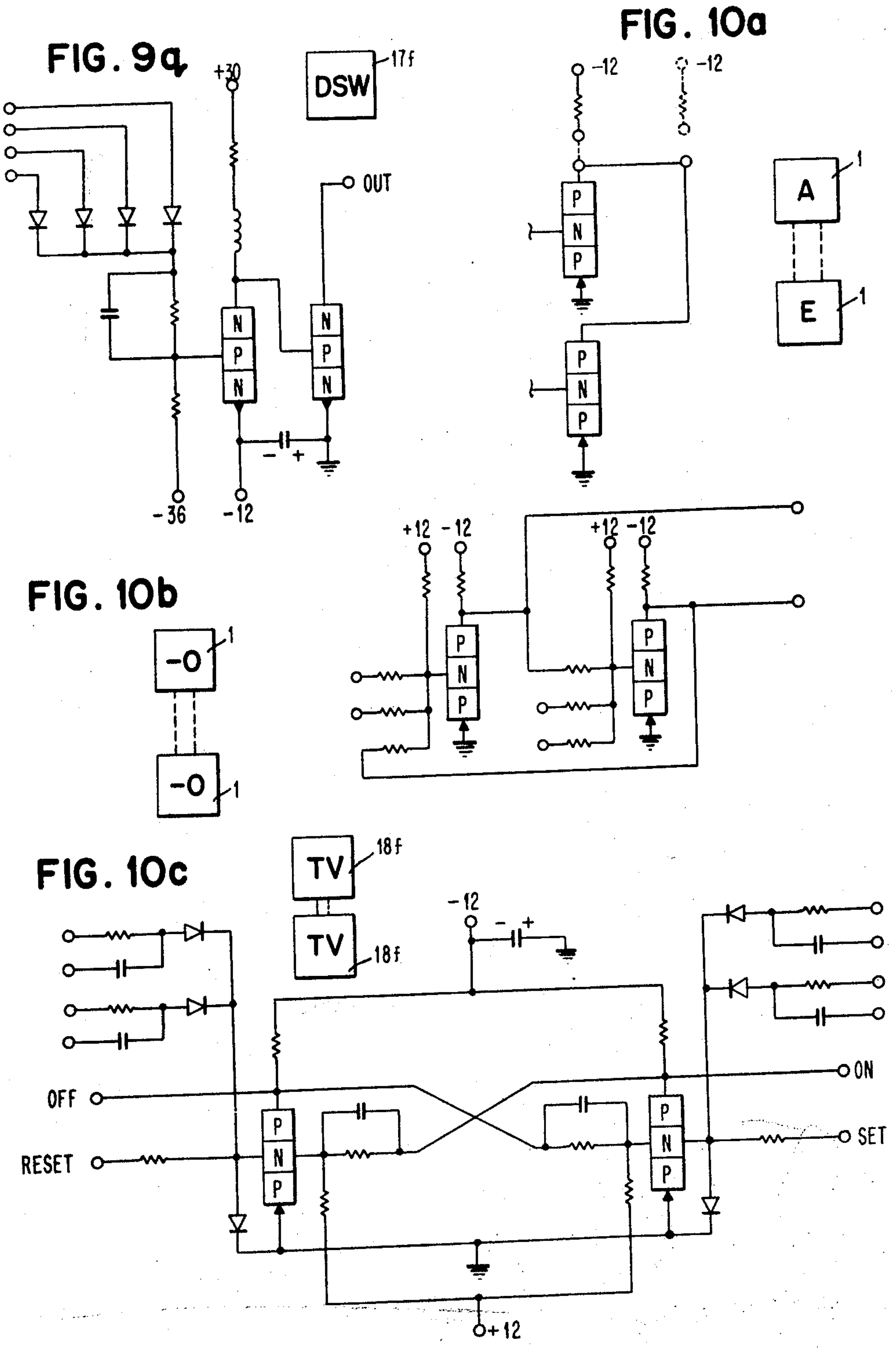
FIG. 10 is a composite diagram of various unitary functional devices, each of which comprises a plurality of component circuit blocks.

FIG. 10 illustrates devices formed of plural blocks:

*10a A-Block Extended.*—To form a multi-input A-Block (or –O-block) two or more AND-inverters are connected to a common load resistor. The input networks of each block are not shown. The AD and –OD-blocks may be similarly extended.

*10b Trigger.*—Two –O-blocks with latching feedback connections form a bistable circuit or trigger. The trigger connection is indicated by a broken-line connection between two stacked –O-blocks. Either or both –O-blocks forming the trigger may be equipped with an extender E-block.

*10c Voltage-Mode Trigger.*—Two voltage-mode trigger blocks (TV-Blocks) **18*f*** with feedback connections form a bistable circuit or trigger, which may be set, reset, or flip-flopped by appropriate inputs.

SECTION G—CONSTRUCTION

The preferred embodiment is constructed of a magnetic core memory, magnetic core MARS registers, and a multiplicity of printed circuit cards, each bearing one or more circuit blocks such as illustrated in FIG. 9. The cards are generally plugged into sockets for mechanical and electrical orientation into the machine.

*Memory Area*

The basic memory is a 20,000 location, 6-bit-per-location module consisting of twelve planes of 10,000 storage elements each. The five-digit address incorporated provides a capability of adding four other similar modules for a 100,000 location memory area.

The memory module is driven from two 10×10 matrix switches 102 and 103 (FIGS. 1–4) which select one "column" of 12 storage elements (one element in the same position in each plane) to be read from memory to the Memory Buffer Registers. The even-addressed digit and its next-higher adjacent odd-addressed digit are transferred respectively to MBRE 602 and MBRO 603.

Figure 11:
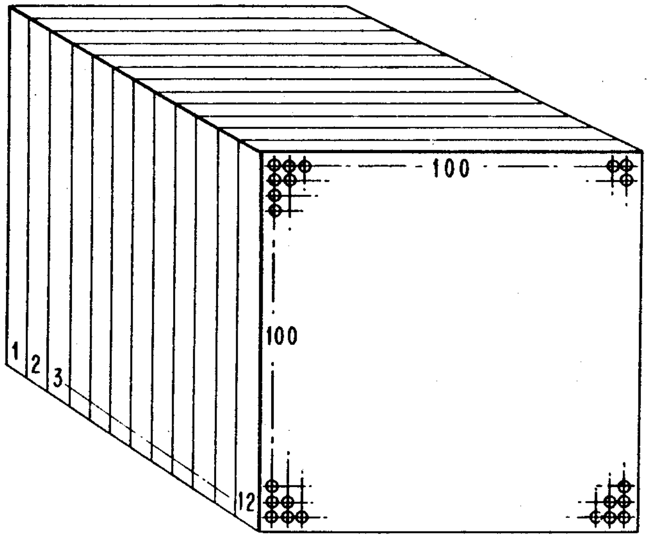
FIGS. 11–14 are diagrams of the memory and memory address retaining storage register core planes.

The memory may be any of several types of memory which are capable of storing and reading out a digit at any one of a multiplicity of storage locations distinctly addressable by addresses made up of five decimal digits. A preferred form of memory is a half-select type of square loop ferrite core matrix wherein each core forms a bit storage element, which is subject to state-change when the X and Y windings which intersect at the core each receive half-select current. FIG. 11 illustrates the preferred memory diagrammatically.

Four windings 20, 21, 22, 23 (FIG. 12) affect each core 24 Winding 20 is an X address line for each horizontal row; winding 21 is a Y address line for each vertical column; winding 22 is a sense winding affecting all the cores in the particular plane; and winding 23 is an inhibit winding Z. Only one core can be selected from each plane during any given memory reference; the selected core is located at the intersection of the selected X and Y address lines, which are pulsed with half-select current at read time. This coincident current at the X—Y intersection applies full read current to the selected core, driving it to the zero state. During write time the X and Y address lines are selected and each similarly pulsed with half select currentt so that full write current is applied to the selected core, driving it to the 1 state. Inhibit lines Z for each but the selected column of cores, parallel to the Y lines, are pulsed with current opposite to the half select current flowing in the selected Y line (effectively half read current); the pulse produced by the switching of the selected core to 1 therefore cannot harmfully affect any of the non-selected cores.

A sense winding passes through all cores in each plane, and since only once core in each plane is interrogated during a memory reference cycle, no ambiguity of output results. At the time the selected core is changing state during read-out (if it contains a 1) the sense line is sampled. As the presence of a 1 is detected it is signalled by an induced pulse on the sense line. The memory addressing area sets one switch core in each of the X and Y matrices and the setting of the switch cores generates half read current on one X address line and one Y address line feeding the 12 planes of the memory in parallel. At the points of coincident current, 12 ferrite cores (one for each plane) are provided with full read current which resets any of the 12 cores containing ones. Resetting the cores holding ones induces pulses on the corresponding sense windings which are inputs to MBRE and MBRO. Information is retained in MBRE and MBRO until the end of the cycle, at which time their contents are read back into memory to regenerate the identical two digits read out; the X address and Y address lines continue to select the particular memory locations. Memory design fixes a relationship between the core plane configuration and the two-digit memory buffer register since two digits are read at a time. Locations with addresses ending in odd digits are placed in MBRO; locations with addresses ending in even digits are placed in MBRE.

United States patent application of Gregory Constantine Jr. entitled "Magnetic Switching Devices," Serial Number 745,395, filed June 30, 1958, of common assignee herewith, discloses a suitable structure for matrix switches 102 and 103.

*FIG. 4—Memory Addressing Area 200*

The memory address register 201 (MAR) controls addressing of the memory. A 5-digit address, presented to MAR by means to be explained, is stored in 22 bistable devices, the outputs of which are as follows:

| | |
|---|---|
| 10,000's position | 1 C |
| 1,000's position | 8 4 2 1 C |
| 100's position | 8 4 2 1 C |
| 10's position | 8 4 2 1 C |
| units position | 8 4 2 1 C |

The C bits provide odd parity; i.e., the total number of bits present, including the C bit, in each position of MAR must be odd or a parity check error is detected. Check means 1001 accomplishes this detection.

The 1-valued bit of the units position of MAR is connected via lines 203 and 204 to even/odd trigger 604 (E/O) in the Memory Readout Area. To allow addressing Memory with a 4-digit number, the 10,000's position 1-bit is connected via lines 205 and 206 to appear in place of the units position 1-bit. Memory location 00177 (XXX$\overline{1}$, $\overline{8421}$, $\overline{842}1$, $\overline{8}421$, $\overline{8}421$), for example, is addressed by four groups of bits ($\overline{8421}$, $\overline{842}1$, $\overline{8}421$, $\overline{8}42\overline{1}$, E/O-odd, which is equivalent to "0176-odd").

Memory location 10177 (XXX1, $\overline{8421}$, $\overline{842}1$, $\overline{8}421$, $\overline{8}421$) is addressed by four groups of bits ($\overline{8421}$, $\overline{842}1$, $\overline{8}421$, $\overline{8}421$, E/O-odd which is equivalent to "0177-odd"). Memory location 09176 (XXX$\overline{1}$, $8\overline{421}$, $\overline{842}1$, $\overline{8}421$, $\overline{8}42\overline{1}$) is addressed by four groups of bits ($8\overline{42}1$, $\overline{842}1$, $\overline{8}421$, $\overline{8}42\overline{1}$), E/O-even, which is equivalent of "9176-even"; 19176 (XXX1, $8\overline{42}1$, $\overline{842}1$, $\overline{8}421$, $\overline{8}42\overline{1}$) is addressed by four groups of bits ($8\overline{421}$, $\overline{842}1$, $\overline{8}421$, $\overline{8}421$, E/O-even, equivalent to "9177-even").

The four groups of bit signals used to address the memory are thus the units group made up of the 842 bit signals from the units digit in MAR and the 1 bit signal from the 10,000's digit in MAR. The 10's, 100's and 1000's group are the 10's, 100's and the 1000's digits from MAR.

The units and hundreds signal groups from MAR are operative via channels 210 and 211 to address a specific column of cores in memory along the Y line associated with that column of 100 cores and with the two signal groups. There are 100 Y lines in each plane; 10×10 matrix switch 102 conditions the selected Y-line according to the bit-values of the two signal groups.

The tens and thousands signal groups from MAR along channels 212 and 213 are decoded in 10×10 matrix switch 103 to condition the selected one of 100 X-lines, each of which is associated with a row of 100 cores and with the two signal groups. The core at the intersection of the selected Y and X lines is selected in each of the 12 planes; the twelve cores so selected read out a pair of digits to MBRE and MBRO.

Selection of the desired digit from either MBRE or MBRO is under control of the E/O switch, which in turn is responsive to the units position 1-bit in MAR via lines 203 and 204. The E/O switch is discussed under subheading "Memory Readout Area."

*Memory Address Register Storage Area*

The flow of data and of instructions in the computer is controlled by the Operation Control Area 500 via the MARS registers.

Each memory reference within the program for any particular instruction is called for by the program timer and directed to the particular location specified by an address stored in a MARS register. For example, on step 2 of the program for an Add Instruction, OR 2 is read out to address the augend digit location in memory.

Figures 12, 13:
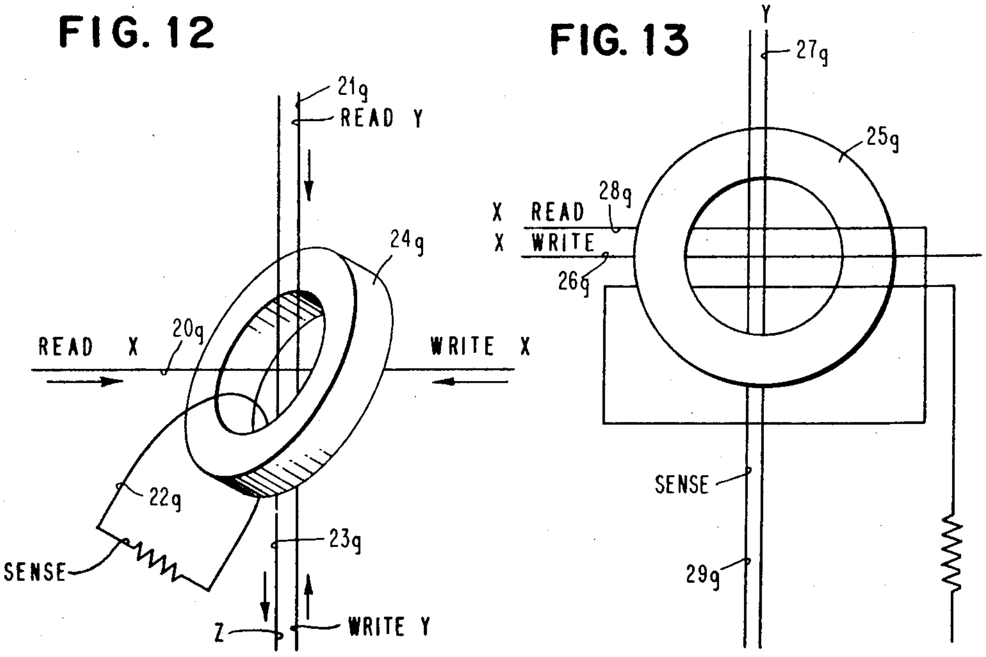

Each MARS register comprises a string of twenty-two cores **25*g*, having windings shown in FIG. 13. An X winding 26*g* and Y winding 27*g* each provide half-select current for writing; a single X read winding 28*g* of two turns provides full read current to the selected register string of cores for read-out on sense line 29*g***.

Figure 14:
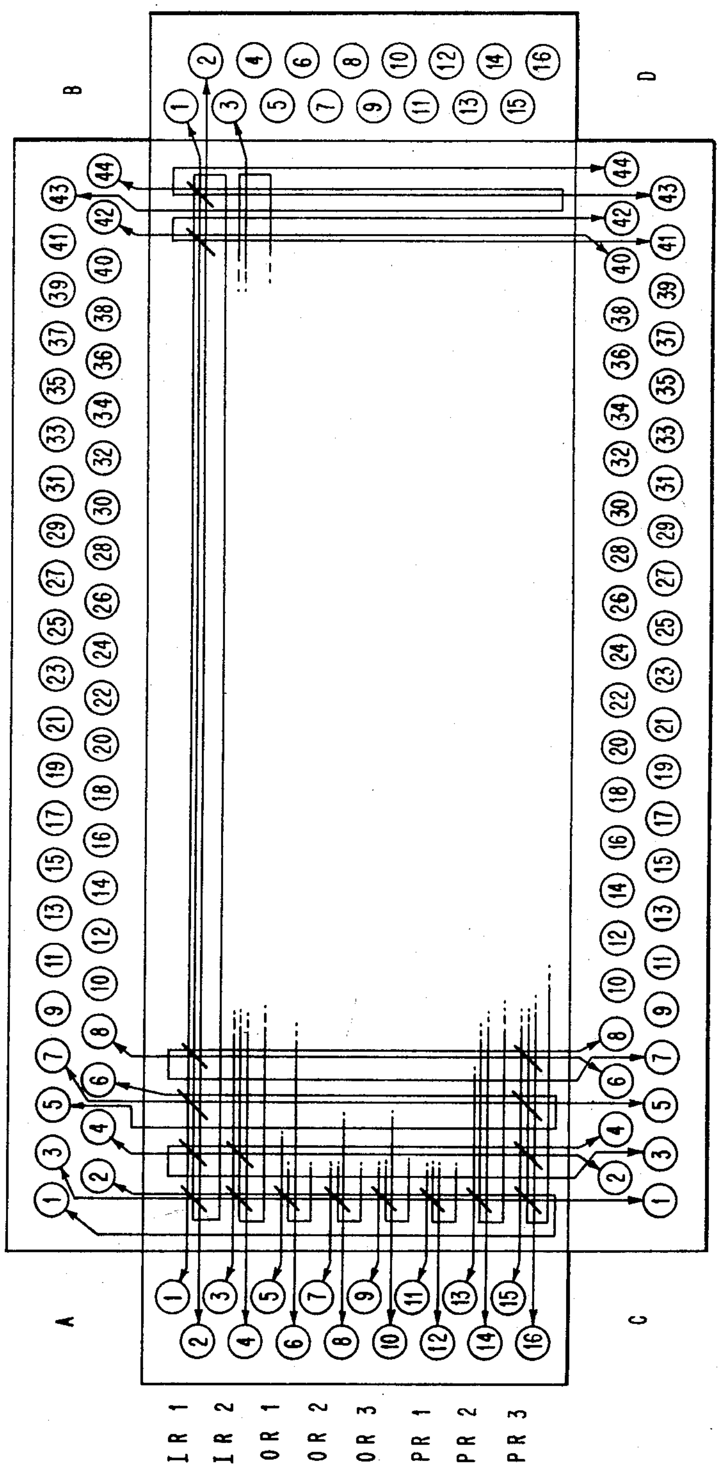

FIG. 14 illustrates the MARS core frame and connections. Each winding is brought out to a numbered terminal on the frame; connections to these terminals are shown in FIGS. 24–27. The line connecting terminals AC1 and BD1 corresponds to the X read line of FIG. 13; it extends through all 22 cores of IR1, is looped around and passed through the string of cores again. This looping allows use of the same type core driver to provide full read current as is used to provide half-select current. For writing the 1-bit in the units order of IR1, half-select currents are applied across winding AC1—BD1 (X Write of FIG. 13) and across winding CD1—AB3 (Y Write of FIG. 13). For reading the 1-bit in the units order, winding AB1—AB3 connects through a sense amplifier related to the 1-bit units position.

FIGS. 15–19 illustrate in detail the MARS bit drivers (309—FIG. 1*a*). Incoming +S signals from DRU or the Incrementer are amplified by PI-blocks such as 310 and presented to WDR-blocks such as 311. Write MARS sample pulses (R3(D1)—timing cycle point Read 3 Duration 1 microsecond) gate the WDR-blocks via SS-blocks such as 312 to provide −S signals on the outgoing lines for the respective bits of the address to be set into MARS.

Figure 20:
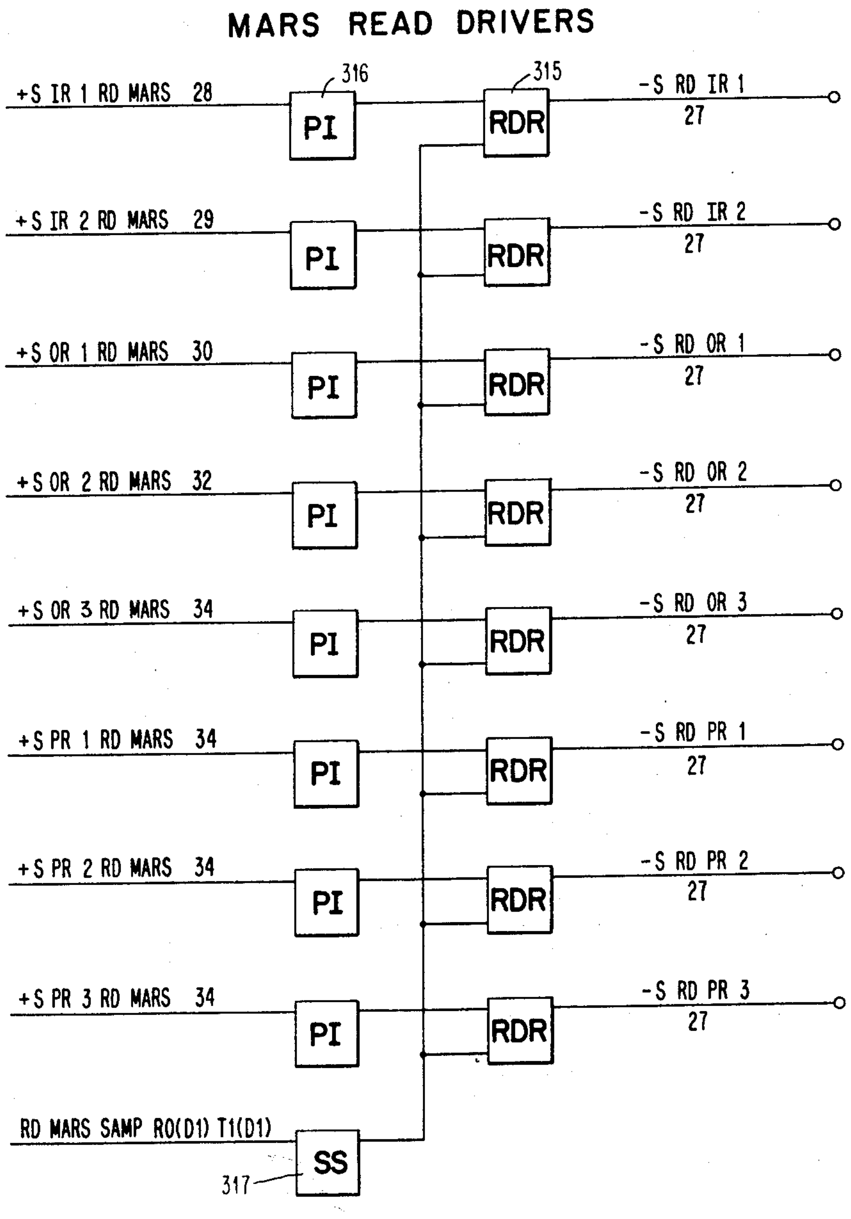

FIG. 20 illustrates the MARS read drivers. The selected RDR-blocks such as 315 operate upon command by means of an incoming +S signal, through a PI-block such as 316 when gated by a RO MARS sample pulse R0(D1) or T1(D1), via SS-block 317. The outgoing lines connect to the related terminals of the MARS core frame (FIG. 27) and thereby to MARS cores (FIG. 14) to provide full read current.

Figure 21:
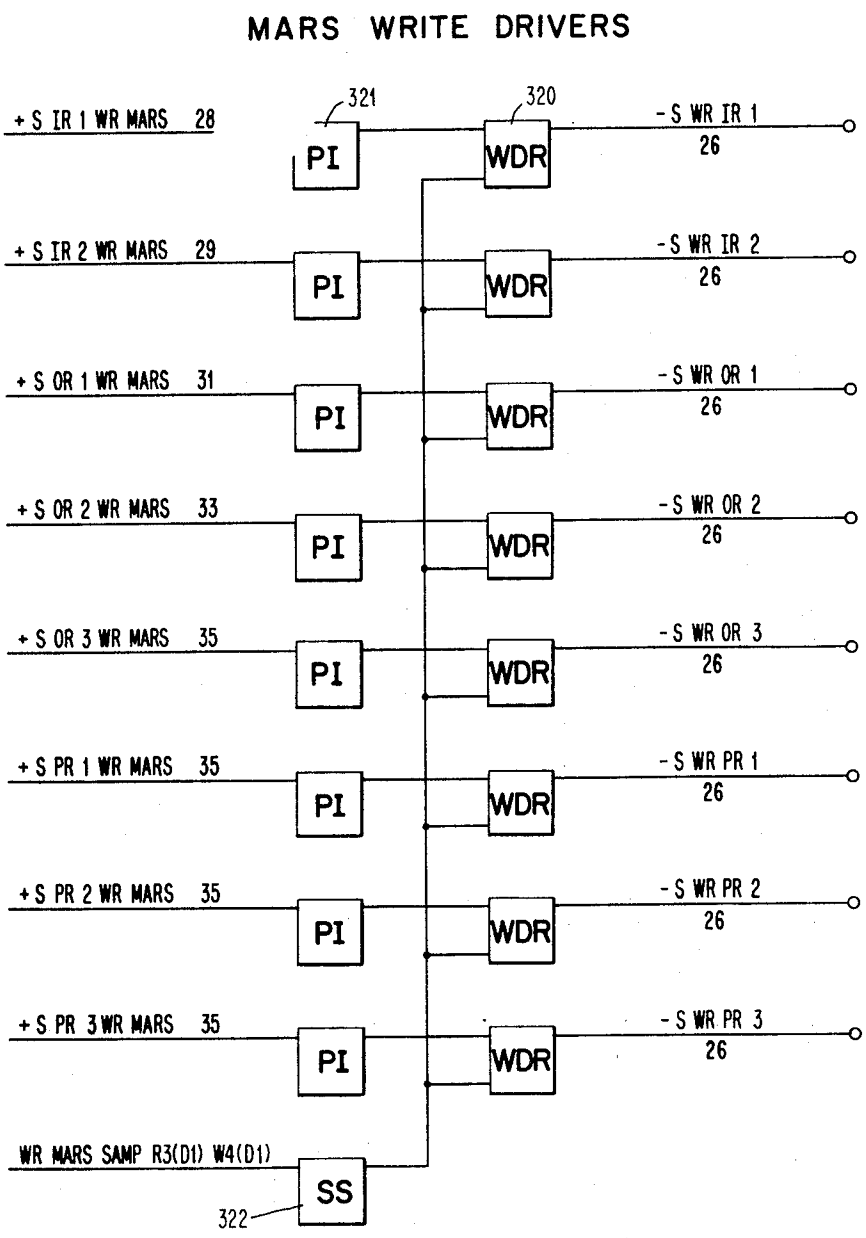

FIG. 21 shows the MARS write drivers, WDR-blocks such as 320, which operate on incoming +S demand via PI-blocks such as 321 and Write MARS sample pulse R3(D1) or W4(D1) gating via SS-block 322 to provide half-select current to the appropriate outgoing line, which connects to the MARS core frame (FIG. 26) and thereby to the MARS cores (FIG. 14.)

Figure 22:
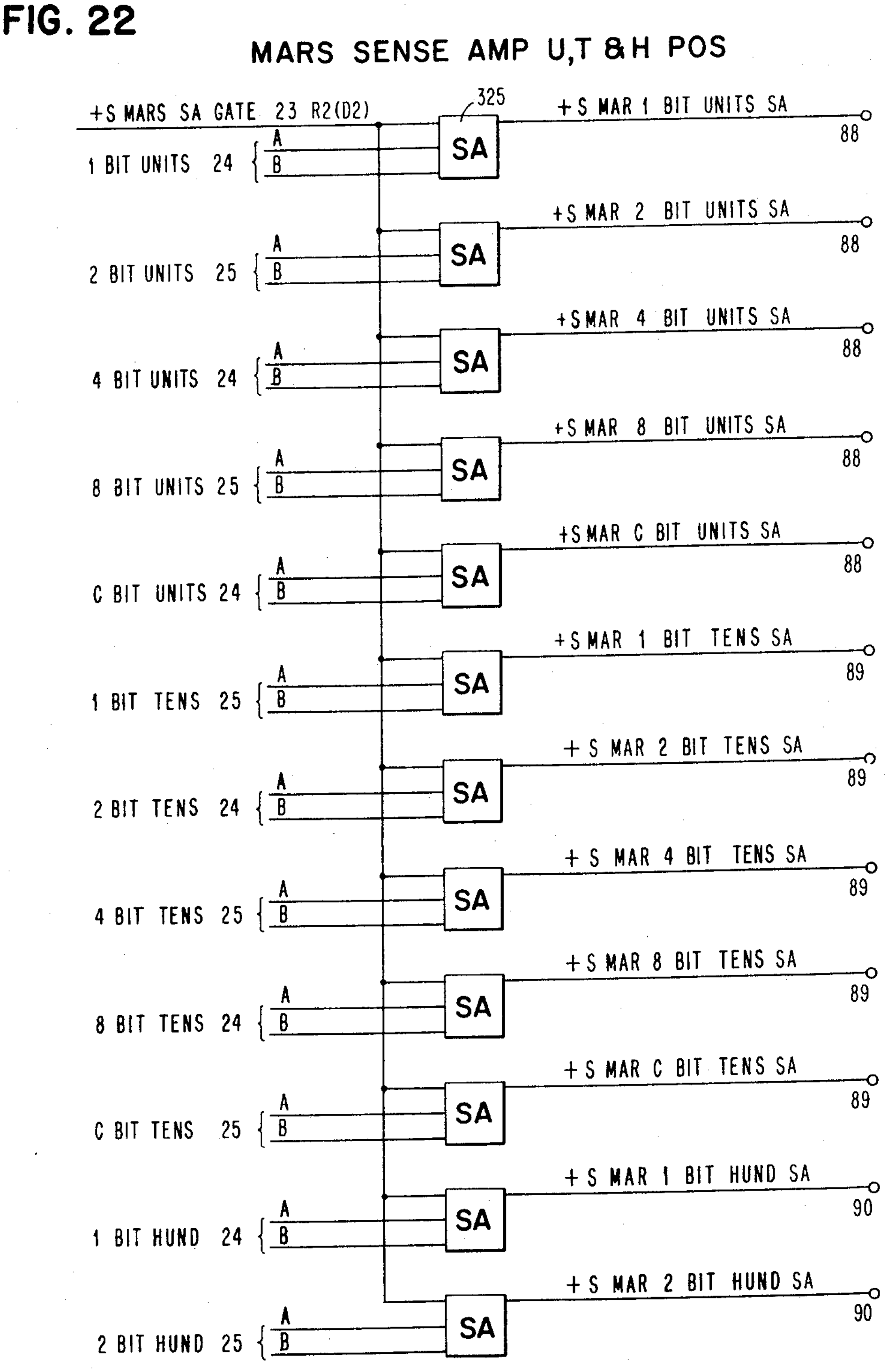
Figure 23:
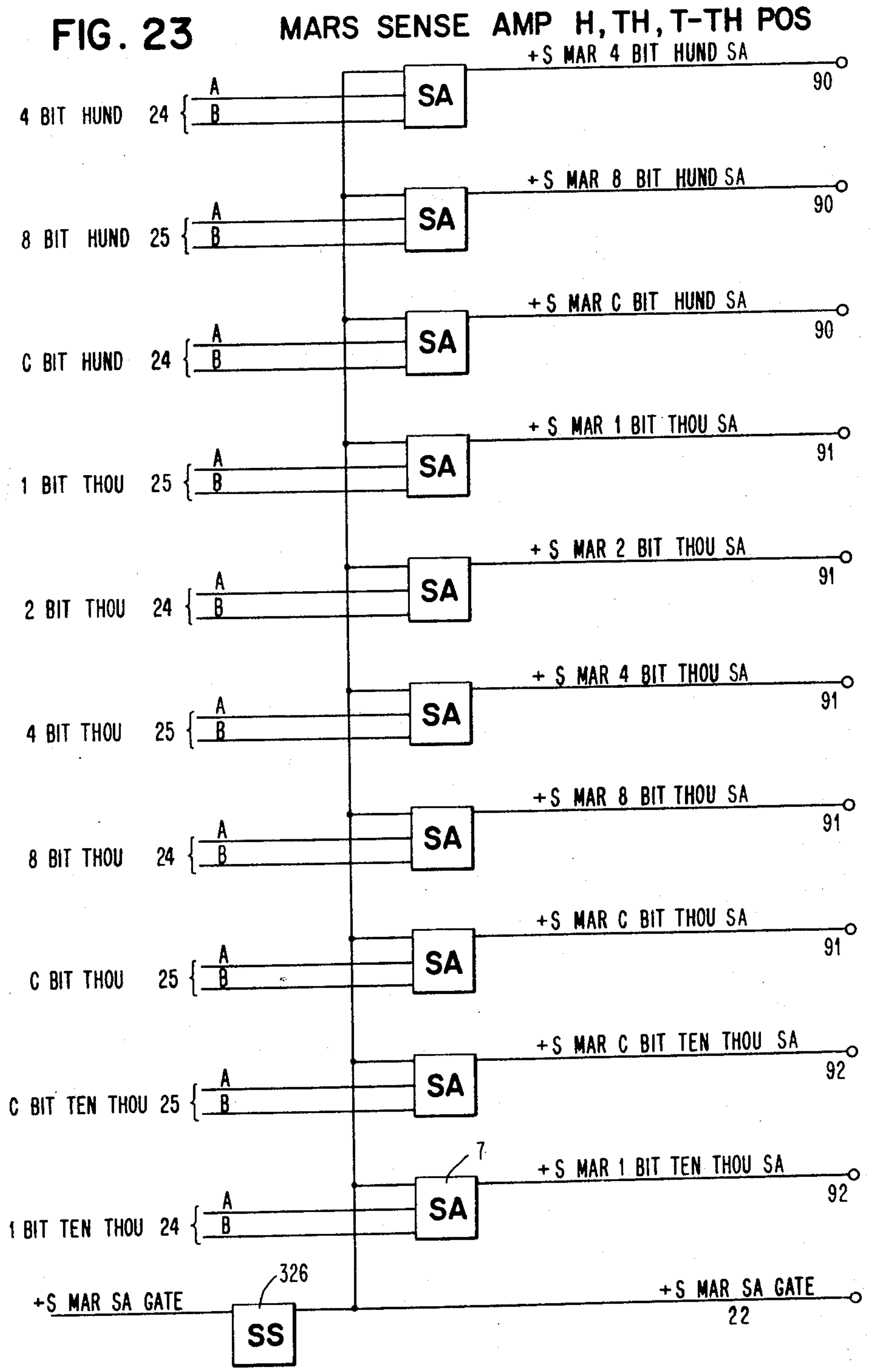
Figure 24:
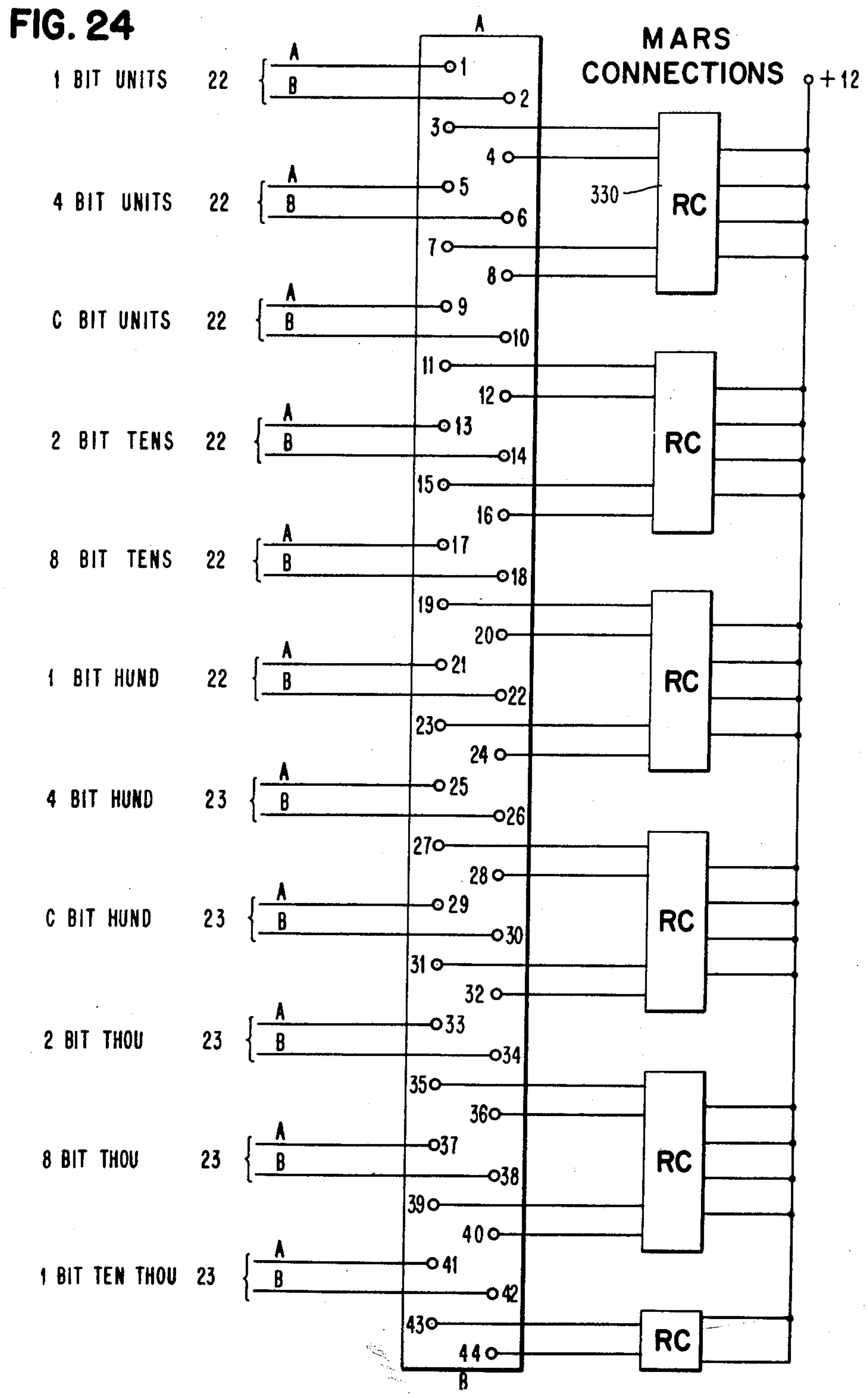
Figure 25:
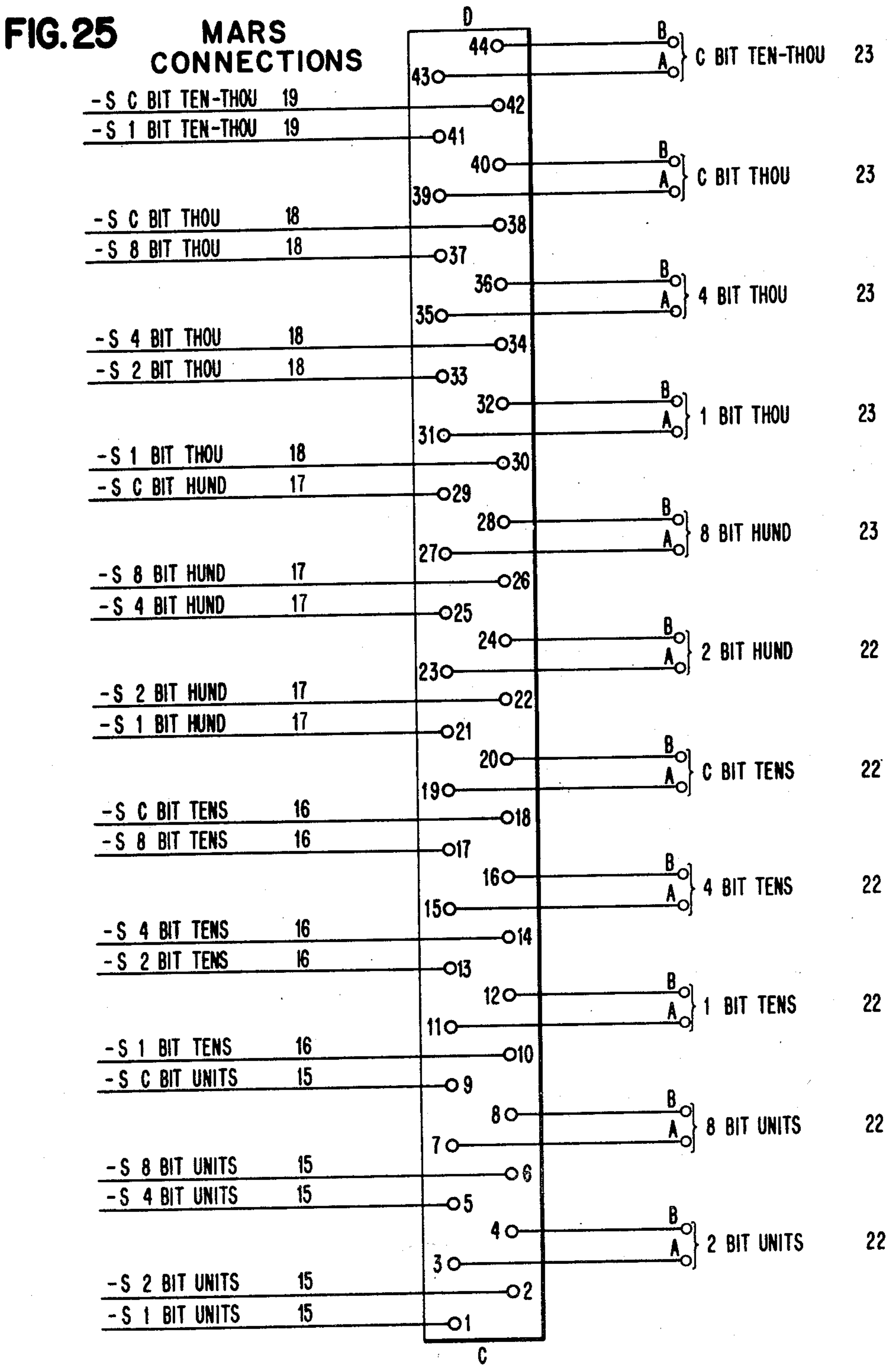
Figure 26:
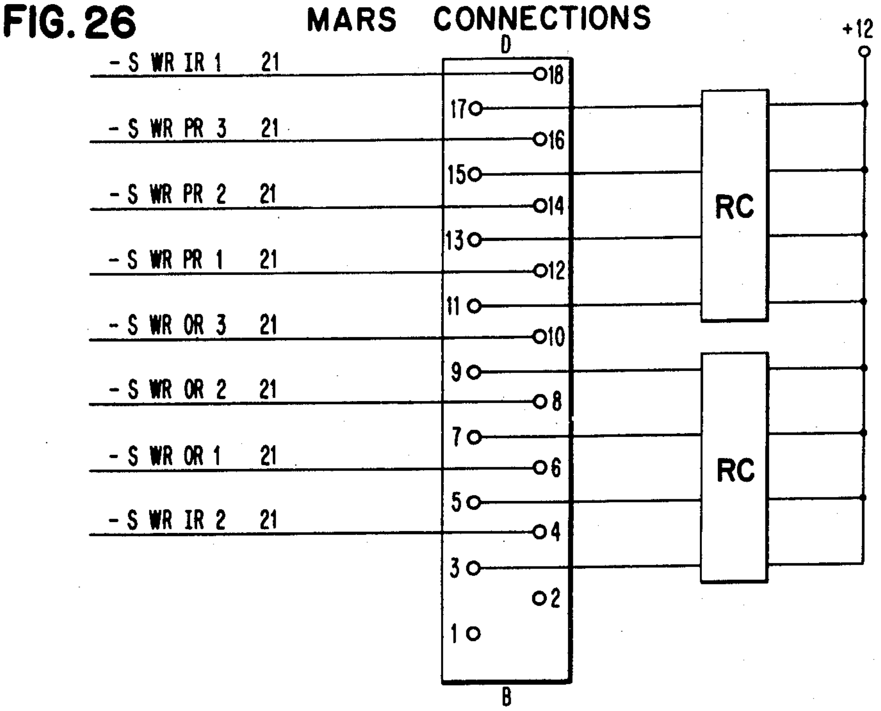
Figure 27:
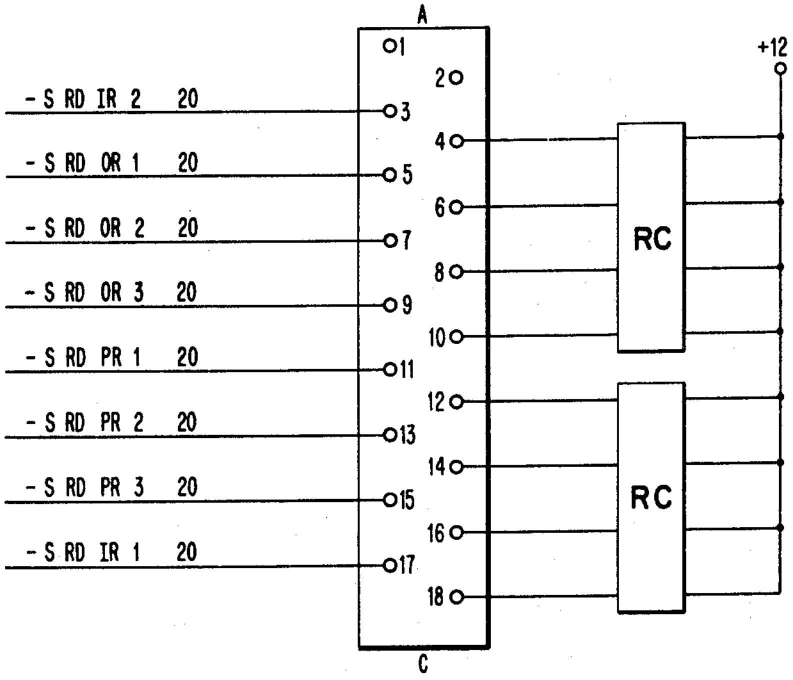
Figure 28:
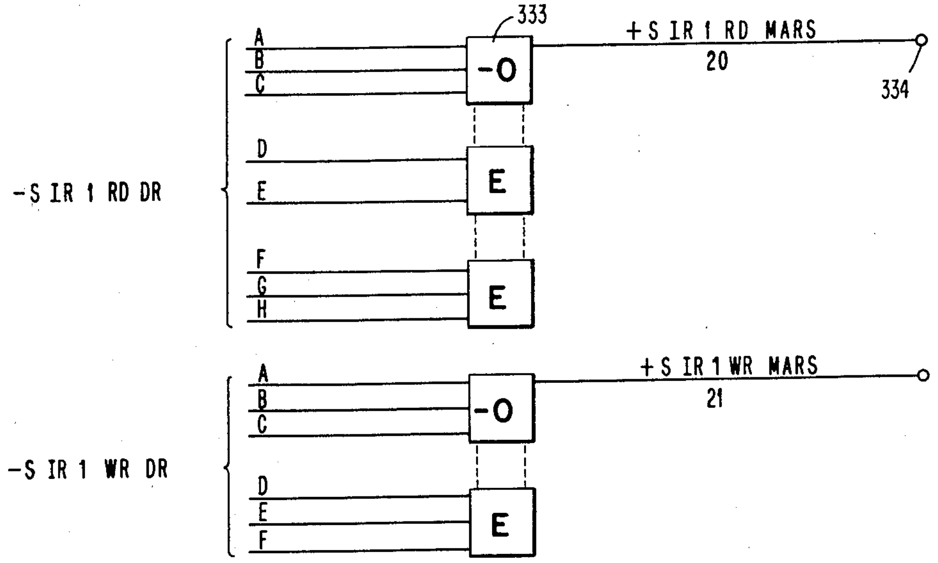
Figure 29:
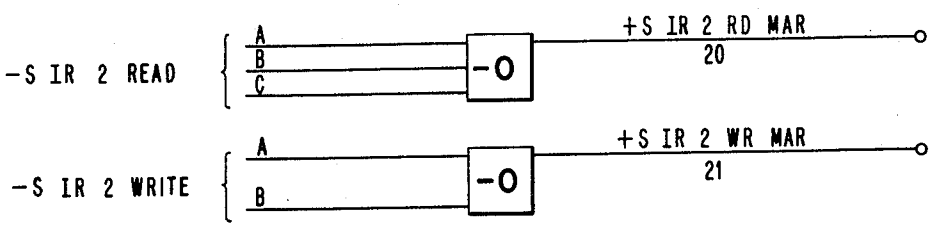
Figure 30:
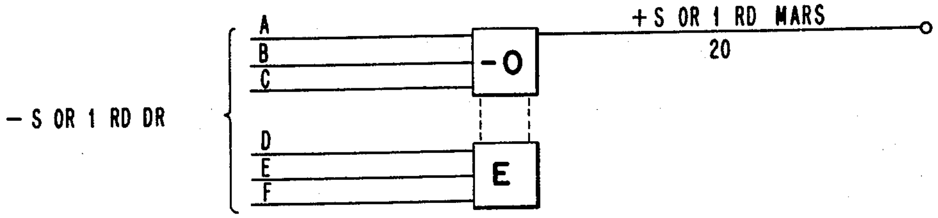
Figure 31:
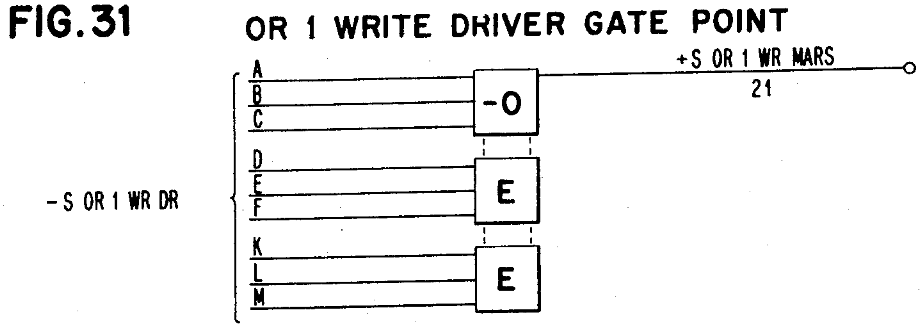
Figure 32:
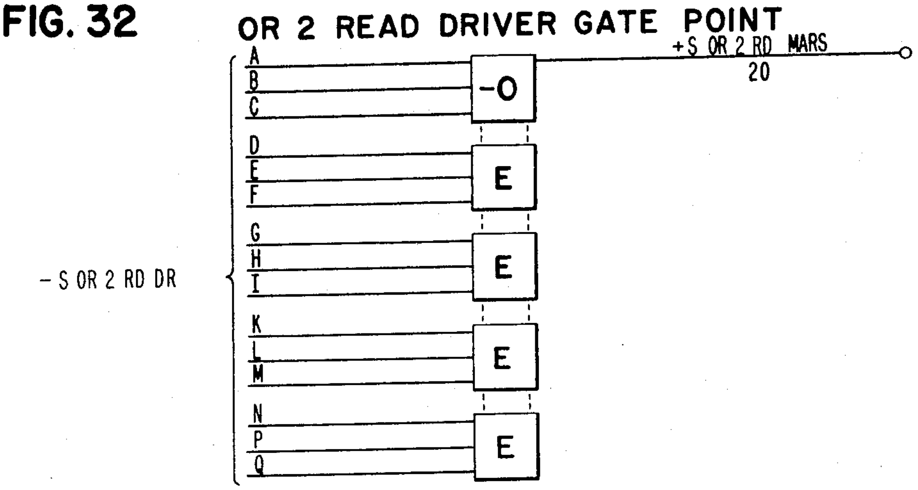
Figure 33:
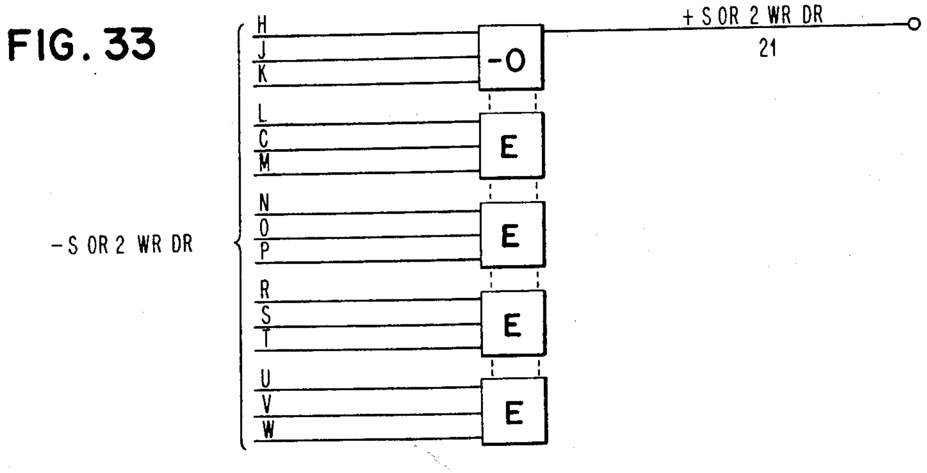
Figure 34:
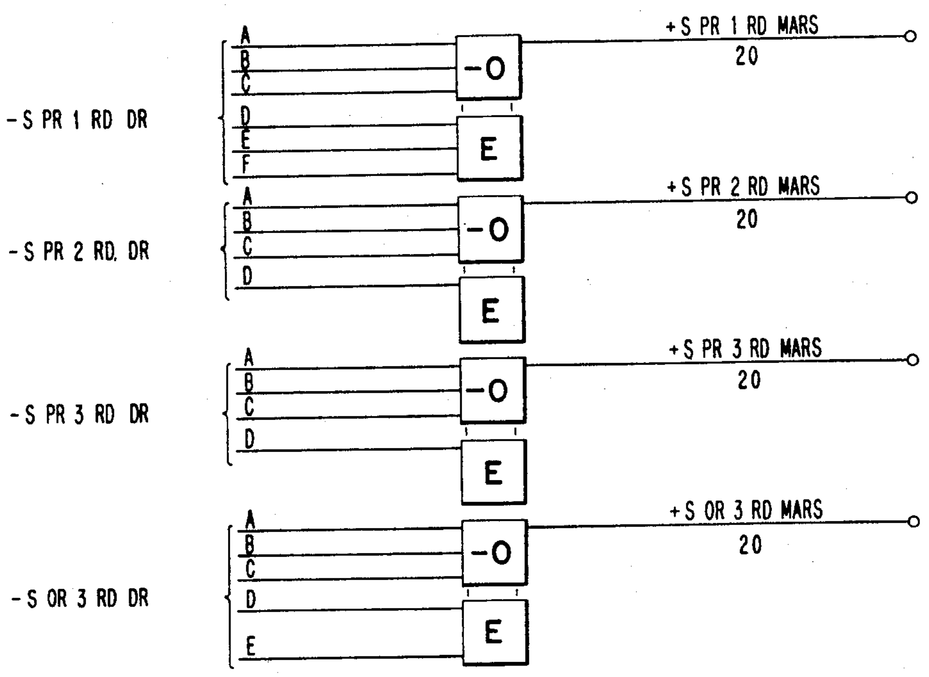
Figure 35:
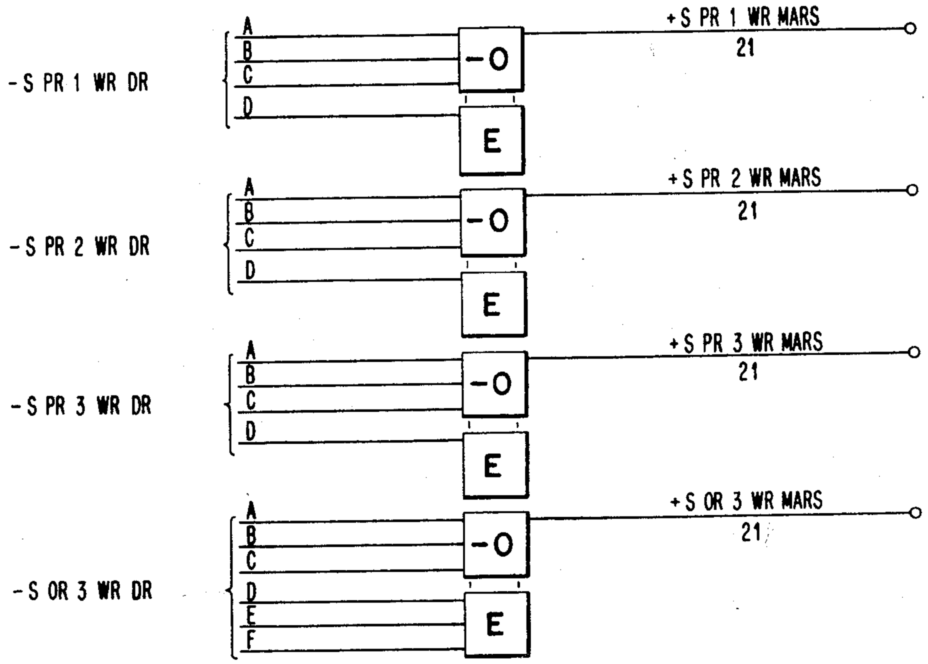

FIGS. 22–23 show the sense amplifier SA-blocks such as 325, which operate MAR in response to outputs from cores in MARS. Each sense winding (FIG. 13) connects to two inputs of the SA-block; when gated by the MARS SA gate pulse R2(D2) via SS-block 326 (FIG. 23) the outgoing lines carry 1-valued bits to MAR positions as +S signals.

FIGS. 24–27 indicate the physical layout of the connections to the MARS core frame, as explained in connection with FIGS. 14–23. RC-blocks such as 330 provide load resistances to a +12 volt source.

FIGS. 28–35 illustrate the MARS register controls. –O-blocks such as 333 and extenders form logical MINUS OR circuits responsive to the program timing area to initiate, by +S signals at the appropriate output terminals such as 334, the transmission of an address into or out of any MARS register upon —S signal demand. For example, when the program timer calls for the address of the augend digit from OR2 (add step 2), it causes a —S signal to be impressed on OR2 read driver incoming line D (OR2 RD DR D) in FIG. 32—this results in a +S signal on an OR2 RD MARS outgoing signal line which connects to the similarly labelled line of FIG. 20, MARS Read Drivers.

FIG. 36 illustrates the BYPASS INCREMENT SWITCH POINT; any —S input to the fifteen-input extended –O-block provides a +S functional signal BYPASS at terminal 409. The circuit in FIG. 36 is effective to operate bypass block 407 in FIG. 1*a*; output goes to FIG. 38.

FIG. 37 illustrates the DRU-DRT GATE POINT TO MARS. —S signals from DRU or DRT are operative through the related OR circuits and emitter followers to produce +S signals functionally designated WR UNITS SAMP, WR TENS SAMP, WR HUND SAMP, WR THOU SAMP and WR TEN THOU SAMP at respective terminals 440–444. These terminals are connected to the related lines in the designated figures to control bit entry into MARS.

Figure 38:
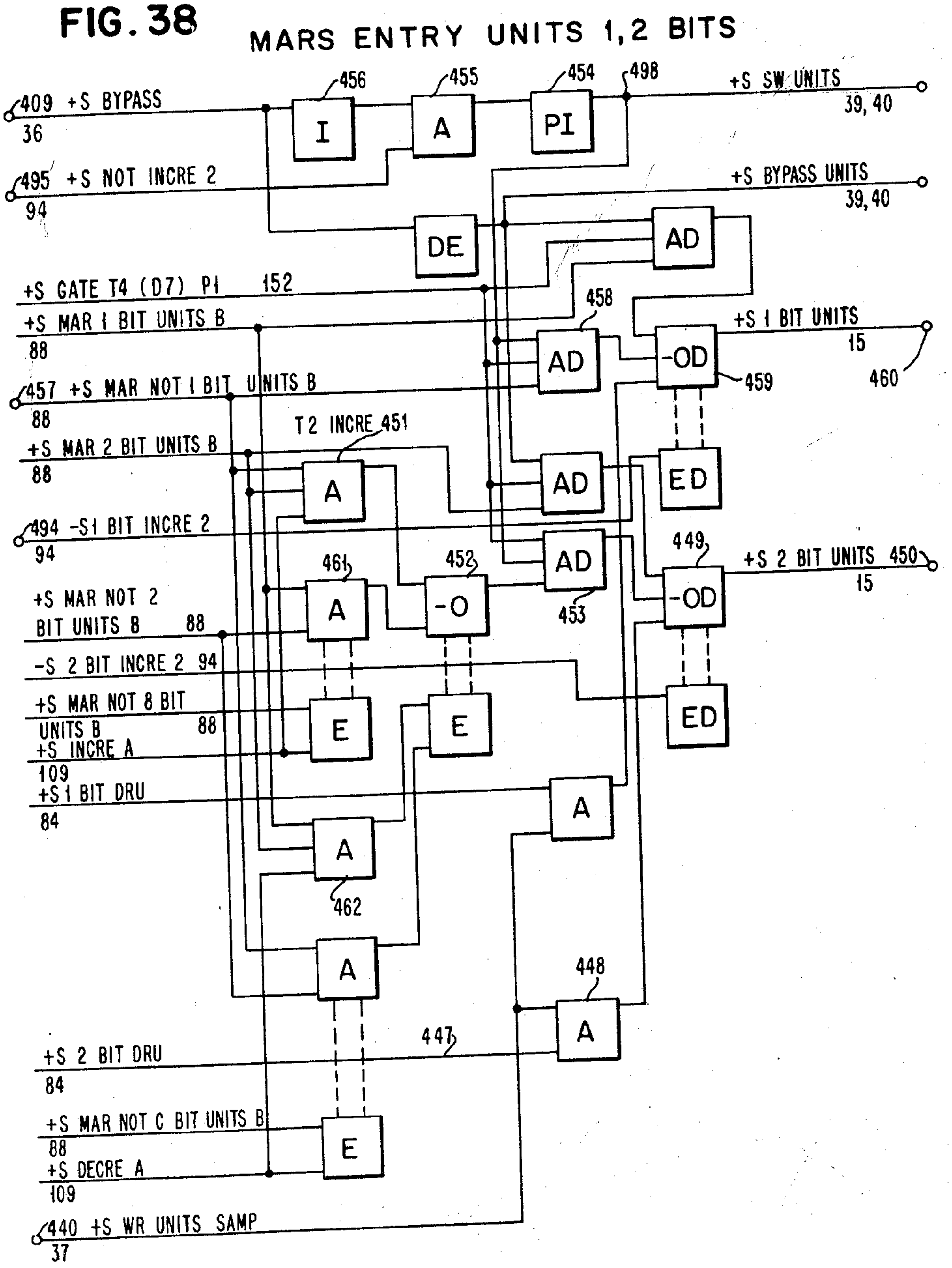

FIG. 38 illustrates MARS ENTRY UNITS 1, 2 BITS. Registers in MARS may be set to bit values from DRU or regenerated to bit values from MAR via increment block 401 in FIG. 1. The increment block includes bypass means so that the address in MAR 201 may return to MARS unchanged, means to increment 2, means to increment 1, and means to decrement 1.

To set the digit value 2 from DRU to MARS, for example, it is necessary only to provide a +S 2 BIT DRU signal on line 447 and the +S WR UNITS SAMP signal at terminal 440 to condition A-block 448 and –OD-block 449 to provide the +S 2 BIT UNITS signal at terminal 450.

It is often necessary to increment the address in MAR by 1 in the regenerative pass via the increment switch back to MARS. The binary coded decimal digit format of 8, 4, 2 and 1 value bits operates in a fashion peculiar to it during incrementing. For example, whenever there is a 2 bit and a "not 1" bit, incrementing changes only the 1 bit, changing decimal 2 to 3 and 6 to 7. A-block 451 is subject to a +S signal identifying the functions NOT 1 BIT UNITS, 2 BIT UNITS and INCRE; upon coincidence of the three functional signals A-block 451 produces a —S signal to condition –O-block 452, producing a +S input to AD-block 453. AD-block 453 is subject to a +S gating signal at T4(D7) and to the output of PI-block 454, which is +S SW units during coincidence of functional signals +S NOT INCRE 2 and NOT BYPASS at A-block 455. I-block 456 produces the +S NOT BYPASS signal, when terminal 409 is deconditioned, from the +S BYPASS signal. Upon conditioning of AD-block 453 with the (NOT 1 BIT and 2 BIT), GATE T4(D7) and SW UNITS signals, AD-block 453 produces a —S signal to –OD-block 449 to produce the +S 2 BIT UNITS signal at terminal 450.

BINARY CODED DECIMAL BIT STRUCTURES

| Decimal | | 8 | 4 | 2 | 1 | C |
|---|---|---|---|---|---|---|
| True | Comp | | | | | |
| 0 / | 9 | 0 | 0 | 0 | 0 | 1 |
| 1 / | 8 | 0 | 0 | 0 | 1 | 0 |
| 2 / | 7 | 0 | 0 | 1 | 0 | 0 |
| 3 / | 6 | 0 | 0 | 1 | 1 | 1 |
| 4 / | 5 | 0 | 1 | 0 | 0 | 0 |
| 5 / | 4 | 0 | 1 | 0 | 1 | 1 |
| 6 / | 3 | 0 | 1 | 1 | 0 | 1 |
| 7 / | 2 | 0 | 1 | 1 | 1 | 0 |
| 8 / | 1 | 1 | 0 | 0 | 0 | 0 |
| 9 / | 0 | 1 | 0 | 0 | 1 | 1 |

In the binary coded decimal bit structure of 8, 4, 2 and 1 value bits, when any decimal digit is incremented by 1, the 1 bit always changes, from 0 to 1 or from 1 to 0. Where there is an even number in MAR to be incremented by 1, terminal 457 is conditioned with a +S MAR NOT 1 BIT UNITS signal, which conditions one input of AD-block 458. A second input is conditioned with a +S GATE signal; the third input is conditioned with the +S SW UNITS signal from PI-block 454. Upon coincident conditioning of its three inputs, AD-block 458 conditions –OD-block 459 to produce the +S 1 BIT UNITS signal at terminal 460. This provides the increment change for the transition from 0 to 1, 2 to 3, 4 to 5, 6 to 7, and 8 to 9.

Where the change is from a 1 bit to a 2 bit through incrementing as in the transition from 1 to 2 and from 5 to 6, provision for producing the +S 1 BIT UNITS signal at terminal 460 is omitted. There is, however, provision including extended A-block 461 for producing the +S 2 BIT UNITS signal at terminal 450 upon coincidence of the +S 1 BIT UNITS, +S MAR NOT 2 BIT UNITS, +S MAR NOT 8 BIT UNITS, and +S INCRE signals. This provides via –O-block 452, AD-block 453 and –OD-block 449 the +S 2 BIT UNITS signal at terminal 450 for all "NOT 2, NOT 8, 1" bit situations, i.e., decimal values 1 and 5 in respective increment transitions to decimal values 2 and 6.

In the transitions from decimal values 3 and 7 to decimal values 4 and 8, the 2 and 1 bits are dropped; there is no provision to produce 1 or 2 bit signals in these situations.

Decrement 1 of decimal values 8, 7, 4 and 3 results in a bit structure including a 2 bit. A-block 462 produces the +S 2 BIT UNITS signal at terminal 450, via blocks 449, 453 and 452 for decrementing decimal values 3 and 7, upon coincidence of +S functional signals DECRE, MAR 2 BIT UNITS and MAR 1 BIT UNITS.

Figure 94:
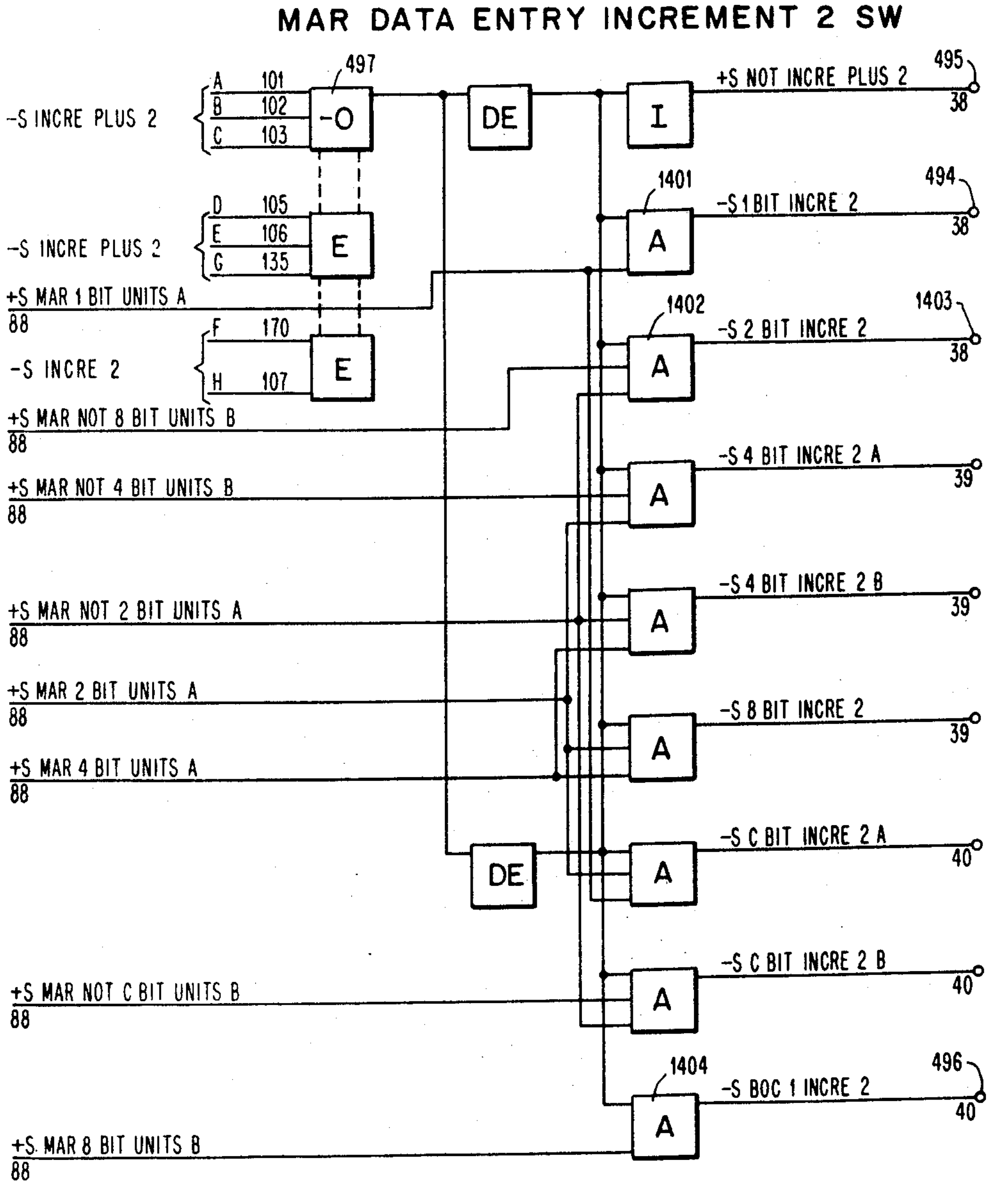
Figure 95:
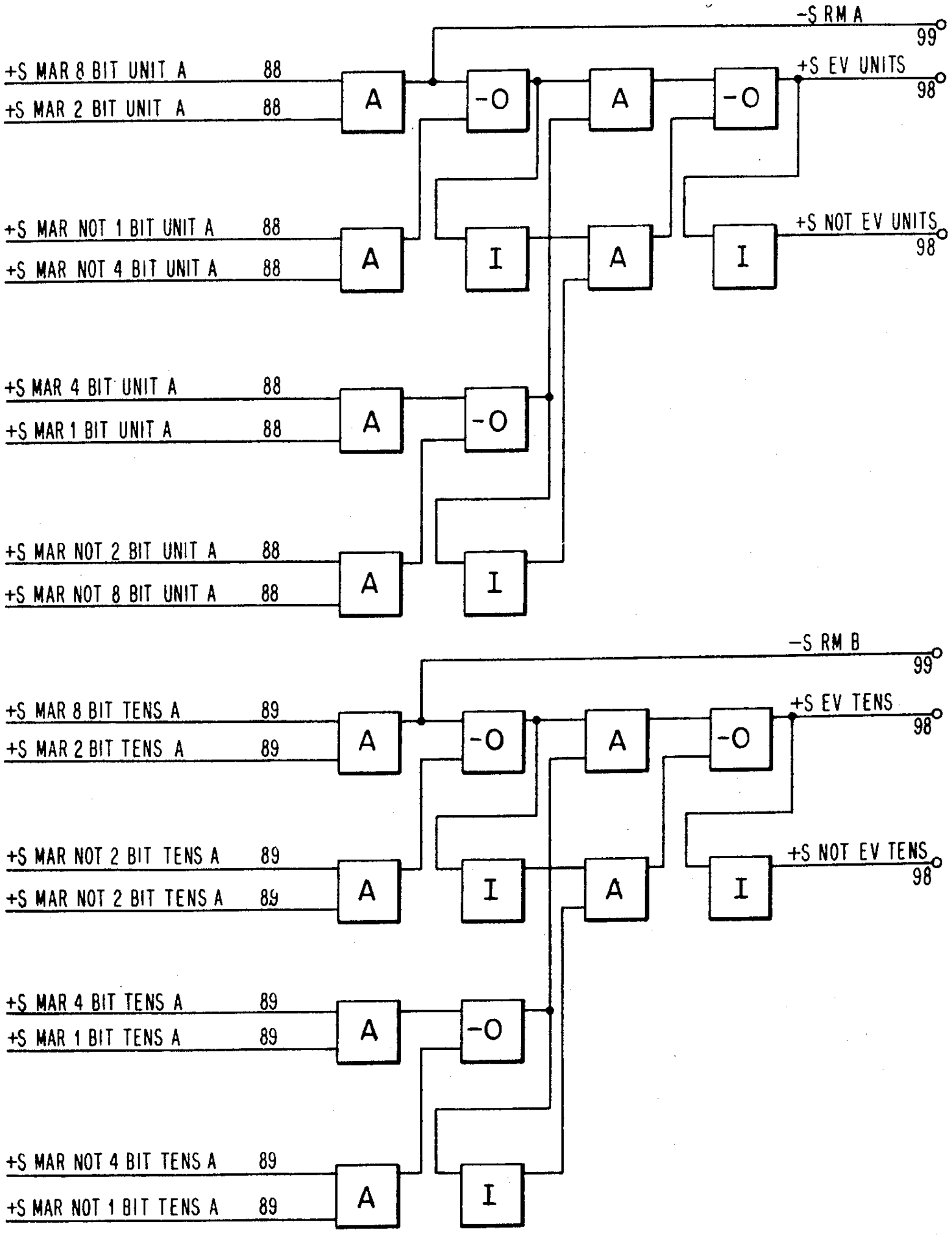

The increment 2 operation, which produces changes in the bit structure only of the 8, 4 and 2 bits, is provided for by a network shown in FIG. 94, which connects into the bypass-increment-decrement at the final output OR stage, for example, to –OD-block 474 (FIG. 39) in the case of the 8 bit.

Figure 39:
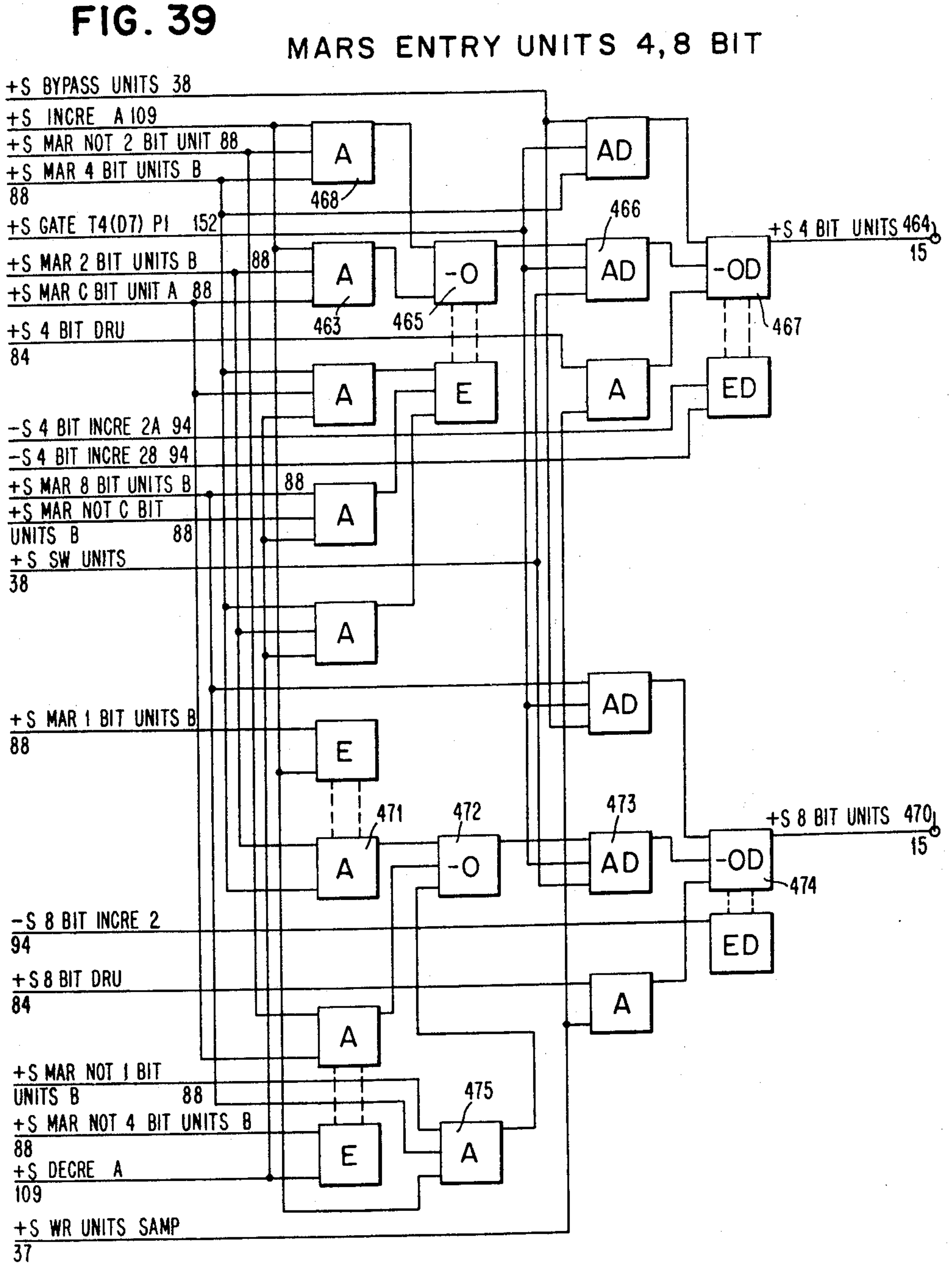

FIG. 39 illustrates the MARS entry units 4 and 8 bit positions. A-block 463 is effective upon coincidence of +S functional signals INCRE, 2 BIT UNITS and C BIT UNITS to produce a +S 4 bit units functional signal at terminal 464, via –O-block 465, AD-block 466 and –OD-block 467. The coincidence of 2 and C occurs at decimal values 3 and 6, which when incremented 1 maintain the 4 bit. A-block 468 provides the +S 4 BIT UNITS signal at terminal 464 upon coincident conditioning by +S signals functionally designated INCRE, MAR NOT 2 BIT UNITS and MAR 4 BIT UNITS via –O-block 465, AD-block 466 and –OD-block 467. The 4 BIT and NOT 2 BIT signals appear coincidentally for the decimal values 4 and 5, which when incremented retain the 4 bit; in incrementing these values the 4 BIT UNITS and NOT 2 BIT UNITS lines are coincidentally conditioned to condition A-block 468 and terminal 464 via blocks 465, 466 and 467.

The +S 8 BIT UNITS signal is produced at terminal 470 when decimal values 7 and 8 are incremented 1. A-block 471 is conditionable by +S functional signals INCRE, 4 BIT UNITS, 2 BIT UNITS, and 1 BIT UNITS to condition -O-block 472, AD-block 473 and -OD-block 474 to produce the +S 8 BIT UNITS functional signal at terminal 470 when the decimal value 7 is incremented 1. AD-block 475 is effective to condition -OD-block 474 via -O-block 472 and AD-block 473 upon coincidence of +S functional signals INCRE, MAR NOT 1 BIT UNITS and MAR 8 BIT UNITS, to increment from decimal 8 to 9.

Increment 1, increment 2 and decrement 1 operations are carried out accordingly in the MARS entry section by logical networks interleaved together with the bypass network to produce the appropriate bit structures with maximum component sharing.

Figure 40:
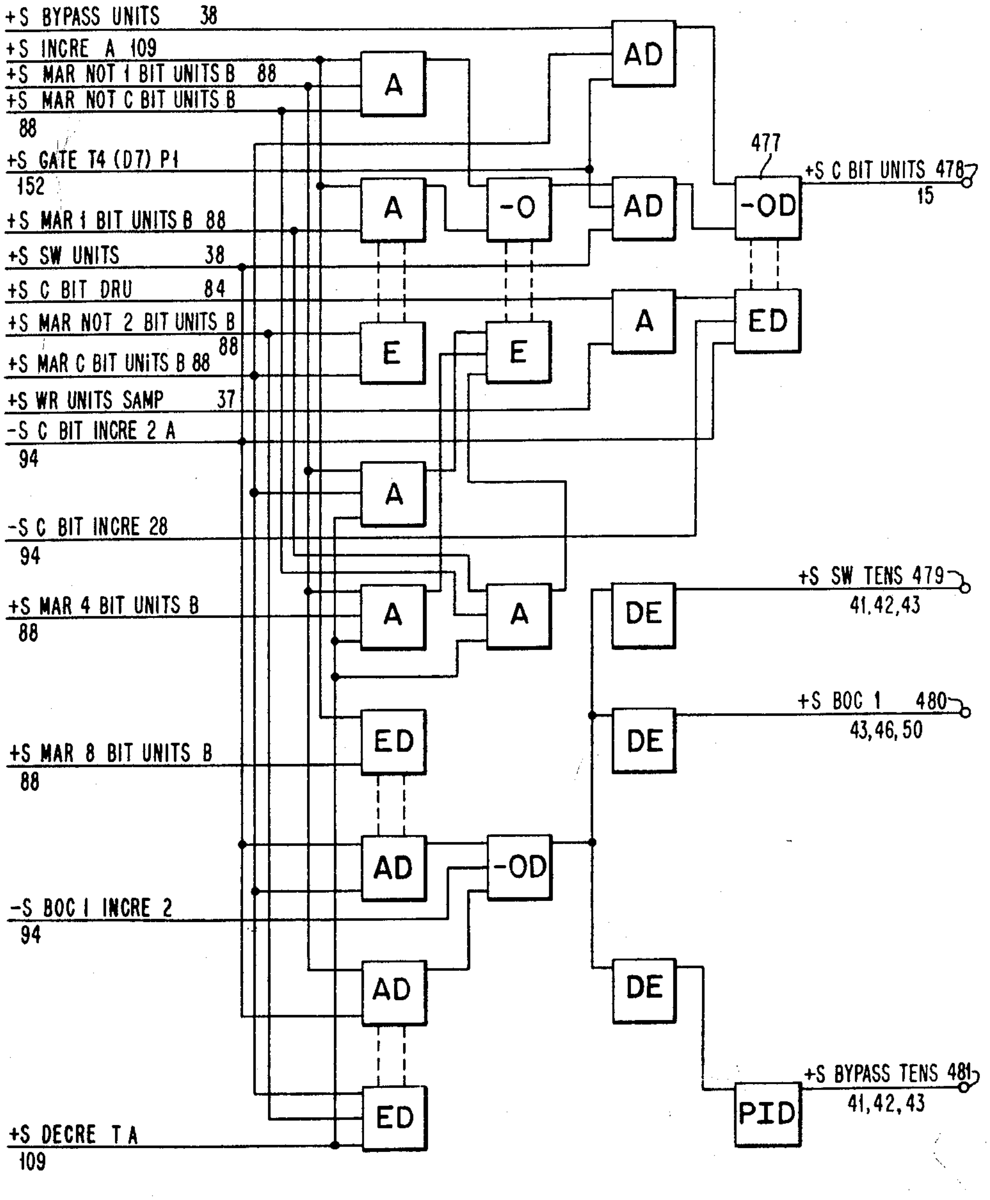
Figure 41:
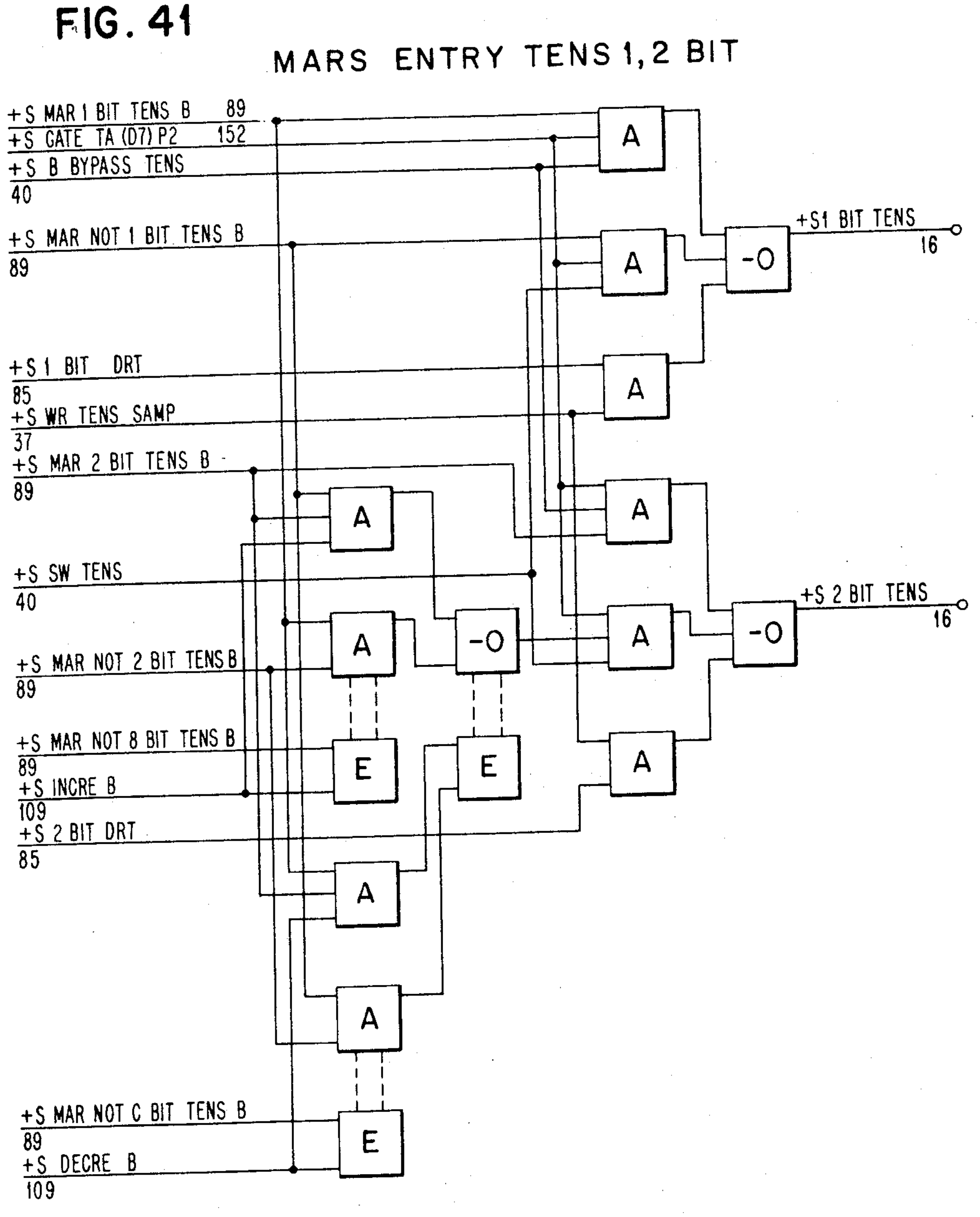
Figure 42:
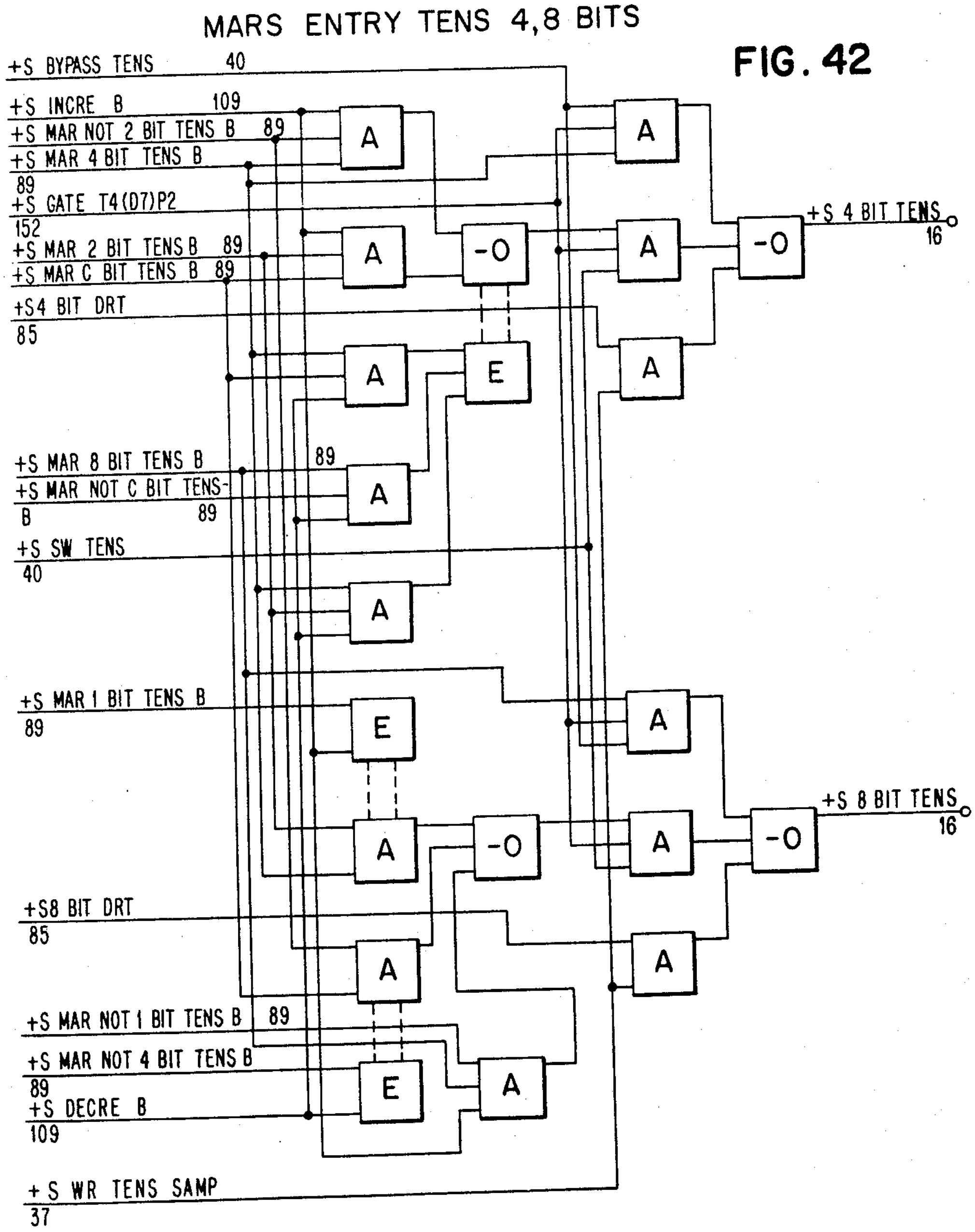
Figure 43:
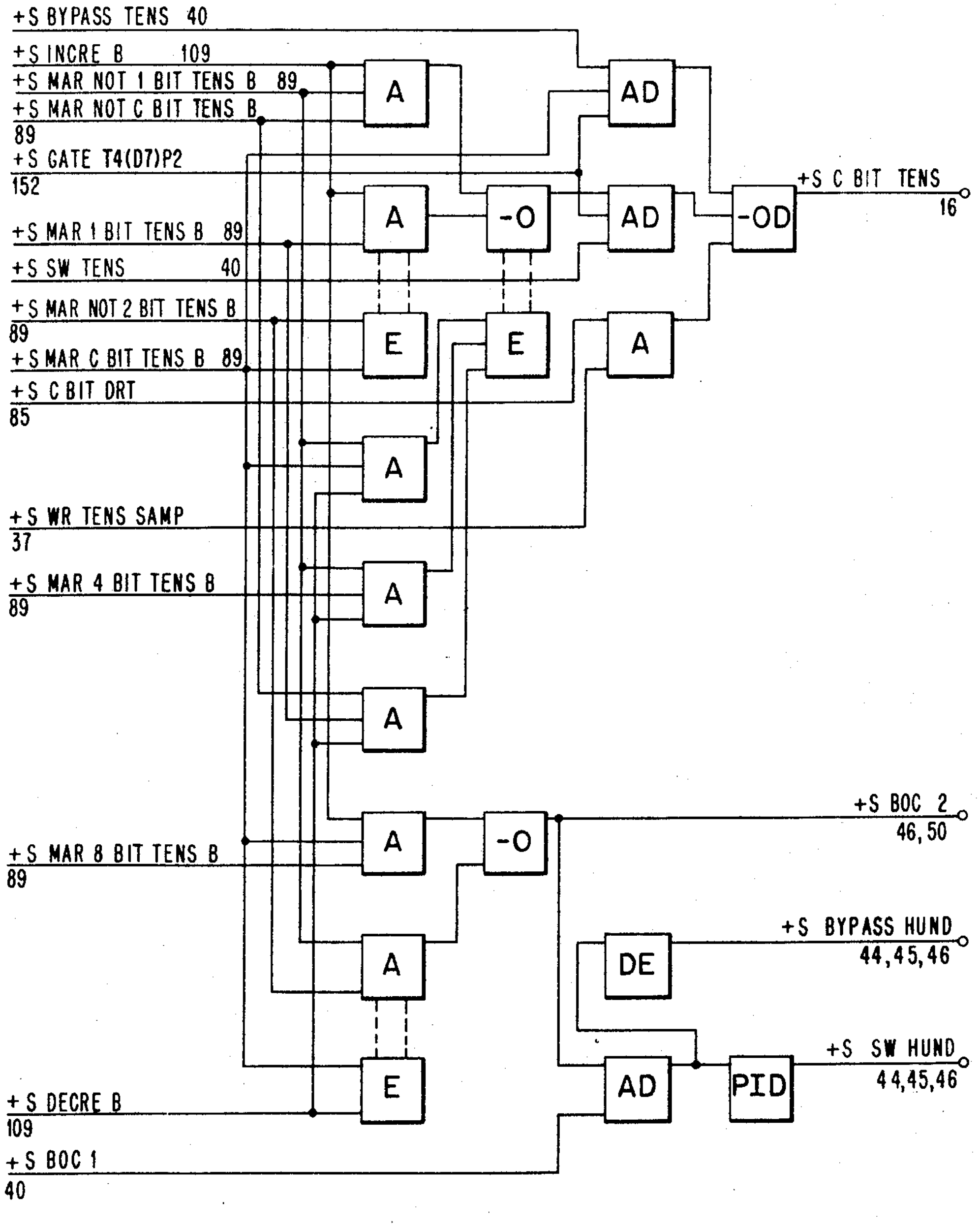
Figure 44:
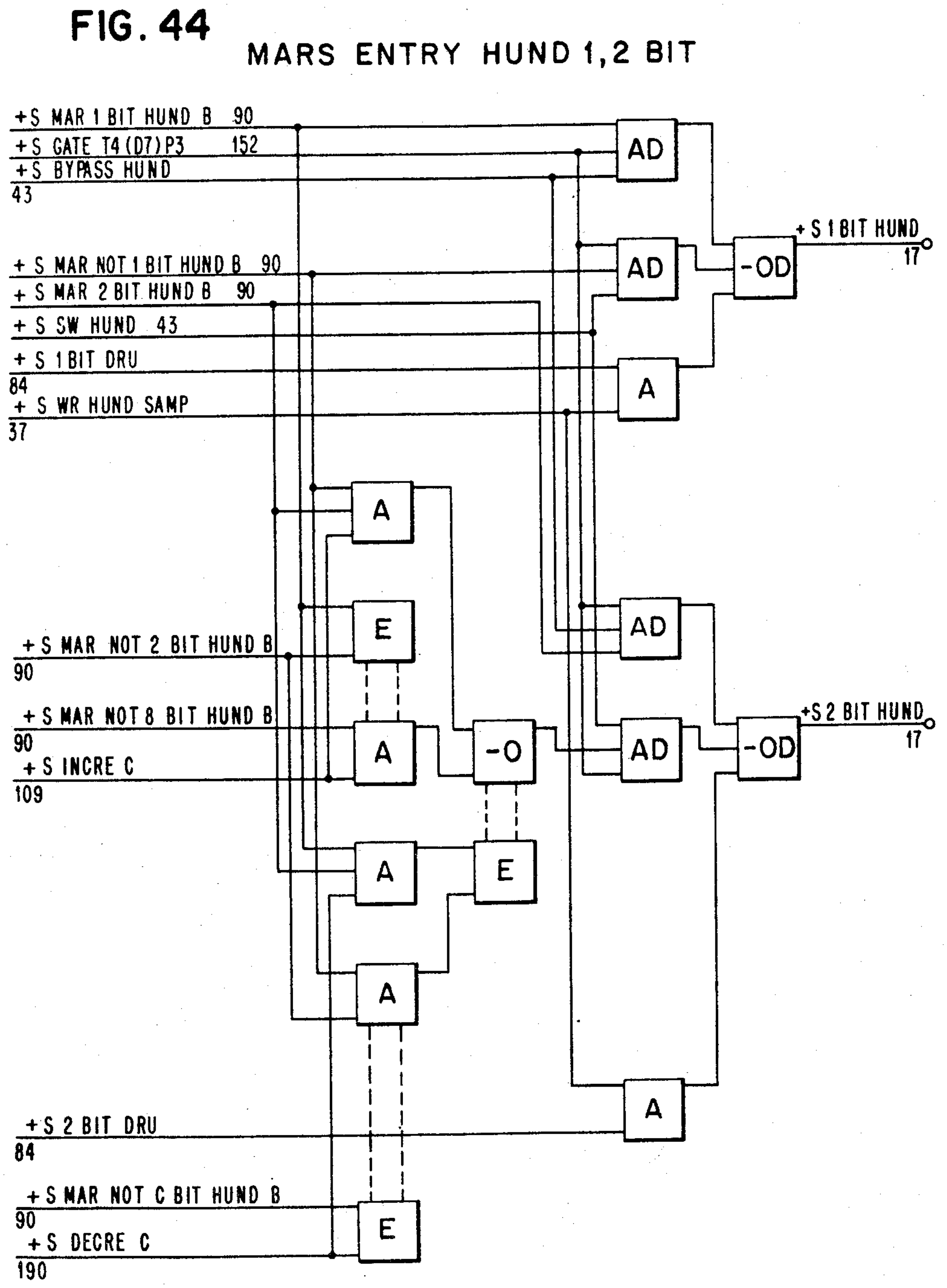
Figure 45:
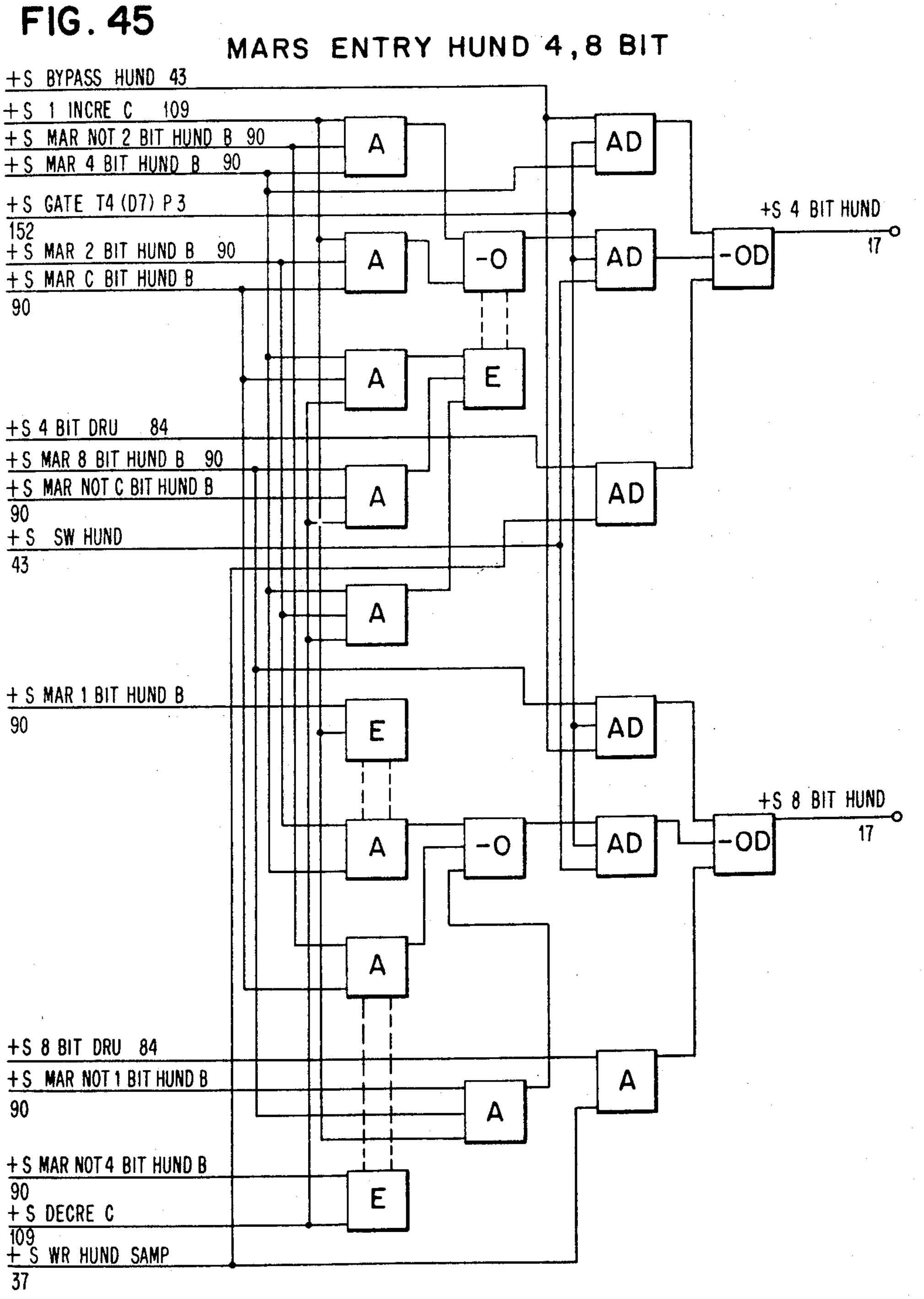
Figure 46:
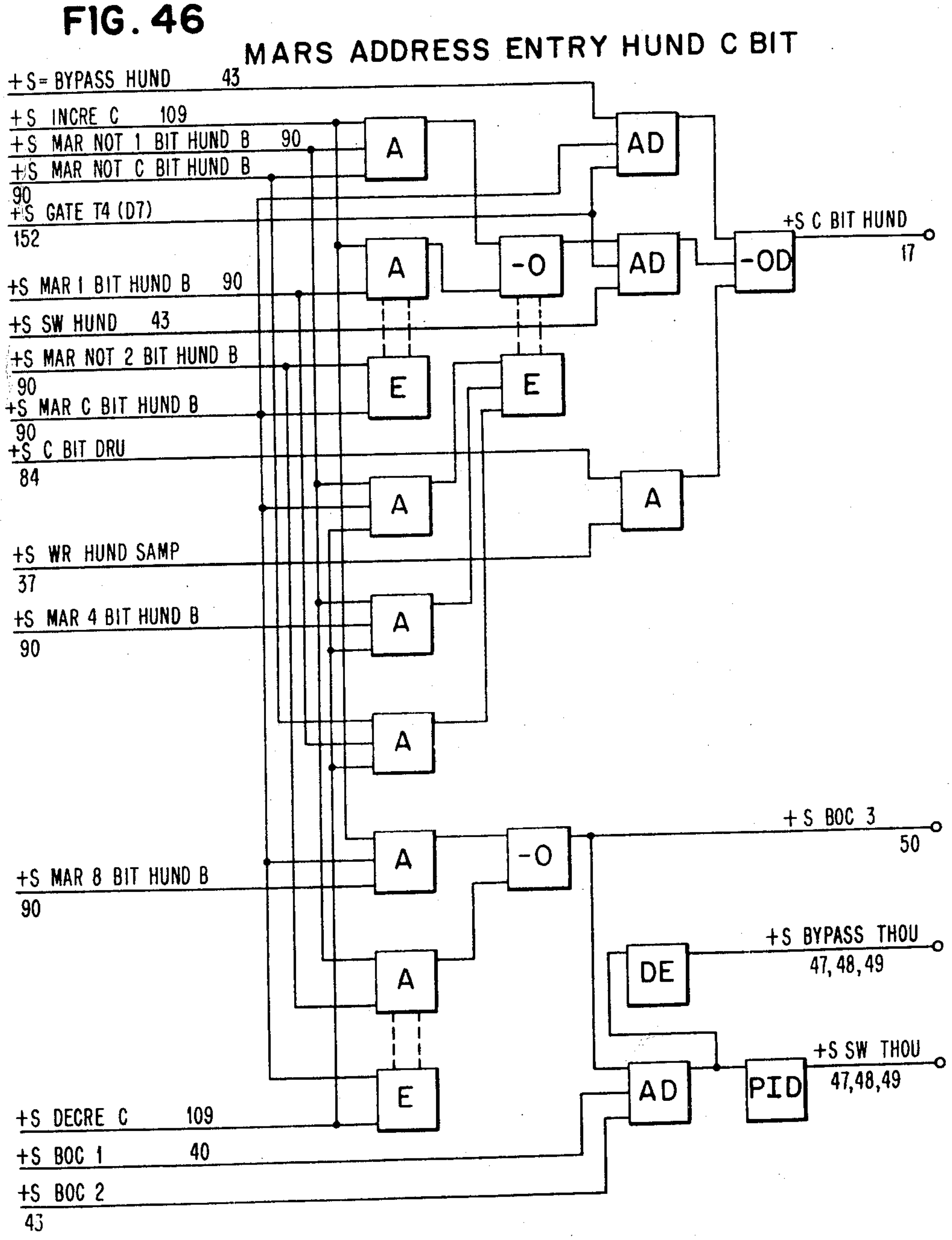
Figure 47:
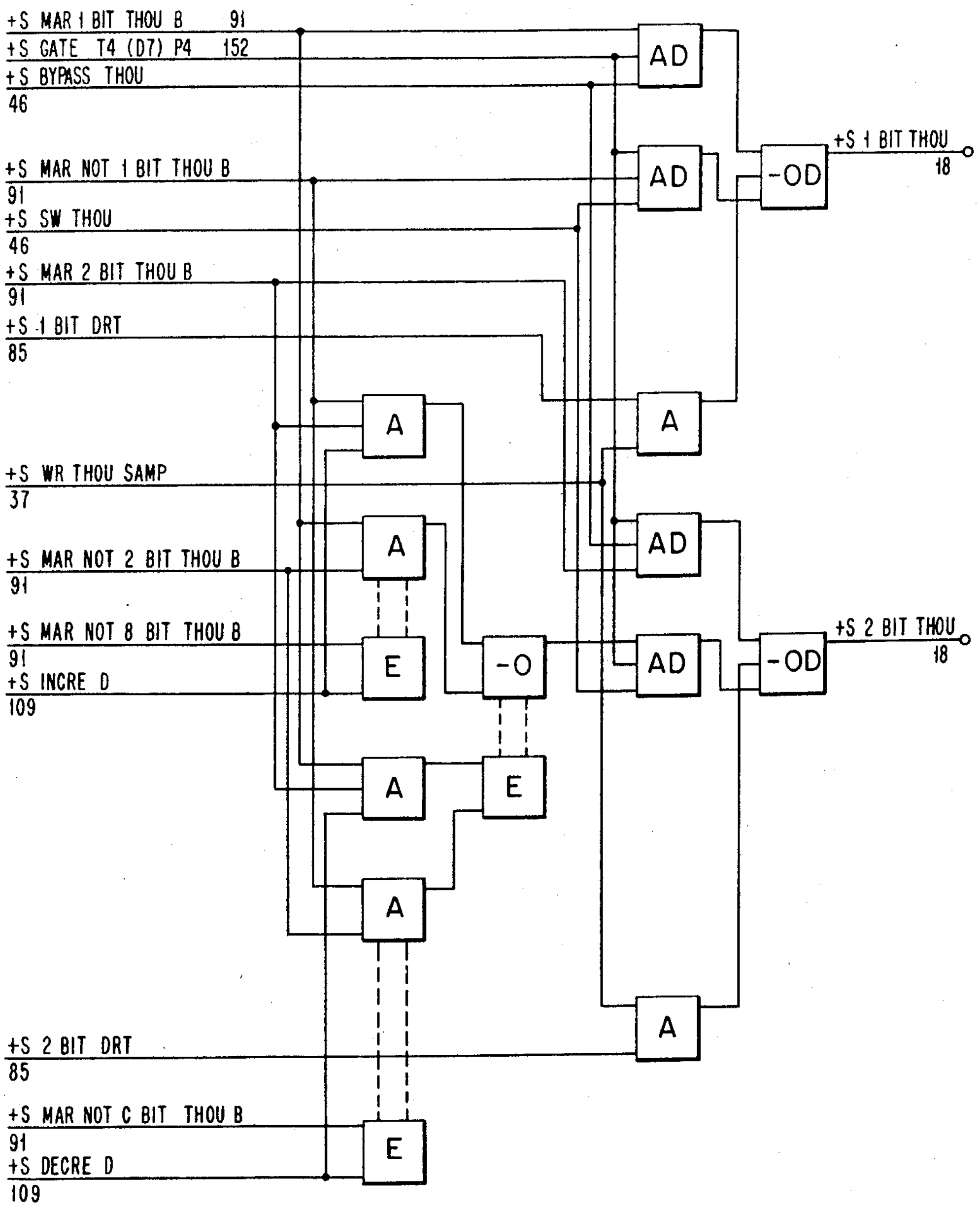
Figure 48:
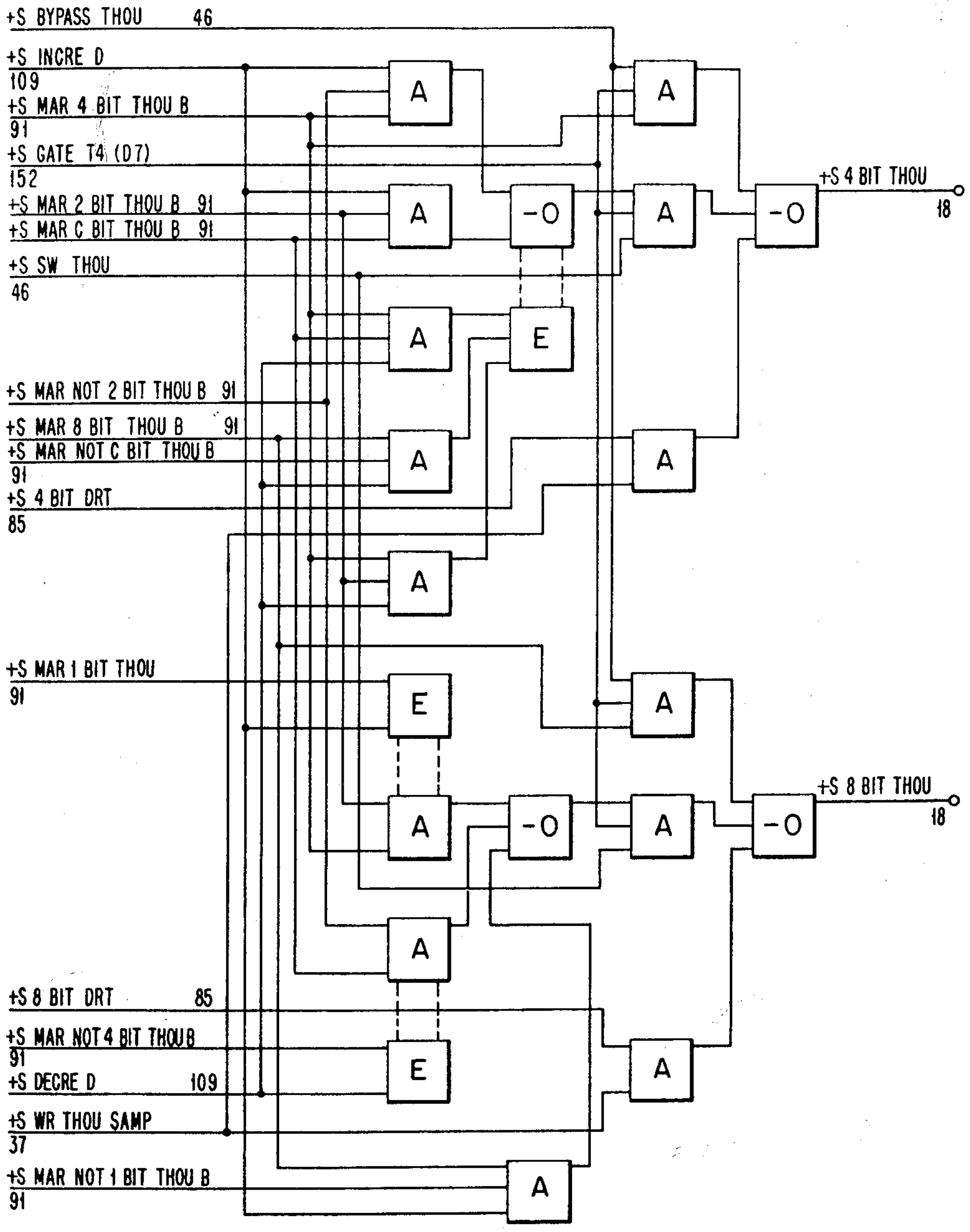
Figure 49:
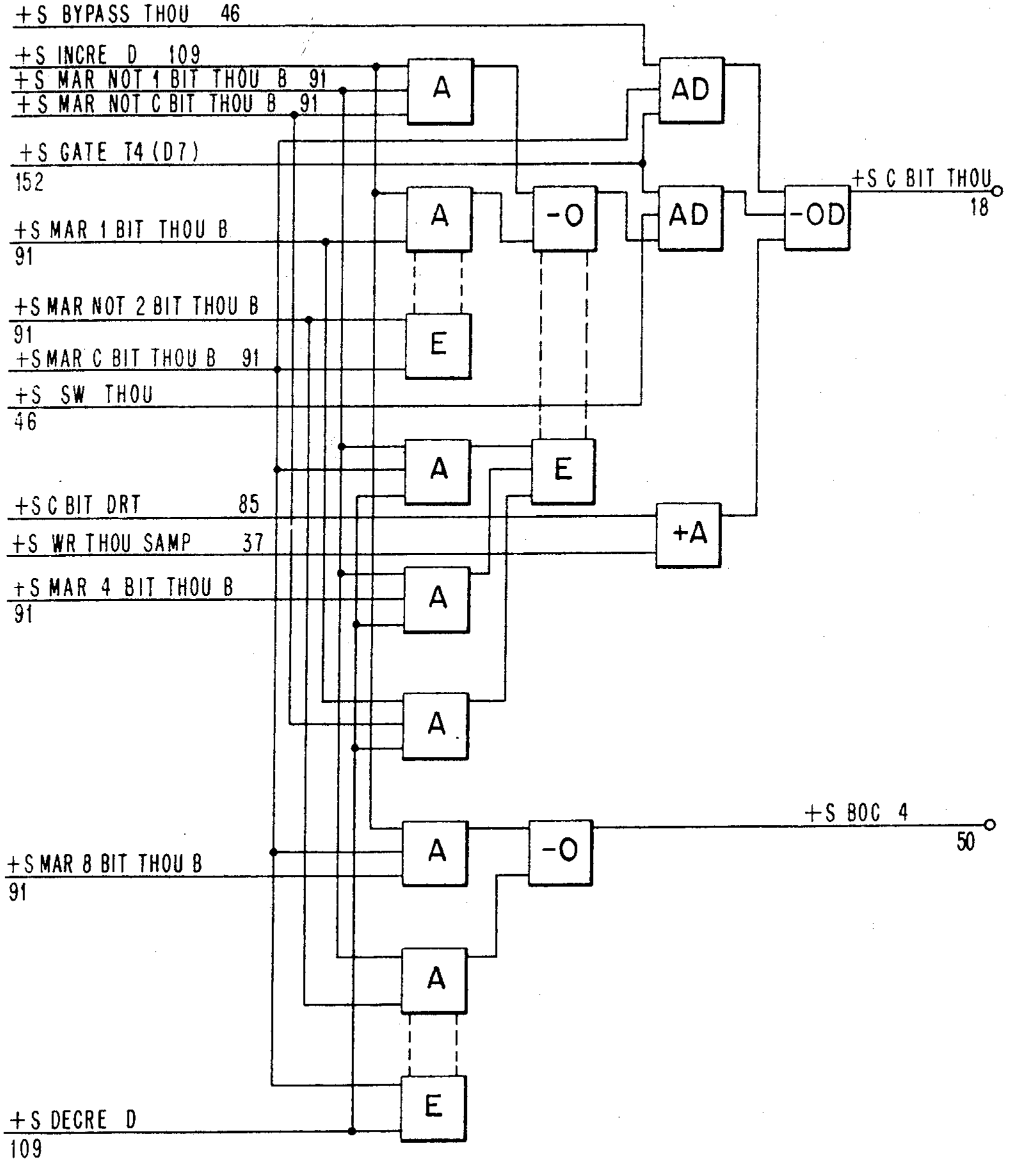
Figure 50:
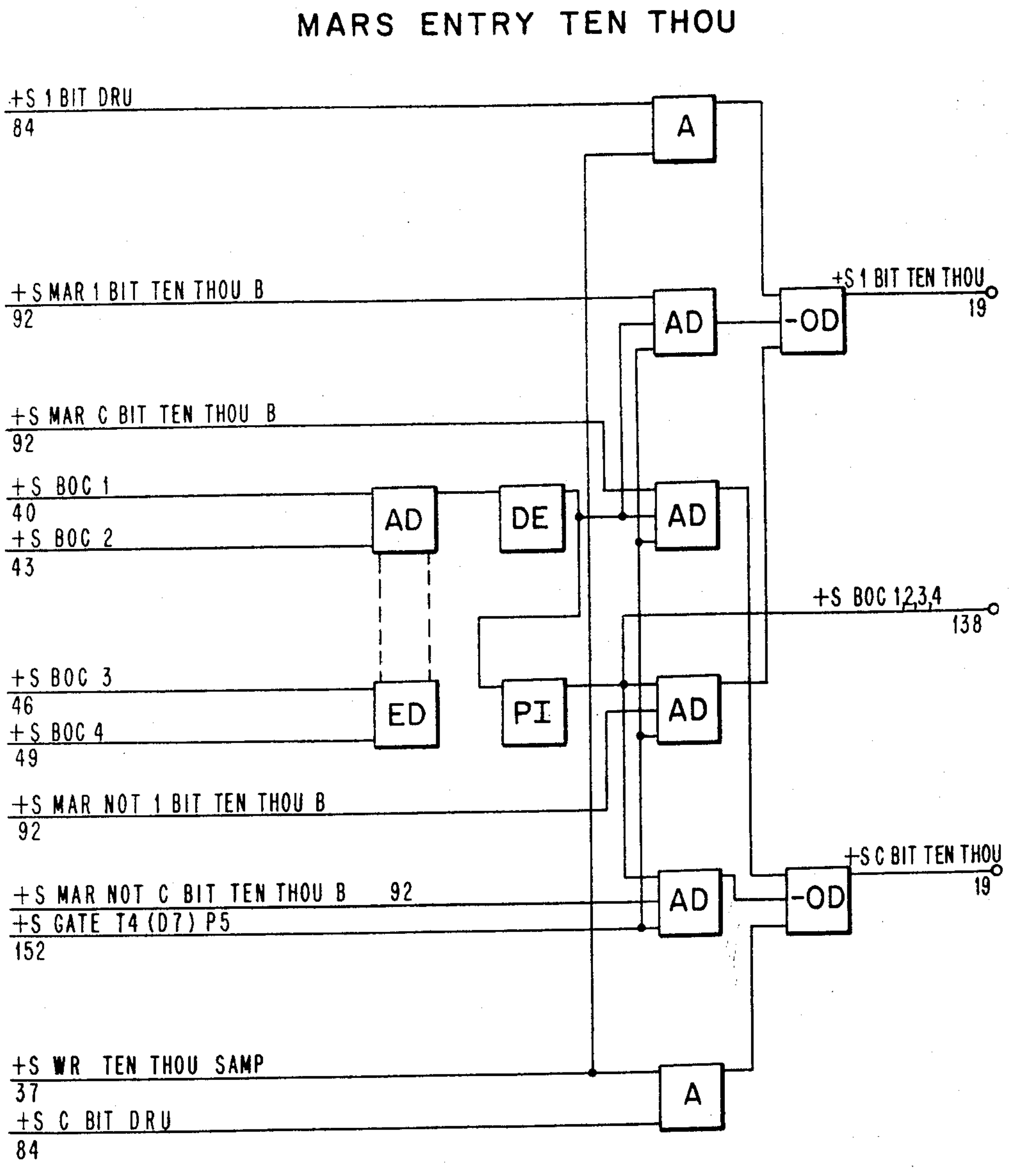

FIG. 40 illustrates the MARS ENTRY UNITS C BIT circuit of the increment switch. The odd parity C bit is present in the digit format of decimal values 0, 3, 5, 6 and 9. Accordingly, the C bit is produced during increment 1 cycles where the previous decimal value was 9, 2, 4, 5 or 8. Accordingly, -OD-block 477 produces the +S C BIT UNITS functional signal at terminal 478 whenever the conditions are appropriate.

The remaining positions in MARS are affected by incrementing of the 1 bit of the units position only in the instances where the increment or decrement operation causes a carry or borrow. In such a situation, +S signals SW TENS and BOC 1 (borrow-carry) are available at terminals 479 and 480. The +S signal BYPASS TENS at terminal 481 is complementary to the BOC signal; all higher order digit values are thus either subjected to borrow-carry operation or bypassed. Borrow-carry signals are generated in ripple carry situations by similar networks in FIGS. 41, 46, 49 and 50.

Figure 51:
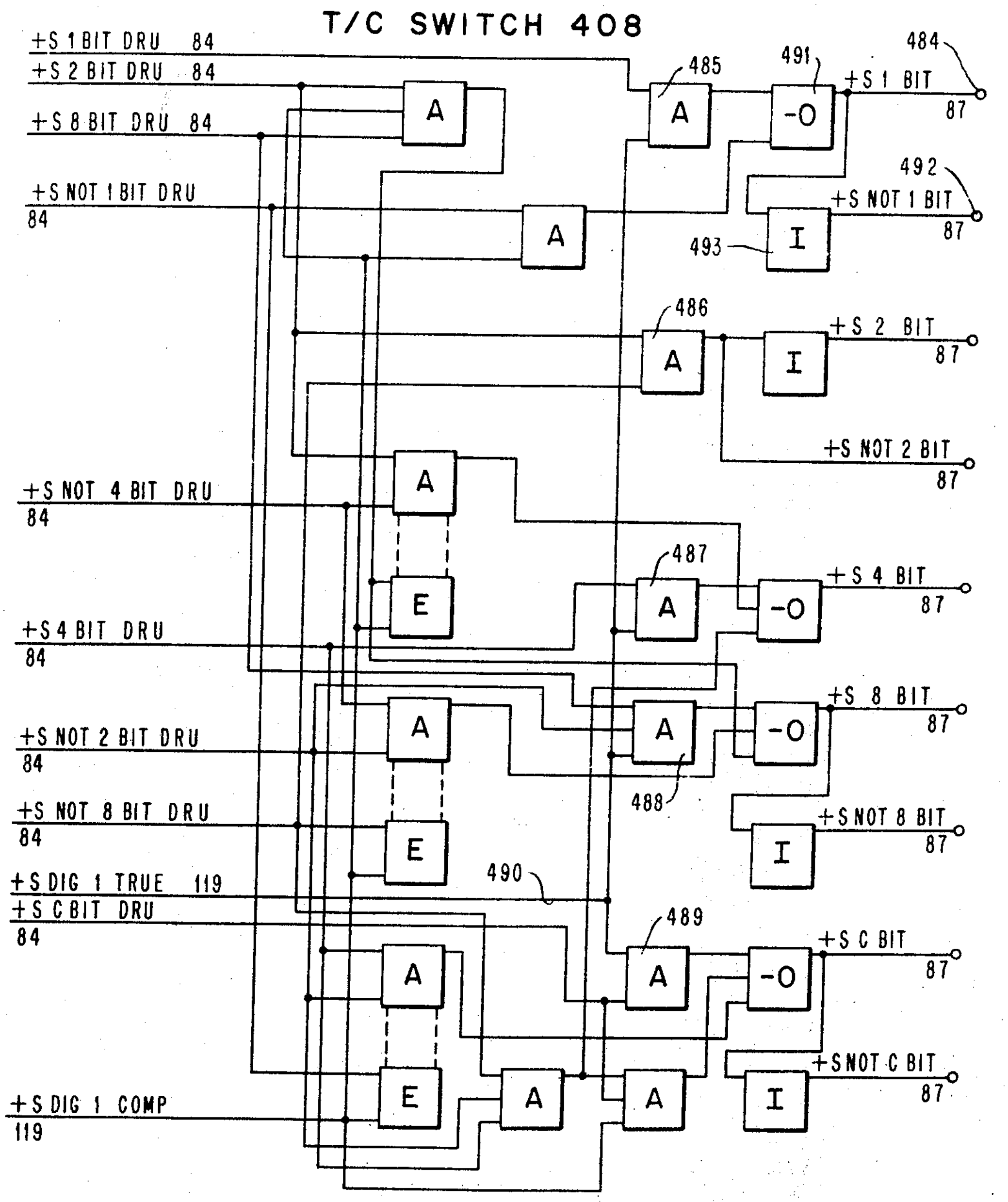

FIG. 51 illustrates true complement switch 408 in FIG. 1, which is in the digit path from DRU to MAR units position. The binary coded decimal digit bit structure provides, in the nines complement, for conversion of an odd number to an even number or an even number to an odd number. The one bit therefore always is changed in complementing; the 2 bit never changes, but the possibility of a record mark (8–2 bits) is discounted by signal +S NOT 8 BIT DRU.

The true output of +S functional signals 1 bit, not 1 bit, 2 bit . . . not 8 bit, C bit and not C bit are available at appropriate terminals such as terminal 484, when gated by A-blocks 485, 487, 488 and 489 upon coincidence of +S functional signals DIGIT 1 TRUE on line 490 and the appropriate bit signal from DRU via -O-block such as 491. The +S not bit signals are available at terminals such as 492 via I-blocks such as 493.

Figure 52:
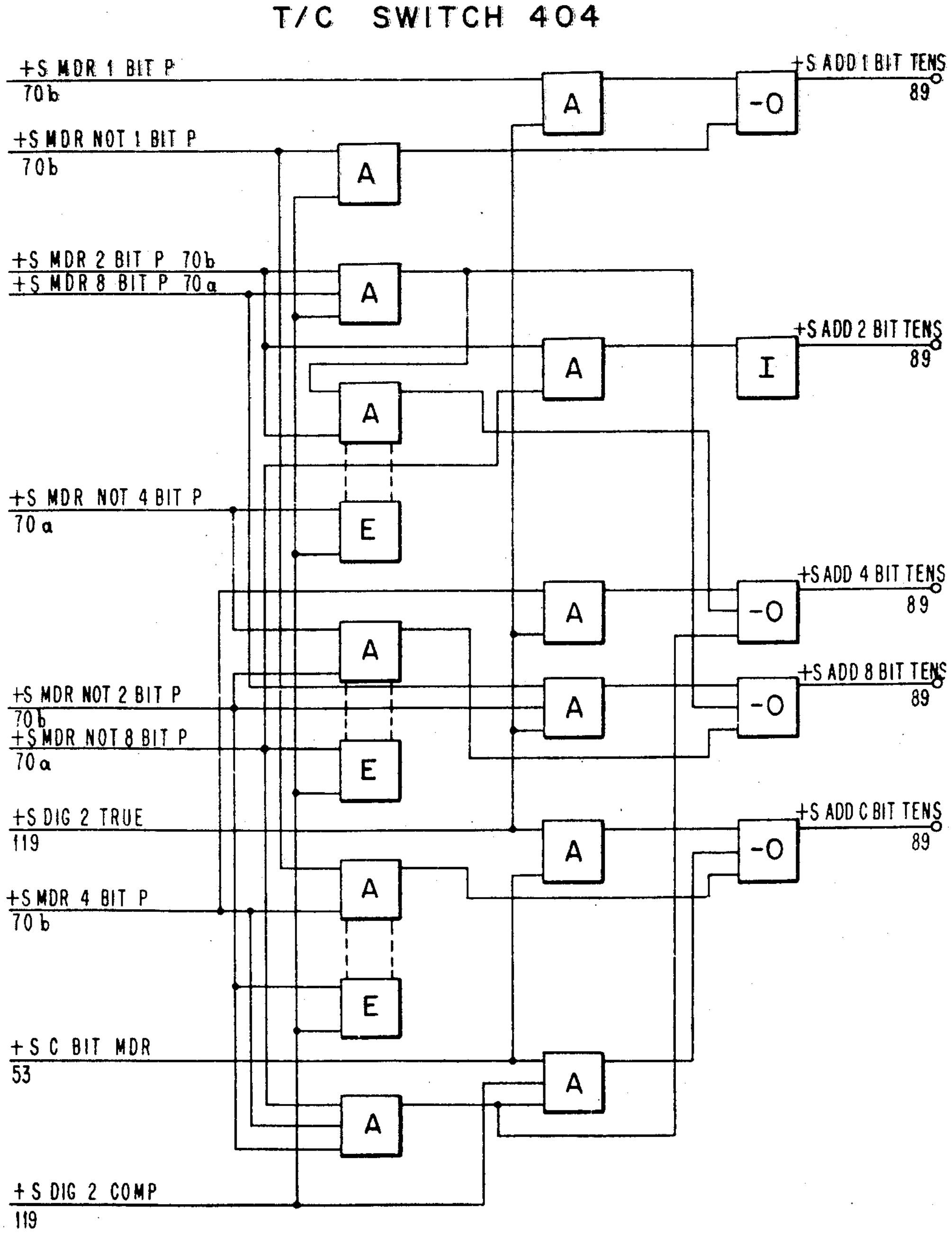

FIG. 52 illustrates true complement switch 404, which is similar in function and logic to true complement switch 408. Output requirements are less stringent; the not bit functional signals are not produced.

Figure 53:
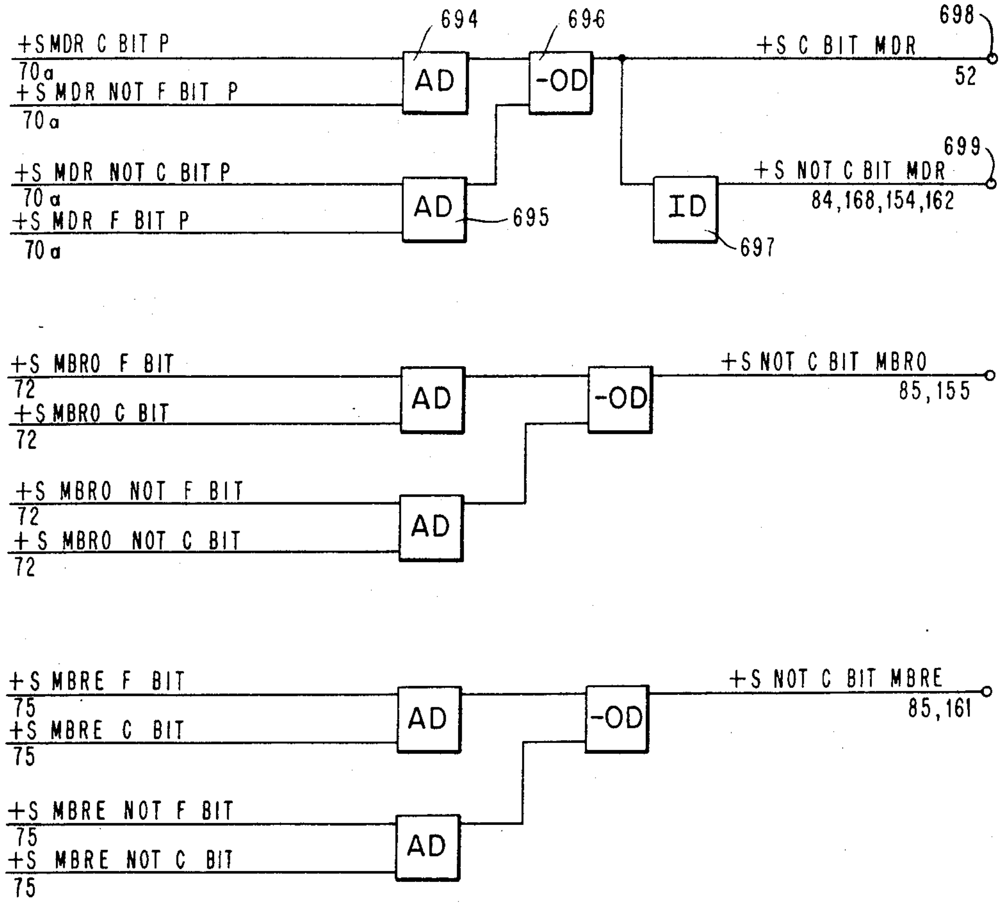

FIG. 53 illustrates the C bit correctors for MDR, MBRO and MBRE output paths. The C bit is carried along for odd parity throughout machine operations; the flag, however, is omitted in many machine operations, requiring a change in C bit whenever a flag is abolished. Accordingly, blocks 694–696 in Exclusive OR configuration provide for a +S C BIT MDR functional signal at terminal 698 in response to presence of C NOT F or F NOT C to retain odd parity despite loss of the flag. ID block 697 provides a +S NOT C BIT MDR functional signal at terminal 699. MBRO and MBRE C bit correctors are similar.

Figure 54:
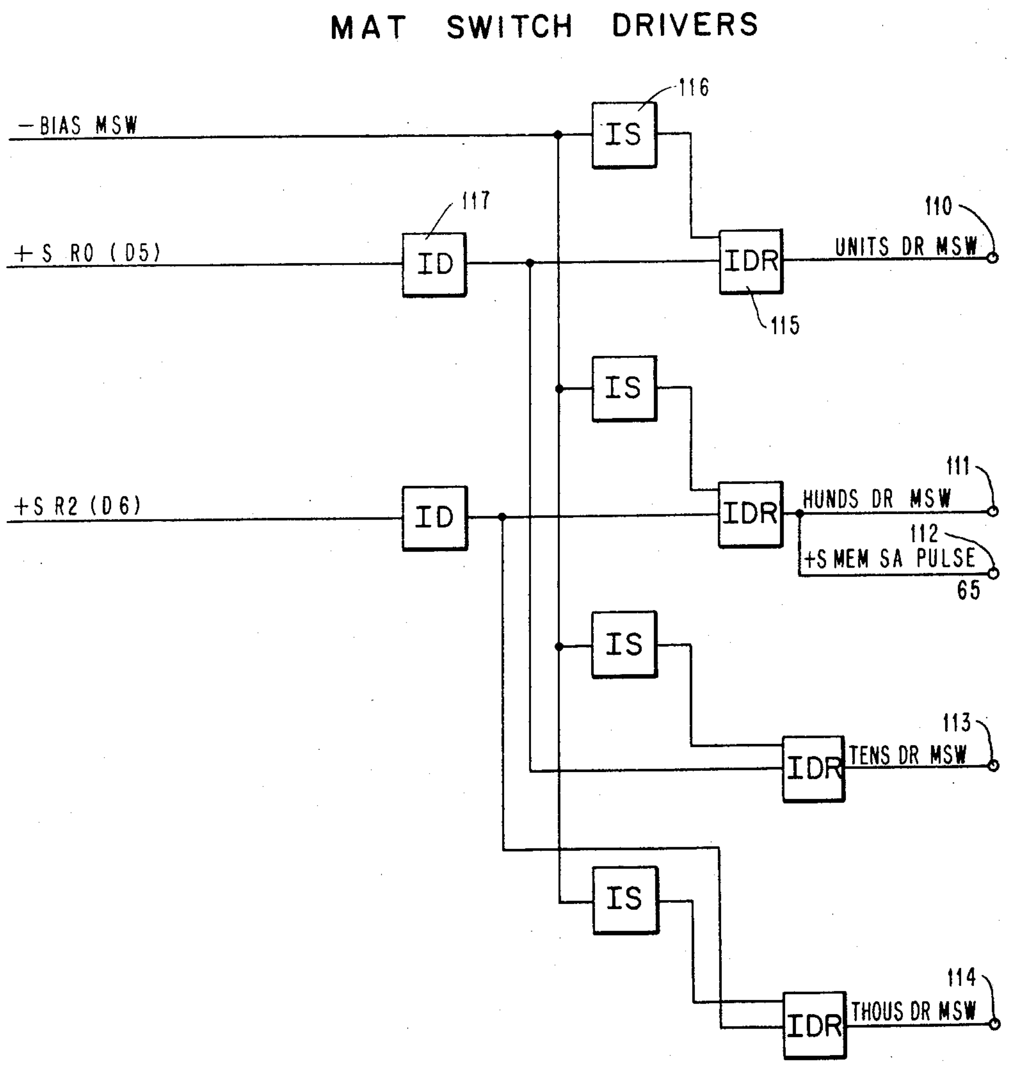

FIG. 54 illustrates the matrix switch drivers. Drive signals are available at terminals 110–114 as follows: Units and tens, at RO(D5) time—hundreds and thousands, at R2(D6) time. IDR blocks such as 115 provide the drive signals in response to inputs from IS-blocks such as 116 and timings via ID blocks such as 117.

Figure 55:
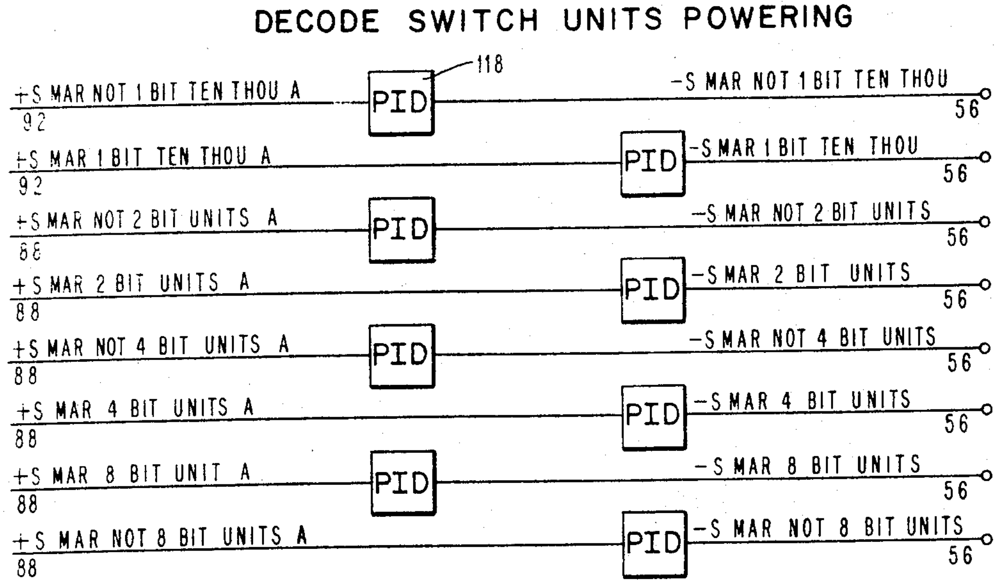

FIG. 55 illustrates the decode switch units powering PID-blocks including 118.

Figure 56:
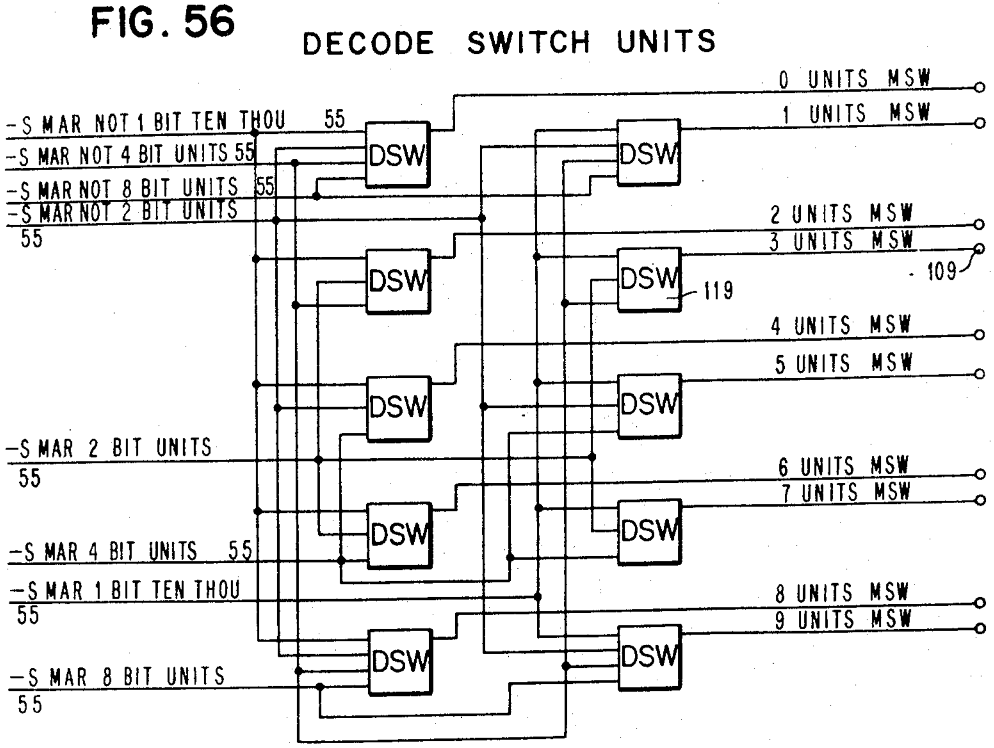
Figure 57:
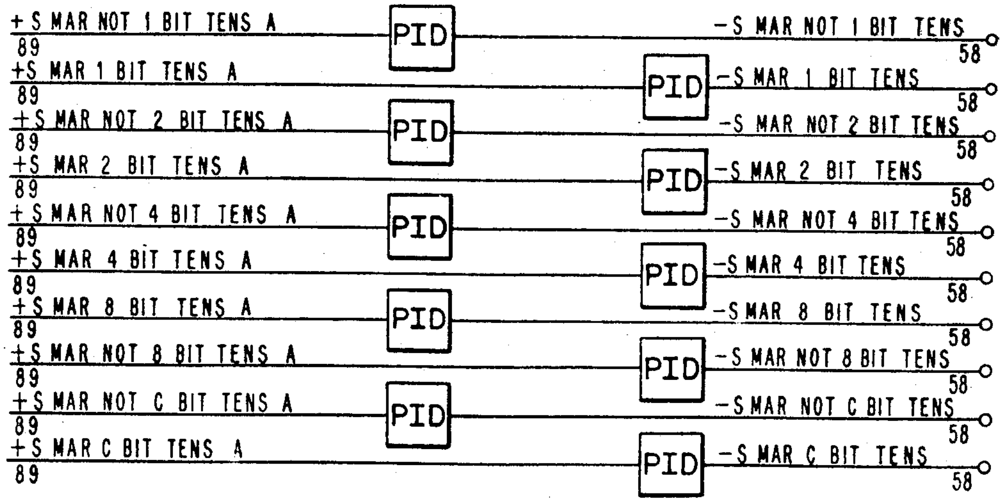
Figure 58:
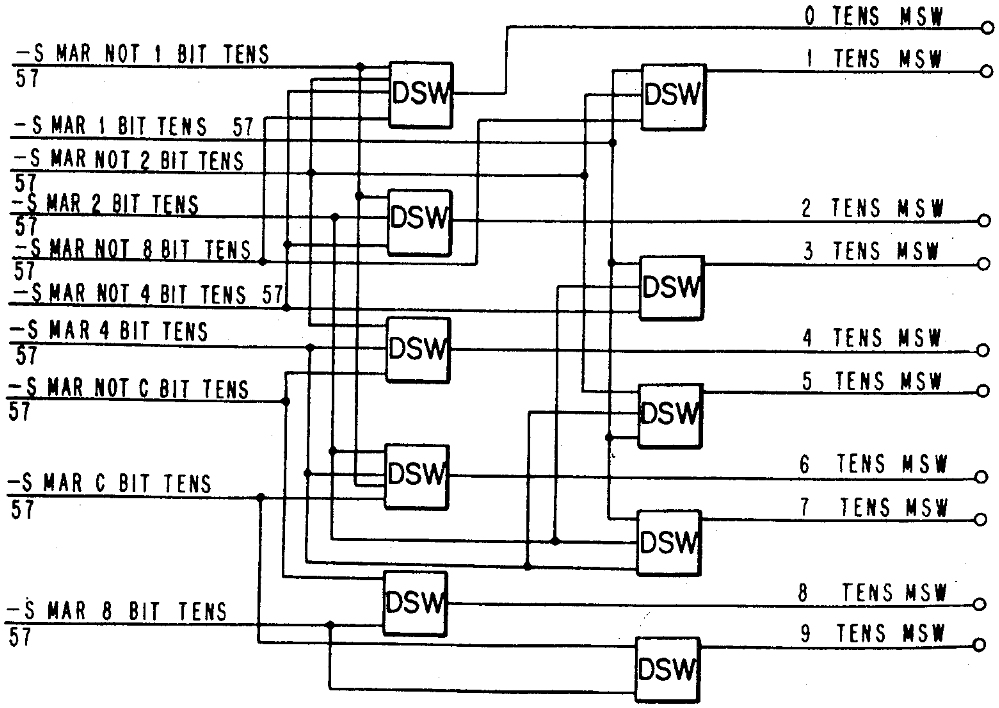
Figure 59:
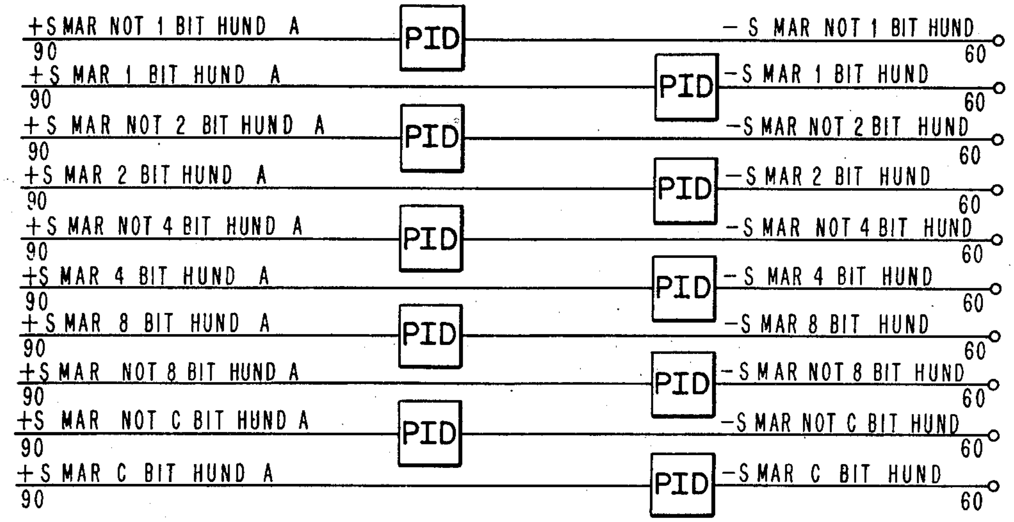
Figure 60:
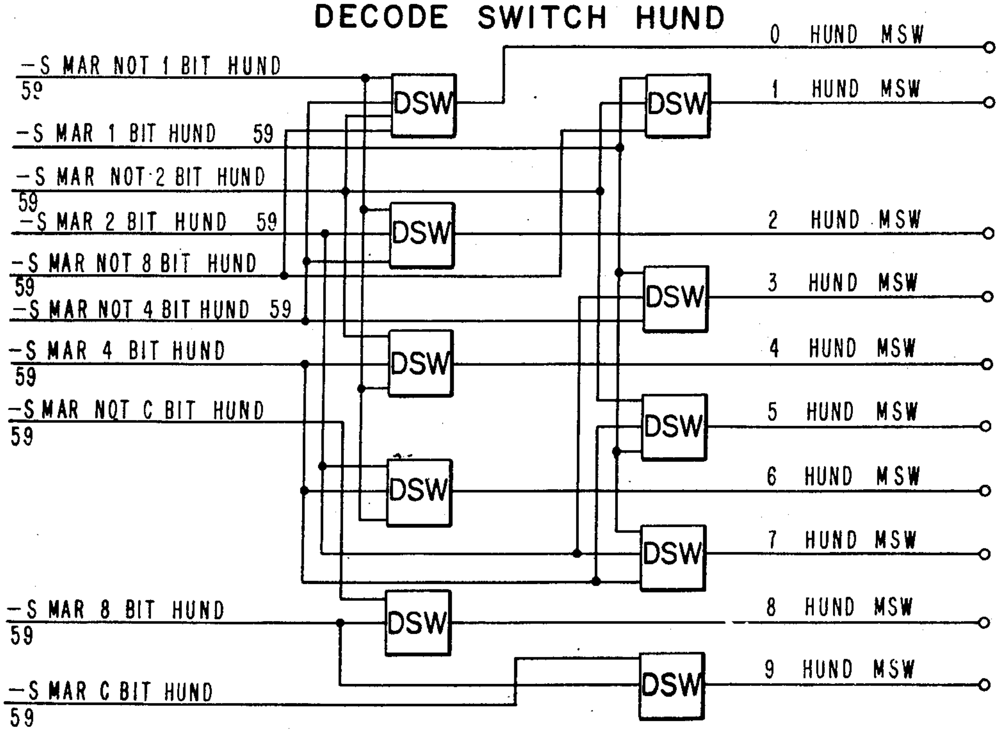
Figure 61:
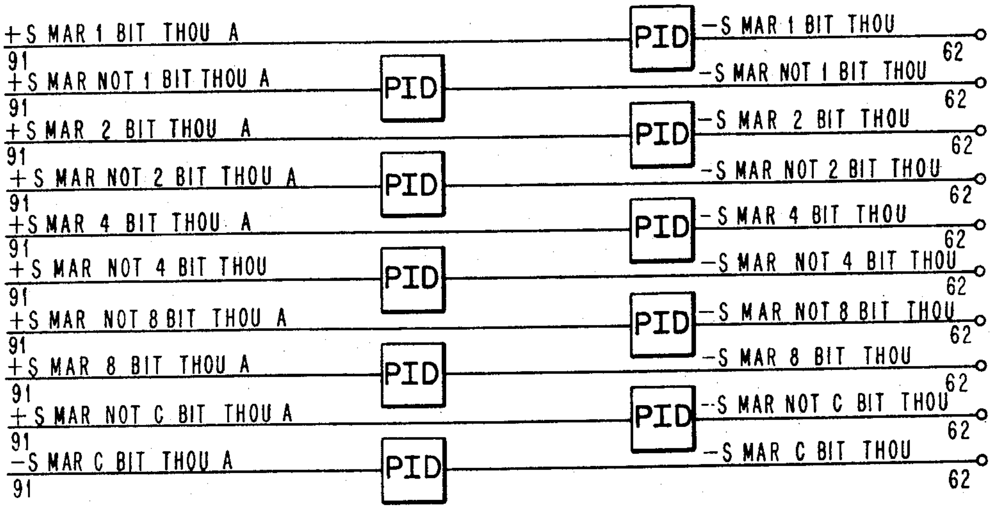
Figure 62:
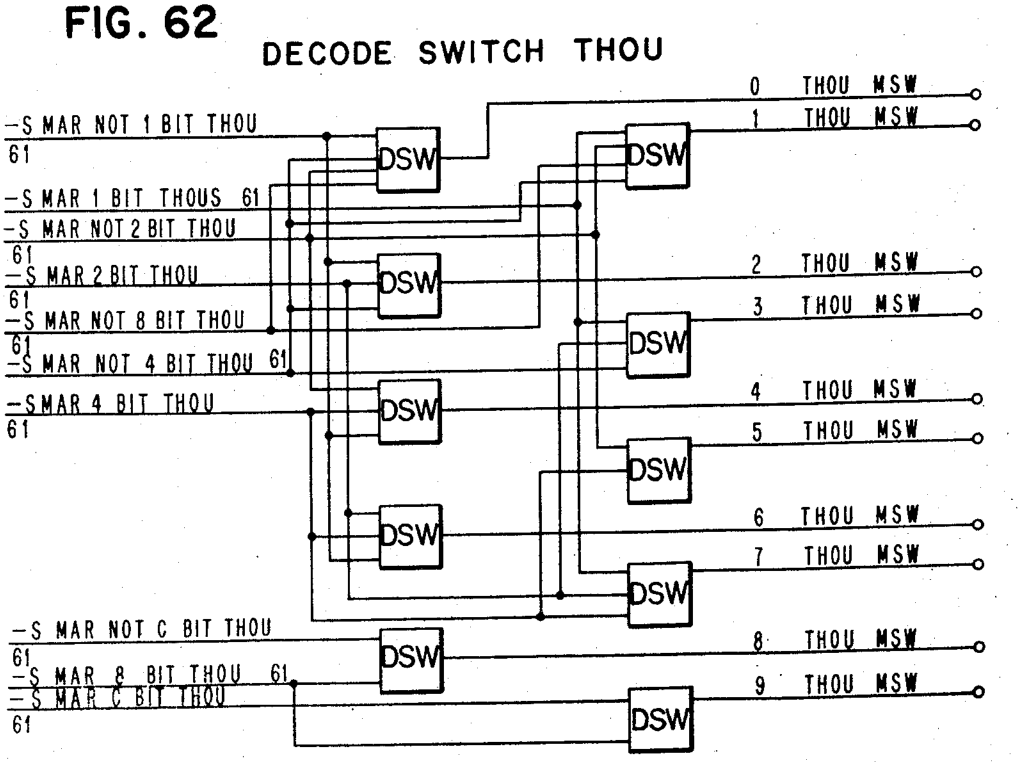

FIG. 56 illustrates the decoder units switch. Together the circuits of FIGS. 55 and 56 provide a BCD to 1-out-of 10 code conversion for proper addressing of the memory for readout. DSW block 119, for example, provides the 3 UNITS MSW signal at terminal 109 to read out memory locations which have a three as their units address value, whenever −S MAR 1 BIT TEN THOU, −S MAR 2 BIT UNITS and −S MAR NOT 4 BIT UNITS signals are coincidently available. The use of the units bit ten thousands position in decoding the units order of the memory address has previously been discussed in detail in connection with FIG. 4.

FIGS. 57–62 illustrate the decode switch tens, hundreds, and thousands and their respective powering circuits, which are similar to FIGS. 55–56.

Figure 63:
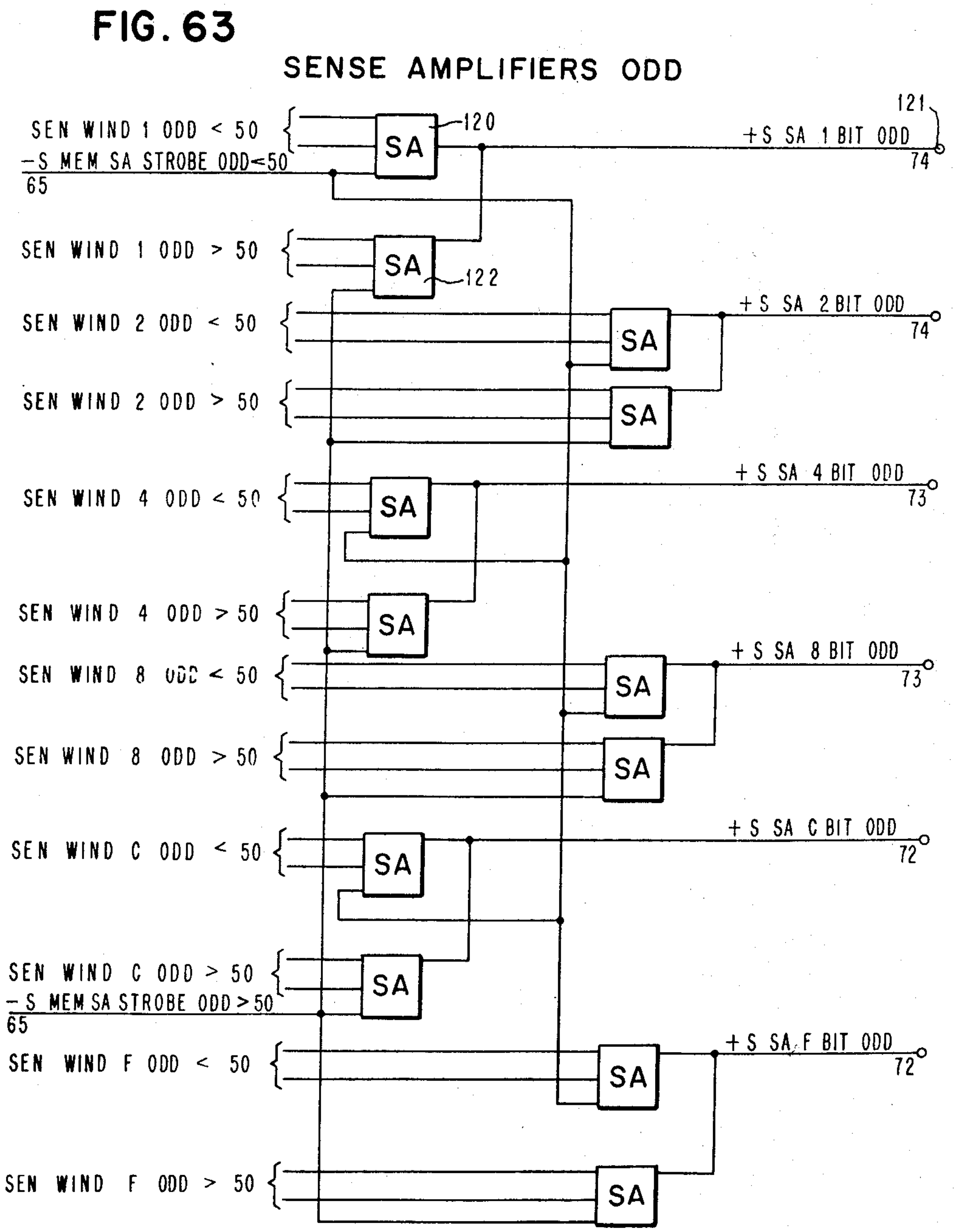

FIG. 63 illustrates the sense amplifiers odd, which are part of block 600 in FIG. 1*a* in the path between amplifiers block 601 and MBRO 603. The particular memory chosen in the prefererd embodiment is divided into less than 50 and more than 50 halves for readout purposes. Accordingly, SEN WIND 1 ODD<50 operates SA-block 120 upon timing from the −S MEM SA STROBE ODD<50 pulse to provide a +S functional signal SA 1 BIT ODD at terminal 121. Similarly, SA-block 122 provides the +S SA 1 BIT ODD signal at terminal 121 upon coincidence of a signal on SEN WIND 1 ODD>50 and +S MEM SA STROBE ODD >50. Other bit signal amplifications are available at their respective terminals for the 2 BIT ODD, 4 BIT ODD, 8 BIT ODD, C BIT ODD, and F BIT ODD.

Figure 64:
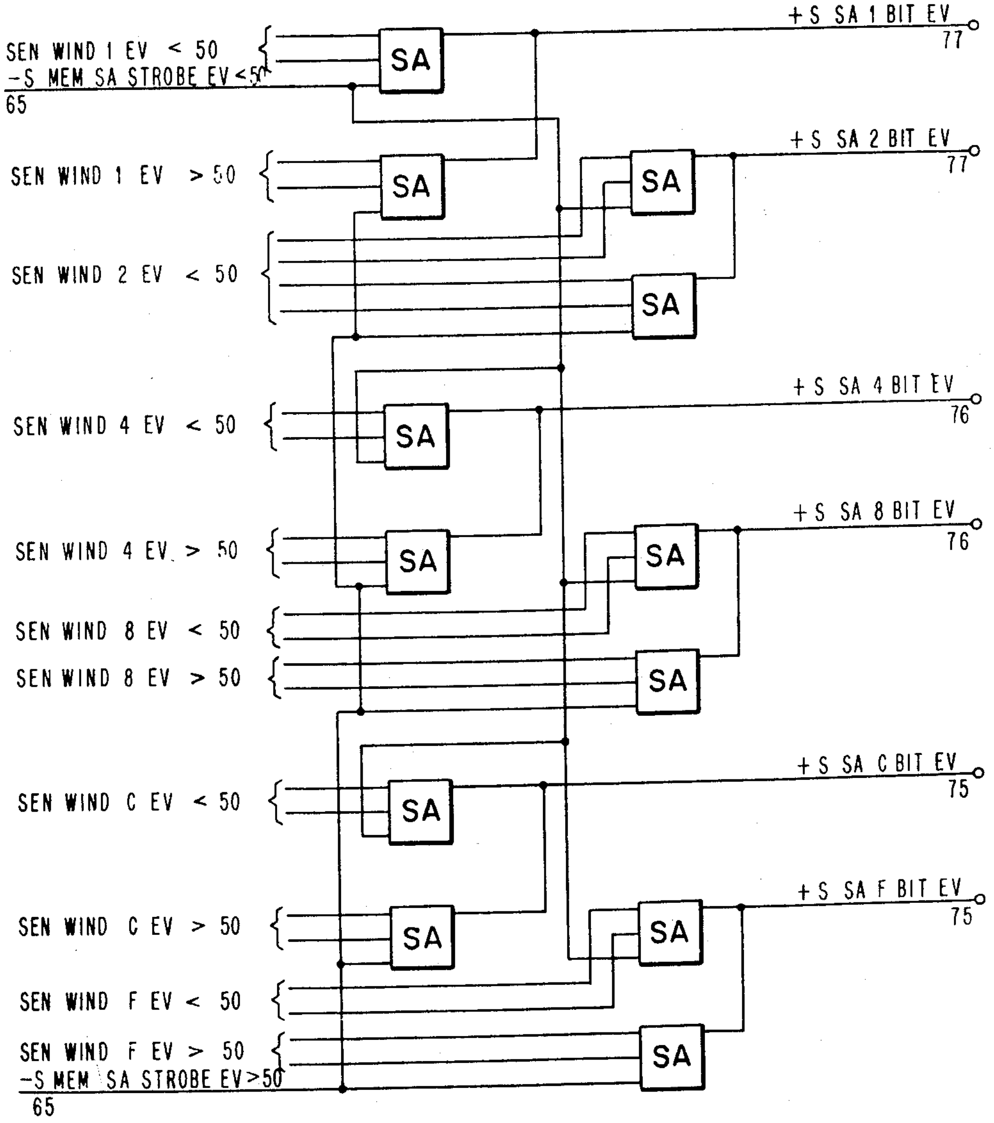

FIG. 64 illustrates sense amplifiers even, which are similar in function and scope to the sense amplifiers odd of FIG. 63.

Figure 65:
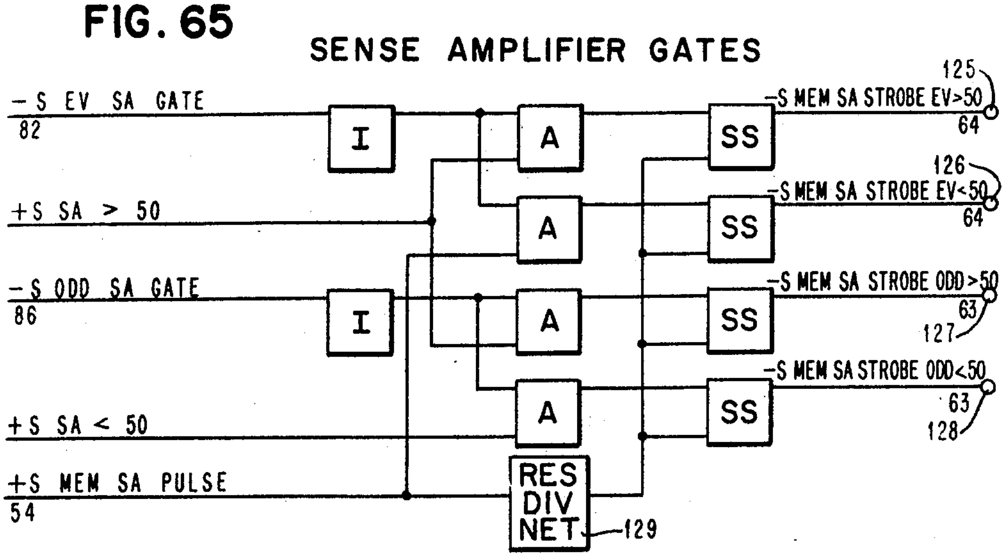

FIG. 65 illustrates sense amplifier gates which produce the four strobe pulses necessary to operate the sense amplifiers odd <50, odd >50, even <50 and even>50 at terminals 128–125 respectively. Resistance divider network 129 provides proper gating levels to the single shot strobe output blocks.

Figure 66:
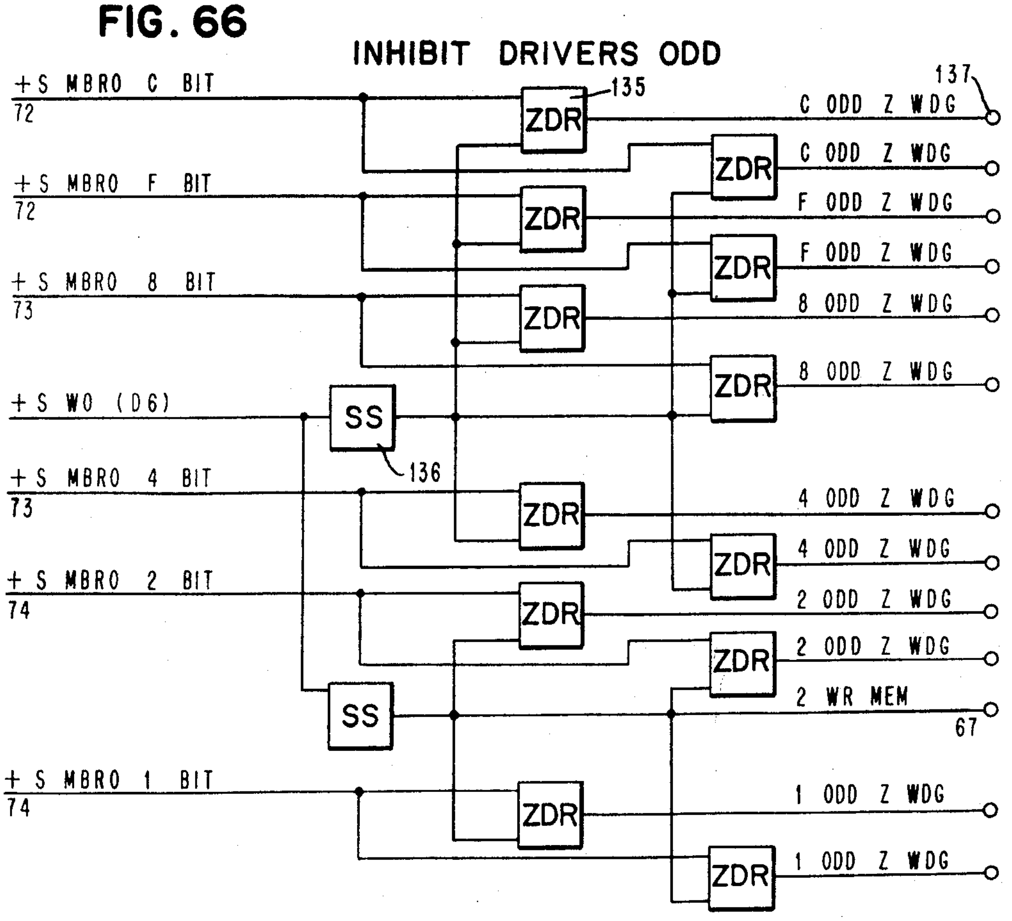

FIG. 66 illustrates the inhibit drivers odd. All writing into memory of both data and instructions is from the memory buffer registers even and odd. Accordingly, at write time W0(D6) ZDR blocks such as 135 which is effective upon coincidence of the output of SS block 136 (−S at W0 time) and the not function of its associated bit line MBRO C bit from FIG. 72 to provide at terminal 137 the appropriate inhibit signal C OD Z WDG. Other inhibit drivers are similarly effective when their associated bits are not to be written into memory.

Figure 67:
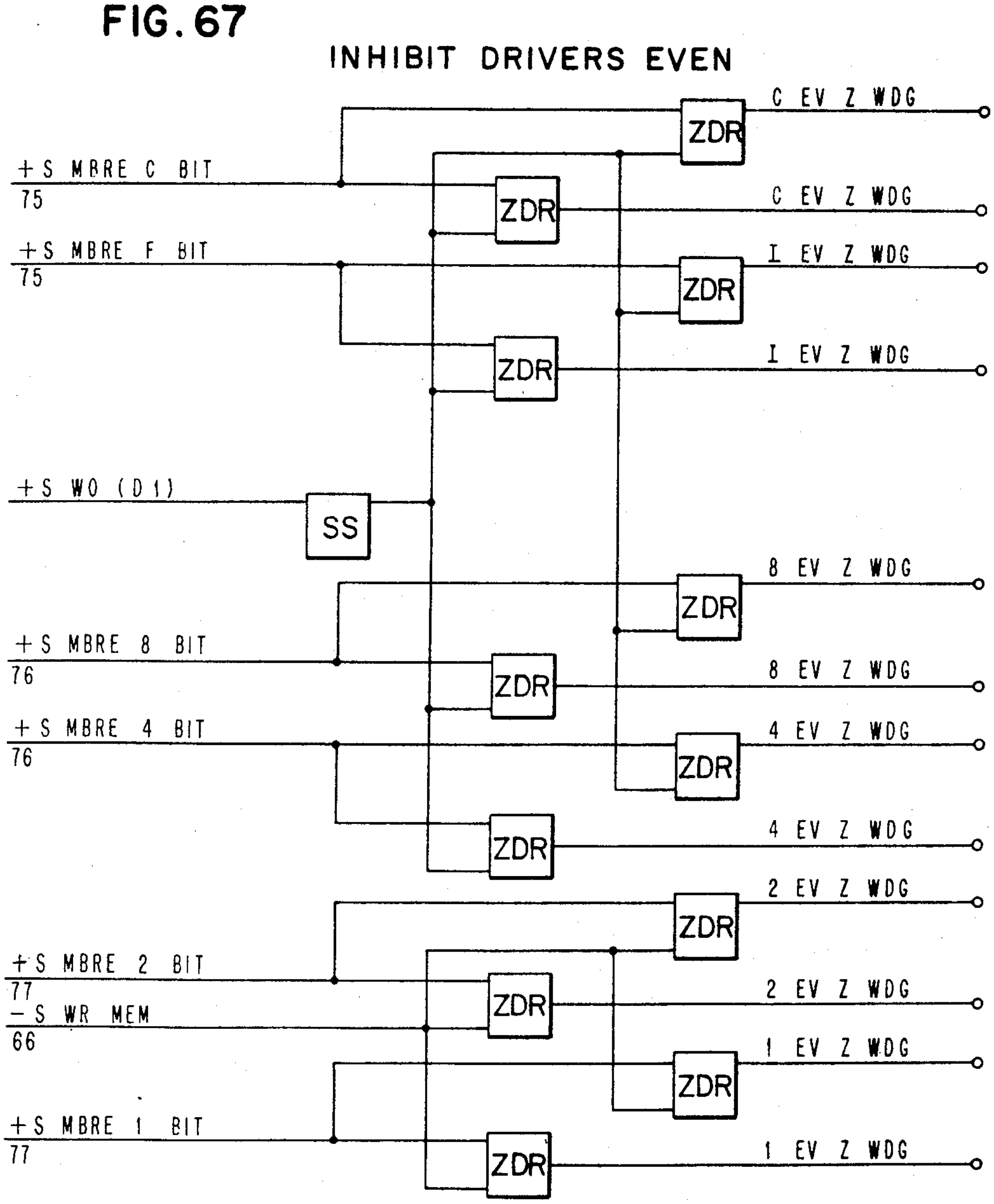

FIG. 67 illustrates inhibit drivers even, which are similar in purpose and structure to the inhibit drivers odd of FIG. 66.

Figure 68:
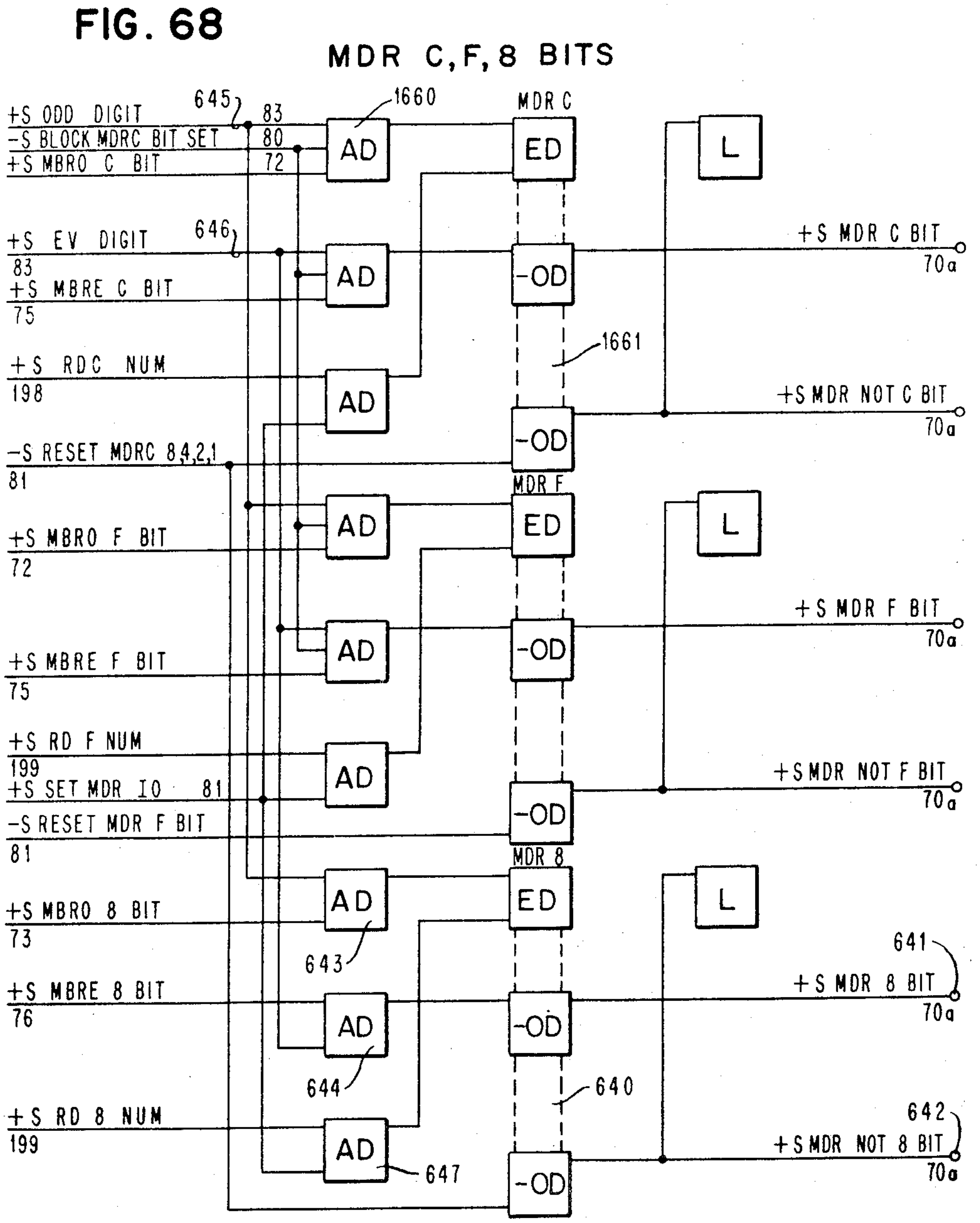
Figure 69:
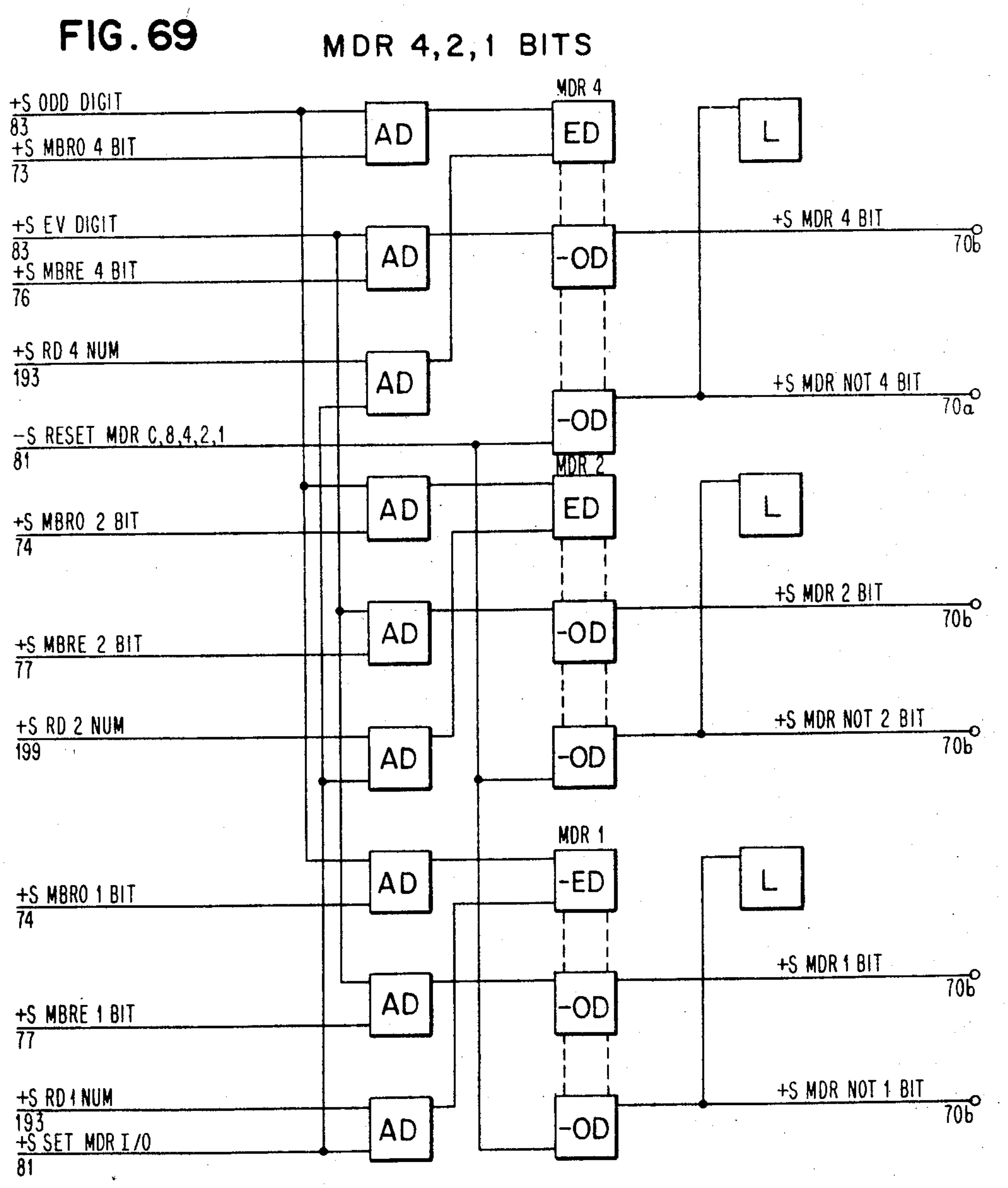

FIGS. 68 and 69 illustrate the memory data register and associated AND circuits 606, 607 and 608 of FIG. 1*a*. Bit triggers for each of the C, F, 8, 4, 2 and 1 bits provide function outputs and "not function" outputs. For example, 8 bit trigger 640 provides a +S MDR 8 BIT signal at terminal 641 when the 8 bit is present in MDR and terminal 642 provides the +S MDR NOT 8 BIT signal when MDR 8 BIT trigger 640 is unset. AD-blocks such as 643 form the AND circuit 607 (FIG. 1*a*) and AD-blocks such as 644 provide the AND circuit 606 of FIG. 1*a*. Trigger 640 may be set from the 8 bit in MBRO if line 645 is functional with the +S ODD DIGIT or trigger 640 may be set with an 8 bit from MBRE when line 646 is functional with a +S EV DIGIT signal. AD-block 647 provides input to MDR from I/O devices such as paper tape or the typewriter.

Figure 70A:
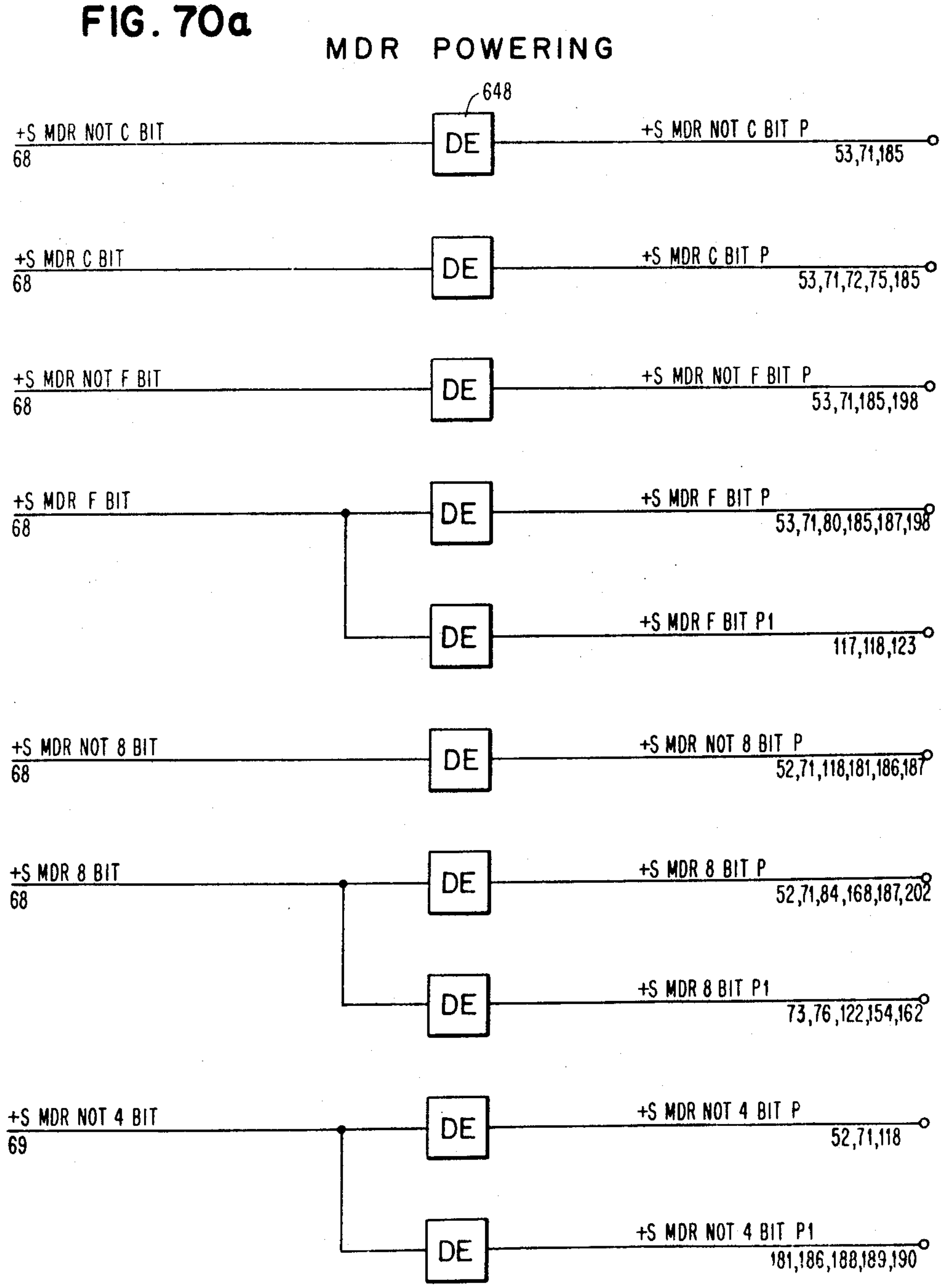
Figure 70B:
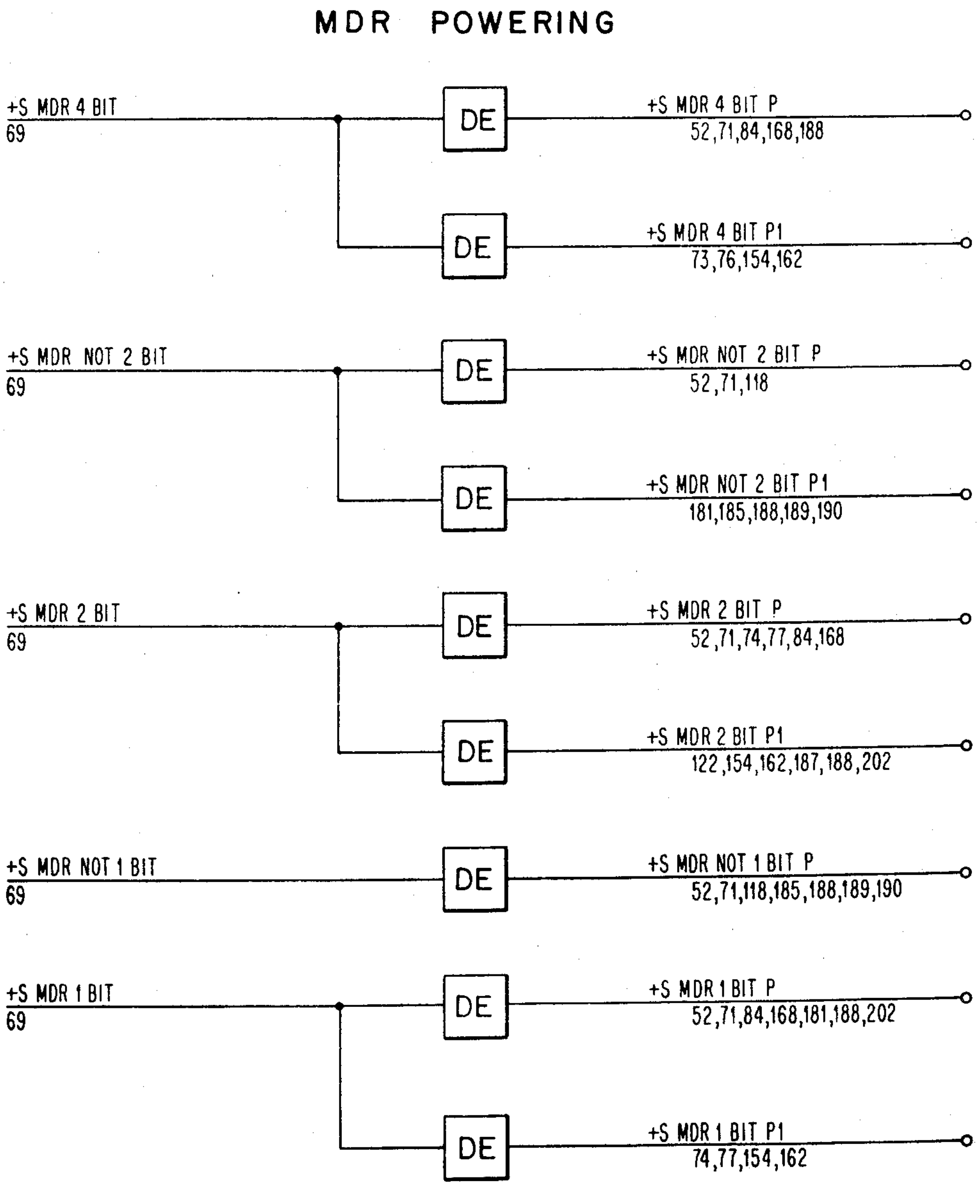

FIGS. 70*a* and 70*b* provide powering for the various outputs of MDR. DE-block 648 is typical.

Figure 71:
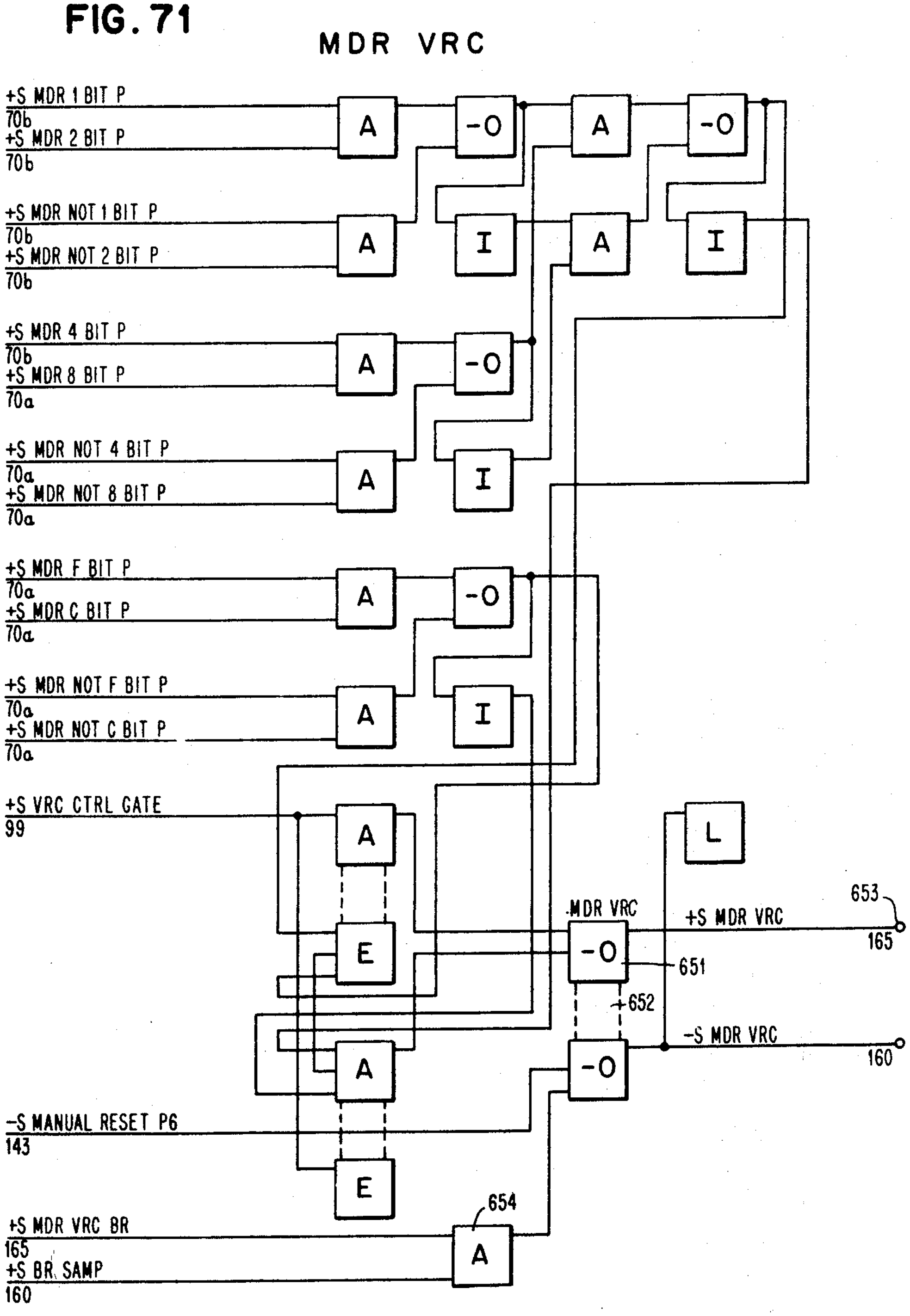

FIG. 71 illustrates the MDR vertical redundancy check. Three networks of A and -O-blocks in EXCLUSIVE OR configuration, each providing the EXCLUSIVE OR function of a pair of bits from MDR, feed two EXCLUSIVE OR networks to provide the sum modulo two of the six possible bit values, according to the formula MDR $VRC=[(1 \veebar 2)\veebar(4 \veebar 8)]\veebar(F \veebar C)$. This conditions -O-block 651, which is the final block in the final EXCLUSIVE OR network, to produce the +S MDR VRC signal at terminal 653; -O-block 651 is also the set half of MDR VRC trigger 652, which is subsequently reset by a +S VRC BR signal to A-block 654 coincident to a +S B SAMP signal, or by a manual reset signal.

Figures 72, 73, 74:
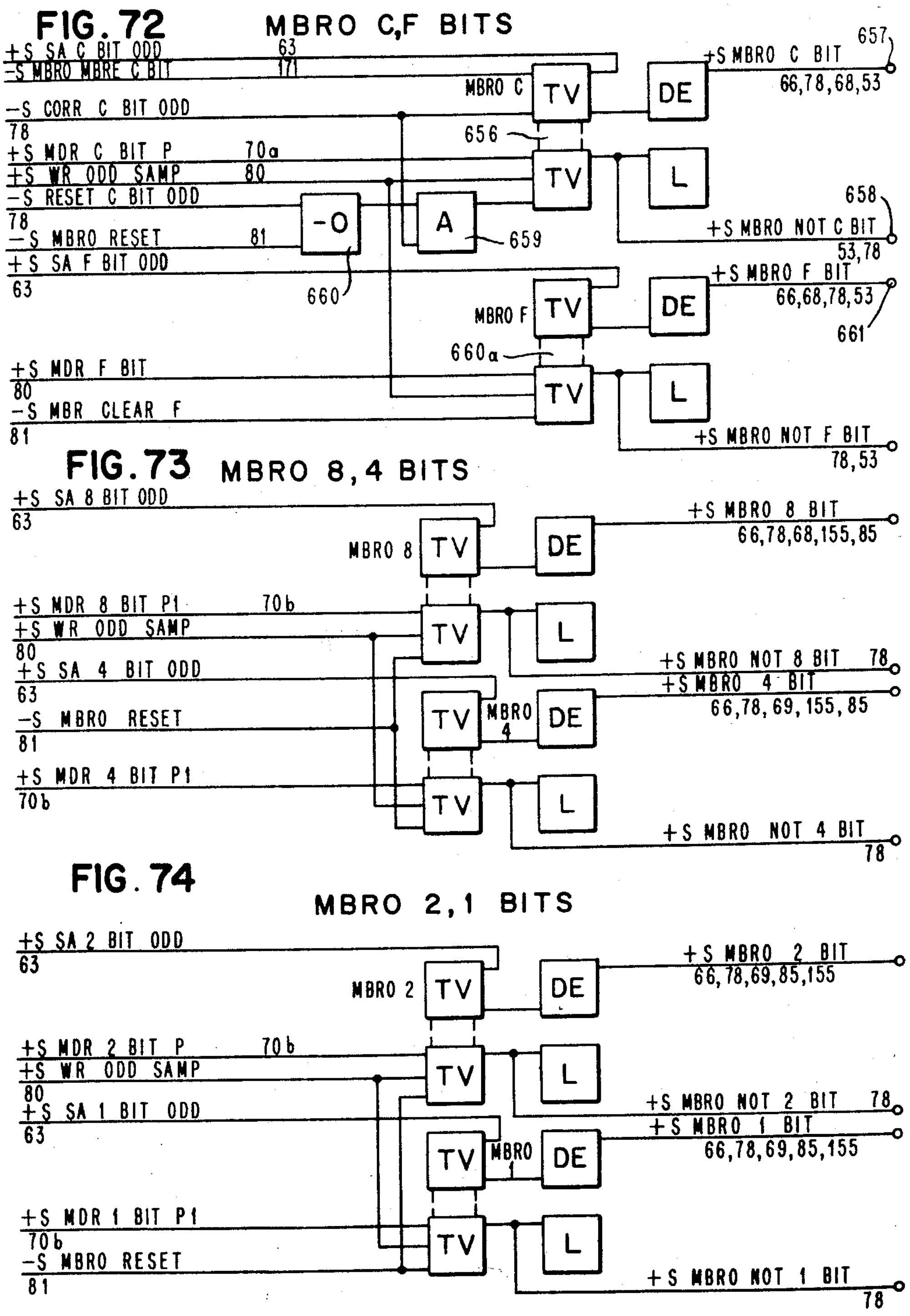

FIGS. 72–74 illustrate the memory buffer register odd, block 603 in FIG. 1*a*. In FIG. 72, voltage mode trigger 656 provides a +S MBRO C BIT output to terminal 657 or a +S MBRO NOT C BIT signal to terminal 658 according to the presence of a C bit in MBRO. Trigger 656 may be set by a +S SA C BIT ODD from FIG. 63 or by a —S CORR C BIT ODD from FIG. 78. It may be reset by a +S MDR C BIT from FIG. 78, +S WR ODD SAMP from FIG. 80 or by the output of A-block 659 which is effective upon coincidence of the +S complement of the CORR C BIT OD —S signal and a —S RESET C BIT ODD or —S MBRO RESET input to -O-block 660.

MBRO F trigger **660*a* is effective when set by a +S SA F BIT ODD signal to produce at terminal 661 a +S MBRO F BIT functional signal. Trigger 660*a*** may be reset by a —S MBR CLEAR F signal or by the +S WR ODD SAMP pulse from FIG. 80. The operation of the other bit triggers in MBRO is similar; they may be set from memory via the sense amplifiers or from MBR directly. They are reset prior to being set by the +S WR ODD SAMP; they provide continuous +S BIT functional signals, if set to 1, and continuous +S NOT BIT signals, if set to 0, at separate terminals. The NOT BIT signal may also be interpreted as the bit signal at —S levels.

Figures 75, 76, 77:
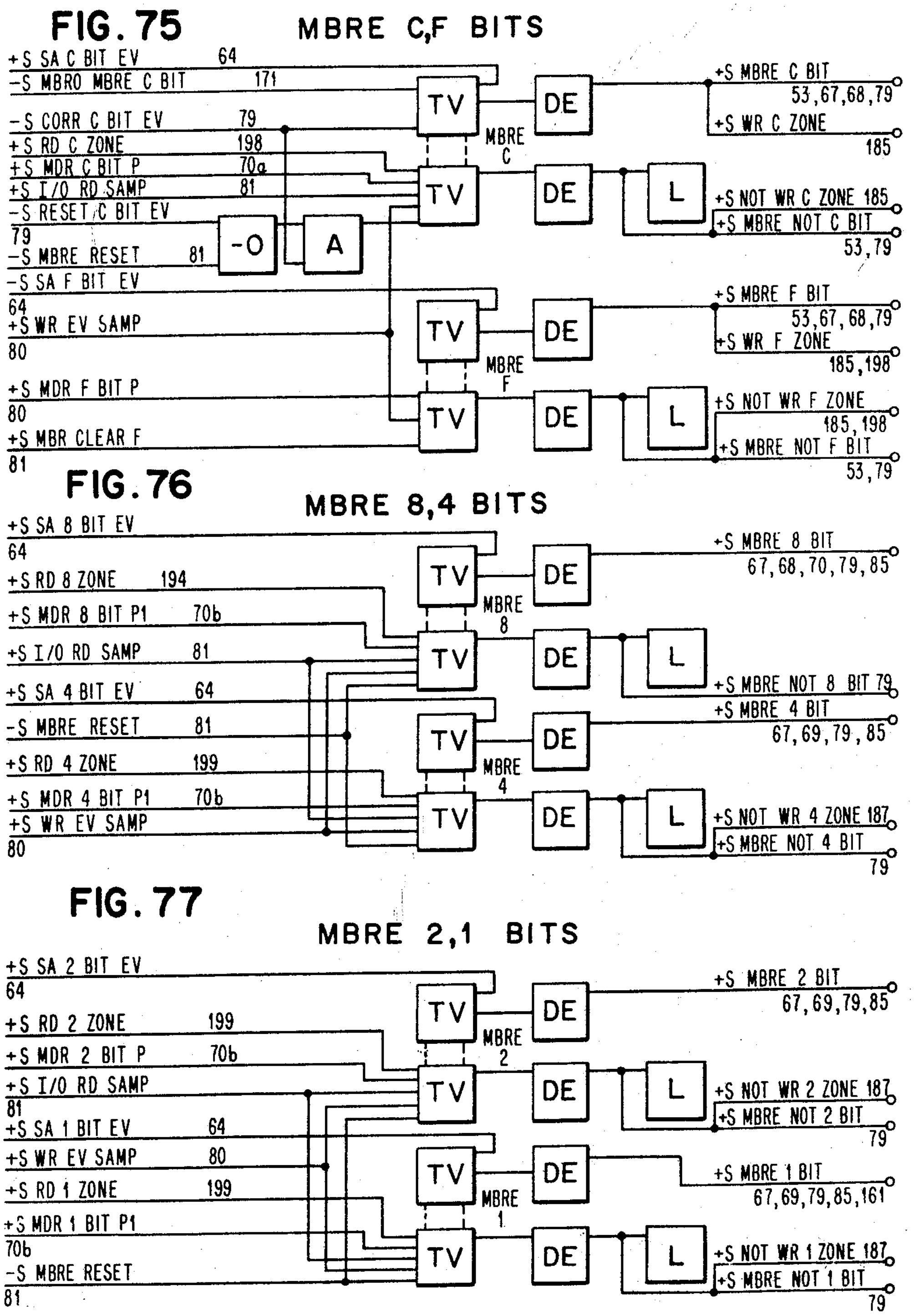

The memory buffer register even, shown in FIGS. 75, 76 and 77, is identical in scope and structure to the memory buffer register odd.

Figure 78:
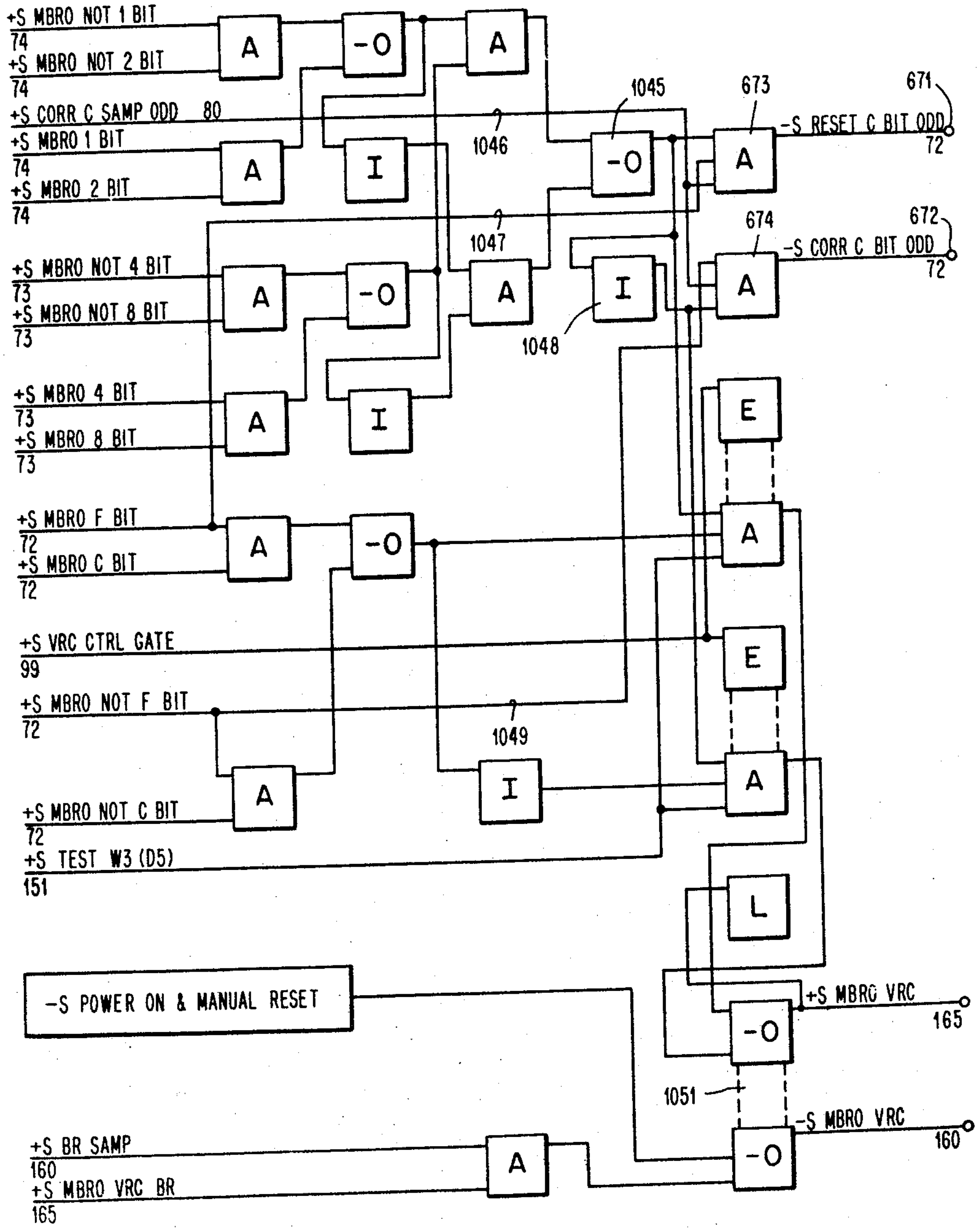

FIG. 78 illustrates MBRO VRC check block 1003 of FIG. 1*a*. Three EXCLUSIVE OR networks, each related to a pair of the six possible bits, provides functional output only when parity in the related bit pair is odd. The output of two of the bit EXCLUSIVE OR networks feeds a second level EXCLUSIVE OR network which provides functional output only when parity of the related four bits is odd. A third level EXCLUSIVE OR network provides functional output whenever the combined parity of the four bits (output of the second level EXCLUSIVE OR) and of the remaining two bits is odd, setting MBRO VRC trigger 1051. The VRC trigger may be reset manually or according to a branch condition.

Terminals 671 and 672 provide C bit control signals. The output of the second level EXCLUSIVE OR circuit, a +S signal from —O-block 1045 when $(1 \veebar 2)\veebar(4 \veebar 8)$ for odd parity of the four BCD bits, together with +S CORR C SAMP ODD on line 1046 and MBRO F BIT on line 1047 conditions A-block 673. A-block 673 produces the —S RESET C BIT ODD on terminal 671, where BCD bit parity was odd and the flag bit is abolished, to extinguish the C bit trigger. I-block 1048 produces the +S functional signal when BCD bit parity is even. A-block 674 is conditionable by the +S CORR C SAMP ODD functional signal on line 1046, +S MRBO NOT F BIT on line 1049, and the +S (even BCD parity) output of I-block 1048 to condition terminal 672 with the —S CORR C BIT ODD functional signal.

Figure 1B:
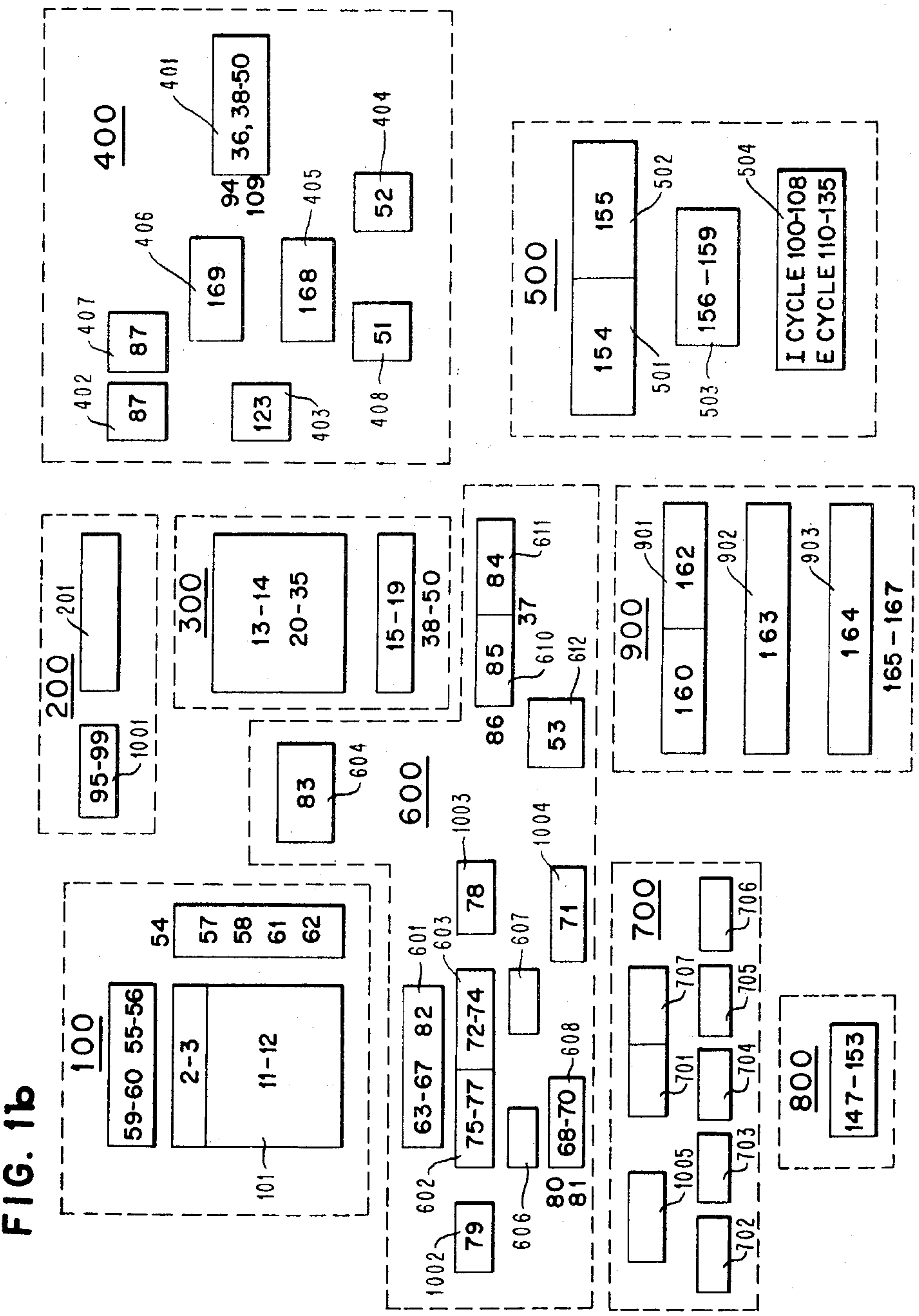
Figure 79:
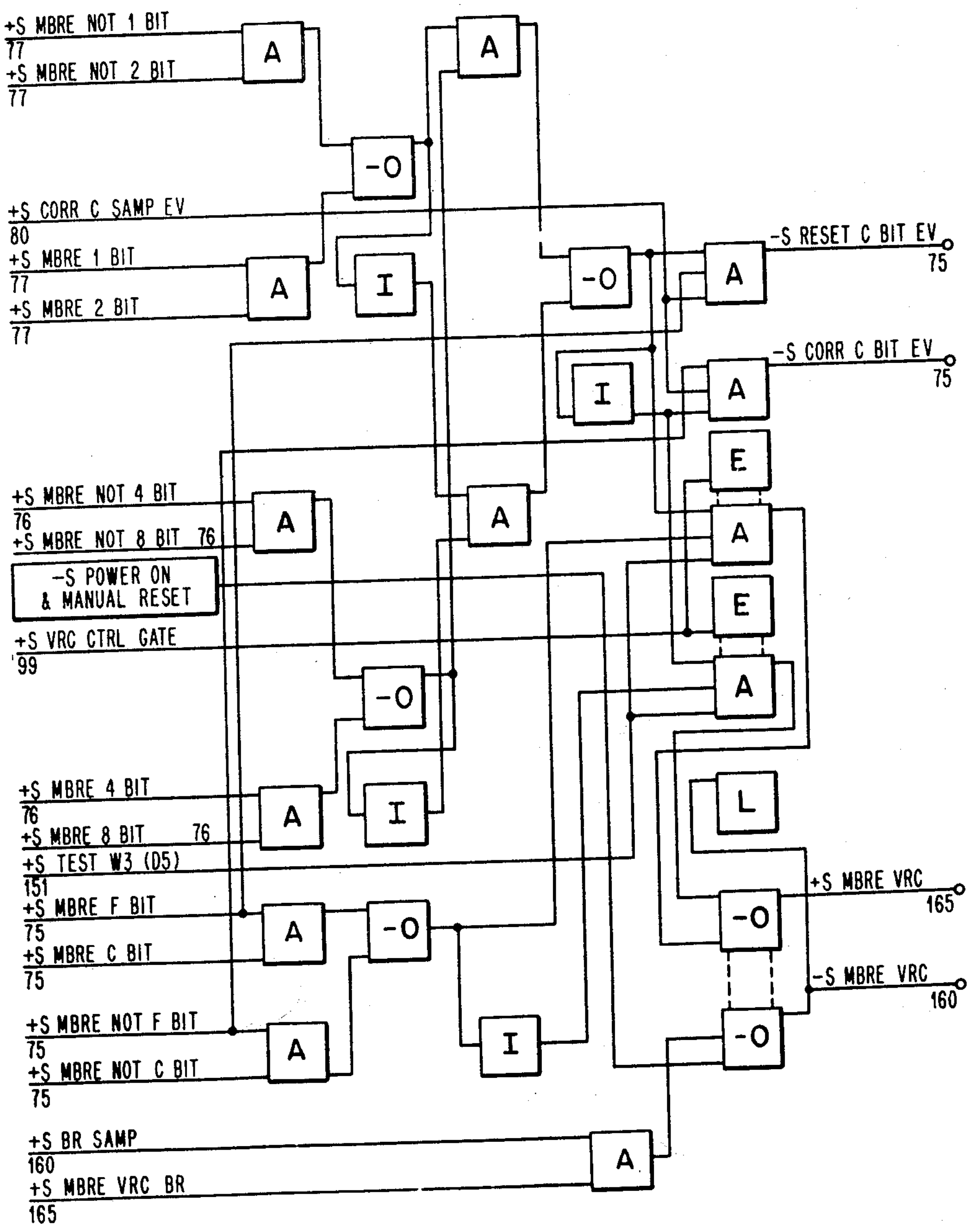

FIG. 79 illustrates MBRE VRC which corresponds to check block 1002 in FIG. 1*b*. It is similar in scope and function as well as structure to the MBRO VRC illustrated in FIG. 78.

Figure 80:
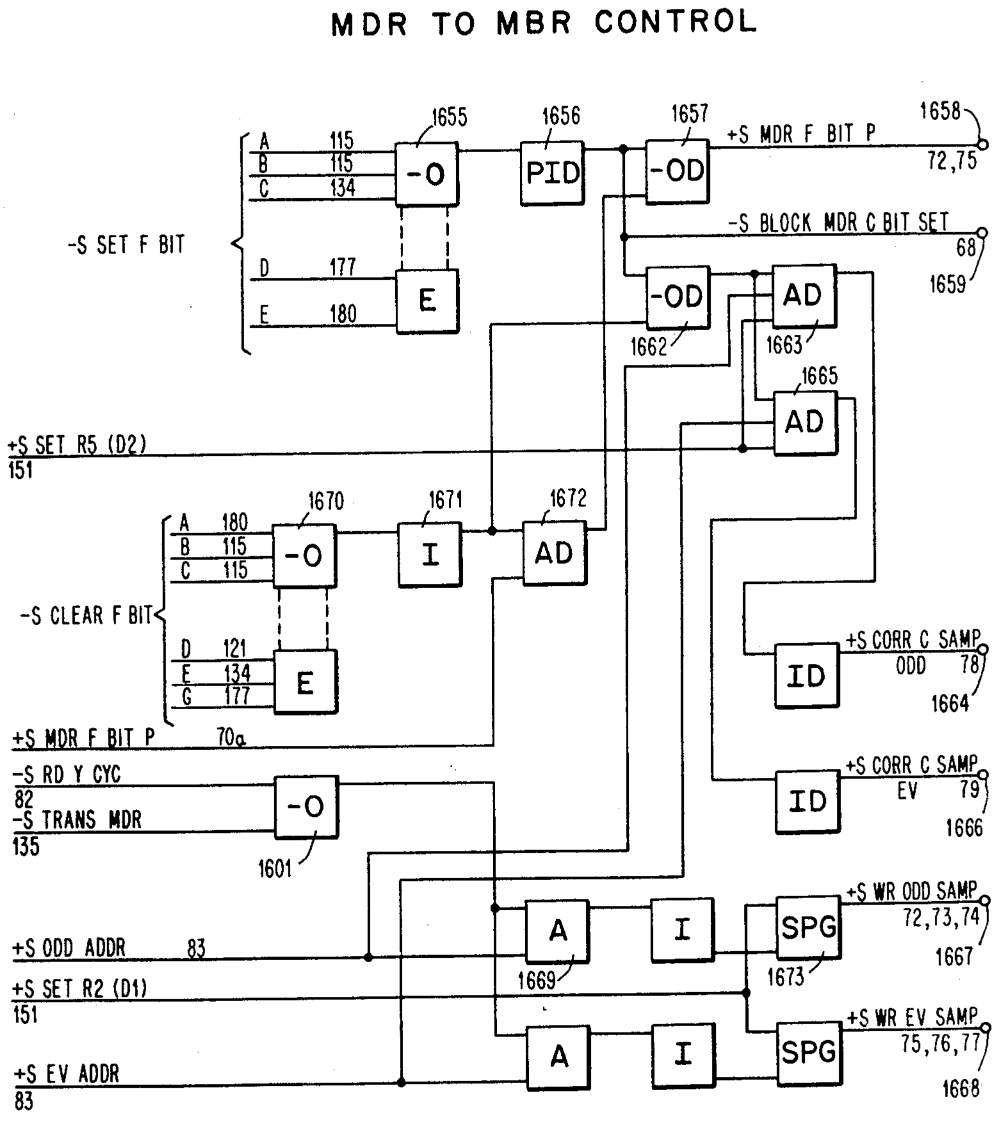
Figure 81:
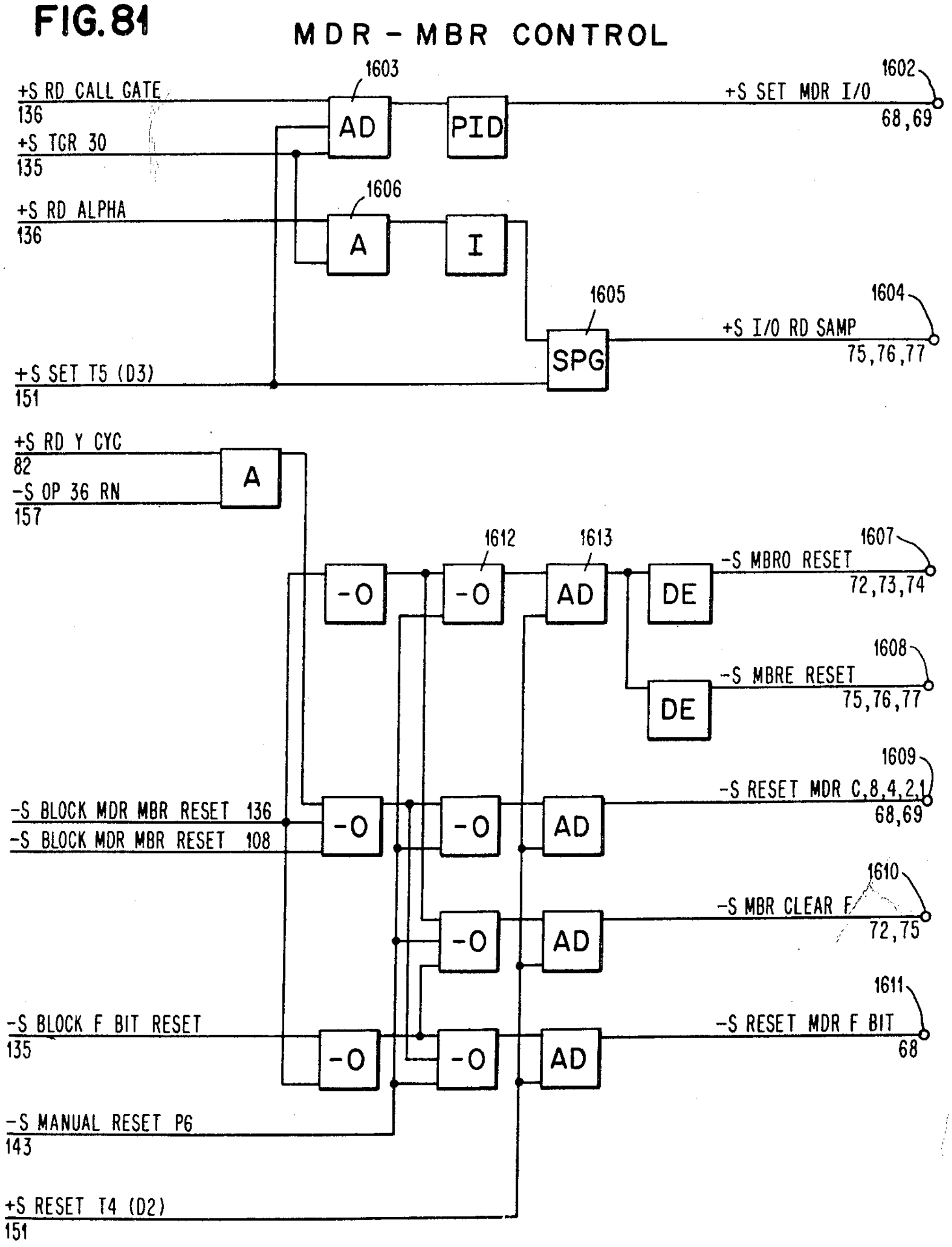

FIGS. 80 and 81 illustrate MDR to MBR control. In many data transfer operations between the memory data register and the two memory buffer registers, it is desirable to add or to clear a flag. To set the flag bit, any —S SET F BIT input to -O-block 1655 is inverted in PID-block 1656 and applied viad —OD-block 1657 to terminal 1658 as a +S MDR F BIT functional signal. PID-block 1656 directly provides a —S BLOCK MDR C BIT SET at terminal 1659 which passes to AD-block 1660 in FIG. 68 to prevent setting of the MDR C bit trigger 1661. The output of PID-block 1656 also conditions -OD-block 1662 which conditions odd address AD-block 1663 to provide a +S CORR C SAMP ODD functional signal at terminal 1664; the output of -OD-block 1662 also conditions even address AD-block 1665 to provide a +S CORR C SAMP EV functional signal at terminal 1666. The flag bit is cleared when a —S CLEAR F BIT functional signal is applied to -O-block 1670, inverted back to —S by I-block 1671 and applied to OD-block 1662. Normal output of I-block 1671, a +S functional signal available except during conditioning of -O-block 1670 by a —S CLEAR F BIT functional signal, maintains AD-block 1672 effective upon conditioning by a +S MDR F BIT functional signal to condition -OD-block 1657 and provide +S MDR F BIT signal at terminal 1658. In this manner, the MBR F BIT is regenerated.

The +S CORR C SAMP ODD functional signal at terminal 1664 passes to A-blocks 1673 and 1674, in FIG. 78. A-block 1673 (FIG. 78) is conditioned by the output of -O-block 1045 whenever the parity of the 1, 2, 4 and 8 bit quadruple is add. Line 1046 is functional with a +S MBRO F BIT signal whenever the MBRO contains a flag. The third input is functional from the +S CORR C SAMP ODD signal from FIG. 80. A-block 673 provides a —S RESET C BIT ODD to the MBRO in FIG. 72.

FIG. 80 also provides WR ODD SAMP and WR EV SAMP +S pulses at terminals 1667 and 1668 to control input to MBRO and MBRE respectively. A-block 1669 conditions SPG-block 1673 for production of the sample pulse at R2 time. A-block 1669 in turn is responsive to -O-block 1601 according to RDY CYC or TRANS MDR functional inputs.

FIG. 81 provides additional MDR-MBR control. Terminal 1602 is functional with a +S SET MDR I/O upon conditioning of AD-block 1603 by +S functional signals RD CALL GATE, TGR 30 and SET T5(D3). MDR control during an I/O program is thus effected.

Terminal 1604 is functional with a +S I/O RD SAMP signal from SPG-block 1605 at T5 during cycles that A-block 1606 is conditioned. A-block 1606 is responsive to coincident +S functional signals TGR 30 and RD ALPHA.

—S reset signals for MBRO, MBRE, and MDR and flag clearing signals for the MBR's and for MDR are available at terminals 1607–1611 upon conditioning of an input -O-block such as 1612, gated at time RESET T4(D2) by AD-blocks such as 1613.

FIG. 82 illustrates memory sense amplifier control. A-block 676 is conditioned by coincident +S functional signals ODD ADDR from FIG. 83 and the output of -O-block 677, the read point, to condition A-block 678 top input. The bottom input of A-block 678 is conditioned by the output of -O-block 679, the read Z point. A-block 678 provides a —S ODD S A GATE signal at terminal 680 which passes to FIG. 65. A similar circuit provides a —S EV S A GATE signal at terminal 681 for even addresses. +S and —S RD Y CYC signals are available at terminals 682 and 683 respectively.

FIG. 83 illustrates the odd-even address data control, block 604 in FIG. 1*b*. Odd-even trigger 685 is set by the +S MAR 1 BIT UNITS signal gated through AD-block 686 to provide a +S functional signal ODD ADDR at terminal 687. The odd-even trigger may be reset manually or by the output of AD-block 688; when reset, a +S EV ADDR functional signal is available at terminal 689. The odd-even trigger controls AND circuits 606—607 (FIG. 1*a*) to select the proper one of two digits read out simultaneously to MDR. During "not read alpha" periods of operation of the machine A-block 690 is conditioned when the odd-even trigger is reset, providing via PI-block 691 a +S EV DIGIT functional signal at terminal 692; when A-block 690 is not conditioned, its +S functional signal, ODD DIGIT, is available at terminal 693.

Figure 84:
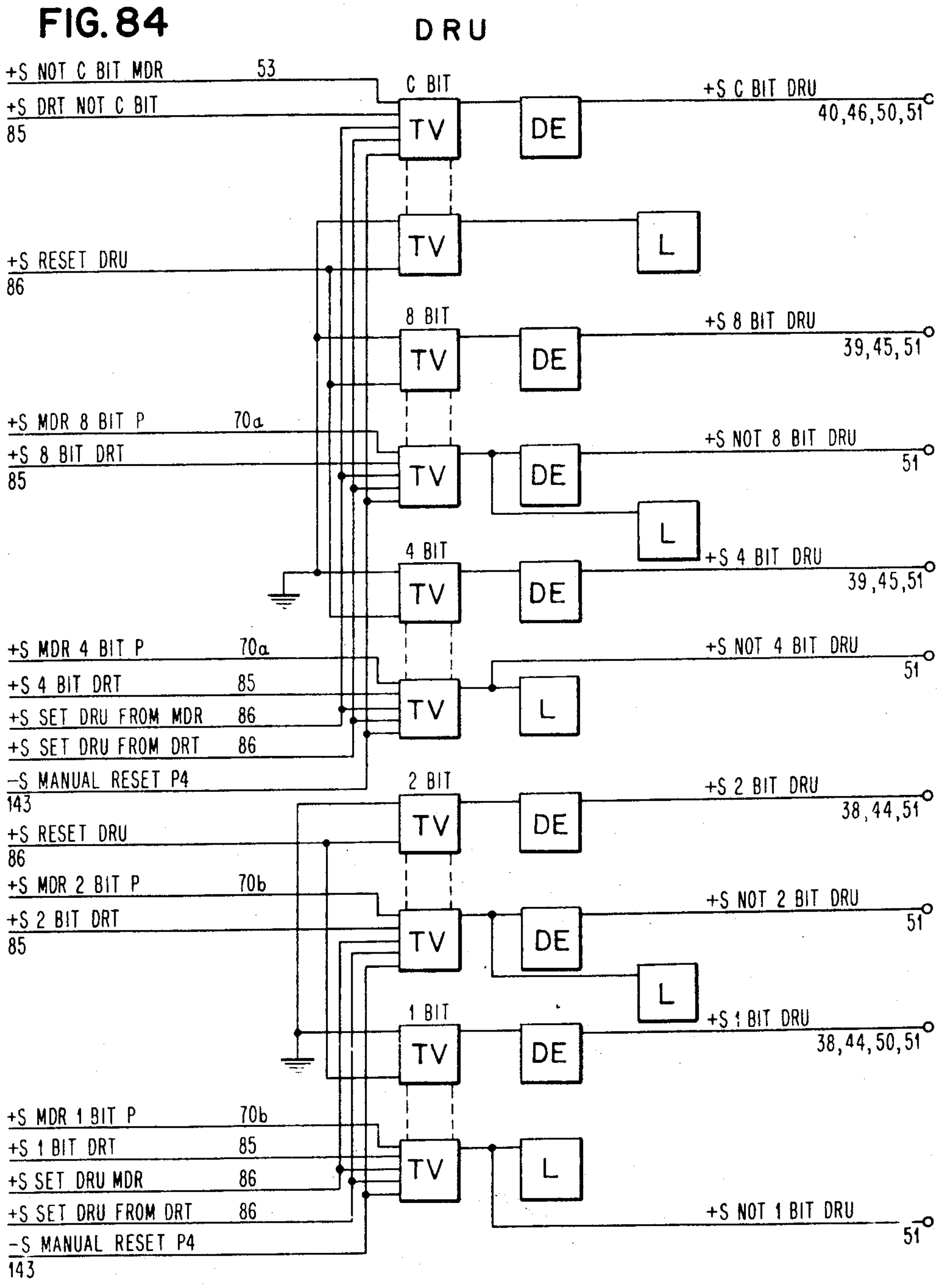

FIG. 84 illustrates the digit register units, DRU block 611 in FIG. 1*a*. DRU is a simple 5-bit trigger register with inputs bit by bit from MDR or from DRT. Inputs are gated by +S SET signals from MDR or from DRT, from FIG. 86.

Figure 85:
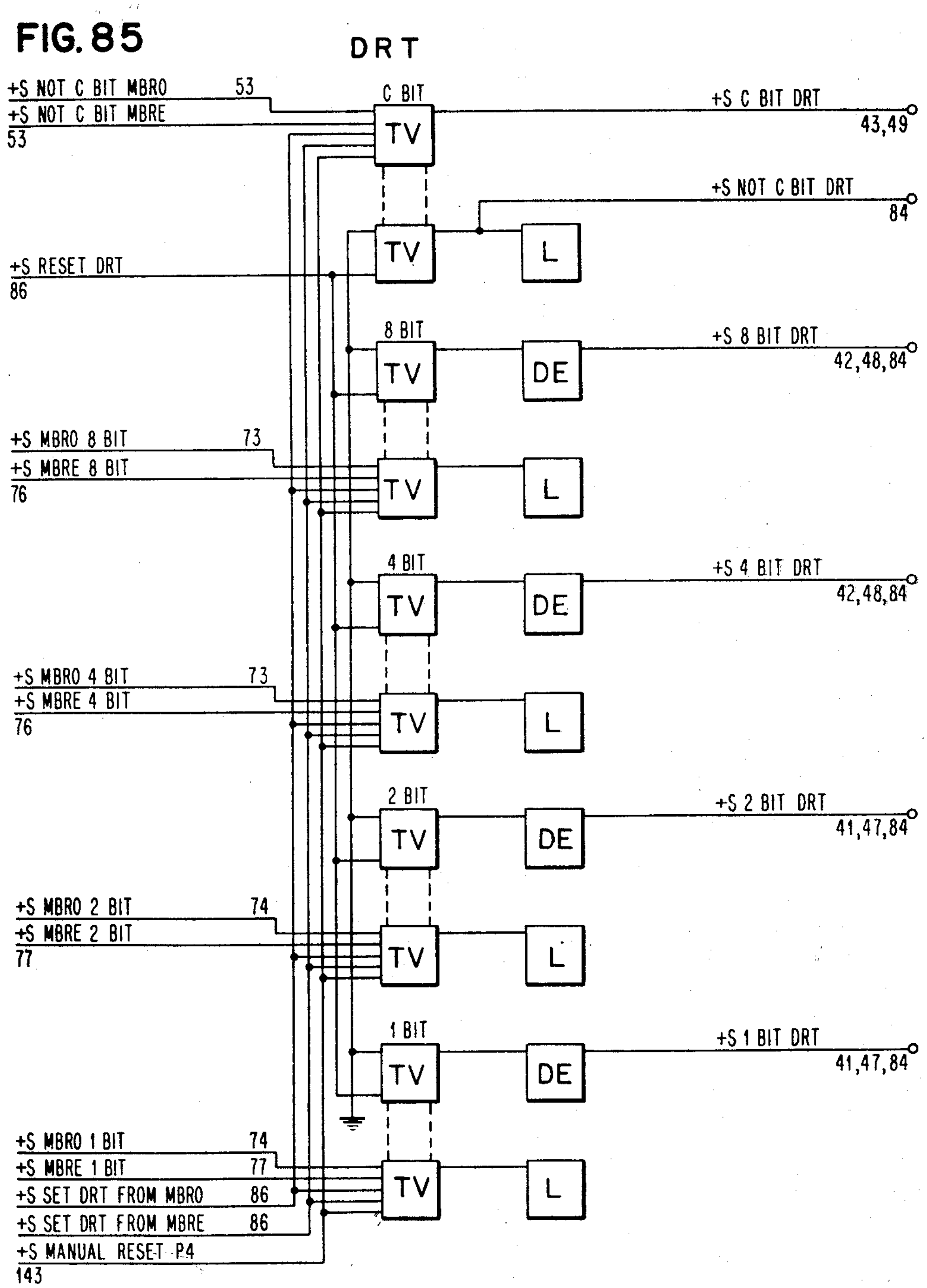

FIG. 85 illustrates the digit register tens, which corresponds to DRT block 610 in FIG. 1*a*. Five voltage mode triggers are provided, one for each bit 8, 4, 2, 1 and C. The flag is omitted during operations involving DRT. DRT receives inputs from MBRO and MBRE, and provides outputs at five terminals, one for each bit.

Figure 86:
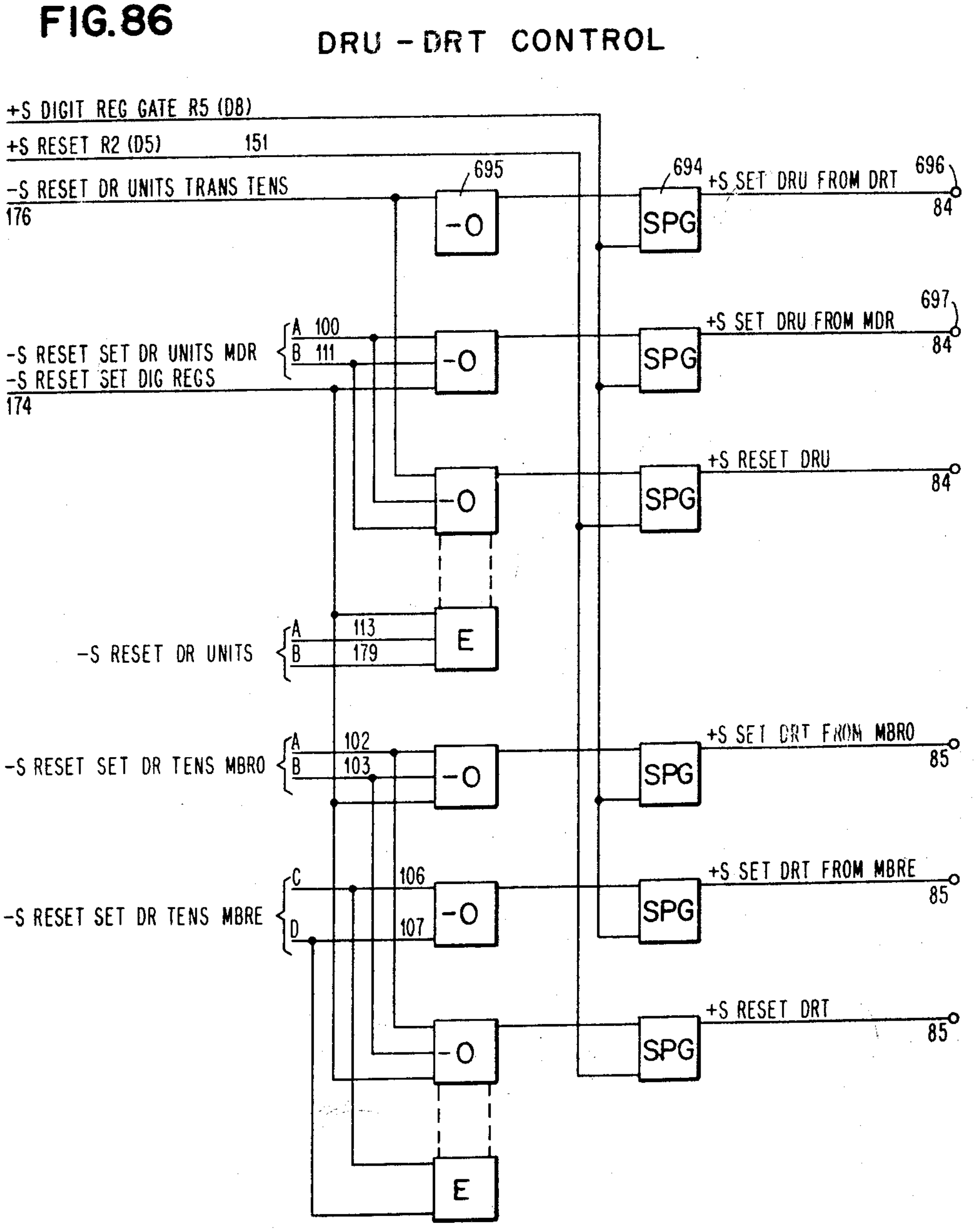

FIG. 86 illustrates DRU-DRT control. Functional signals are generated by SPG blocks such as 694 upon demand from -O-blocks such as 695 to produce +S set signals at terminals such as 696 and 697. The +S set signals are functionally designated SET DRU FROM DRT, SET DRU FROM MDR, RESET DRU, SET DRT FROM MBRO, SET DRT FROM MBRE AND RESET DRT. The DRU-DRT control signals are provided upon demand from circuits illustrated on figures to be explained infra.

Figure 87A:
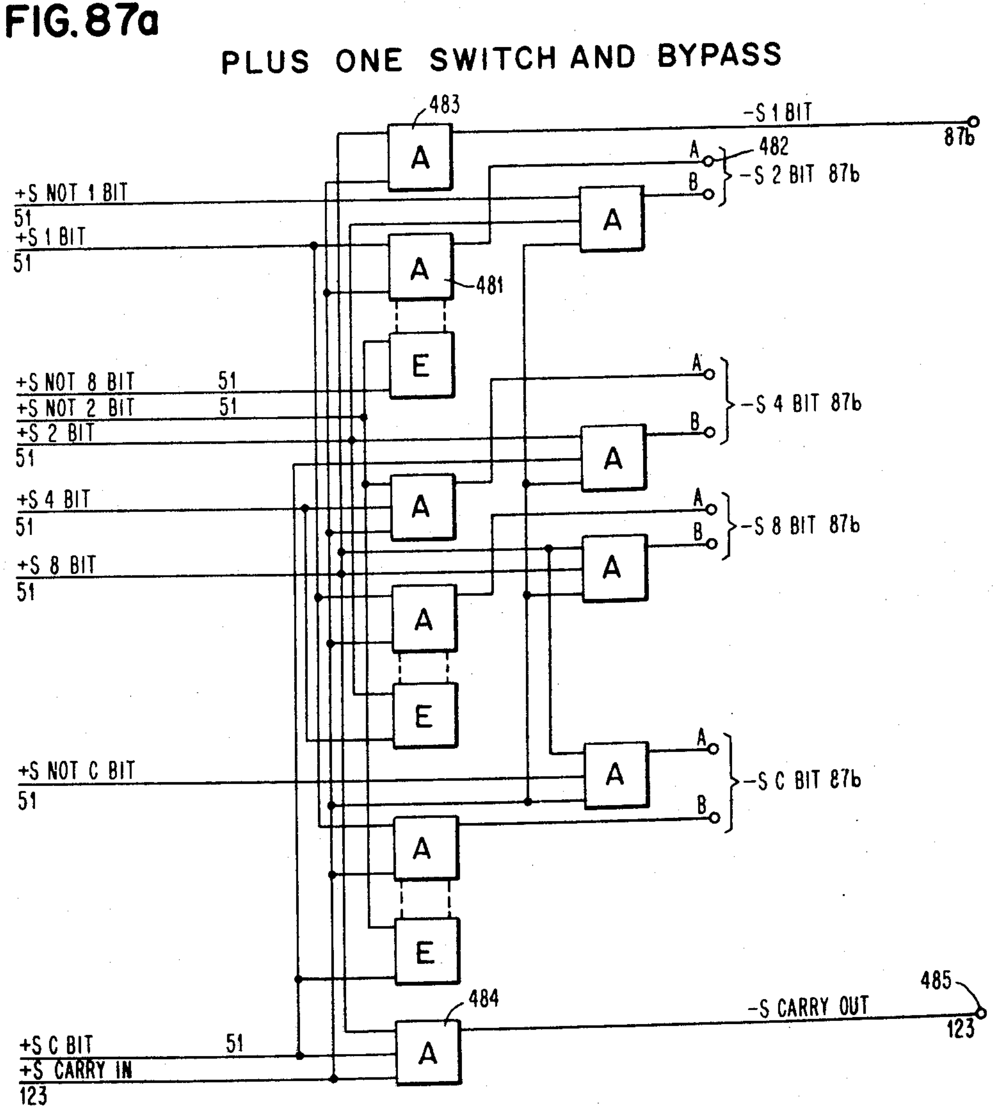
Figure 87B:
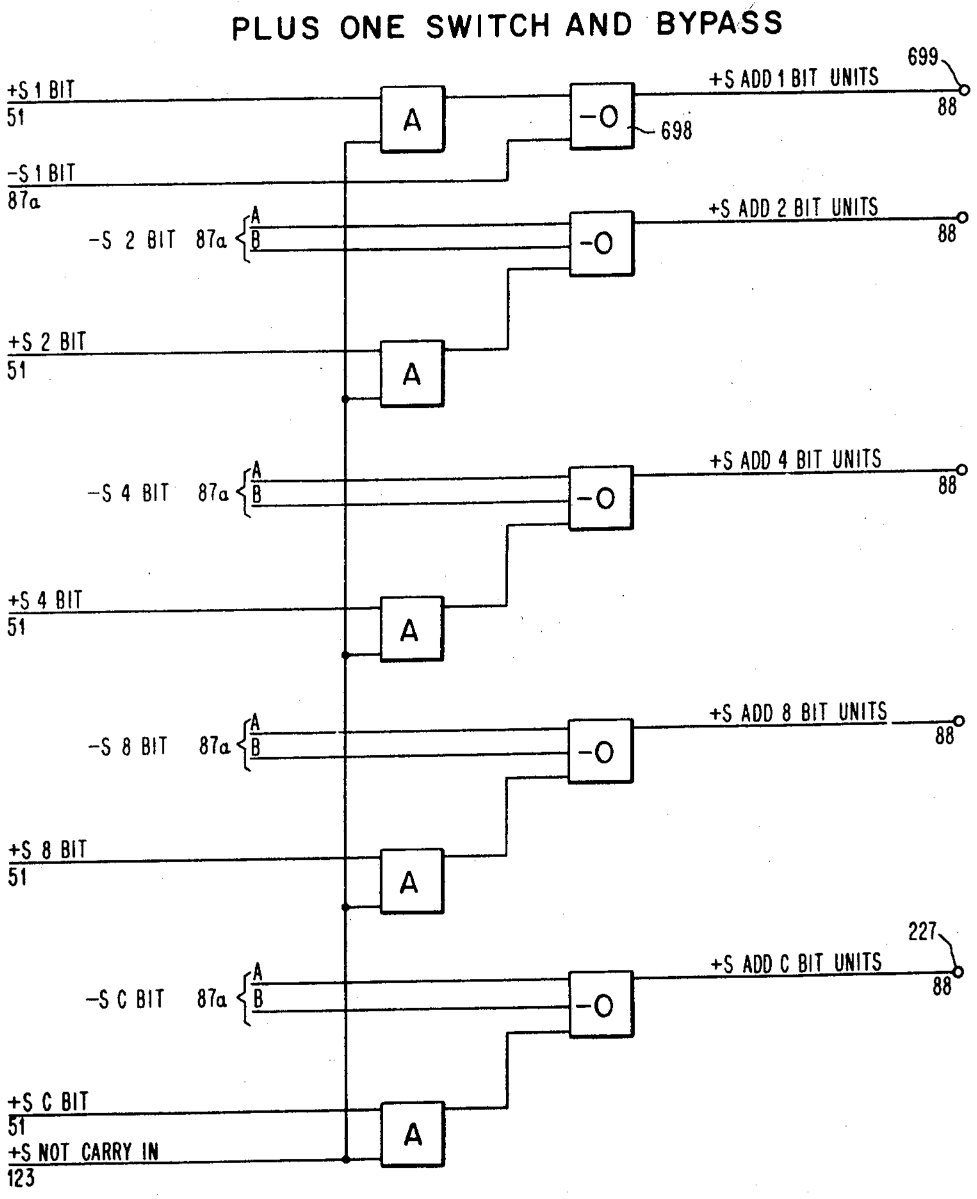

FIGS. 87*a* and 87*b* illustrate +1 switch 402 and bypass 407 in FIG. 1*b*. The matrix of AND circuits in FIG. 87*a* receives +S functional signals 1 BIT, CARRY IN, NOT 2 BIT and NOT 8 BIT at A-block 481 and provides a —S 2 BIT output at terminal 482 which passes to FIG. 87*b*. A —S 1 BIT functional signal is provided by A-block 483 upon coincidence of +S functional signals CARRY IN and 8 BIT. A-block 484 provides a —S CARRY OUT signal at terminal 485 when a 9 digit and carry appear together, as indicated by coincidence at A-block 484 of +S functional signals CARRY IN, C BIT and 8 BIT (coincidence of 8 and C bit occurs only for the 9 value). The —S CARRY OUT functional signal appearing at terminal 485 is effective to set the carry block (403 in FIG. 1*a*—also see FIG. 123) to provide a carry in on the next higher order addition. The +1 switch network of A-blocks accepts as inputs the bit structures for decimal digits 0 through 8 and provides respective bit structure outputs for decimal values 1 through 9; A-block 484 accepts inputs for the decimal 9 value and carry and provides a carry out signal.

FIG. 87*b* is the +1 switch bypass. A network of A-blocks and -O-blocks accept bit +S functional bit signals and the +S NOT CARRY IN functional signal to provide conditioning input for -O-blocks such as 698 which produce +S bit signals at terminals such as 699 to set the MAR units position to the appropriate digit value, +1 or bypass.

FIGS. 88–92 illustrate the memory address register units, tens, hundreds, thousands, and then thousands positions respectively, MAR block 201 in FIG. 1*a*. Each position in MAR comprises four bit triggers valued 8, 4, 2, 1 and a C bit trigger; the exception is MAR ten thousands position which has only the 1 bit and C bit triggers. Since the preferred embodiment memory contains only addresses 00000–19,999, MAR ten thousands needs only the C and 1 bits. Voltage mode triggers 220–224 provide, through a group of emitter follower powering blocks, +S functional signals for the 8, 4, 2, 1 and C bits units and +S functional signals for NOT 8, NOT 4, NOT 2, NOT 1 and NOT C bits at terminals such as 225. The outputs generally connect to the memory addressing matrices 102 and 103 (FIG. 1*a*) and to the increment block 401 (FIG. 1*a*).

Figure 88:
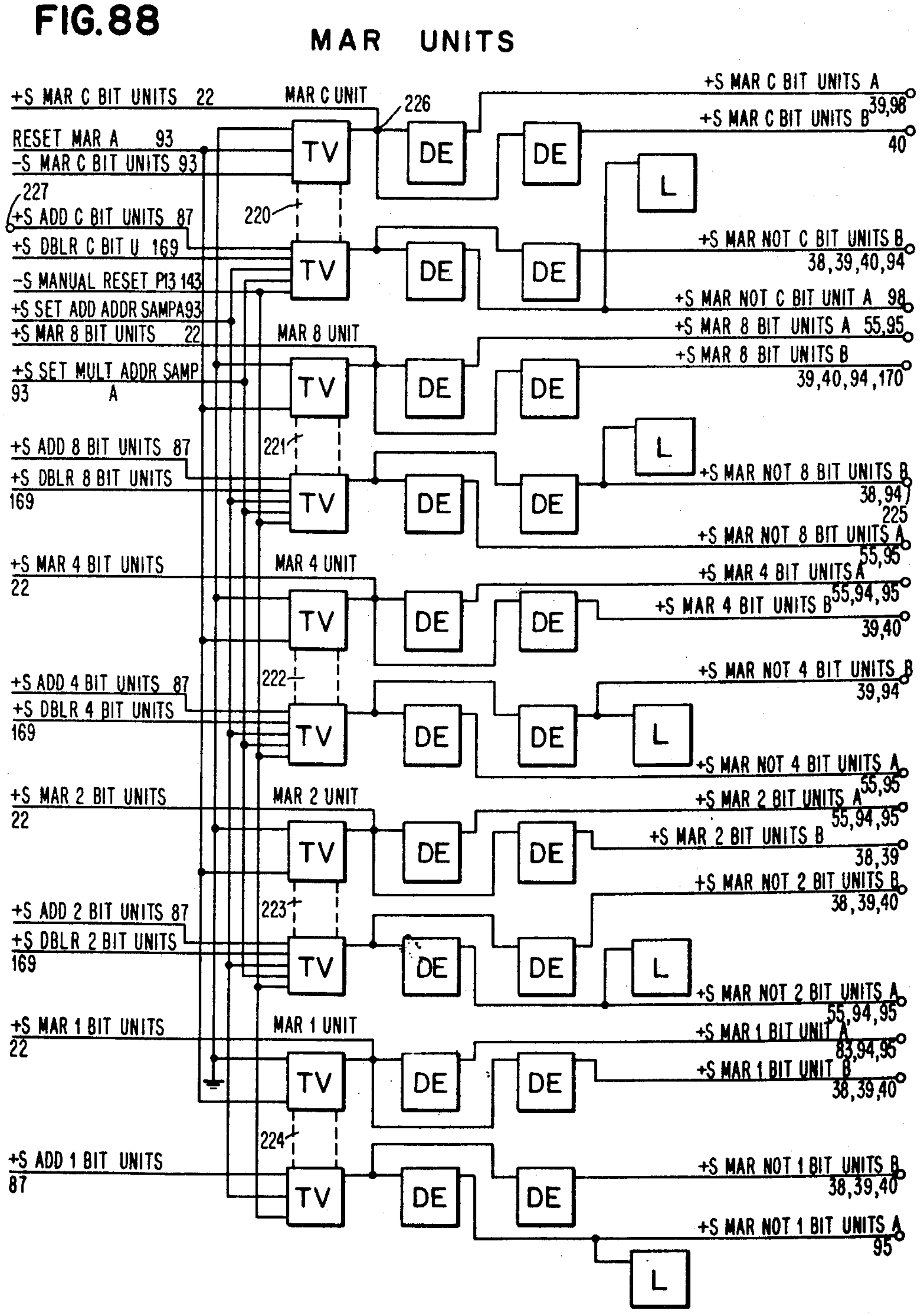

In FIG. 88, MAR units, inputs to the bit triggers in form of sample pulses are available for setting the MAR triggers through collector pullover. The connection of the +S MAR C BIT UNITS functional signal from FIG. 22 to voltage mode trigger 220 is at connection point 226. Another manner of setting the MAR C bit UNITS trigger 220 is from the +S ADD C BIT UNITS functional signal from terminal 227 of FIG. 87*b*. Other mechanisms for setting the MAR units position will become apparent during the more detail description of multiply hardware, especially FIGS. 93 and 94, infra. The MAR units position is settable from the +1 switch block 402 (FIG. 1*a*), the bypass block 407, doubler block 406 or the units order of MARS 300.

Figure 89:
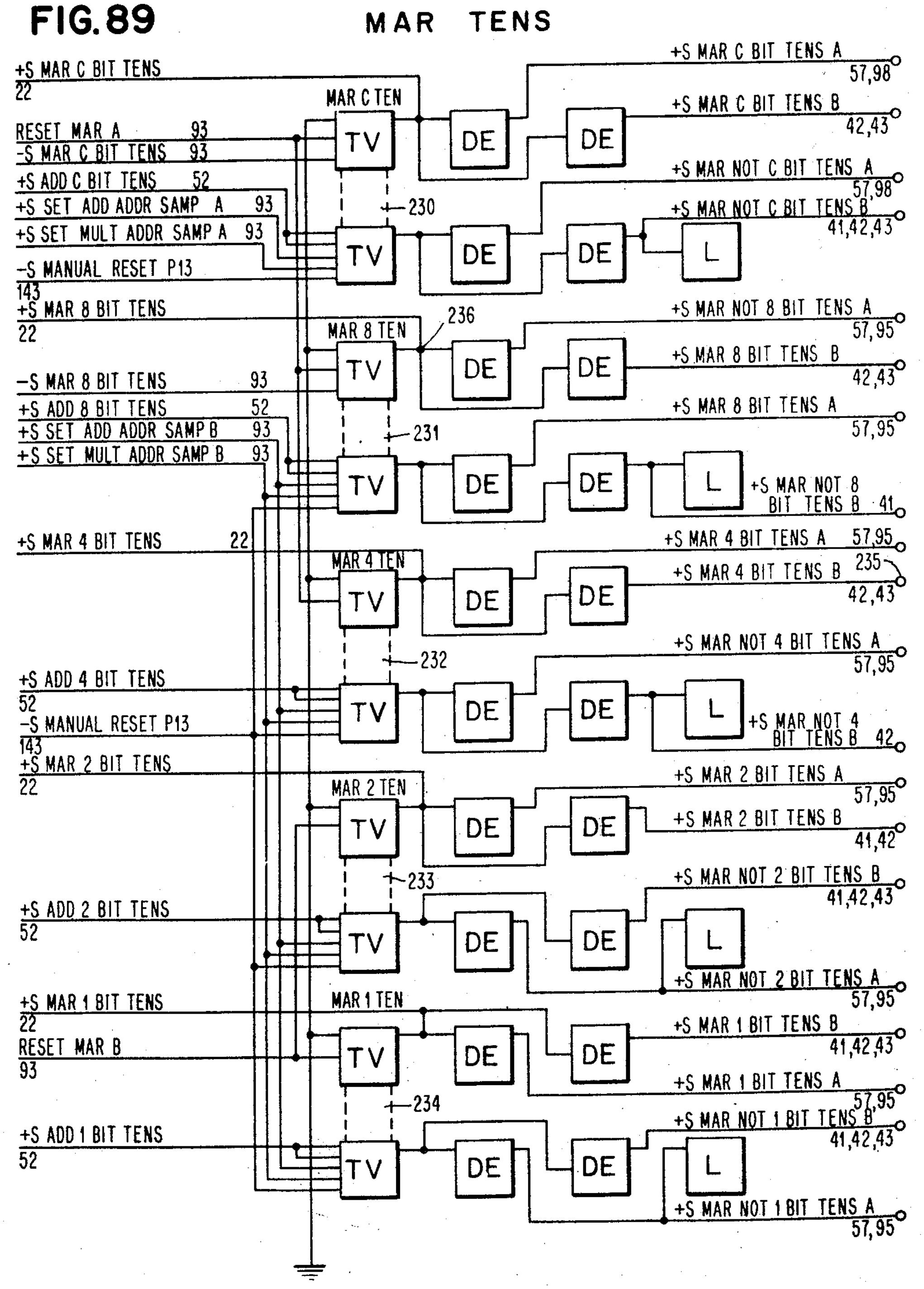

FIG. 89 illustrates the MAR tens position. Five voltage mode triggers 230–234 are effective to indicate the bit structure of the tens order digit in the address, the set condition of respective C, 8, 4, 2 and 1 bit triggers providing +S functional signals for bit values and not bit values at a full set of terminals such as 235 for the +S MAR 4 bit tens functional signal. MAR tens position may be set from T/C block 404 in FIG. 1 or from the tens order in MARS. It may also be set by collector pullover signals such as +S MAR 8 BIT TENS at point 236.

Figure 90:
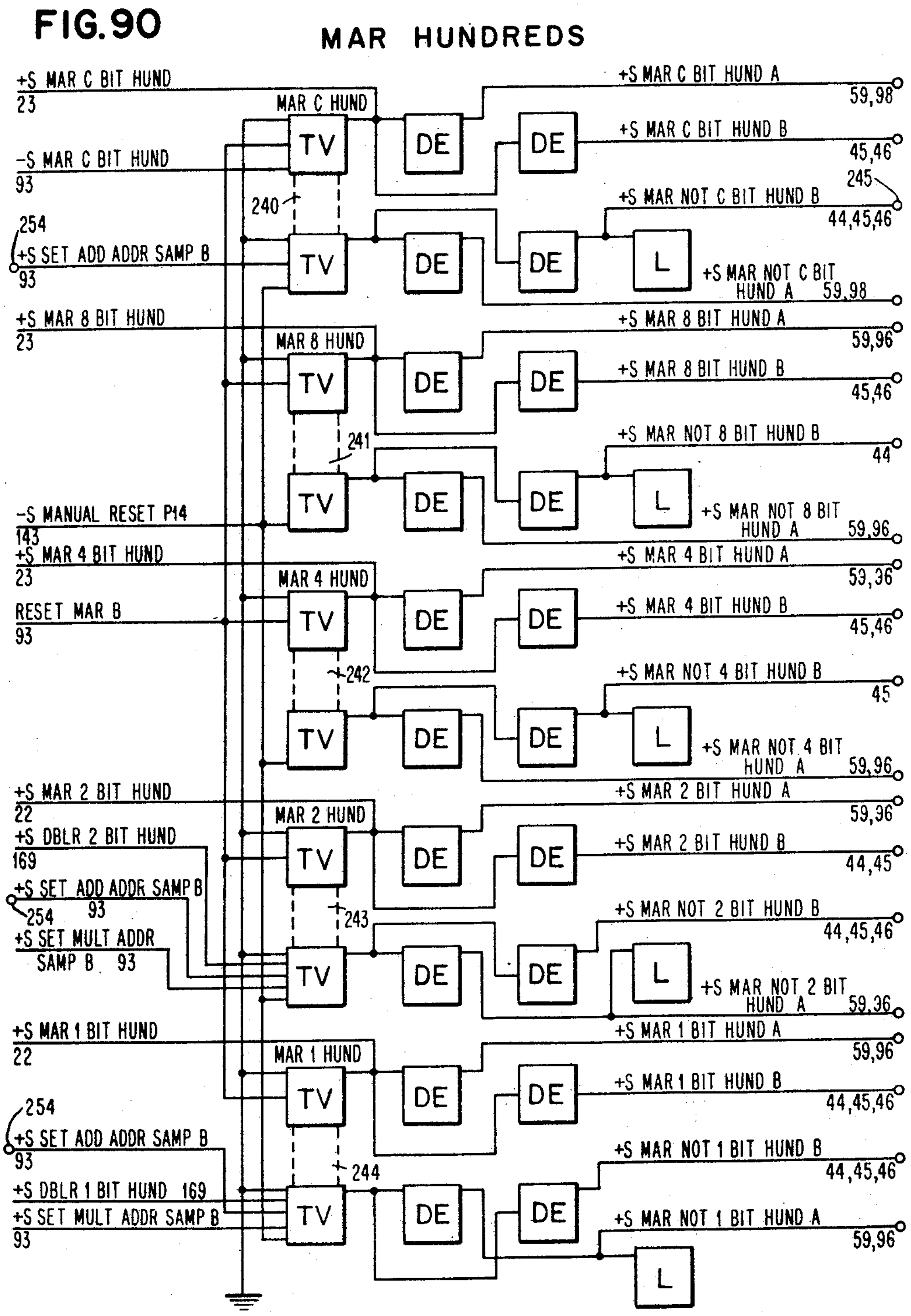

FIG. 90 illustrates the MAR hundreds order, which comprises voltage mode triggers for respective C, 8, 4, 2 and 1 bits which make up the bit structure of the hundreds digit in an address. Triggers 240–244 provide +S functional signals for bit values and not bit values at a set of terminals such as 245 at which the +S MAR not C bit hundreds appears when trigger 240 is unset. During the table lookup add programs, MAR hundreds is set to fixed address value 3 to provide basic table addressing, by circuits to be explained infra. Doubler 406 also sets MAR hundreds.

Figure 91:
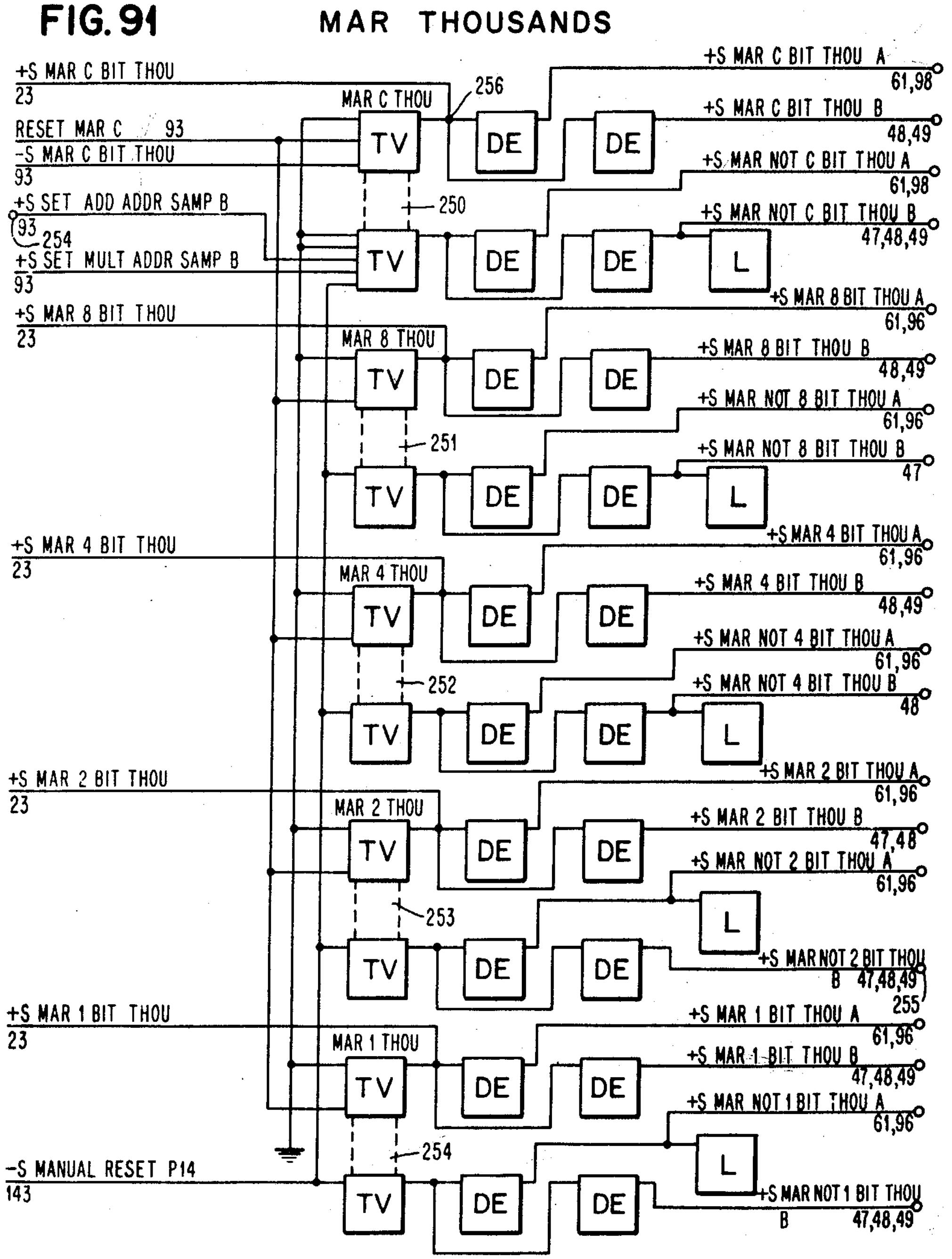

FIG. 91 illustrates the MAR thousands position, which contains voltage mode bit triggers 250–254 for the C, 8, 4, 2 and 1 bits respectively. +S bit output functional signals and +S not bit functional signals are available at a set of terminals including terminal 255 for the +S MAR not 2 bit thousands signal. The MAR thousands bit triggers may be set by collector pullover by a signal such as the +S MAR C BIT THOU signal at point 256 which sets MAR C THOU trigger 250. The thousands order in MAR is settable only to bit values according to MARS. During table lookup add and multiply operations MAR THOU is reset to decimal value 0 (C bit only) to provide basic table addressing.

Figure 92:
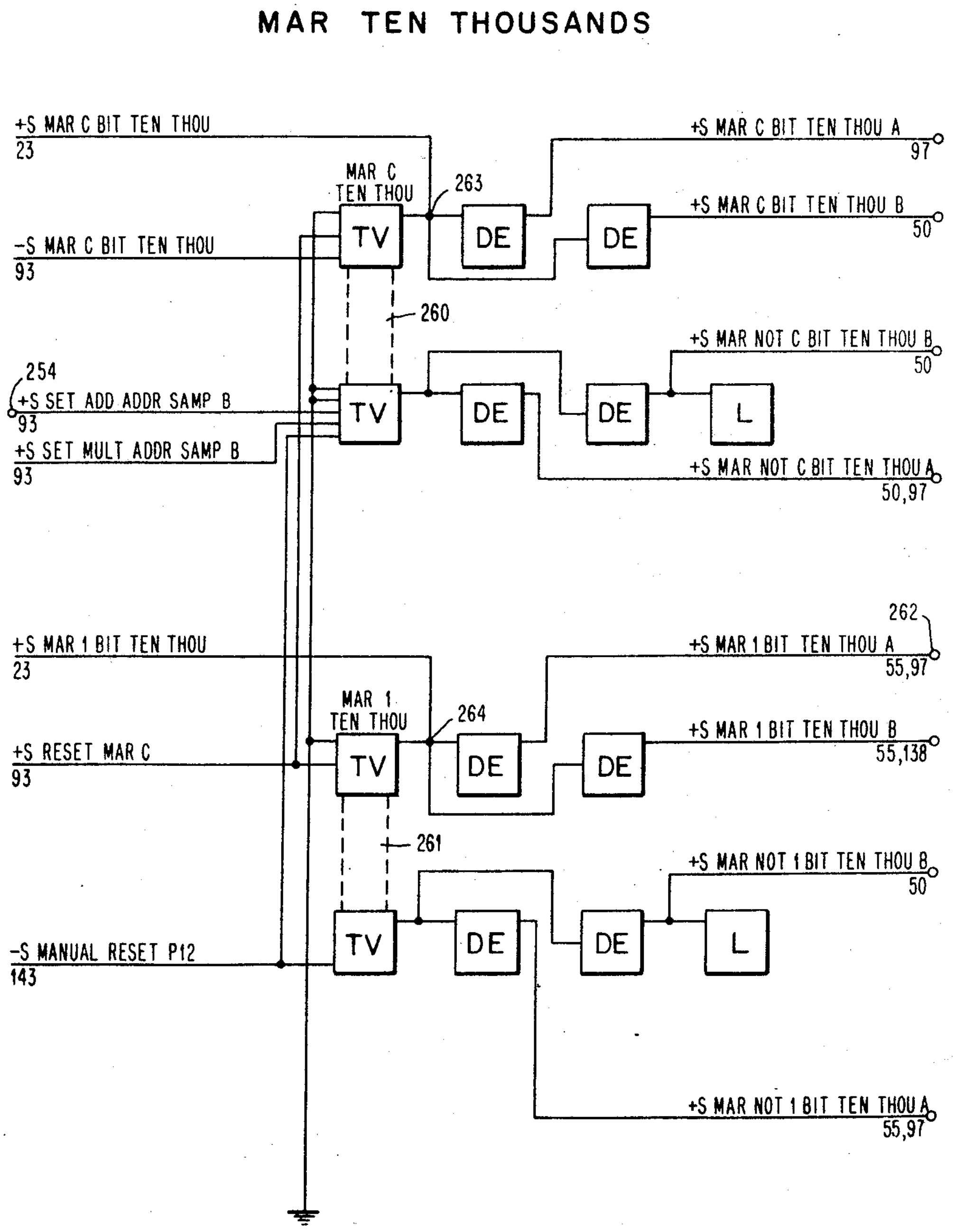

FIG. 92 illustrates MAR ten thousands order, which comprises MAR C TEN THOU trigger 260 and MAR 1 TEN THOU trigger 261 which provide +S MAR functional signals for the C bit, the 1 bit, the not C bit and not 1 bit at terminals such as 262 for the +S MAR 1 BIT TEN THOU. Triggers 260 and 261 are settable primarily by collector pullover signals at terminals 263 and 264 from MARS. During table lookup add and multiply operations MAR 10 THOU is reset to decimal 0 value, i.e., NOT 1 BIT and C BIT.

Figure 93:
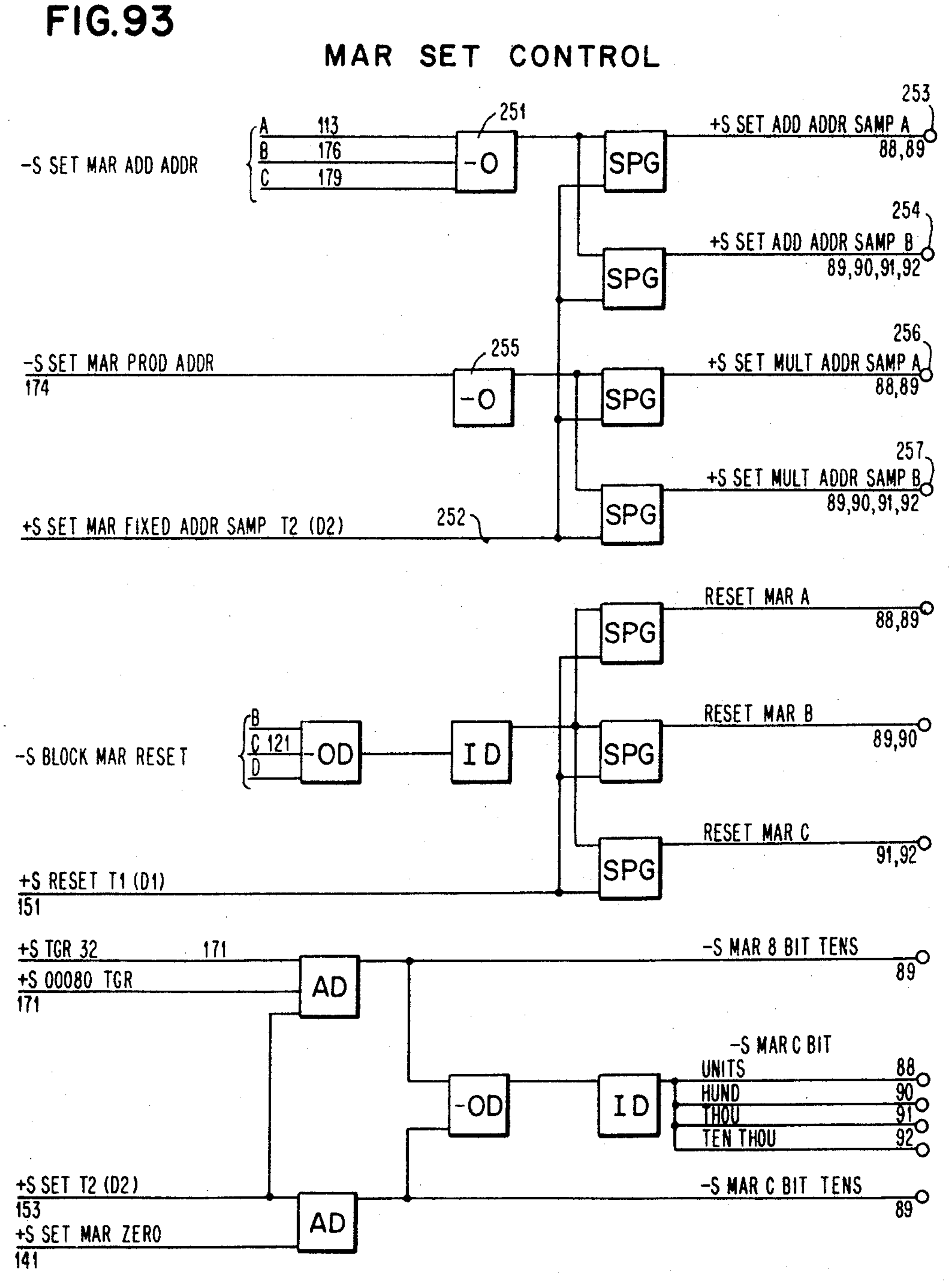

FIG. 93 illustrates MAR set control. In add, multiply and certain other operations MAR is set at least partially to a fixed address. For example, in add, MAR is set to the address 003*xx*—this requires "C bit only" in the ten thousands and thousands positions, C, 2, and 1 bits in the hundreds position, and variable setting of the tens and units positions according to the operands to be added. A —S SET MAR ADD ADDR A signal appears during add as input to -O-block 251. -O-block 251 provides, at a timing controlled by +S MAR FIXED ADDR SAMP functional signal on line 252, +S ADD ADDR SAMP pulses at terminals 253 and 254. Terminal 254 connects to FIGS. 84–92. In FIG. 92 the +S SET AD ADDRESS SAMP B pulse from terminal 254 sets trigger 260 to the C bit value. In FIG. 91, MAR thousands, the +S SET ADD ADDR SAMP B pulse from terminal 254 sets the MAR C trigger 250 to the C bit value. In FIG. 90, MAR hundreds, the +S SET ADD ADDR SAMP B pulse from terminal 254 sets triggers MAR C HUND, MAR 2, HUND and MAR 1 HUND (240, 243, and 244). This provides basic table addressing within the block 003*xx*.

To set MAR for multiply table lookup within the address block 00100–00299, –O-block 255 is conditioned, providing via intervening SPG blocks the +S SET MULT ADDR SAMP functional signal at terminals 256 and 257. The signal tapped at terminal 256 passes to FIGS. 88 and 89 where it serves as a data gate in the units and tens orders of MAR.

The signal tapped at terminal 257, +S SET MULT ADDR SAMP B, passes to FIGS. 89–92. In FIG. 89, the signal serves as a data gate. In FIGS. 91 and 92, it sets the MAR THOU and MAR 10 TH C BIT triggers for the decimal 0 value. In FIG. 90, MAR HUNDREDS, the +SET MULT ADDR SAMP gates the signal from DOUBLER block 406 (FIG. 1*a*, details FIG. 169) to the MAR 2 HUND trigger 243 or MAR 1 HUND trigger 244. The DOUBLER signal, derived from the carry of doubling a single decimal digit (0 or 1) augmented by 1, provides either a 2 or a 1 signal but not both.

Accordingly, the +S SET MULT ADDR SAMP causes MAR to be set with the multiply table address 00 (1 plus carry of doubled multiplier digit) multiplicand (units digit of doubled multiplier digit). FIG. 93 also shows circuitry for setting MAR to the accumulator address 00080 for multiply.

FIG. 94 illustrates the MAR data entry increment 2 switch, which provides, at output terminals such as 494, —S bit increment 2 signals for 1, 2, 4, 8 and C bits. The NOT INCRE PLUS 2 +S functional signal is available where appropriate at terminal 495. The —S BOC 1 INCRE 2 signal is available, where appropriate, at terminal 496, for borrow-carry situations. The bit functional signals from terminals such as 494 connect into the final stage OR circuits in the MARS entry units FIGS. 38, 39 and 40. For example, the —S 1 BIT INCRE 2 functional signal at terminal 494 conditions —OD-block 459 extender (FIG. 38) to provide the +S 1 BIT UNITS functional signal at terminal 460. The +S NOT INCRE PLUS 2 functional signal at terminal 495 (FIG. 94) connects via A-block 455 (top of FIG. 38) and PI-block 454 to provide the +S Switch UNITS functional signal at connection point 498 when the not bypass function is present.

The binary coded decimal digit bit structure provides a simple conversion in increment 2 operations. The 1 bit, for example, is never changed. A-block 1401 gates the MAR 1 BIT UNITS signal from FIG. 88 upon coincidence with the INCREment PLUS 2 gate point output from –O-block 497; —S 1 BIT INCREment 2 functional signal is available at terminal 494. A-block 1402 produces the —S 2 BIT INCREment 2 signal at terminal 1403 upon coincidence of the INCREment PLUS 2 gate point signal, +S MAR NOT 8 BIT UNITS and +S MAR not 2 bit units signals. The not 8 bit input is to prevent confusion of the 8–2 bit combination which is used as a record mark in the preferred embodiment. Other A-blocks provide —S bit increment 2 signals at their respective terminals according to the input rules. A-block 1404 provides the —S BOC INCREment 2 functional signal at terminal 496 upon coincidence of functional signals +S MAR 8 bit units and the increment 2 gate point. The BOC 1 INCREment 2 functional signal at terminal 496 passes to FIG. 40 where it is used to provide ripple carry through MAR where applicable, in the manner previously described in connection with FIGS. 40, 43, 46, 49 and 50.

Figure 96:
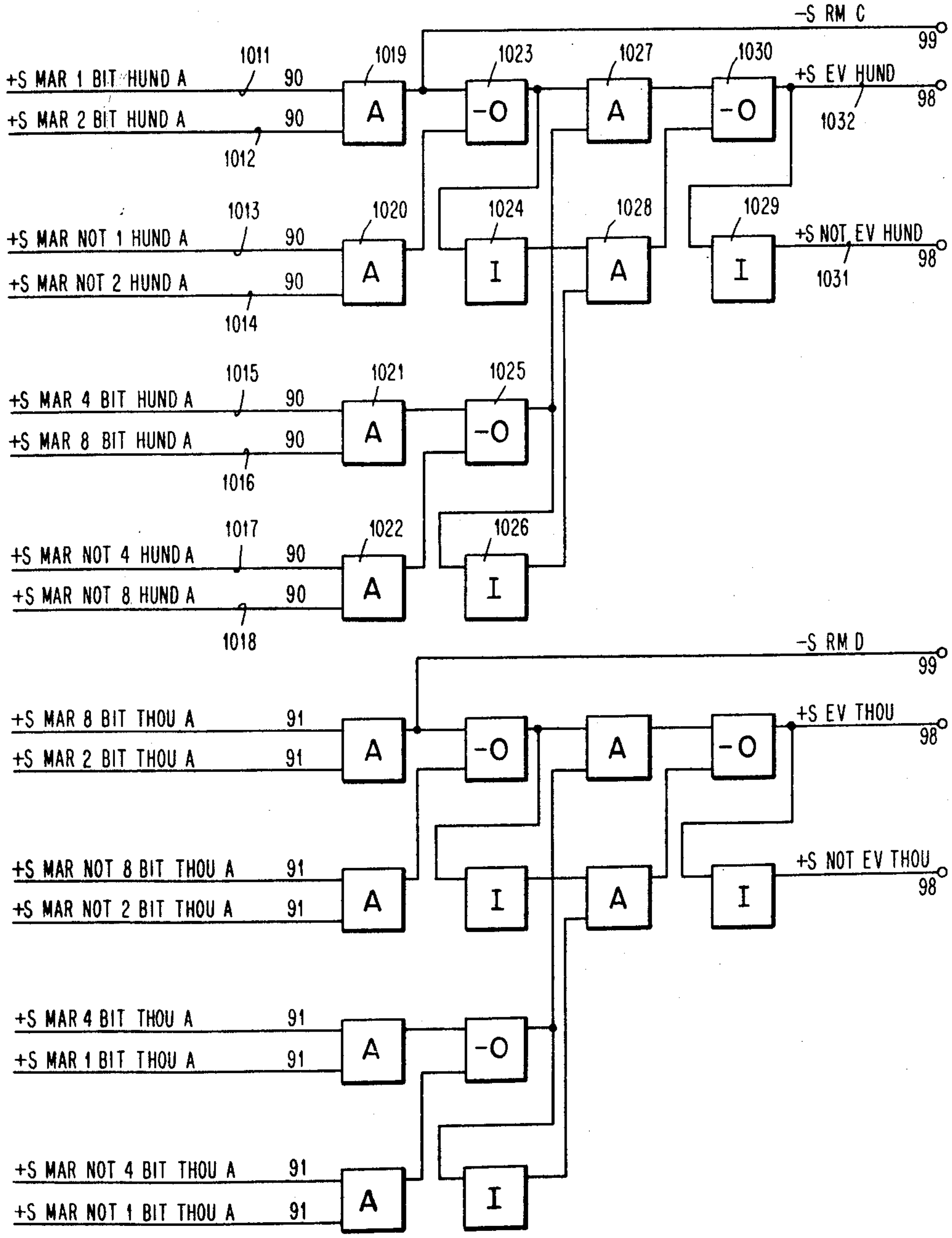

FIGS. 95 through 99 illustrate MAR VRC checking. Each digit involves four binary coded decimal bits and one vertical redundancy check bit; the total number of 1-valued bits is odd or the vertical redundancy check signals an error. FIG. 96 is typical. Lines 1011 to 1018 are functional with +S signals according to the appropriate bit values. A-blocks 1019–1022 are each effective when the paired inputs are functional; for example, A-block 1020 is conditioned when lines 1013 and 1014 (NOT 1 and NOT 2) are functional. A-blocks 1019 and 1020 are never coincidently conditioned since their inputs are complementary. –O-block 1023 therefore is conditioned only when the number of 1-valued bits in the 1 and 2 bit group is even, that is, either there are no 1 bits or two 1 bits (not EXCLUSIVE OR). –O-block 1025 similarly is conditioned only when the 4 and 8 bit pair has an even number of 1 values. –O-block 1030 is conditioned by EXCLUSIVE OR outputs from –O-blocks 1023 and 1025 via inverters 1024 and 1026 through AND circuits 1027 and 1028 to produce the +S EV HUND functional signal at terminal 1032. I-block 1029 produces a +S NOT EV HUND functional signal at terminal 1031. The EV and NOT EV parity signals at terminals 1032 and 1031 pass to FIG. 98.

In FIG. 98, lines 1031 and 1032, and lines 1033 and 1034 (which are functional according to the C bit hundreds position) are inputs to A-blocks 1035 and 1036. A-block 1035 is conditioned by coincidence of +S NOT EV HUND and +S C BIT HUND to condition line 1037 when the total number of 1-valued bits in the hundreds position of MAR is the sum of an even number of BCD bits and not C bit, or of not even and C bit, that is, even. Conditioning of line 1037 conditions extended –O-block 1038 to condition +S MAR VRC EV terminal 1039, which passes to FIG. 99. Similarly, coincident conditioning of lines 1032 and 1034 conditions A-block 1036 to condition –O-block 1038 upon coincidence of +S EV HUND and +S MAR NOT C HUND, which is an even number of 1-valued bits, a parity error.

Figures 99, 100:
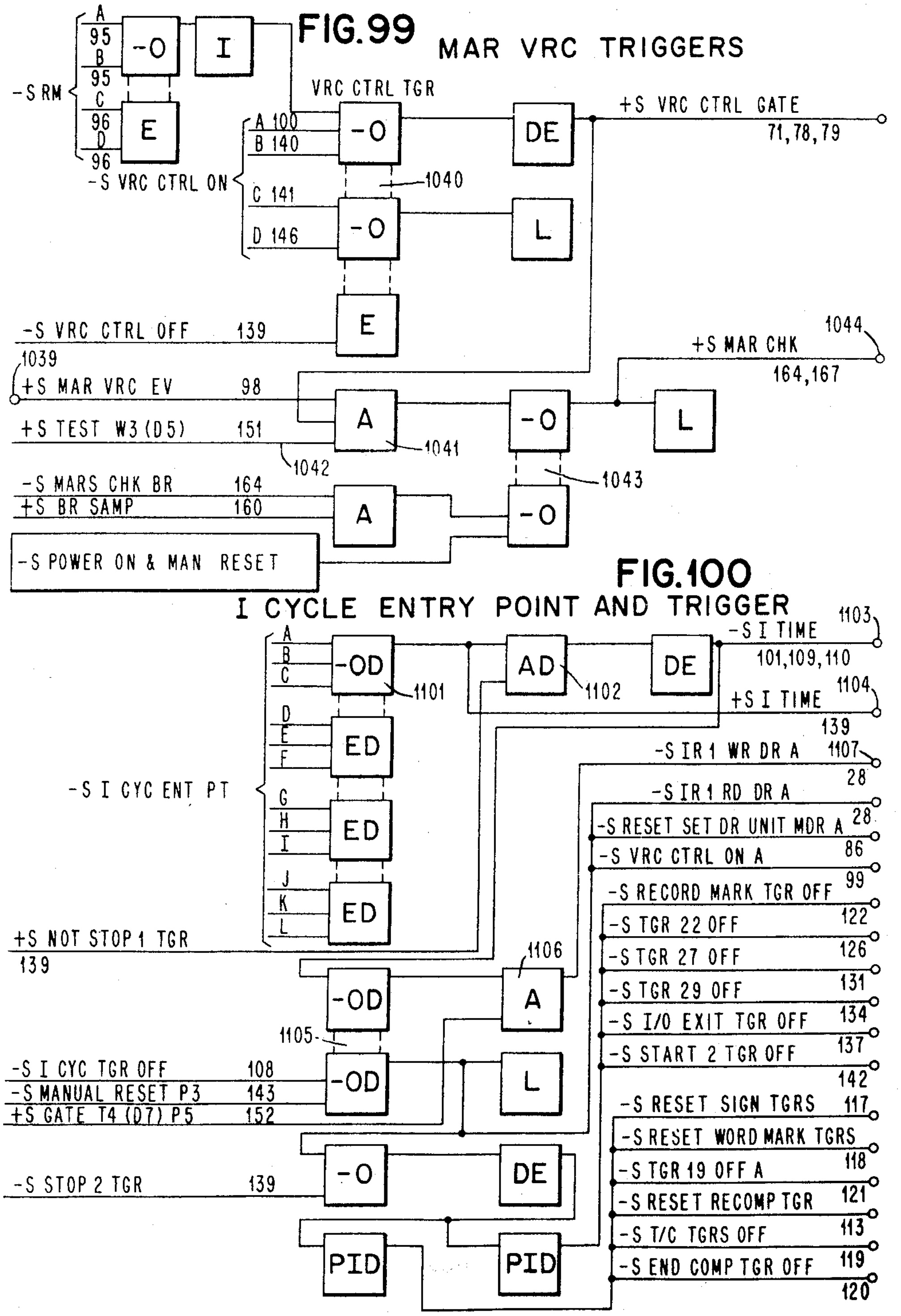

FIG. 99 illustrates the MAR VRC triggers. The VRC control trigger 1040 is assumed to be ON, providing one input to A-block 1041. The +S TEST W3(D5) 1042 is functional at a proper time in the cycle, upon which, if +S MAR VRC EV terminal 1039 is functional, MAR check trigger 1043 is set. This provides a +S MAR CHK signal at terminal 1044 which passes to FIG. 164 and FIG. 167, where it may be effective either to cause branching to a previous program step check point or to halt the machine, under control of the stored program.

*I-Cycle*

FIGS. 100–108 illustrate the I-cycle entry point and triggers. The functional procedure during time is explained in detail under the subhead I-time steps in column 13 and following. The I-cycle (instruction cycle) is entered through the I-cycle entry point extended –OD-block 1101 from any of a number of inputs marked A through L, which essentially are the final signals of preceding execute cycles. For example, the last function of the add operation program timer is to signal the end of addition which causes entry into the I-cycle for obtaining the next instruction. AD-block 1102 passes the I-cycle entry point signal to terminal 1103 except when a stop is to be effective. —S I-TIME conditioning of terminal 1103 sets trigger 1105, the I-cycle trigger. A-block 1106 produces a —S IR 1 WR DR A signal on line 1107 which passes to FIG. 28 to condition IR1 for the writing of the instruction into IR1 during the following I-cycles. Other signals controlled by trigger 1105 are RESET SET DR UNIT MDR A, VRC CTRL ON, RECORD MARK TGR OFF, TGR 22 OFF, TGR 27 OFF, TGR 29 OFF, I/O EXIT TGR OFF, START 2 TGR OFF, RESET SIGN, TGRS, RESET WORD MARK TGRS, TGR 19 OFF, RESET RECOMP TGR, T/C TGRS OFF and END COMP TGR OFF. The housekeeping chores accomplished, the machine is ready to enter the I-cycle to set up for the particular instruction.

Figure 101:
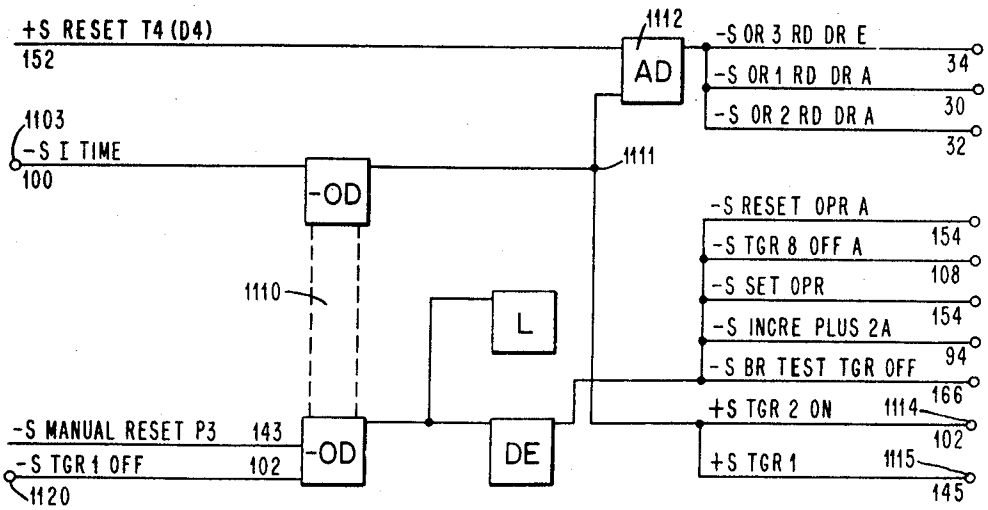

FIG. 101 illustrates I-cycle trigger 1. Terminal 1103, —S I-TIME, is functional to set I-cycle trigger 1110, conditioning connectioning point 1111 with the functional signal +S TGR 1. AD-block 1112 is conditioned at T4 of the cycle to produce —S signals to operate the read drivers of OR1, OR2 and OR3. The OFF side of I-cycle trigger 1110 produces —S signals RESET OPR A, TGR 8 OFF A, SET OPR, INCRE PLUS 2A and BR TEST TGR OFF. I-cycle trigger 1 is effective to reset OR1, OR2 and OR3, and to set the operation registers. Other MARS registers such PR1 can be reset by similar connections, should such resetting be desirable.

Terminals 114 and 115 connect to the ON side of I-cycle trigger 1110 at conneciton point 1111. The +S functional signal at at terminal 1114 is designated TGR 2 ON; at 1115 is designated TGR 1.

Figure 102:
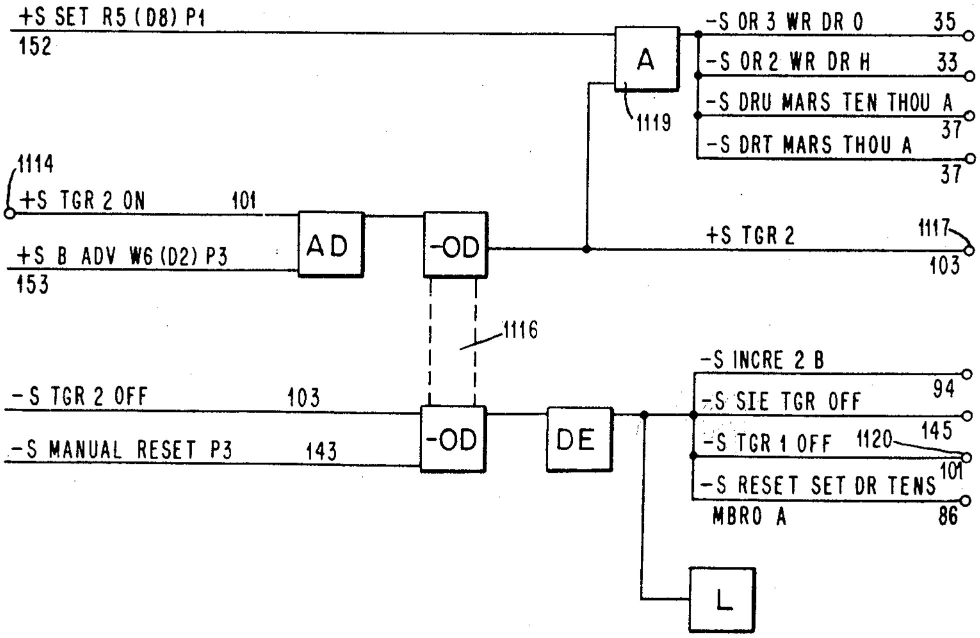
Figures 103, 104:
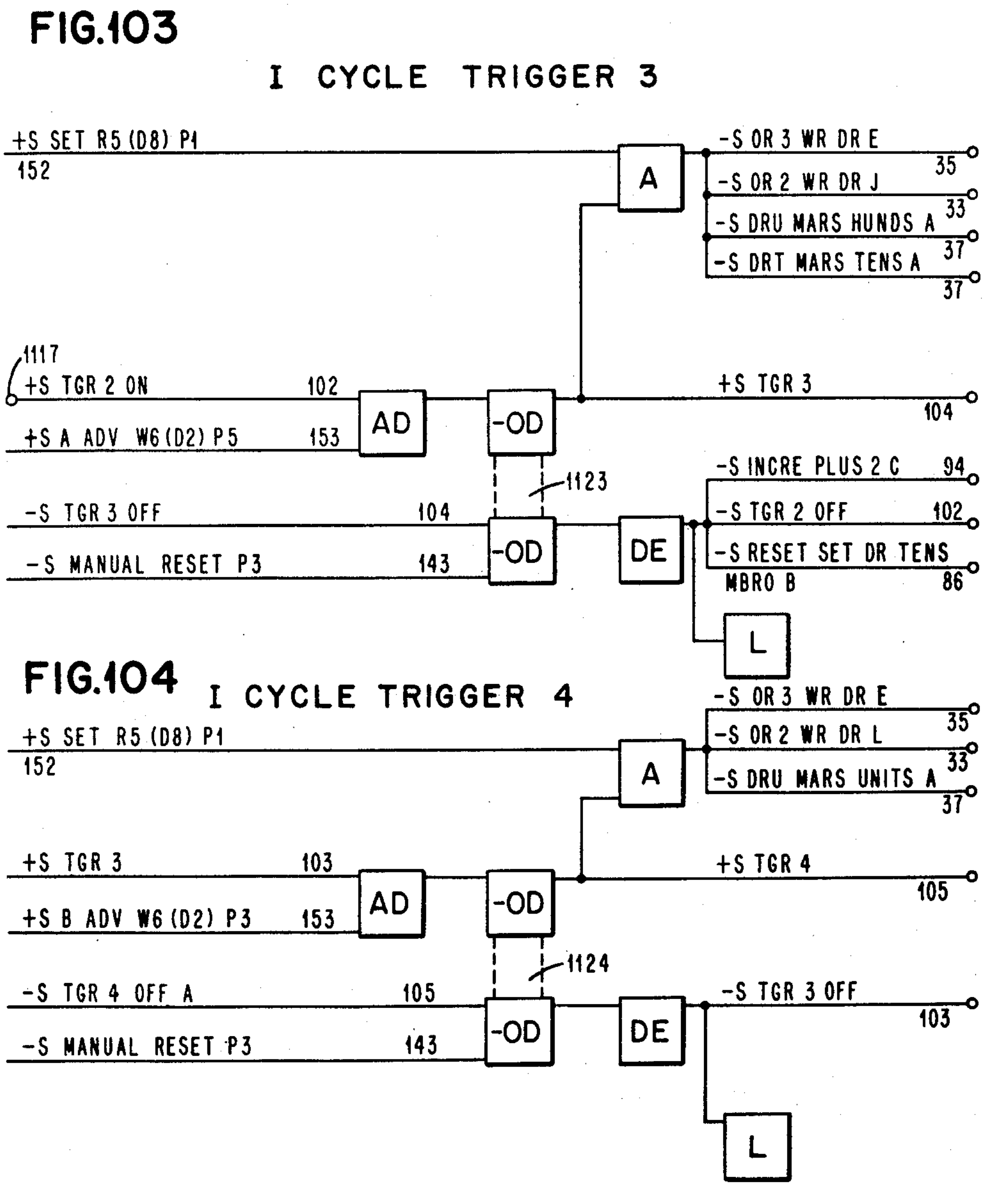
Figure 105:
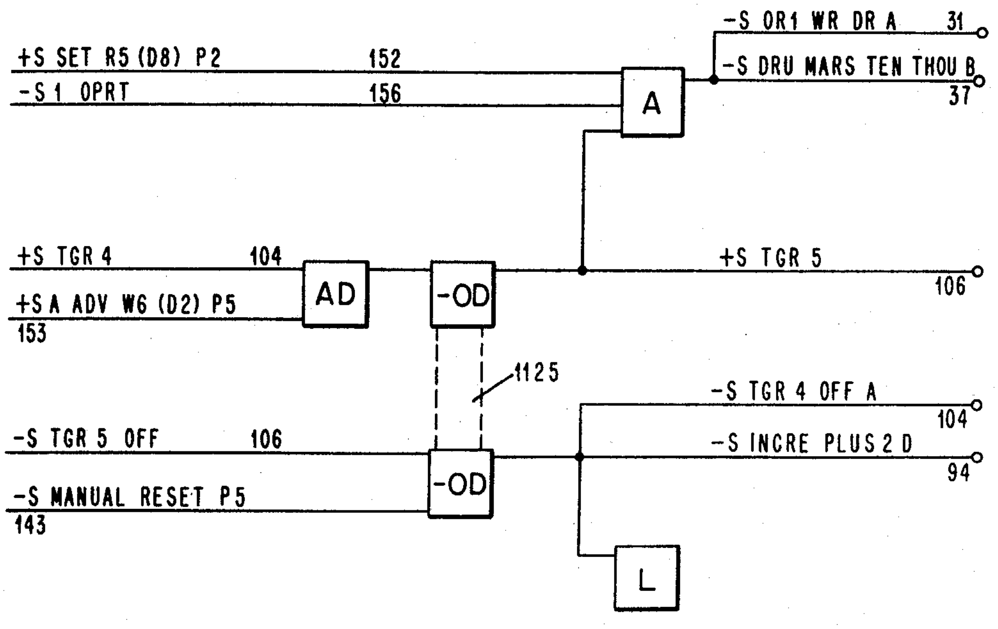
Figure 106:
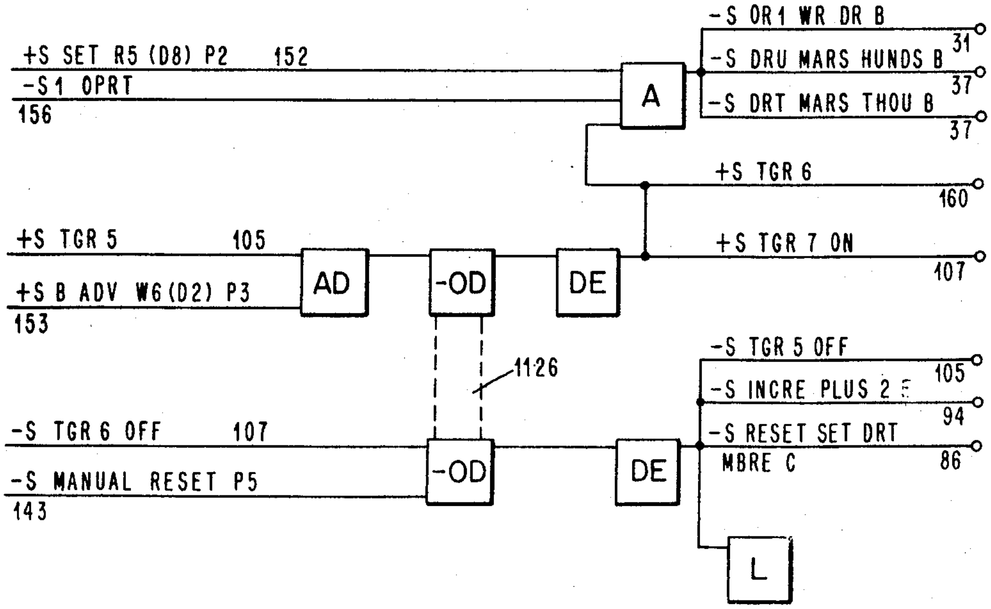

FIG. 102 illustrates I-cycle trigger 2. The +S TGR 2 ON functional signal at terminal 1114, when gated by a +S ADV W6(D2) pulse, turns I-cycle trigger 2 (1116) ON to provide a +S signal at terminal 1117, designated TGR 2. A-block 1119 is conditioned by +S functional signals TGR 2 and SET R5(D8) to produce —S functional signals designated OR 3 WR DR, OR 2 WR DR, DRU MARS TEN THOU A, and DRT MARS THOU A. The off side of I-cycle number 2 trigger (1116) provides —S functional signals designated INCRE 2 B, SIE TGR OFF, TGR 1 OFF and RESET SET DR TENS MBRO A. The TGR 1 OFF signal at terminal 1120 is effective in FIG. 101 to turn I-cycle trigger number 1 (1110) OFF.

FIGS. 103 to 107 illustrate I-cycle triggers 3 through 7, reference characters 1123 through 1127.

Figures 107, 108:
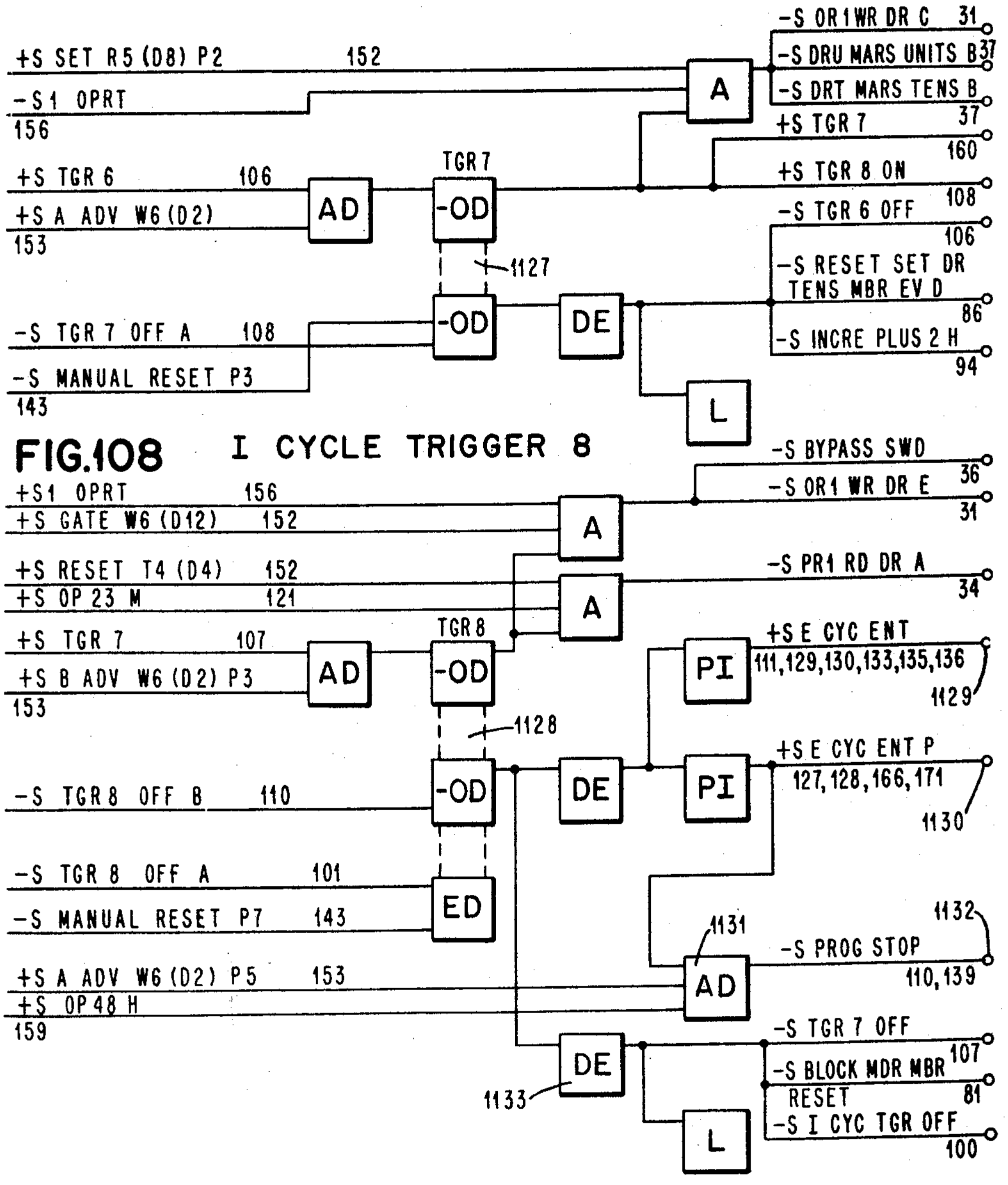

FIG. 108 illustrates I-cycle trigger 8, trigger 1128. Triggers 1123–1127 are effective to control I-cycle steps 3 through 7 respectively to load the operand addresses and other applicable addresses into MARS. I-cycle trigger 8 (1128) in FIG. 108 is essentially to control a dummy cycle at the end of I-time to prepare for the succeeding execution cycle. Terminals 1129 and 1130, for example, are functional with the +S E CYC ENT (E cycle entry) when I-cycle trigger 8 (1128) is ON.

AD-block 1131 is effective when conditioned to produce a —S PROG STOP functional signal at terminal 1132. AD-block 1131 is conditioned by a W6 time pulse and by the HALT operation signal to provide the program stop. During periods when trigger 1128 is on, —S functional signals are available as outputs of DE-block 1133 as functional signals TGR 7 OFF, BLOCK MDR MBR RESET and I-CYCLE TGR OFF. I-cycle trigger 8 thus ends the I-cycle by extinguishing I-cycle trigger 1105 (FIG. 100) and provides for beginning the execution cycle (E-cycle).

Figure 109:
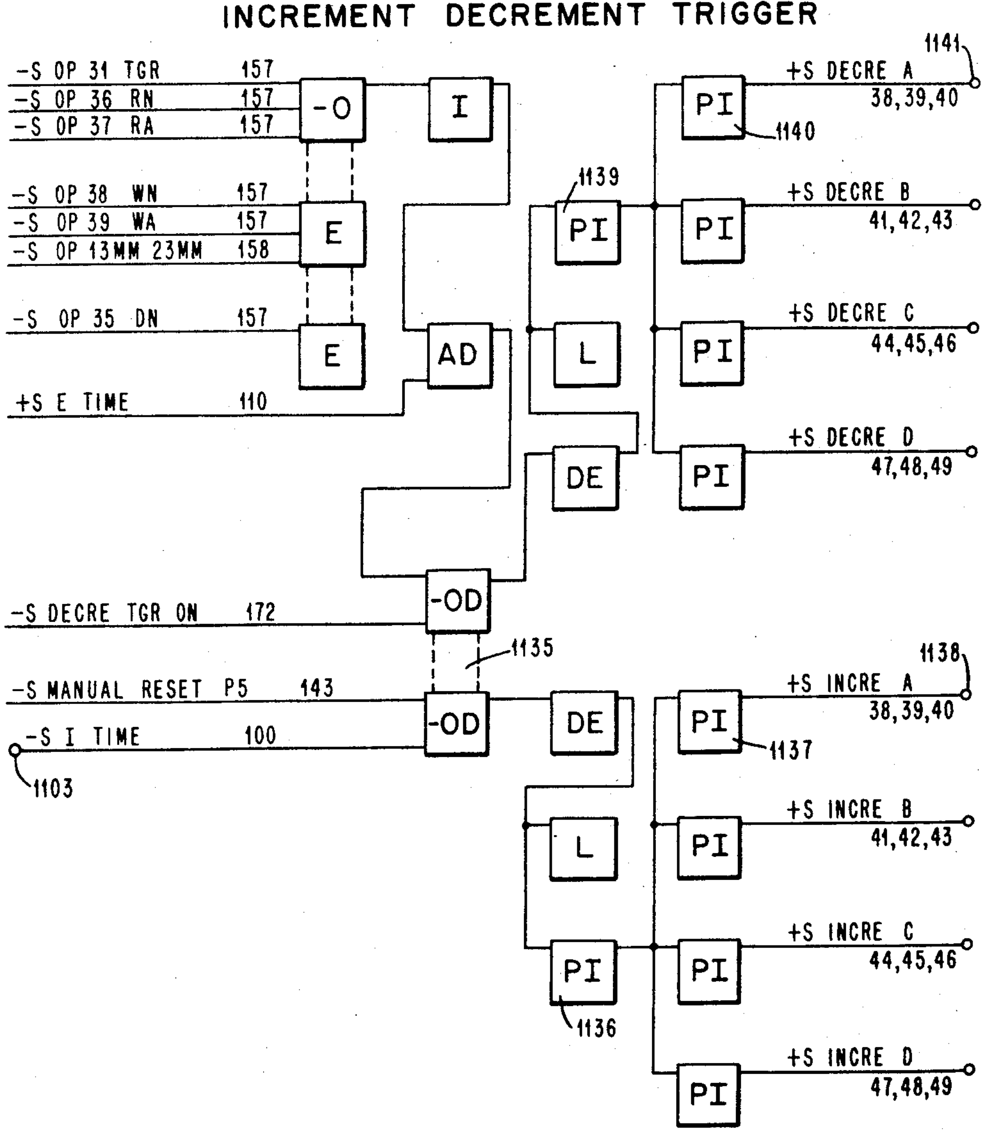

FIG. 109 illustrates the increment-decrement trigger 1135. The operation is generally decrement during arithmetic operations, since higher order digits are placed in lower addresses than low order of digits. During I-time, however, where incrementing is the rule, the increment-decrement trigger is set to increment. A —S I-TIME functional signal from terminal 1103 in FIG. 100 sets the trigger to increment and produces, via PI-block 1136 and another series PI-block such as 1137 +S INCRE functional signal at a terminal such as 1138. During arithmetic and transfer type operations where decrementing is a rule, the increment-decrement trigger is set to decrement, producing via PI-block 1139 and a series PI-block such as 1140 the +S DECRE functional signal at a terminal such as 1141.

Figure 110:
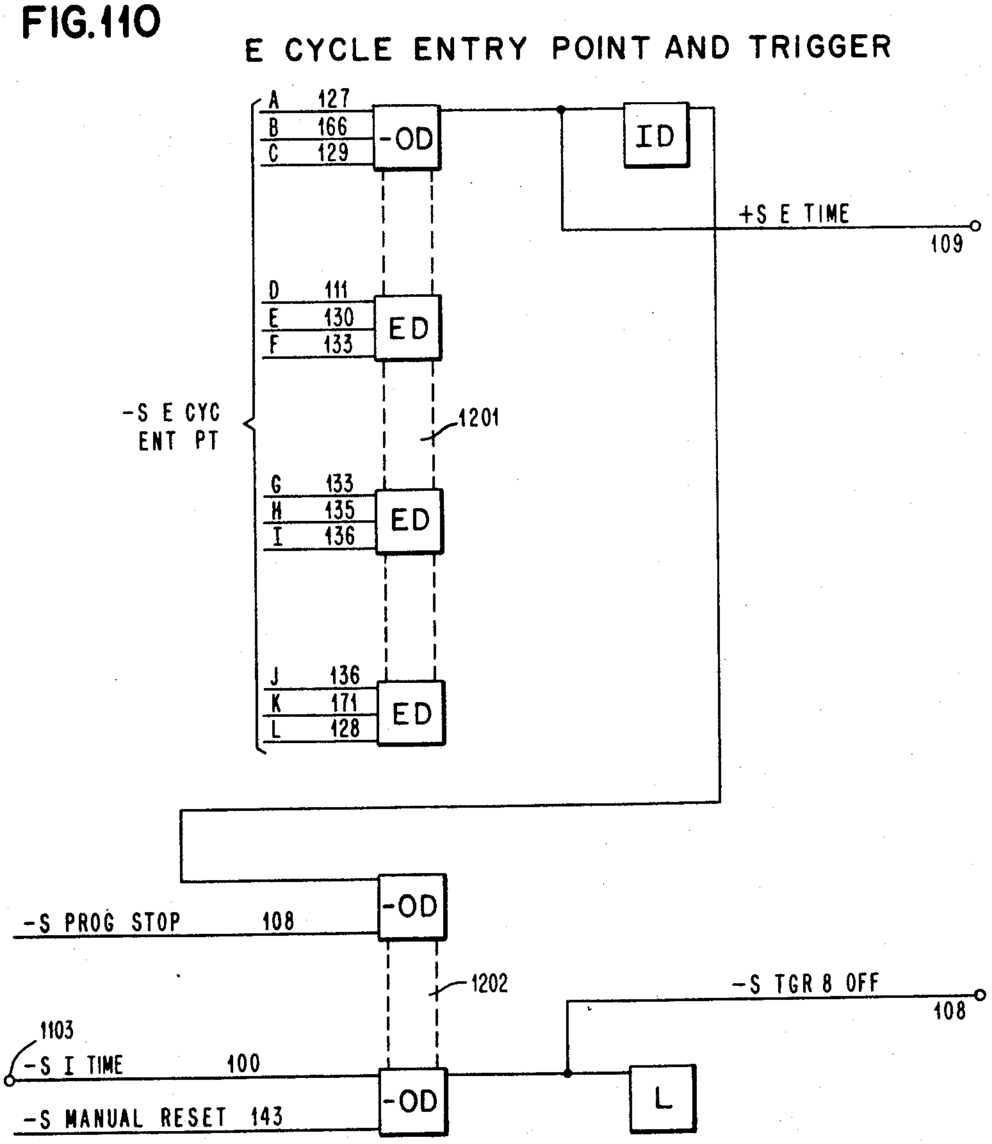

FIG. 110 illustrates the E-cycle entry point and trigger. Extended -OD-block 1201 accepts —S E CYC ENT PT functional signals from figures to be explained infra and provides a +S E TIME functional signal for conditioning the increment-decrement trigger in FIG. 109 to decrement. The +S E TIME signal, inverted to —S, sets trigger 1202, which when set provides the functional signal —S TGR 8 OFF to end the I-time dummy cycle.

Figure 111:
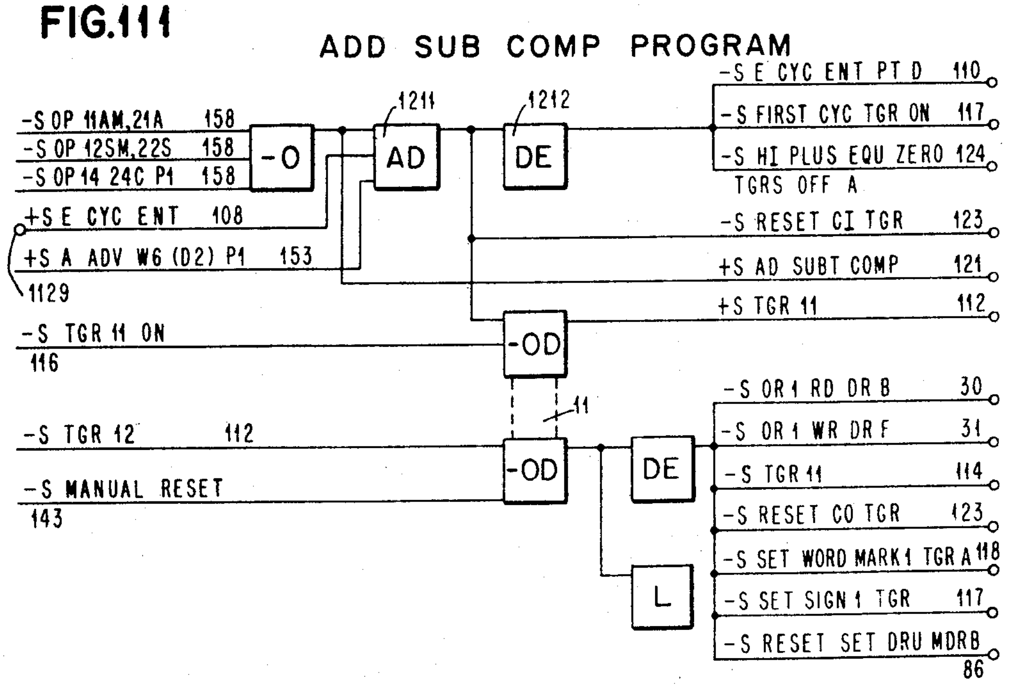

FIG. 111 illustrates in detail the circuits to carry out the function of block 541 in FIG. 7, namely, read addend digit. Trigger 11 defines the step and produces a +S TGR 11 pulse to advance the program to trigger 12 on the next cycle. The off side of trigger 11 produces —S functional signals OR 1 RD DR B, OR 1 WR DR F, TGR 11, RESET CO TGR, SET WORD MARK 1 TGR, SET SIGN 1 TGR and RESET SET DRU MDRB. Functionally trigger 11 is effective to produce its program step 1 during addition, to turn off program step 4 trigger 14 (FIG. 114) and to advance the program to trigger 12 in FIG. 112. Trigger 11 is normally reset as trigger 12 comes on.

Figure 112:
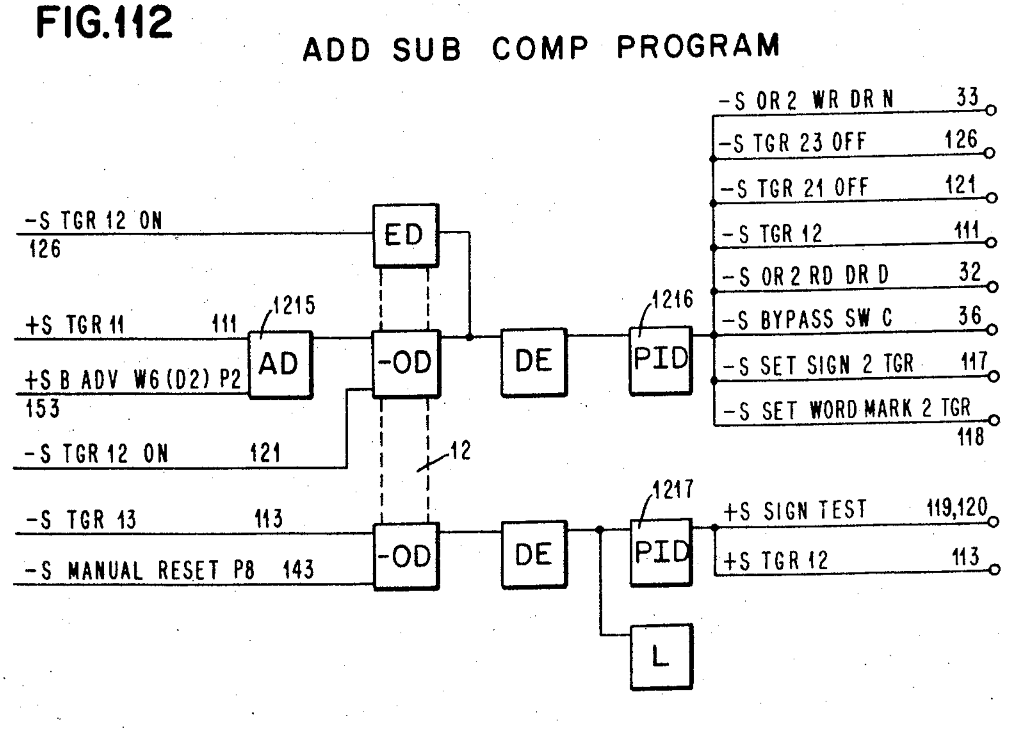

FIG. 112 illustrates program step 2 of the add-subtract compare program which centers around trigger 12. The circuit illustrates in detail block 542 of FIG. 7, which has the function of producing the augend digit. Trigger 12 produces the following —S functional signals: OR 2 WR DR N, TGR 23 OFF, TGR 21 OFF, TGR 12, OR 2 RD DR D, BYPASS SW C, SET SIGN 2 TGR and SET WORK MARK 2 TGR. It produces +S functional signals SIGN TEST and TGR 12. Step 2 of the add program accomplishes the read augend digit function. On the low order digit of the operand, its —S SET SIGN TGR functional signal provides for testing the flag to determine the sign of the augend. The —S SET WORD MARK 2 TGR functional signal allows it, on subsequent digits of the augend, to watch for the word mark flag.

Figure 113:
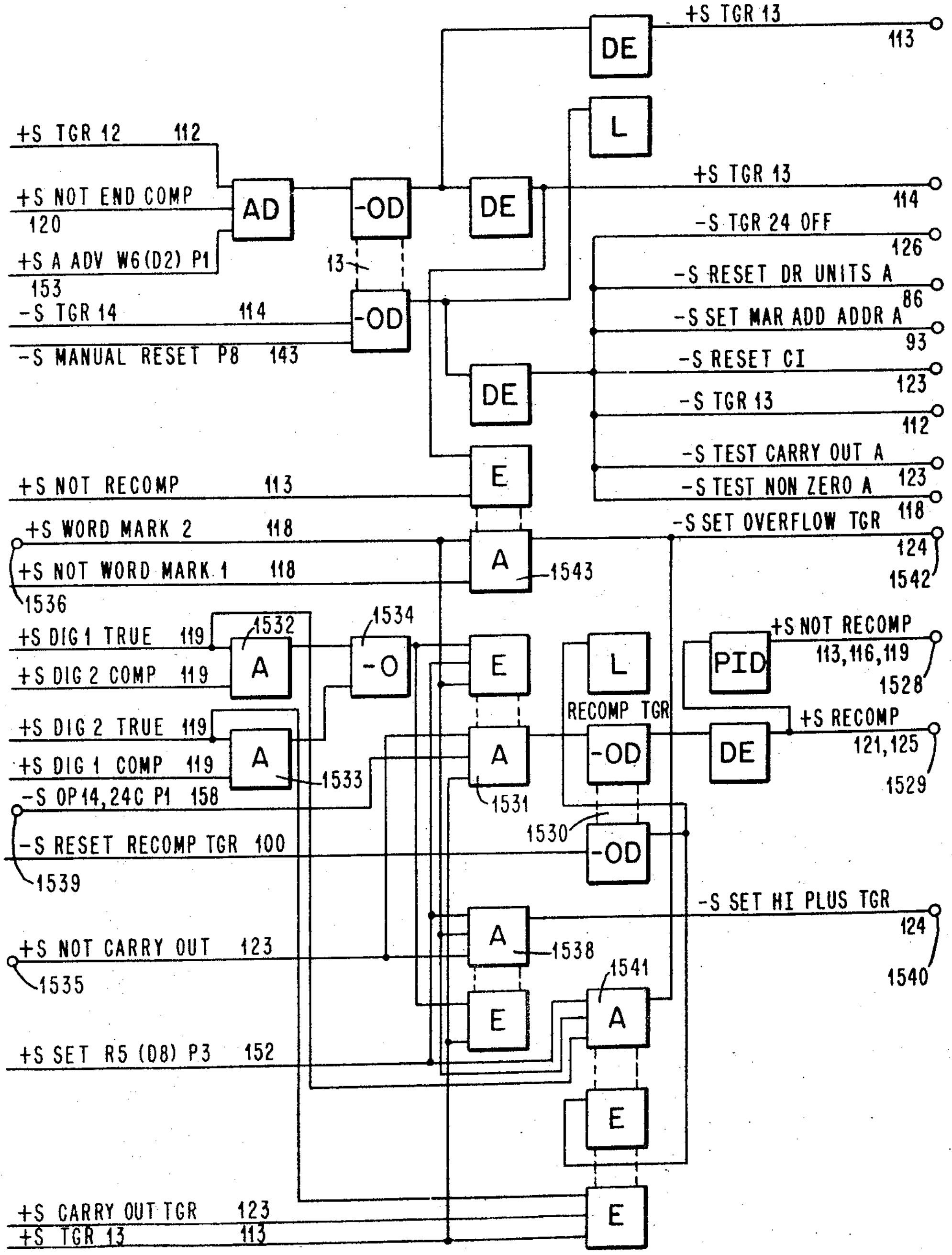

FIG. 113 illustrates in detail step 3 of the add-subtract compare program, which centers around trigger 13, and corresponds to block 543 of FIG. 7. The lower half of FIG. 113 illustrates recomplement circuit which are to be explained infra. Trigger 13 is set at a gating time depending on the previous setting of trigger 12 and is reset on the following cycle when trigger 14 is set. Trigger 13 produces a +S TGR 13 signal and the following —S functional signals: TGR 24 OFF, RESET DR UNITS A, SET MAR ADD ADDR, RESET CI trigger, TGR 13, TEST CARRY OUT A and TEST NON-ZERO A. The —S set MAR ADD ADDR A functional signal is effective to read the add table to produce the sum of the digits being added.

FIG. 114 illustrates program step 4 of the add-subtract compare program, which centers around trigger 14 and corresponds to block 544 in FIG. 7. Trigger 14 produces the following —S functional signals: TRANS CO TO CIA (carry out to carry in) OR 2 RD DR E and OR 2 WR DR O. It produces +S functional signal TGR 14 and, when gated with the compare signal in A-block 583, produces a —S RD Y PT B signal.

FIG. 115 illustrates add-subtract compare flag control. A —S functional signal SET F BIT A is produced at terminal 585 upon coincidence at A-block 586 of the following +S functional signals: TGR 14, FIRST CYC TGR, the +S complement of —S OP 14, 24 C, and the +S output of -O-block 587 which is conditioned by either the +S DIG 2 TRUE or NOT SIGN 2 TGR PLUS signals. A-block 586 is effective to set the F bit in the units position of the sum or difference in situations where the sum or difference may be minus. A-block 588, which has identical inputs except that the output of -O-block 587 is inverted by I-block 581, produces a —S CLEAR F BIT functional signal to clear the units position F bit in the sum in situations where the sum or difference must always be positive. A-block 590 produces a —S set F bit functional signal upon coincidence of +S functional signals WORD MARK 2, NOT TGR 21, TGR 14 and the +S complement of the —S OP 14, 24 C signal which is available continuously except during compare operations. This —S SET F BIT functional signal is effective to produce the word mark in the sum at the high order digit. A-block 591 produces a —S CLEAR F BIT functional signal during all periods of addition and subtraction programs except the high and low order digits, upon coincidence of +S functional signals NOT FIRST CYC TGR, NOT WORD MARK 2, TGR 14 and the +S not condition of the —S OP 14, 24 C signal.

Since the flag is used for multiple purposes, housekeeping becomes very important. There are various arithmetic schemes in which the sign of the arithmetic operation result is predicted to be either minus or plus. The prediction of the preferred embodiment is that all arithmetic results which are negative or which may be either negative or positive are predicted to be negative. Sign control will be more completely described in connection with FIG. 117 infra.

Figure 116:
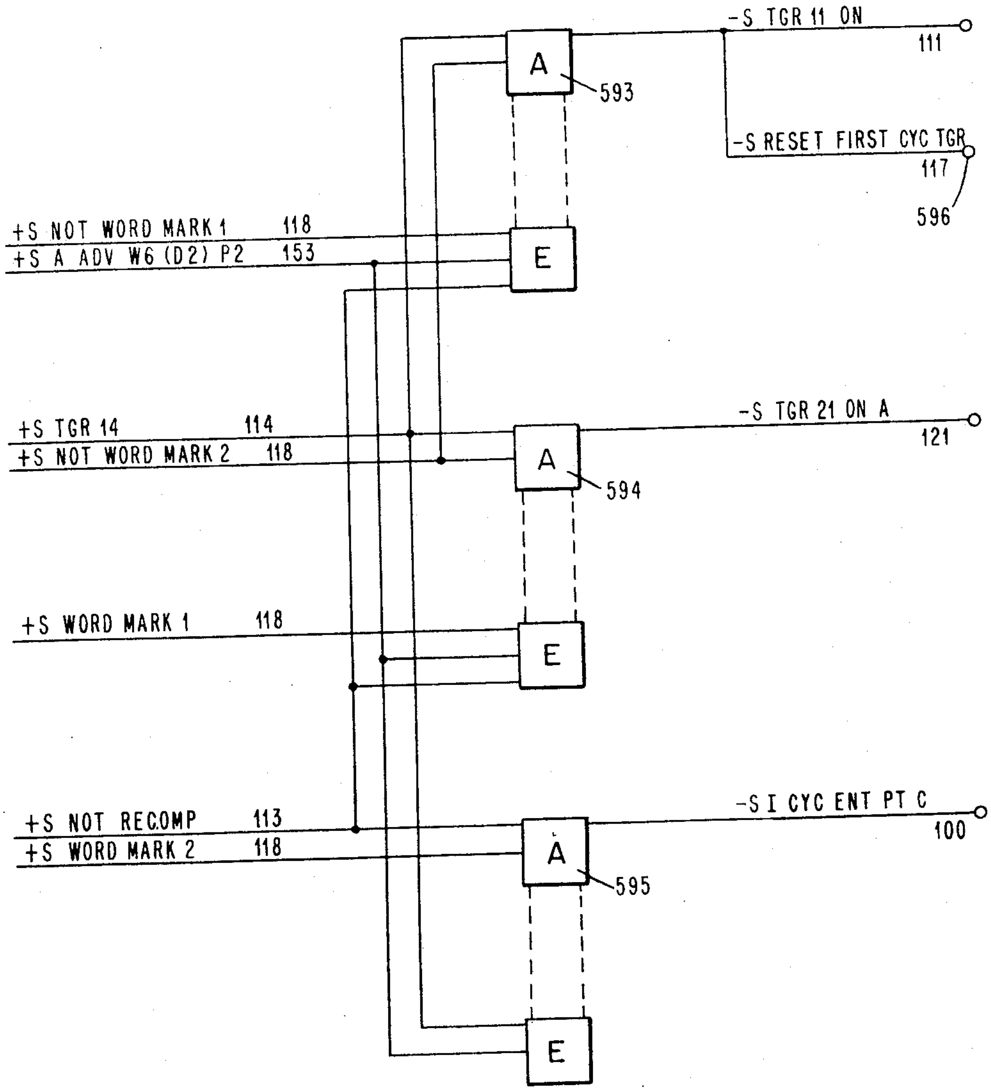

FIG. 116 illustrates add-subtract compare end control, which corresponds to block 545, LOOPER in FIG. 7. Programming rules call for the augend field being at least 2 digits long and containing a number of digit positions capable of holding the result of the arithmetic operation. For example, for safe addition of a two digit addend and four digit augend, a five digit augend field should be allowed to provide for carries. Accordingly, the operation is determined to be at an end when the augend digit word mark is sensed. A-block 593 provides for the outside loop, addend digit augend digit, and carry of FIG. 7 by providing a —S functional signal TGR 11 ON which sets add program step number 1 trigger 11 in FIG. 111. Trigger 11 controls circuits for producing the next order addend digit. A-block 593 is conditioned upon coincident conditioning of inputs with +S functional signals NOT WORD MARK 1, A ADV W6(D2), NOT RECOMP, TGR 14 and NOT WORD MARK 2. The —S output of A-block 593 is also available via terminal 596 to reset the first cycle trigger shown as block 531 in functional block diagram FIG. 6 and in detail infra at FIG. 117.

A-block 594 produces a —S functional signal TGR 21 ON A which controls the inside loop "augend digit and carry" of FIG. 7, eliminating add step 1 after the addend is exhausted. A-block 594 is conditioned upon coincidence of +S functional signals TGR 14, NOT WORD MARK 2, WORD MARK 1, A ADV W6(D2) and NOT RECOMP.

A-block 595 produces the —S I CYC ENT PT functional signal which ends addition by causing entry into the succeeding I-cycle. A-block 595 is conditioned by coincident +S functional signals NOT RECOMP, WORD MARK 2, A ADV W6(D2) and TGR 14.

Figure 117:
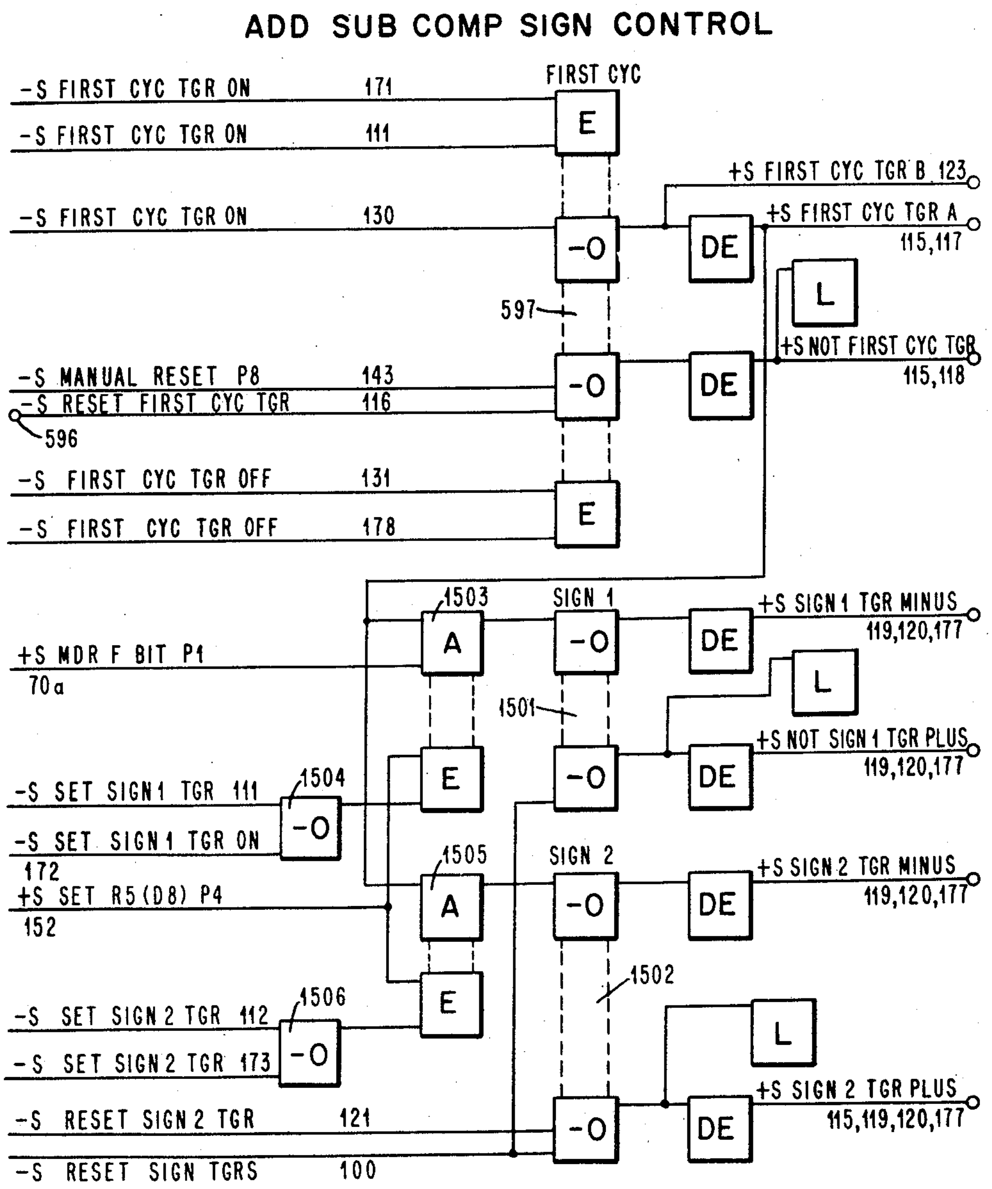

FIG. 117 illustrates add-subtract compare sign control. First cycle trigger 597 is set at the end of I-time from circuits in FIG. 111 and produces +S FIRST CYC TGR functional signals until reset by a reset pulse such as a —S RESET FIRST CYC TGR functional signal at terminal 596. This is produced by the add-subtract compare end control circuit FIG. 116 as the first digit addition is completed during add. The first cycle trigger controls sign 1 trigger 1501 and sign 2 trigger 1502 which determine the positive or negative character of the operands by scanning the flag during the first cycle. The sign triggers produce +S sign functional signals when set, and +S not sign functional signals when reset. Sign 1 trigger 1501 is settable upon conditioning of A-block 1503 by coincidence of +S functional signals FIRST CYC TGR, MDR F BIT, SET R5(D8) and the +S functional output of –O-block 1504 which is responsive to —S functional signals SET SIGN 1 TGR from FIGS. 111 and 172. The —S SET SIGN 1 TGR signal is available from FIG. 111 during add-subtract compare program stage 1 cycles, during which the addend digit is brought out. Accordingly, if the flag appears in the lower order addend digit, the sign 1 trigger is effective during the entire add operation. Sign 2 trigger 1505 is reset at start of I-time and is set by the first cycle trigger and a SET SIGN 2 TGR signal from FIG. 112 at –O-block 1506.

Figure 118:
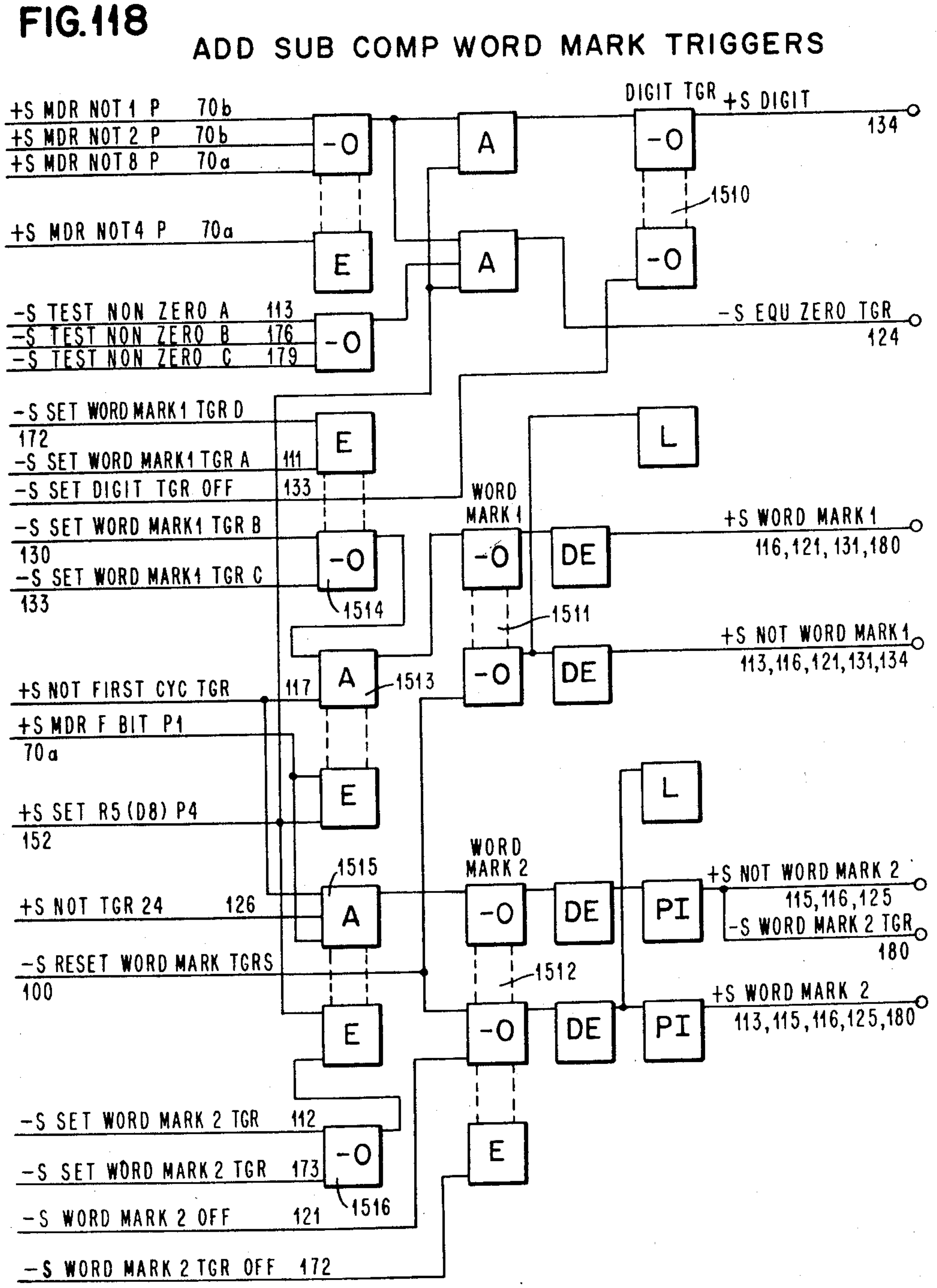

FIG. 118 shows add-subtract compare word mark triggers which correspond to blocks 529 and 530 in FIG. 6. Digit trigger 1510 is set at R5 time in any cycle where a 1, 2, 4 or 8 bit is present in MDR. Word mark 1 trigger 1511 produces +S WORD MARK 1 functional signals when set and +S NOT WORD MARK 1 functional signals when reset. A-block 1513 sets word mark 1 trigger 1511 at R5 time of cycles in which +S functional signals NOT FIRST CYC TGR, MDR F BIT and the output of –O-block 1514 are available. –O-block 1514 is conditionable by a —S SET WORD MARK 1 TGR signal from a variety of figures including the add program stage 1 circuit of FIG. 111. Word mark 2 trigger 1512 is similarly settable by A-block 1515 at R5 time of cycles in which +S functional signals NOT FIRST CYC TGR, NOT TGR 24, MDR F BIT, and the output of –O-block 1516 are available. –O-block 1516 is conditionable by —S SET WORD MARK TGR 2 functional signals from FIG. 173 or FIG. 112 during the add program. Word mark 1 trigger is set when operand 1 is at its high order digit as indicated by the flag; word mark 2 trigger similarly is set when operand 2 high order digit is available, as indicated by its flag bit.

Figure 119:
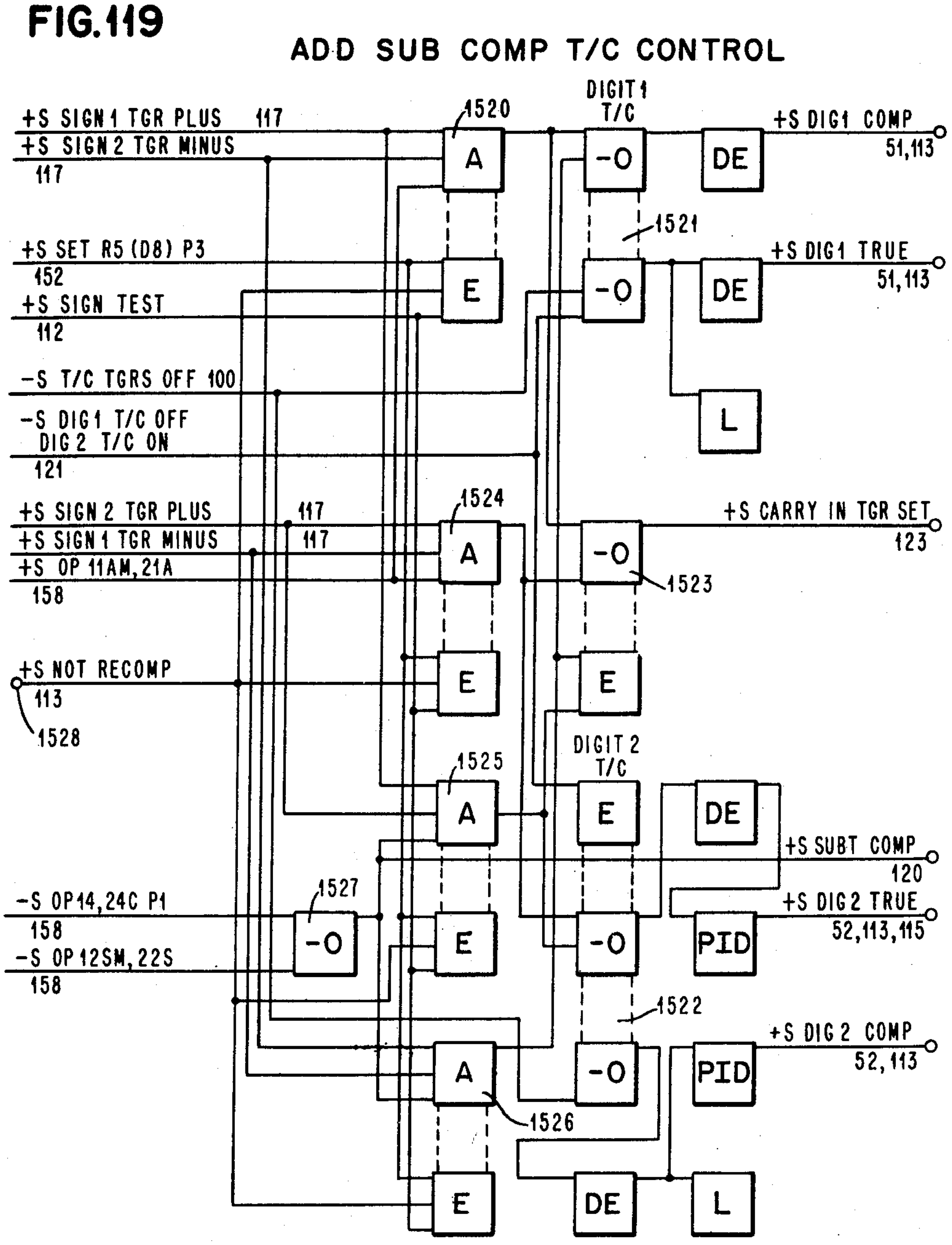

FIG. 119 illustrates add-substract compare true complement control triggers 1521 and 1522. Digit 1 true complement trigger 1521 is normally reset to true to produce the +S DIG 1 TRUE functional signal. A —S functional signal T/C TGRS OFF from FIG. 100 resets the true complement triggers during I-time. A-block 1520 is conditioned for setting digit number 1 true complement trigger to "complement" upon coincidence of functional signals +S SIGN 1 TGR PLUS, SIGN 2 TGR MINUS, OP 11 AM, 21 A, and SIGN TEST. The SIGN TEST functional signal is available from FIG. 122 during the add-subtract compare program stage 2, according to the signal control scheme outlined briefly supra in column 20, lines 70–75, and column 21, lines 1–4. The addend digit is complemented when the addend sign is plus and when the augend sign is minus during addition. A minus sign flag is forced into the units sum digit predicting a negative sum. Should the absolute value of the augend be greater than that of the addend, the sum is negative and the minus sign remains. Carry out of the high order indicates this condition; if there is no carry out of the high order, recomplementing is required.

In situations where the sum may be negative, the minus sign flag is predicted and an end-around-carry is added to the units order during program step 3 of the units order add program. –O-block 1523 accordingly produces +S CARRY IN TGR SET signals whenever conditioned by —S output of any one of four A-blocks 1520, 1524, 1525 or 1526. A-block 1520 is conditionable, as previously explained, upon coincidence of +S SIGN 1 TGR PLUS and SIGN 2 TGR MINUS. A-block 1524 is conditioned upon coincidence of +S functional signals SIGN 2 TGR PLUS and SIGN 1 TGR MINUS. –O-block 1527 produces a +S subtract-compare functional signal which is applied to A-blocks 1525 and 1526. A-block 1525 includes +S inputs SIGN 1 TGR PLUS and SIGN 2 TGR PLUS as well as the subtract input from –O-block 1527; its output is effective to set digit 2 true complement trigger 1522 to complement and to condition –O-block 1523 to produce the +S CARRY IN TGR set signal. A-block 1526 is conditionable by +S functional signals SIGN 2 TGR MINUS and SIGN 1 TGR MINUS; its output conditions –O-block 1523 but does not affect digit 2 true complement trigger 1522 which has been reset to true and is expected to remain at true. The entire FIG. 119 circuit is generally shut down during recomplementing cycles, since the +S NOT RECOMP functional signal is not available at terminal 1528.

Recomplement control is made effective by circuits in FIG. 113 surrounding recomp trigger 1530 which produces a +S NOT RECOMP signal at terminal 1528, or, when set, a +S RECOMP signal at terminal 1529. As previously pointed out, recomplementing is required when the negative result is predicted but does not materialize, since the sum is set up to be negative, having had the end around carry introduced in the units order together with the minus sign flag. A-block 1531 (FIG.

113) is conditioned upon coincidence of the prerequisites of a recomplementing cycle, generally the different signs of operands during addition. A-block 1532 is conditioned by coincident +S signals DIGIT 1 TRUE and DIGIT 2 COMP; A-block 1533 is conditioned by coincident +S functional signals DIG 2 TRUE and DIG 1 COMP; the output of either A-block 1532 or 1533, when conditioned, conditions -O-block 1534 to provide A-block 1531 with an input signifying that recomplementing may be necessary. A +S NOT CARRY OUT signal applied at terminal 1535 fulfills the conditions for recomplement, i.e., possibility of recomplementing and failure to carry out of the high order. A +S functional signal at terminal 1536, WORD MARK 2 and +S signals TGR 13 and SET R5(D8) complete the timing and conditioning coincident signals necessary to set recomp trigger 1530. A-block 1531 is disabled during compare operations by the —S OP 14, 24 C functional signal at terminal 1539; otherwise A-block 1538 has inputs identical to A-block 1531. A-block 1538 therefore during compare operations produces, when there is no carry out, a —S functional signal SET HIGH PLUS TGR at terminal 1540.

A-block 1541 produces a —S SET OVERFLOW TGR functional signal at terminal 1542 upon coincidence of +S functional signals SET R5(B8), WORD MARK 2, DIGIT 1 TRUE, NOT RECOMP, DIG 2 TRUE, CARRY OUT TGR and TGR 13. There should be no carry out during operations where recomplementing is not a possibility, such as where both digits are being added true. Another overflow situation is provided for by A-block 1543 which produces the —S SET OVERFLOW TGR functional signal at terminal 1542 upon coincidence of +S functional signals WORD MARK 1, WORD MARK 2, NOT RECOMP and TGR 13. There should be no table lookup addition step performed after the recognition of both WORD MARKS.

Figure 120:
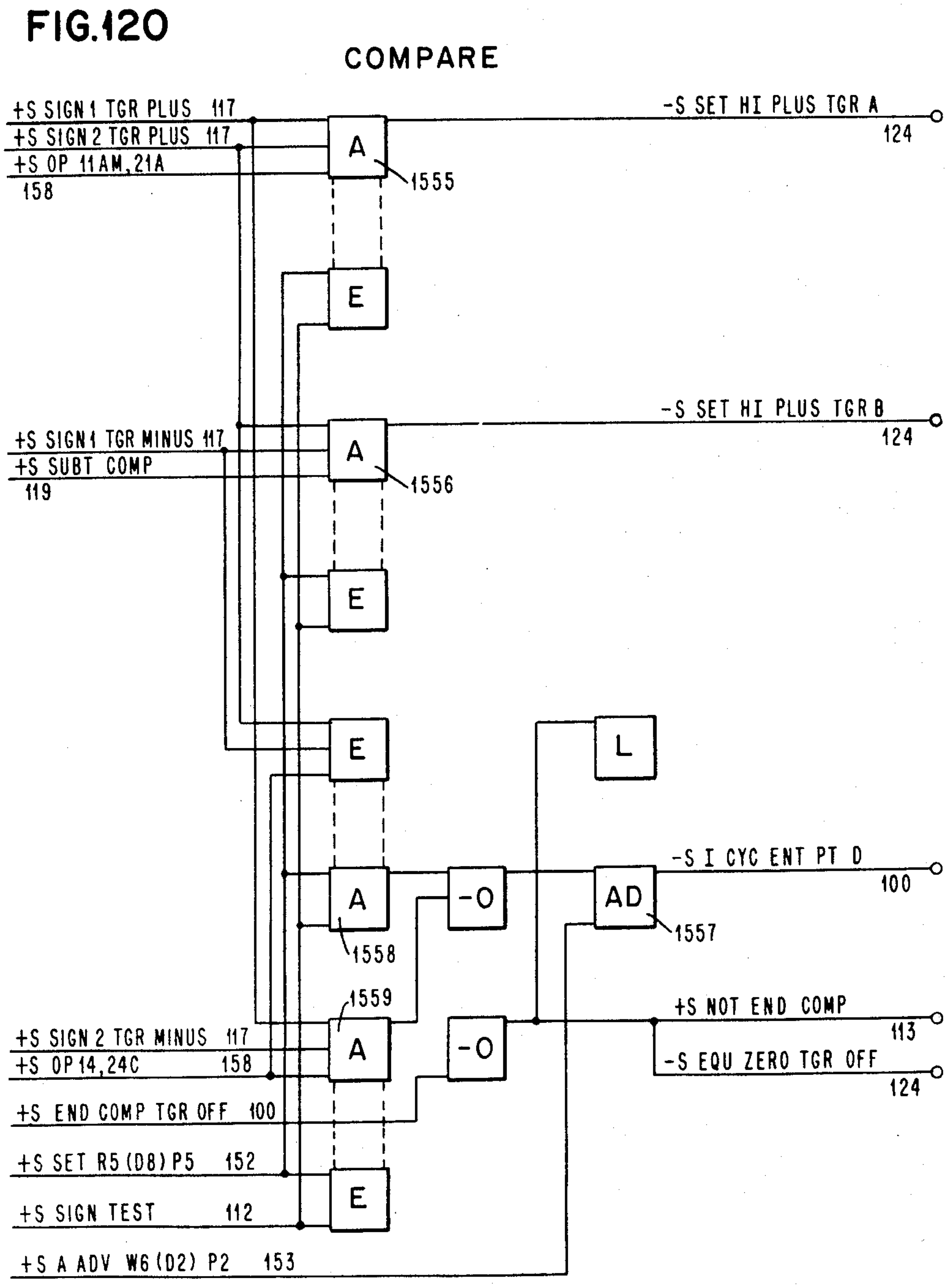

FIG. 120 illustrates compare AND circuits which operate to set (or fail to set) the high plus trigger in FIG. 124. A-block 1555 sets the high plus trigger upon coincidence of +S signals SIGN 1 TGR PLUS, SIGN 2 TGR PLUS, OP 11 AM, 21 A, SIGN TEST and a timing signal. A-block 1556 sets the high plus trigger when +S inputs SIGN 2 TGR PLUS and SIGN 1 TGR MINUS are available during subtraction.

AD-block 1557 produces a —S I CYC ENT PT signal during compare operations by testing A-block 1558 for SIGN 2 TGR PLUS and SIGN 1 TGR MINUS, and A-block 1559 for SIGN 1 TGR PLUS and SIGN 2 TGR MINUS. Compare operations thus are terminated quickly when signs differ.

Figure 121:
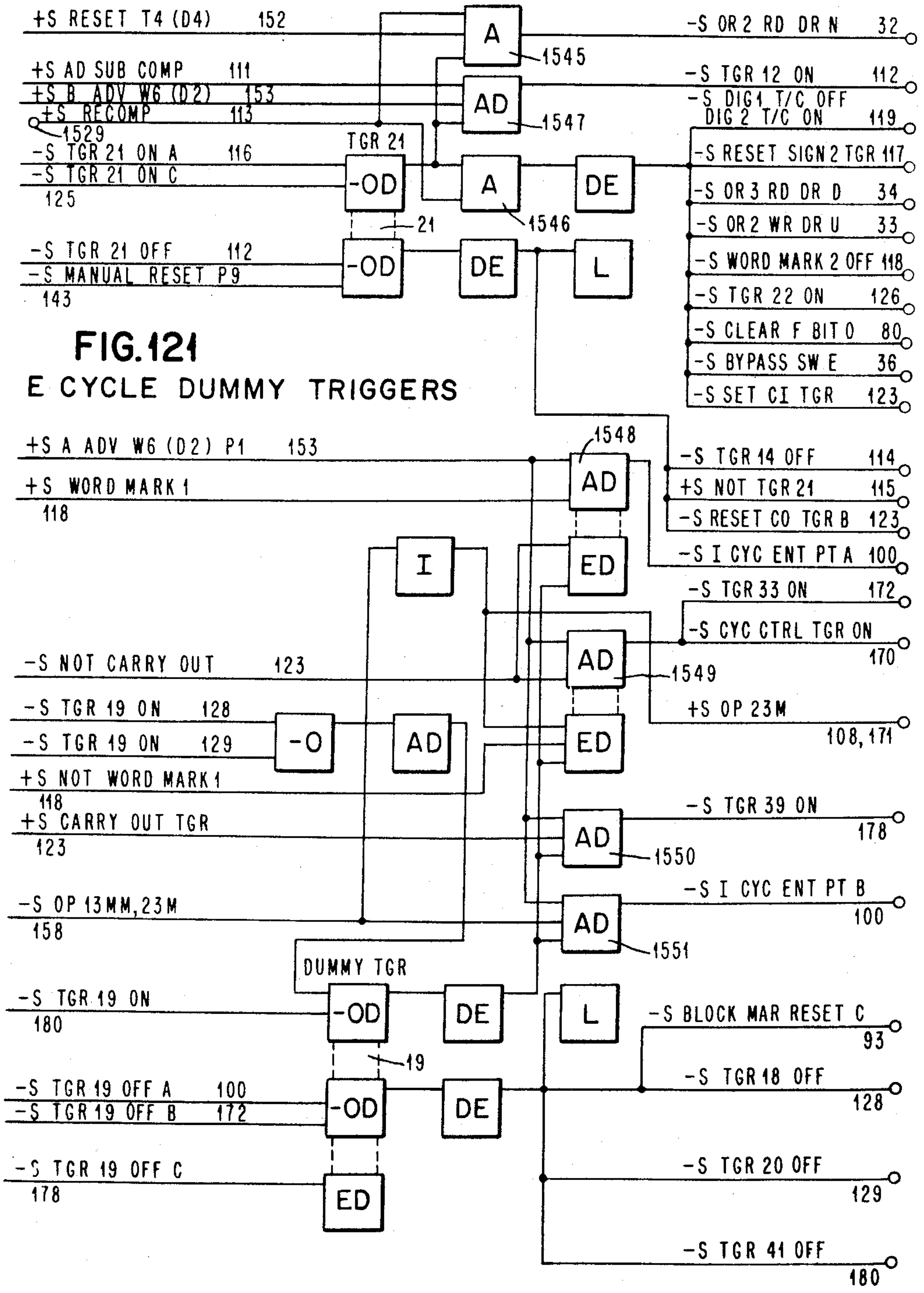

FIG. 121 illustrates E-cycle dummy triggers and their associated circuits. Trigger 21 is set by a —S TGR 21 ON A signal from FIG. 116 at the end of add-subtract and compare programs to condition A-blocks 1545 and 1546 and AD-block 1547. Trigger 21 thus produces —S functional signals OR 2 RD DR N DIG 1 T/C OFF, DIGIT 2 T/C ON, RESET SIGN 2 TGR, OR 3 RD DR, OR 2 WR DR, WORD MARK 2 OFF, TGR 22 ON, CLEAR F BIT, BYPASS SW and SET CI TGR. AD-block 1547 produces a —S functional signal TGR 12 ON to return the add program to step 2, after the addend word mark has been recognized but prior to recognition of the augend word mark, to produce the augend digit and carry loop of FIG. 7, which ignores add step 1.

Dummy trigger 19 is settable by any one of several —S TGR 19 ON signals which are produced in higher number figures to be explained in detail infra. When trigger 19 is set, AD-blocks such as 1548 produce —S functional signals to control housekeeping functions at the end of an E-cycle and set up the succeeding I-cycle. AD-block 1548, for example, is conditioned upon coincidence of +S functional signals A ADV W6(D2), WORD MARK 1, NOT CARRY OUT and TGR 19 to produce the —S functional signal I-cycle entry point A. Other AD-blocks 1549, 1550 and 1551 are conditioned by dummy trigger 19 to provide housekeeping and I-cycle entry point signals during the multiply operation to be explained in detail infra. The dummy trigger is resettable by a number of —S functional signals TGR 19 OFF; when reset it produces —S functional signals BLOCK MAR RESET, TGR 18 OFF, TGR 20 OFF and TGR 41 OFF.

FIG. 122 illustrates record mark trigger 1597 and its associated circuits. The record mark in the preferred embodiment is the 8 bit-2 bit-C bit special character. It is used to indicate the end of an input-output record, generally from tape. Accordingly, A-block 1598 conditions the record mark trigger upon coincidence of +S inputs MDR 2 BIT, MDR 8 BIT, a timing signal and the output of -O-block 1599 which is conditioned by a —S DECODE RECORD MARK signal from one of several figures to be explained infra.

FIG. 123 illustrates add-subtract compare carry control which centers around carry in trigger 1560 and carry out trigger 1561. Carry in trigger 1560, when conditioned, produces via an inverter connected to its off side a +S CARRY IN signal which passes to FIG. 87 to alter the augent digit as it passes to MAR to set up for the table lookup. A-block 1562 is conditioned by +S CARRY IN TGR SET signal from the add-subtract compare true complement control circuit and a +S FIRST CYCLE TGR signal to set the carry in trigger to introduce the end around carry during negative result prediction additions. A-block 1563 via -O-block 1564 sets the carry in trigger from a —S TRANS CO to CI (transfer carry out to carry in) functional signal which occurs on add program step 4, if carry out trigger 1561 is set. This adds the carry to the augend digit during addition of the next higher order digits of an addition, in response to the sensing of the carry flag during the low order table lookup. The carry in trigger is reset on program step 3 of addition via A-block 1565 and -O-block 1566; carry out trigger 1561 is set upon coincidence at A-block 1567 of +S functional signals including MDR F BIT, a timing signal and TEST CARRY OUT. Functionally, carry out trigger 1561 is set when the carry flag in the add table is sensed. The carry out trigger is reset upon add program step 1 cycles and at certain other appropriate times by —S functional signal RESET CO TGR.

FIG. 124 illustrates overflow, high plus, and equal zero triggers 1568, 1569 and 1570 respectively. Each of these triggers is settable by a —S set signal and, once set, produces a continuous +S functional signal until reset. These triggers are generally used to control branching operations on the particular test condition.

Figure 125:
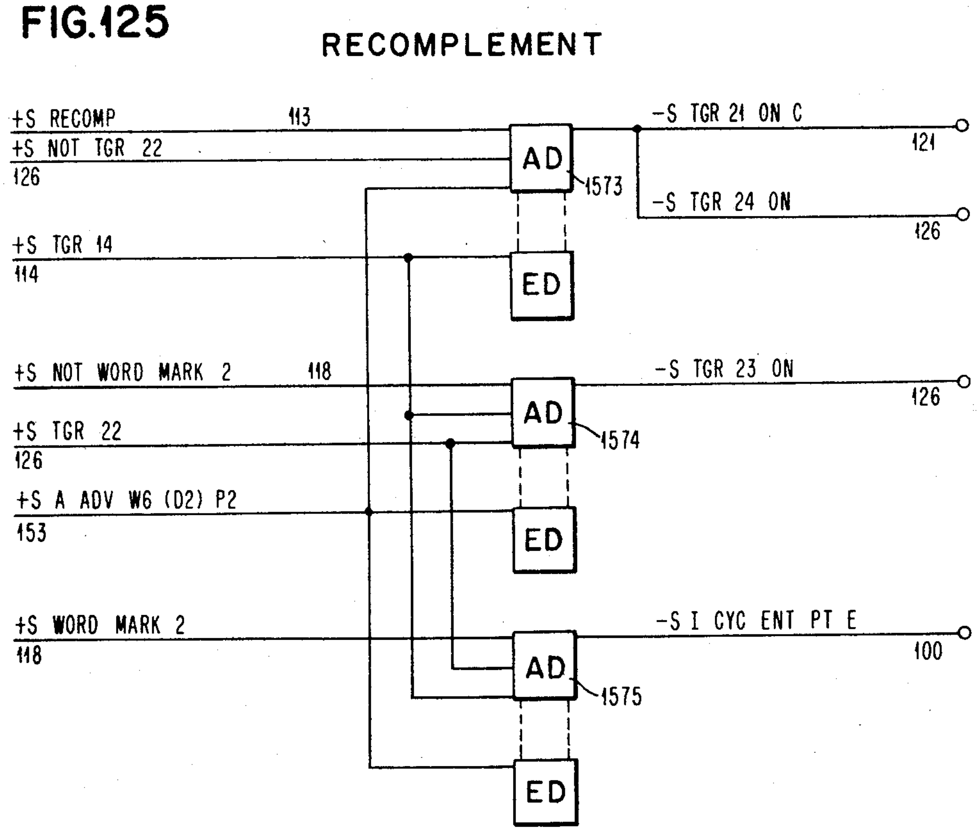

FIG. 125 illustrates recomplement control circuits including AD-blocks 1573, 1574 and 1575. AD-block 1573 is effective to set triggers 21 and 24 upon coincidence of +S functional signals RECOMP, NOT TGR 22, A ADV W6(D2) and TGR 14. AD-block 1574 produces a —S signal to set trigger 23 upon coincidence of gating signal W6, NOT WORD MARK 2, TGR 22 and TGR 14. AD-block 1575 produces a —S I-CYC ENT PT E signal upon coincidence of signals W6, WORD MARK 2, TGR 22 and TGR 14.

FIG. 126 illustrates recomplement program triggers 22, 23 and 24. Trigger 22 starts the recomplement program; trigger 23 shifts control to add program trigger 12; and trigger 24, set on as recomplementing begins, conditions A-block 1515 (FIG. 118) to set the word mark 2 trigger when the high order digit is reached.

Recomplementing is essentially the same as the ordinary complement add program from which it springs. Sign control causes complementing of the complement sum (word 2 or augend).

During the dummy cycle preceding recomplement, AD-block 1547 (FIG. 121) produces a —S TGR 12 ON signal. A-block 1546 produces —S functional signals RESET SIGN 2 TGR, OR 3 RD DR, OR 2 WR DR, WORD MARK 2 OFF, TGR 22 ON, CLEAR F BIT, BYPASS SW and SET CI TGR. OR2 is set to the address of the complement sum, the minus sign flag removed, the prerecomplementing housekeeping done, and the recomplement program entered. Thereafter the complement sum digits are extracted per OR2, complemented to form a table address with the carry, extracted from the table and stored per OR2 until the high order is recognized and the I-cycle entered.

FIG. 127 illustrates the branch and transmit BT program which enters around triggers 15 and 16. The branch and transmit instruction causes an unconditional branch to the P-addressed instruction; transmits the Q-field to the (P–1)-field; and saves the address of the next instruction. AD-block 1577 sets trigger 15 and enters an E-cycle upon coincidence of +S A ADV W6, OP 17, BTN, 27 BT, and E-CYC ENT PT. Trigger 15 produces via AD-block 1578 a —S IR 2 RD DR A signal and via AD-block 1579 sets trigger 16. The off side of trigger 15 produces —S functional signals IR 1 RD DR B, IR 2 WR DR A and BYPASS SW P. Trigger 15 thus causes IR1 to be read out to IR2. Trigger 16 is set upon coincidence at AD-block 1579 of a trigger 15 on +S signal and a W6 timing signal to produce via intervening AND circuits suitably gated —S functional signals OR 2 RD DR K, IR 1 WR DR B, BYPASS SW A, OR 2 WR DR and TGR 26 ON. Trigger 16 thus sets IR1 with the "branch to" address from OR2 and sets trigger 26. Trigger 26, which controls transmit programs, is shown in FIG. 130.

Figure 128:
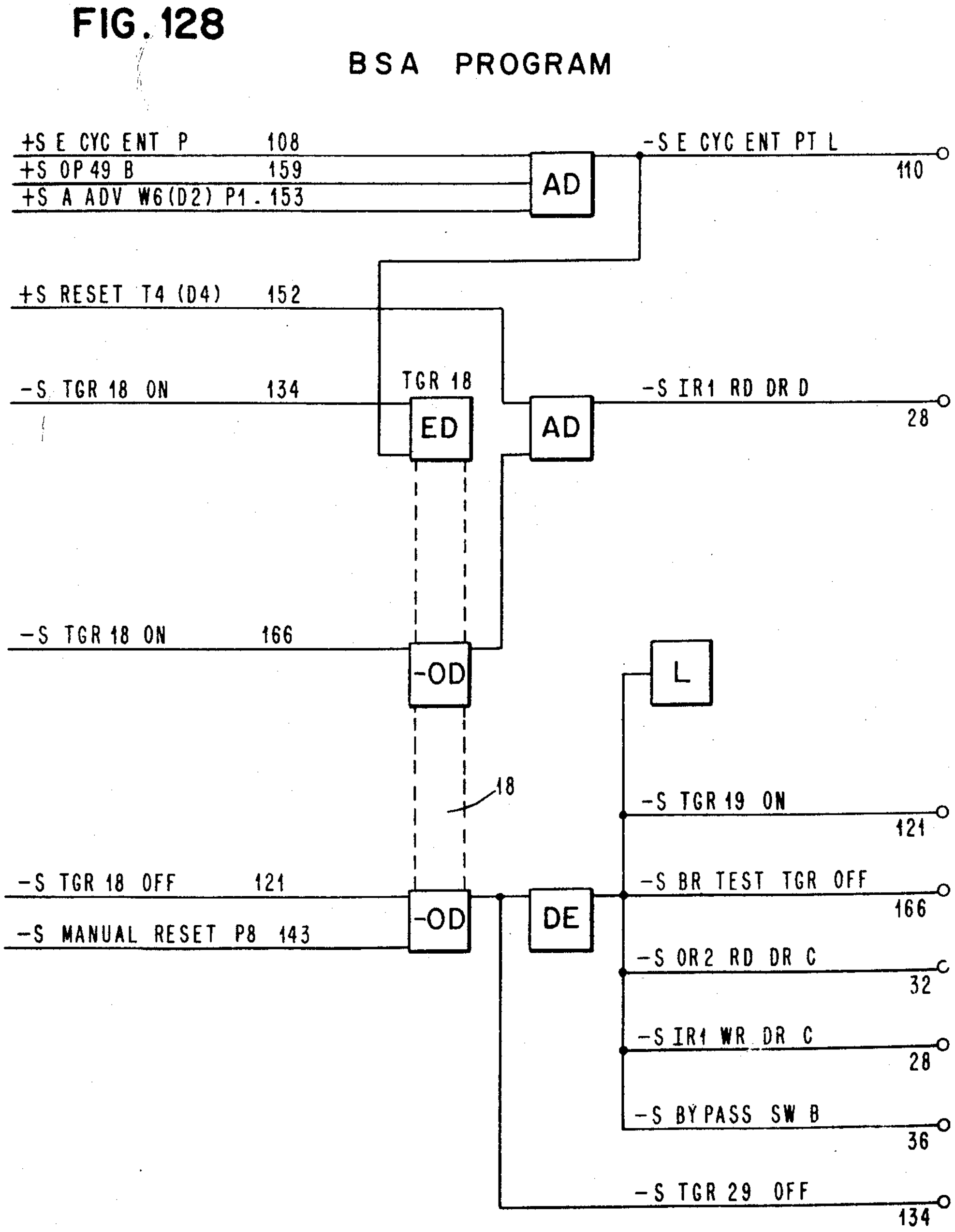

FIG. 128 illustrates BSA program trigger 18, which with its associated circuits is effective to branch saving the address of the instruction. Trigger 18 produces a timed —S IR 1 RD DR D signal and —S signals TGR 19, ON, BR TEST TGR OFF, OR 2 RD DR C, IR 1 WR DR C, BYPASS SW B and TGR 29 OFF.

Figure 129:
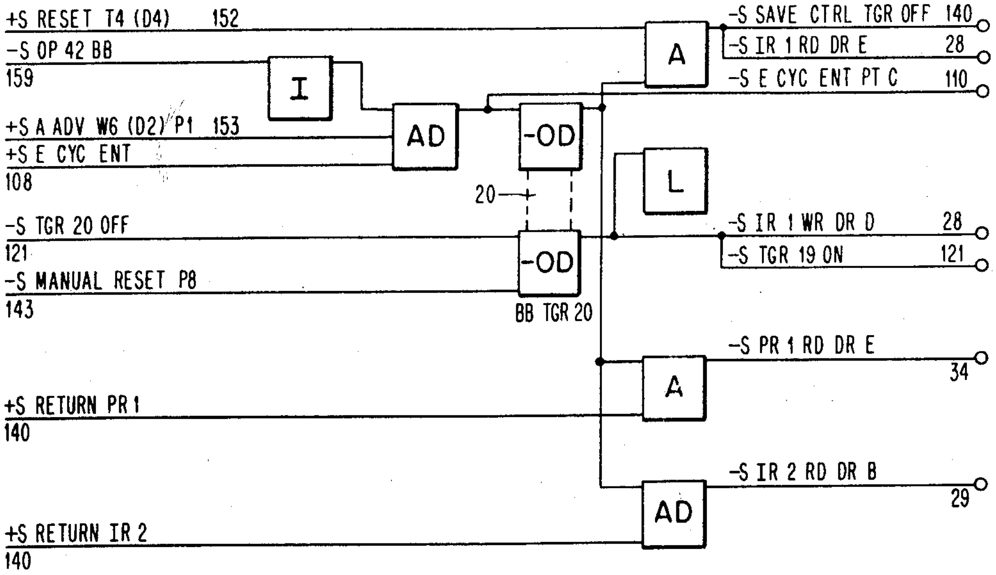

FIG. 129 illustrates the branch back BB program trigger 20 and its associated circuits, which are effective to control an unconditional branch to an address previously stored in PR1.

Figure 130:
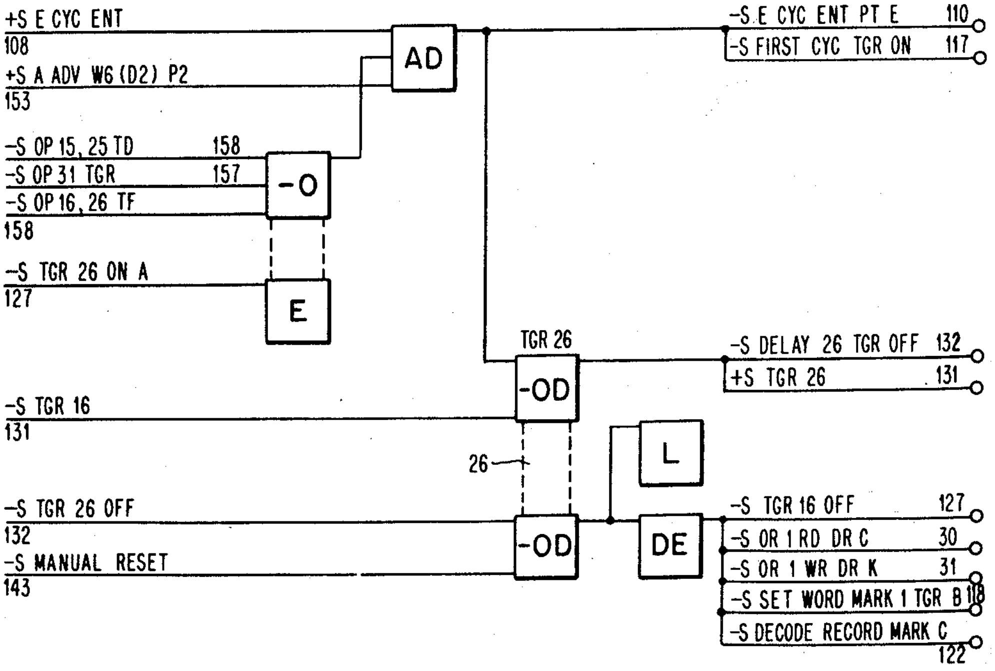

FIG. 130 illustrates transmit program trigger 26 and its associated circuits. Transmit trigger 26 is set upon recognition of the transmit program, controls reading of OR1 and sets up circuits to decode the record mark.

Figure 131:
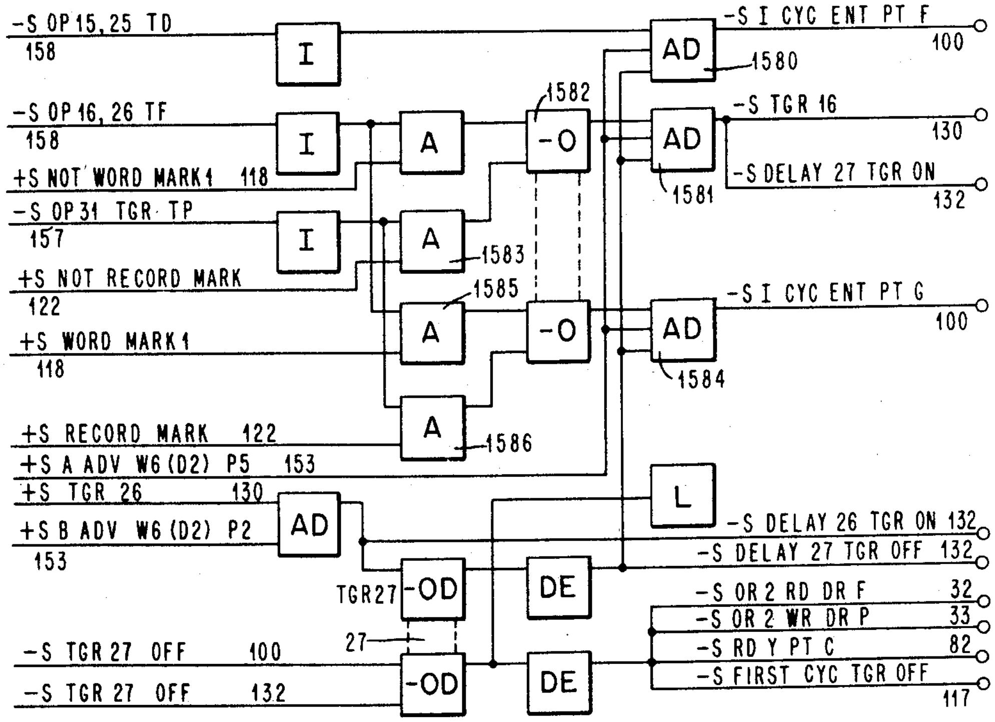

FIG. 131 illustrates transmit program trigger 27 and its associated circuits. Trigger 27 is turned on by a B ADV W6(D2) pulse together with a +S TGR 26 signal. There are various lengths of data groups which can be moved by the transmit program. For example, the —S OP 15, 25 RD (transmit digit) functional signal is inverted and applied to AD-block 1580. After a two step transmit program controlled by triggers 26 and 27, the +S ouput of trigger 27 is coincident with an A ADV pulse at AD-block 1580 to produce the —S I-CYC ENT PT F signal. The digit is transmitted in two memory reference periods.

To transmit a field the —S OP 16, 26 TF functional signal is inverted, ANDed with a +S NOT WORD MARK 1 signal and applied via an intervening OR circuit to AD-block 1581 to produce the —S DELAY 27 TGR ON and the —S TGR 26 on B functional signals. Accordingly, AD-block 1581 controls the starting of another two step transmit cycle. The transmit rhythm is also maintained via -O-block 1582 upon coincidence at A-block 1583 of a +S NOT RECORD MARK functional signal and the inverted —S OP 31 TGR signal during transmit record operations, where word marks are not significant. AD-block 1584 produces a —S I-CYC ENT PT G functional signal upon coincidence of the +S WORD MARK 1 signal with a +S transmit field signal at A-block 1585. A-block 1586 similarly produces via AD-block 1584 the I-cycle entry point signal upon concidence at A-block 1586 of +S functional signals RECORD MARK and the operation 31 trigger.

Figure 132:
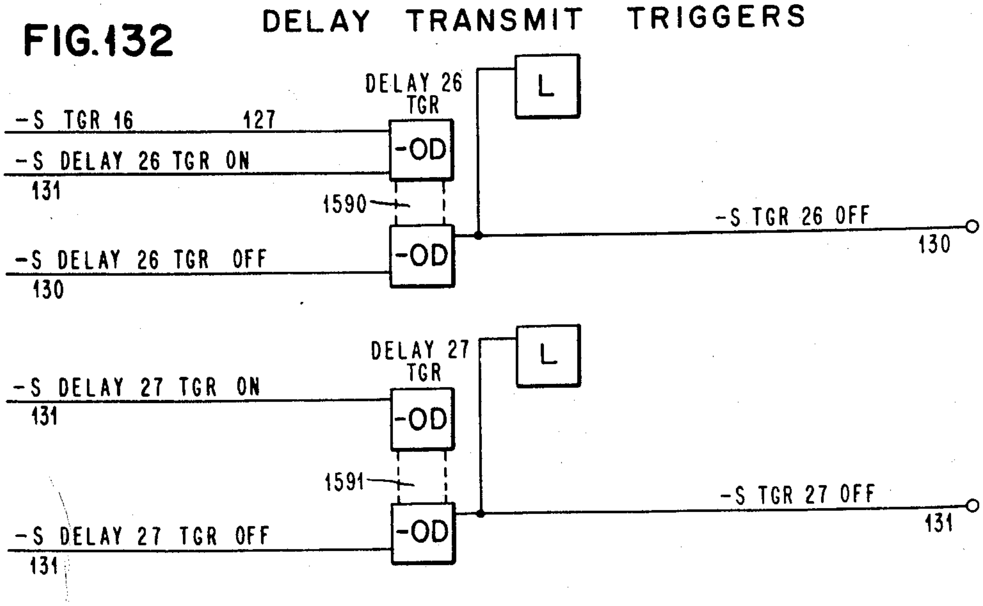

FIG. 132 illustrates delay transmit triggers Delay 26 trigger 1590 and Delay 27 trigger 1591. Trigger 1590 is turned on prior to the first transmit step by a —S trigger 16 signal or by a —S delay 26 trigger on signal. Trigger 1590 when on produces a —S trigger 26 off signal at trigger 26 (FIG. 130) to turn trigger 27 off (FIG. 131). When on, trigger 26 produces a —S delay 26 trigger off signal which turns Delay 26 trigger off in FIG. 132. The delay triggers 1590 and 1591 operate with their associated triggers 26 and 27 merely as an automatic delay. This delay synchronizes the computer with the relatively slower input/output devices.

Figure 133:
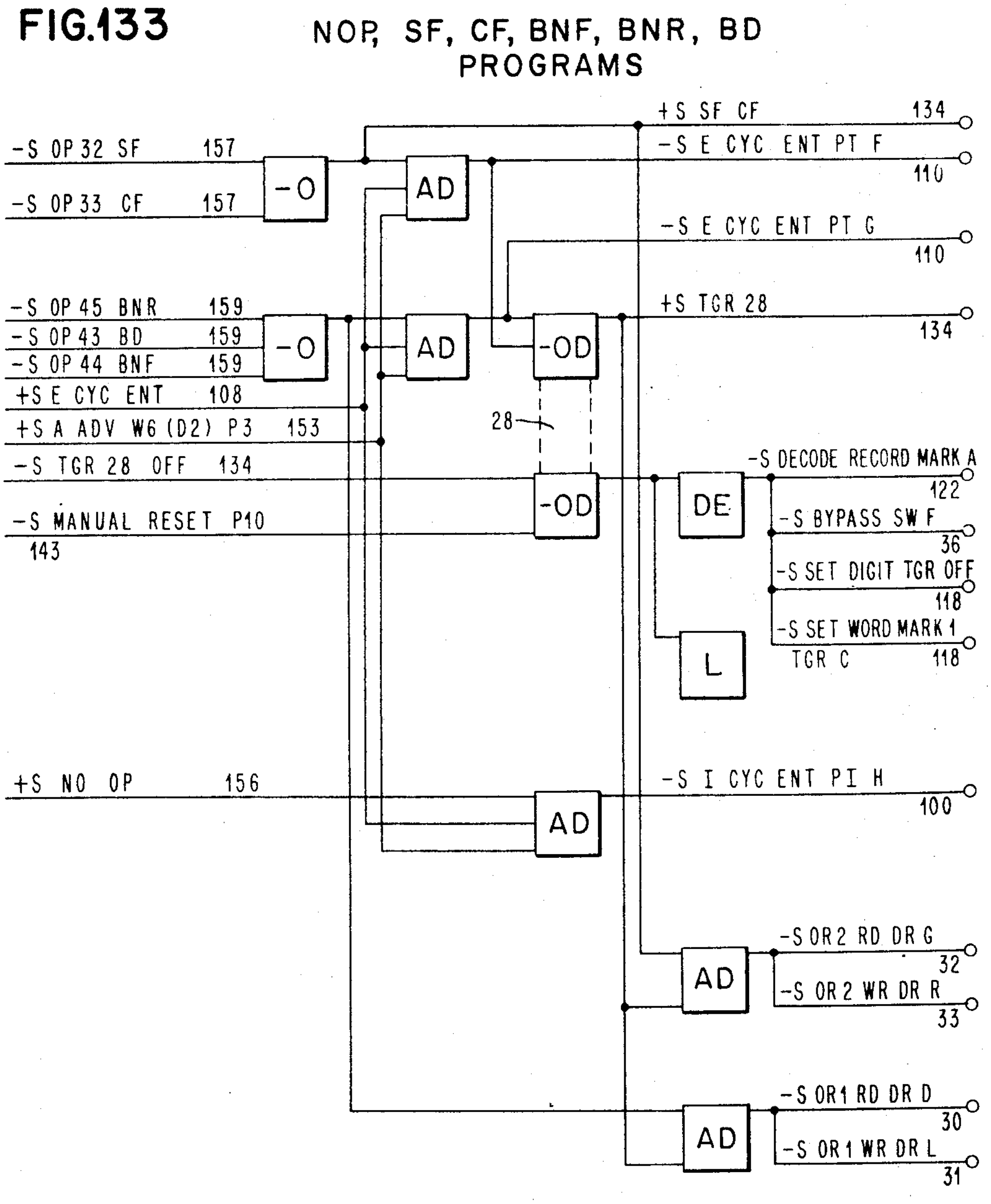

FIG. 133 illustrates NOP, SF, CF, BNF, BNR, and BD programs. The related instructions are no operation, set flag, clear flag, branch no flag, branch no record mark and branch on digit. Trigger 28 is set when any of the appropriate instruction is decoded; when set, it produces a +S TGR 28 signal and —S DECODE RECORD MARK A, BYPASS SW F, SET DIGIT TGR OFF and SET WORD MARK 1 TGR C.

Figure 134:
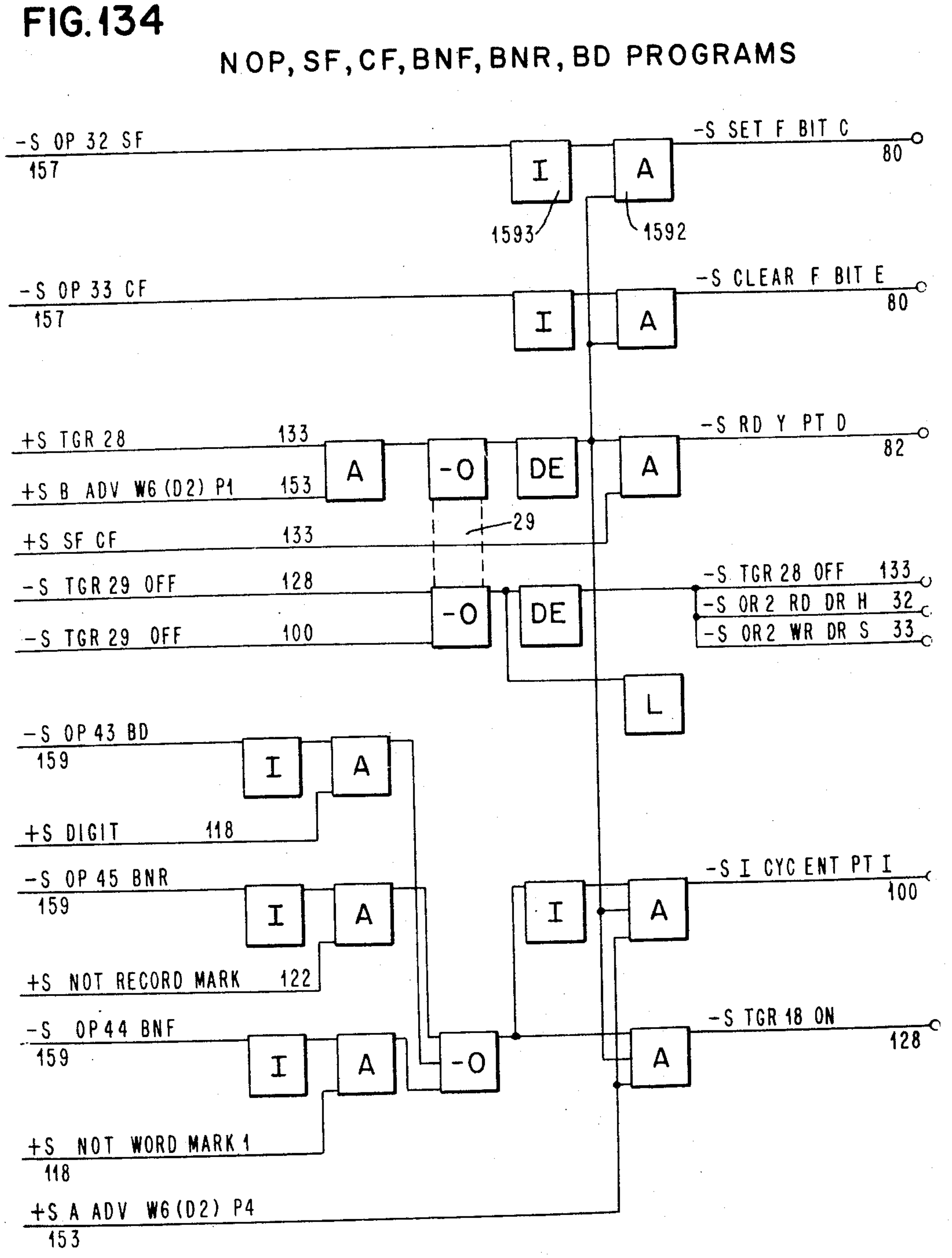

FIG. 134 illustrates the second part of NOP, SF, CF BNF, BNR, and BD programs. The circuit in FIG. 133 sets up to accomplish the necessary functions; the circuit in FIG. 134, centering around trigger 29, provides execution of the appropriate operation. For example, the output of trigger 29 is effective via A-block 1592 to produce the —S SET F BIT signal so long as the —S OP 32 SF functional signal is available via I-block 1593. Similar A-blocks produce —S signals CLEAR F BIT, RD Y PT, I-CYC ENT PT 1 and TGR 18 on whenever appropriate. The off side of trigger 29 produces, when trigger 29 is set, —S functional signals TGR 28 OFF, OR 2 RD DR H and OR 2 WR DR S. OR2 is therefore available to read out the appropriate address in memory upon which the operation is to be performed.

Figure 135:
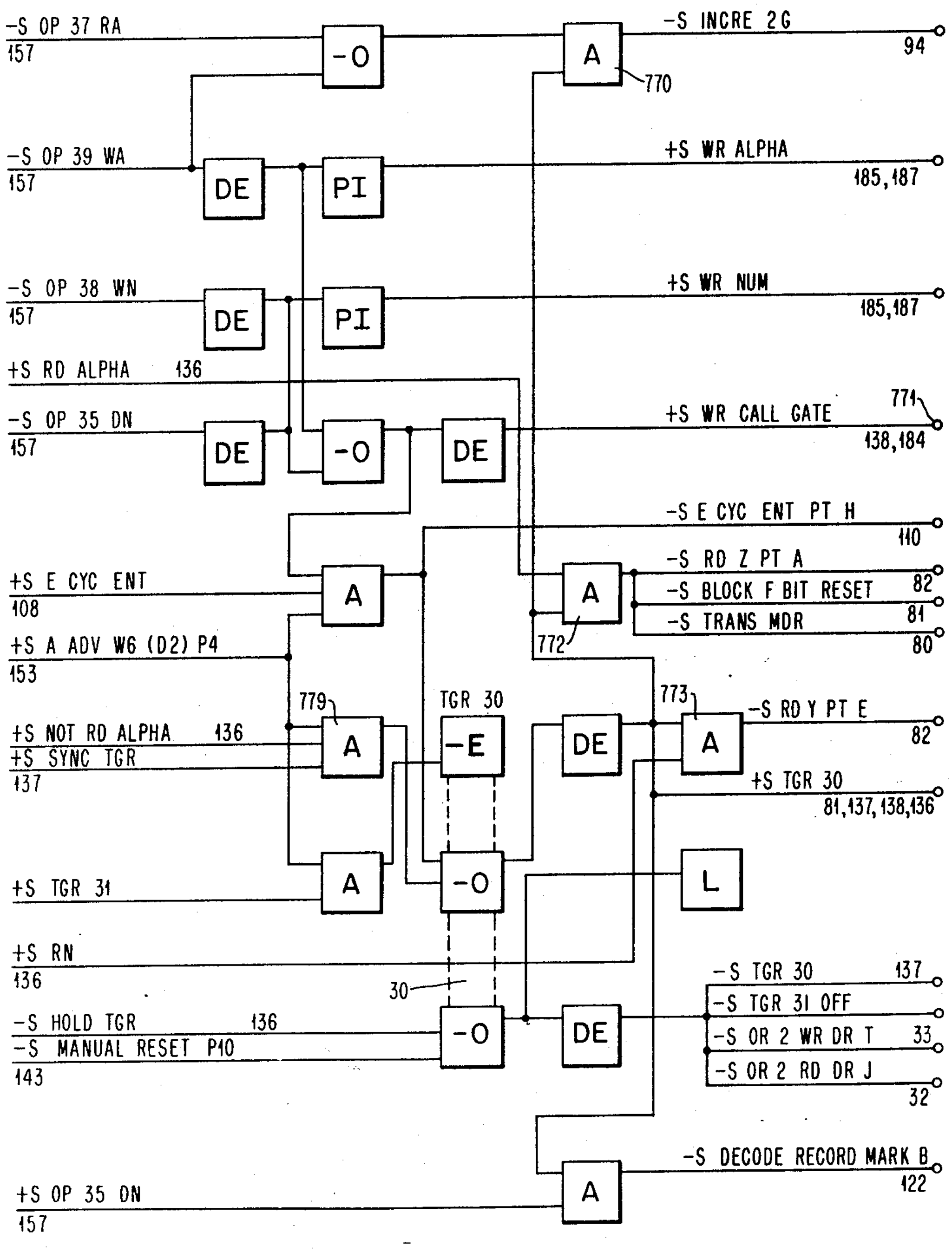

FIGS. 135–138 illustrate I/O control program circuits. Trigger 30, when set, produces via A-block 770 a —S INCRE 2 functional signal during alphameric operations, since two successive decimal digits are used to form one alphameric character. During writing operations WN, DN and WA, write numeric, dump numeric and write alphameric, a +S WRite CALL GATE functional signal is available at terminal 771 (FIG. 135, middle right). The "on" output of trigger 30 conditions A-block 772 to produce —S functional signals RD Z PT, BLOCK F BIT RESET and TRANS MDR. During the reading operation, A-block 773 produces the —S RD Y PT functional signal if trigger 30 is set. Trigger 30 also produces —S functional signals TGR 30, TGR 31 OFF, OR 2 WR DR and OR 2 RD DR. The circuit in FIG. 135 thus causes the machine to set up to decode the record mark, to enter an E-cycle and to address memory at the locations specified by OR2. The actual writing is performed during the E-cycle as explained in FIGS. 136 and following.

Figure 136:
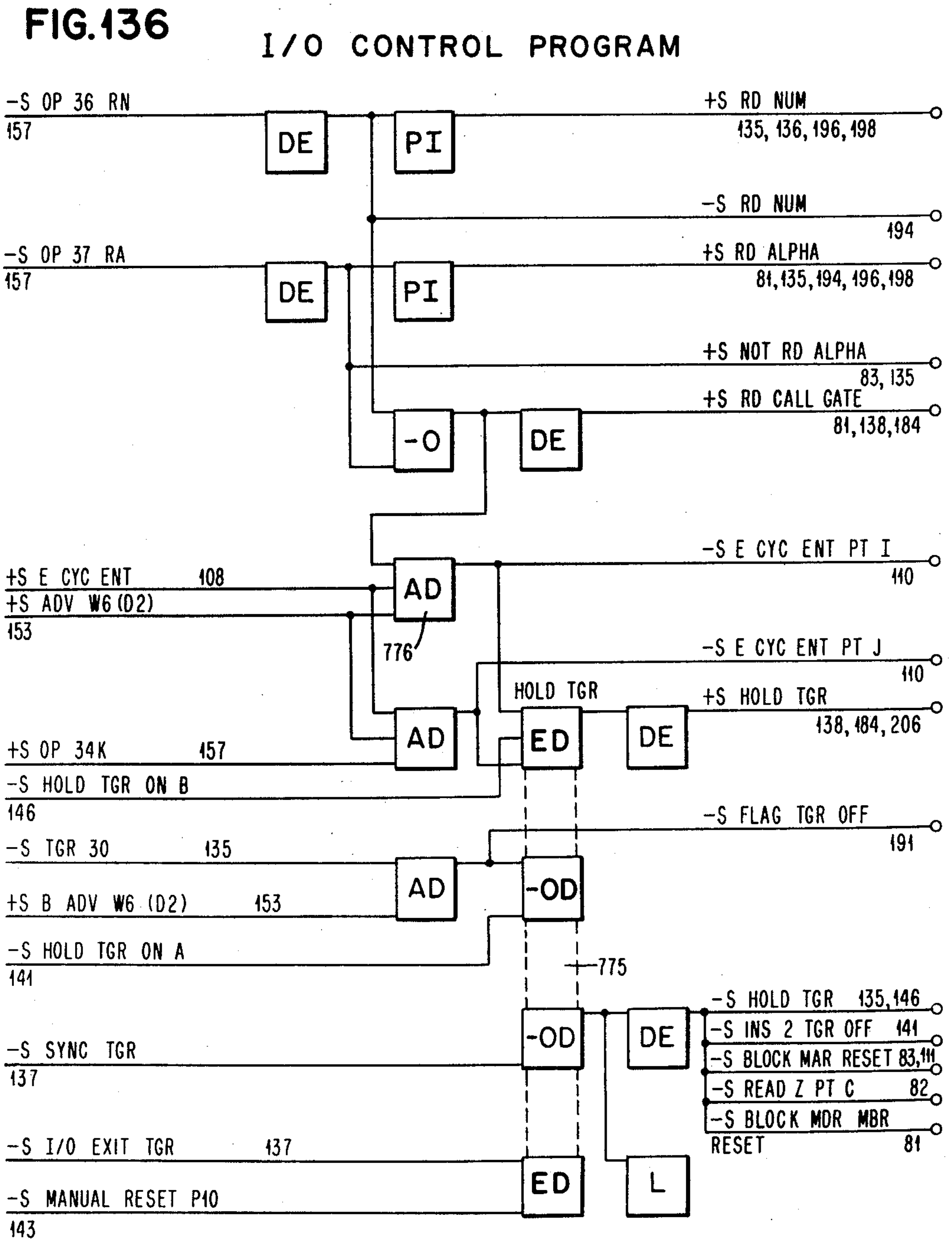

FIG. 136 illustrates I/O control program Hold trigger 775 and associated circuits. +S functional signals RD NUM, RD ALPHA, NOT RD ALPHA and RD CALL GATE as well as —S functional signals RD NUM, E-CYC ENT PT and FLAG TGR OFF are produced by input circuits. AD-block 776 sets the Hold trigger upon coincidence of +S functional signals indicating a read operation, E-cycle entry and advance W6(D2). When set, the hold trigger produces a +S HOLD TGR signal and —S functional signals HOLD TGR, INSERT 1 TGR OFF, BLOCK MAR RESET, RD Z PT and BLOCK MBR RESET. The Hold trigger thus holds up computer operation until the I/O equipment, which normally operates much more slowly than arithmetic operations, can be synchronized.

Figure 137:
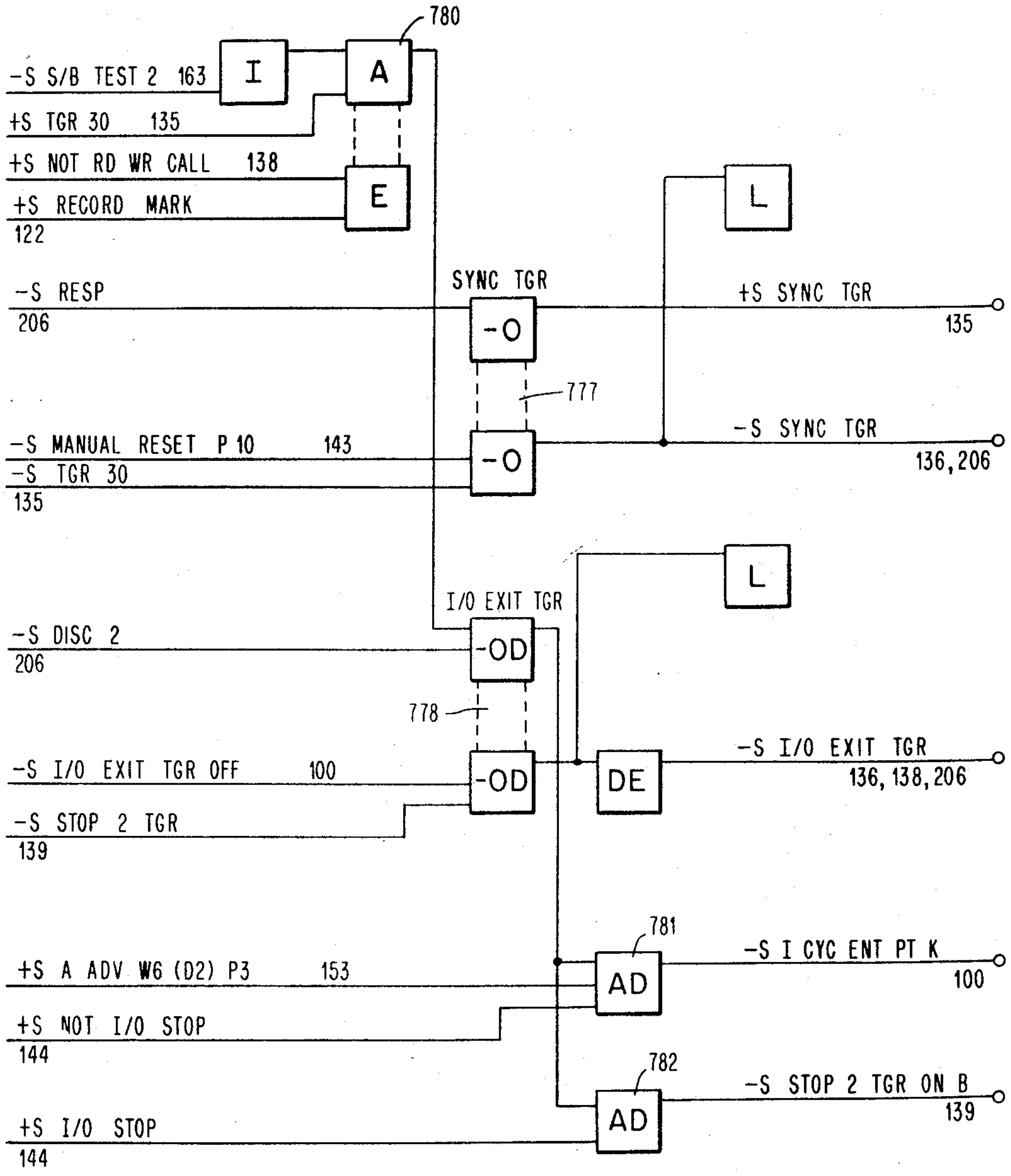

FIG. 137 illustrates the I/O control program Sync trigger 777 and I/O exit trigger 778. The Sync trigger, which synchronizes the computer with the I/O units, is set by a —S RESP signal from the I/O unit and produces +S and —S SYNC TGR signals. In FIG. 135, the +S SYNC signal at A-block 779 coincident with a gating signal and a NOT RD ALPHA signal sets trigger 30 for a memory reference cycle. (During Read Alphameric operations, other circuits are active.) I/O exit trigger 778

(FIG. 137) is set by a DISConnect signal from the I/O unit or by an output from A-block 780 to stop the I/O control program upon receipt of the record mark signal and the not read write call signal. I/O exit trigger 778 produces a —S I/O EXIT TGR functional signal and, via intervening AD-blocks 781 and 782, produces —S functional signals I-CYC ENT PT and STOP 2 TGR ON, according to whether a +S NOT I/O STOP or a +S I/O STOP signal is available. The exit trigger effectively controlls exit from the I/O program, either to a machine stop or to the next instruction in the stored program.

Figure 138:
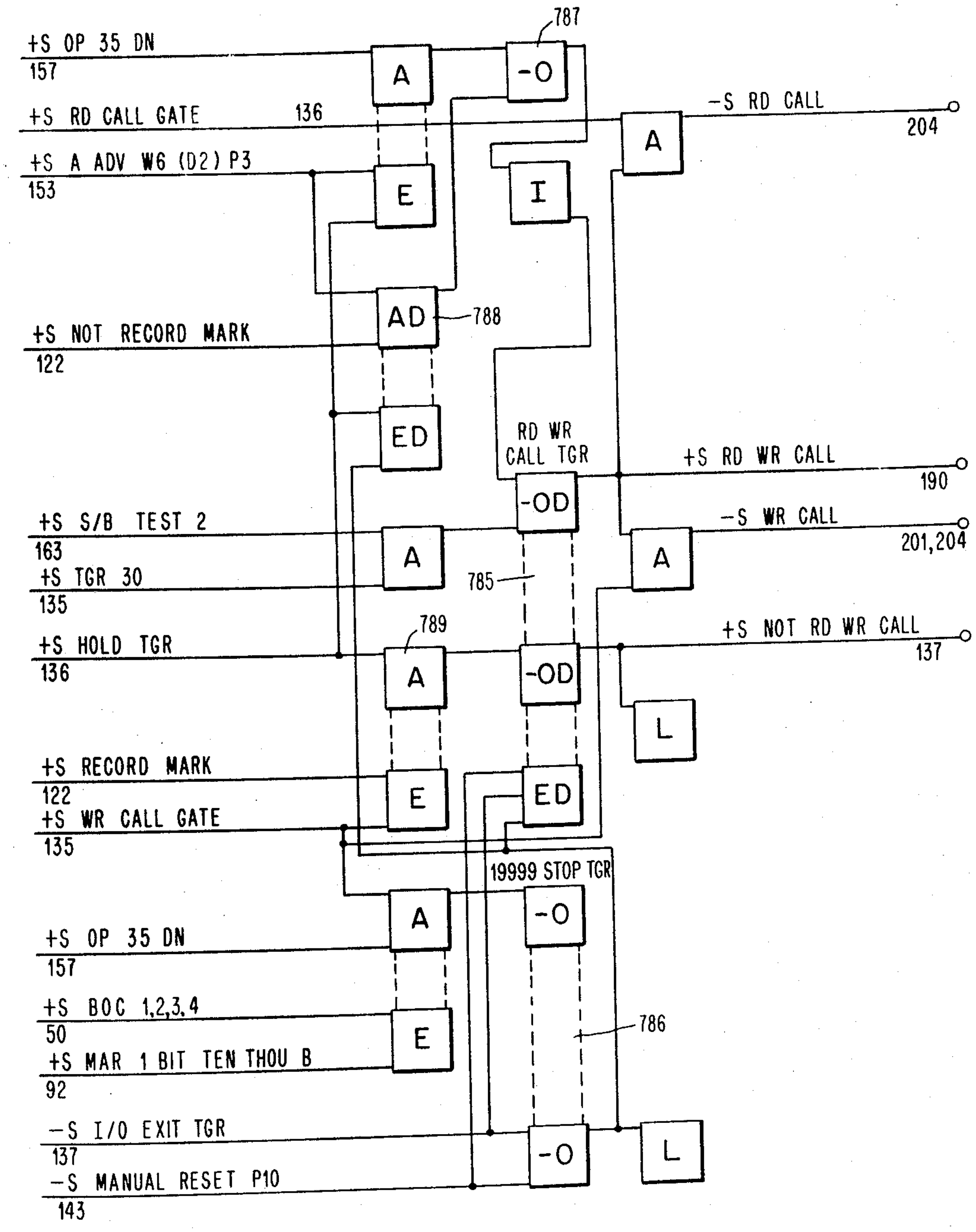

FIG. 138 illustrates I/O control program read write call trigger 785 and 19999 stop trigger 786. The call trigger requisitions an I/O device when required. The 19999 stop trigger prevents overrunning the memory capacity. -O-block 787 is conditioned upon coincidence at AD-block 788 of +S functional signals NOT RECORD MARK, HOLD TGR and the +S functional signal derived from the off side of 19999 stop trigger 786, to continue reading until either the record mark or the highest memory address is reached. Read write call trigger 785 is reset upon coincidence at A-block 789 of +S functional signals HOLD TGR, RECORD MARK and WR CALL GATE to reset the trigger. Call trigger 785 is also resettable by the 19999 stop trigger 786 —S on signal or by a —S I/O EXIT TGR or by a MANUAL RESET signal, any of which overrides the necessity of the read write operation. When reset, trigger 785 produces a +S NOT READ WRITE CALL signal.

Figure 139:
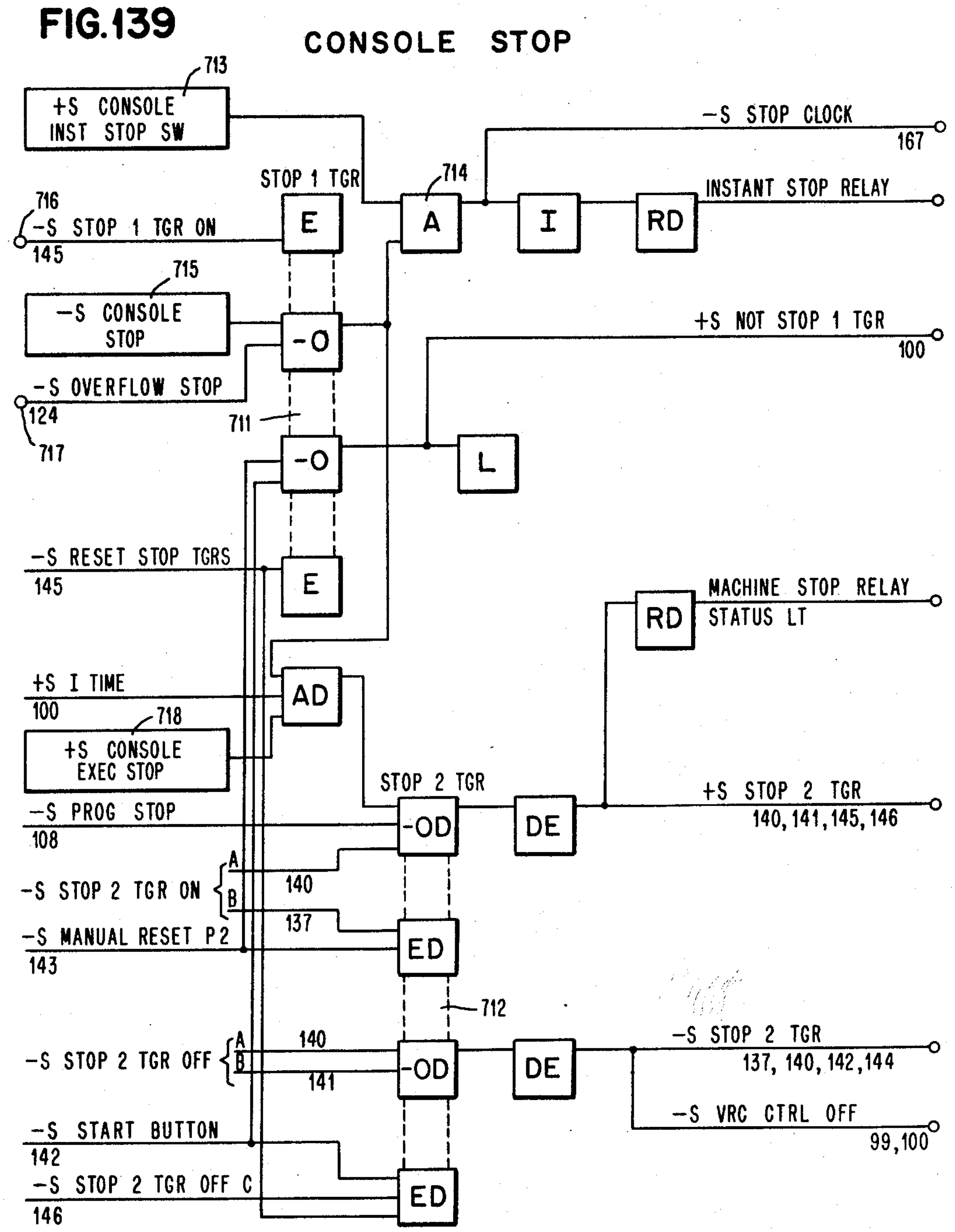

FIG. 139 illustrates the console stop circuits. Stop 1 trigger 711 and Stop 2 trigger 712 are effective to stop automatic operation immediately or upon completion of the execution of an instruction, depending on settings of console switches. Instant stop switch 713 is effective via A-block 714 to stop the clock and to pick and latch the instant stop relay if the Stop 1 trigger is set. A —S functional signal from console stop switch 715 or STOP 1 TGR ON line 716 or OVERFLOW STOP line 717 sets the Stop 1 trigger. The stop triggers are reset by the start button. Stop 2 trigger 712 is set during I time in response to the Console Stop button and the Console Execution Stop switch. It is set by +S signals PROG STOP or STOP 2 TGR ON during automatic operations calling for the appropriate stop.

Figure 140:
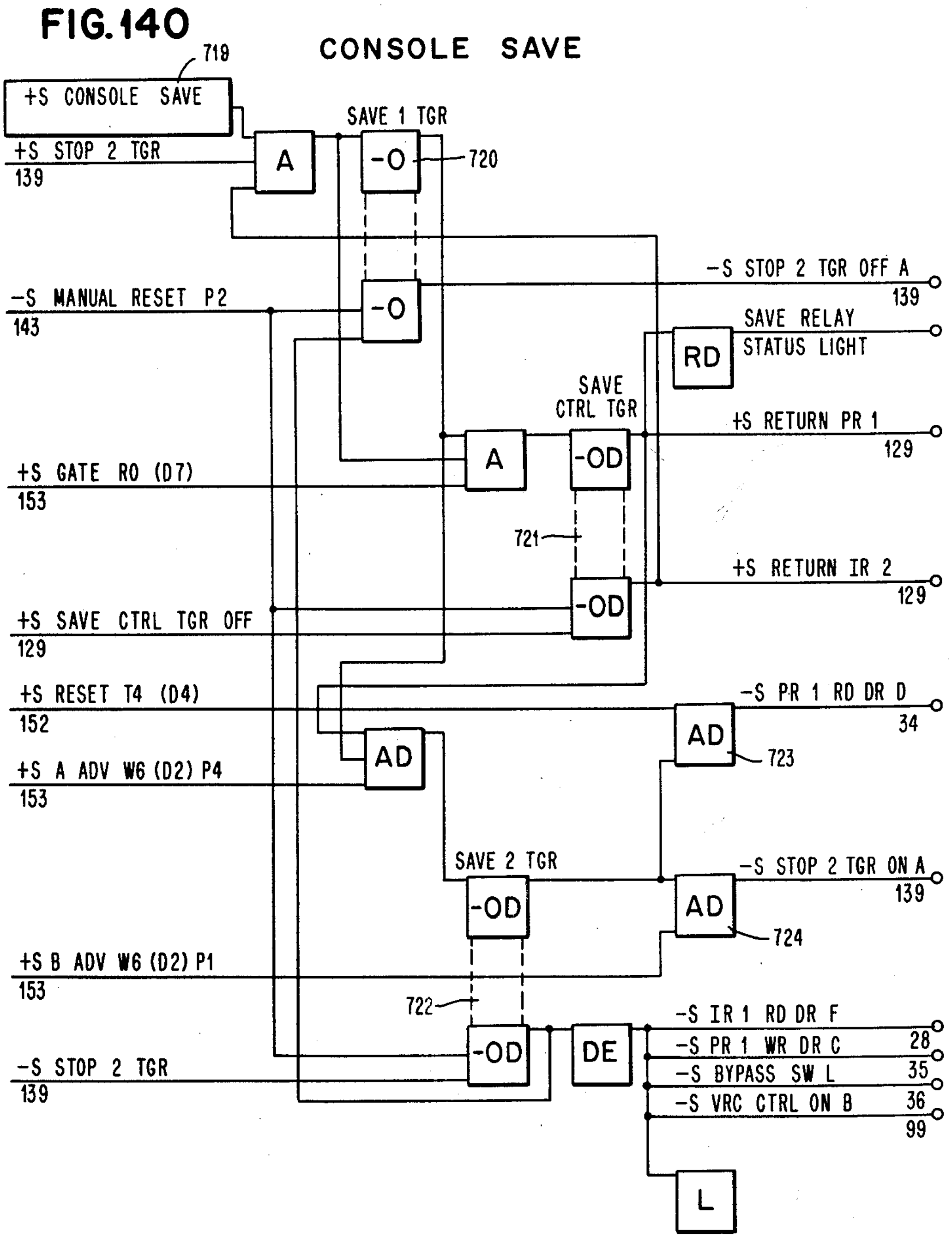

FIG. 140 illustrates Console Save, which includes Console Save button 719, Save 1 trigger 720, Save Control trigger 721, Save 2 trigger 722 and AD-blocks 723 and 724. The Save 1 trigger is set in response to the Console Save button and the Stop 2 trigger to condition input AND circuits of the Save Control and Save 2 triggers. The Save Control trigger is set at R0 time, conditioning the input AND circuit of the Save 2 trigger. AD-block 723 produce a —S PR 1 RD DR D signal at T4(D4); AD-block 724 sets the Stop 2 trigger again; the off side of the Stop 2 trigger 722 produces —S function signals IR 1 RD DR, PR 1, WR DR, BYPASS SW and VRC CTRL ON. The Console will save the instruction for visual checking by the operator.

Figure 141:
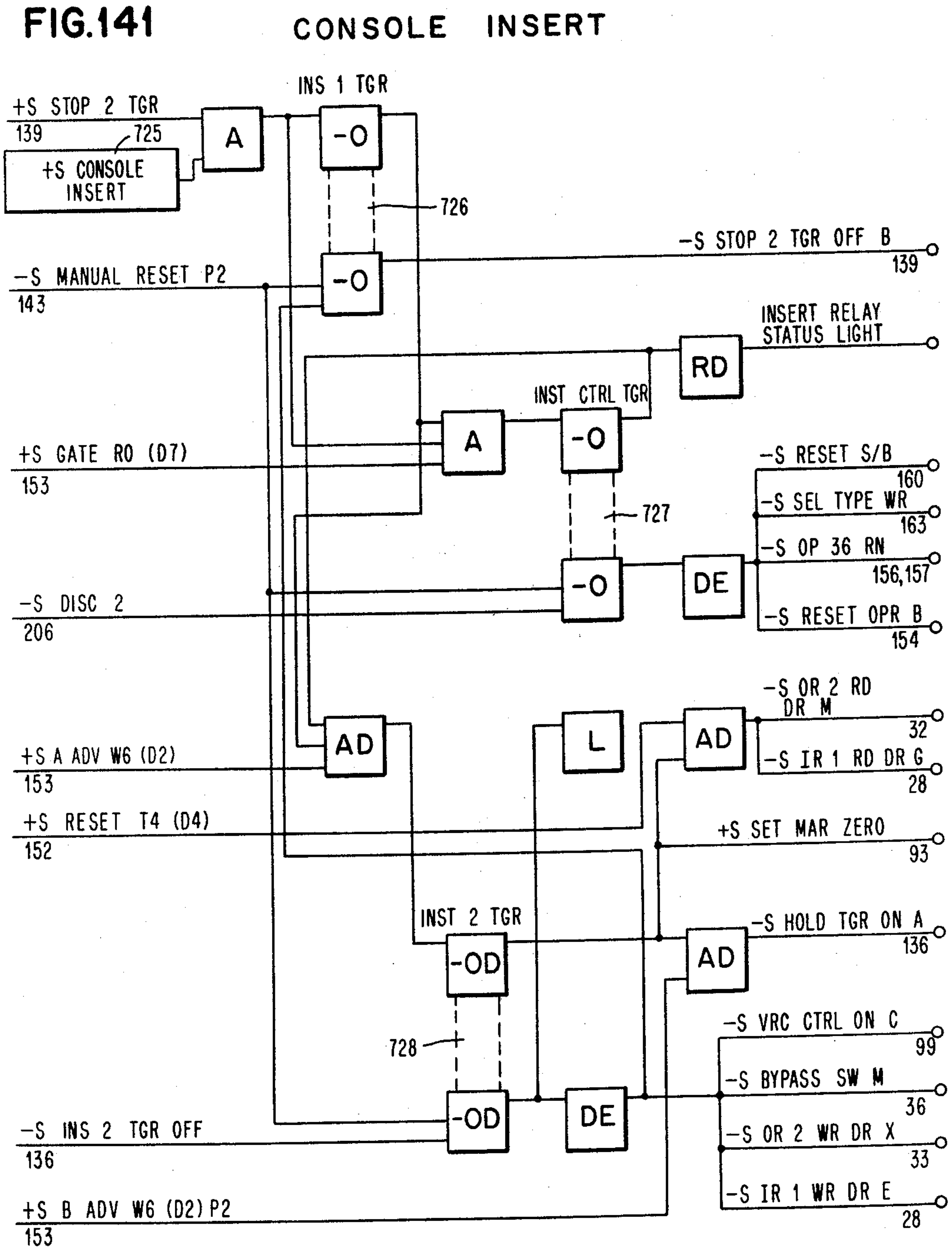

FIG. 141 illustrates Console Insert, which involves Console Insert button 725, Insert 1 trigger 726, Insert Control trigger 727 and Insert 2 trigger 728. Insert 1 trigger 726 is set by the Console Insert button 725 as the Stop 2 trigger is set in FIG. 139. This conditions the Insert Control trigger 727 for turn-on at R0 time; the Insert Control trigger produces —S signals RESET S/B, SELECT TYPEWRITER, OP 36 RN and RESET OPR B. It conditions Insert 2 trigger 728 for turn-on at W6(D2).

Insert 2 Trigger 728 turns off the Insert 1 trigger and produces —S functional signals VRC CTRL ON, BYPASS SW, OR 2 WR DR and IR 1 WR DR. The insert 2 trigger also produces the +S signal SET MAR ZERO, which causes the inserted digits to be placed in memory location 00000, and, via AD-blocks, gated —S signals HOLD TGR ON W6(D2) and OR 2 RD DR and IR 1 RD DR T4(D4).

The console insert is the normal mechanism for starting operation; enough of a program is typed in to start the other I/O units under program control.

Figure 142:
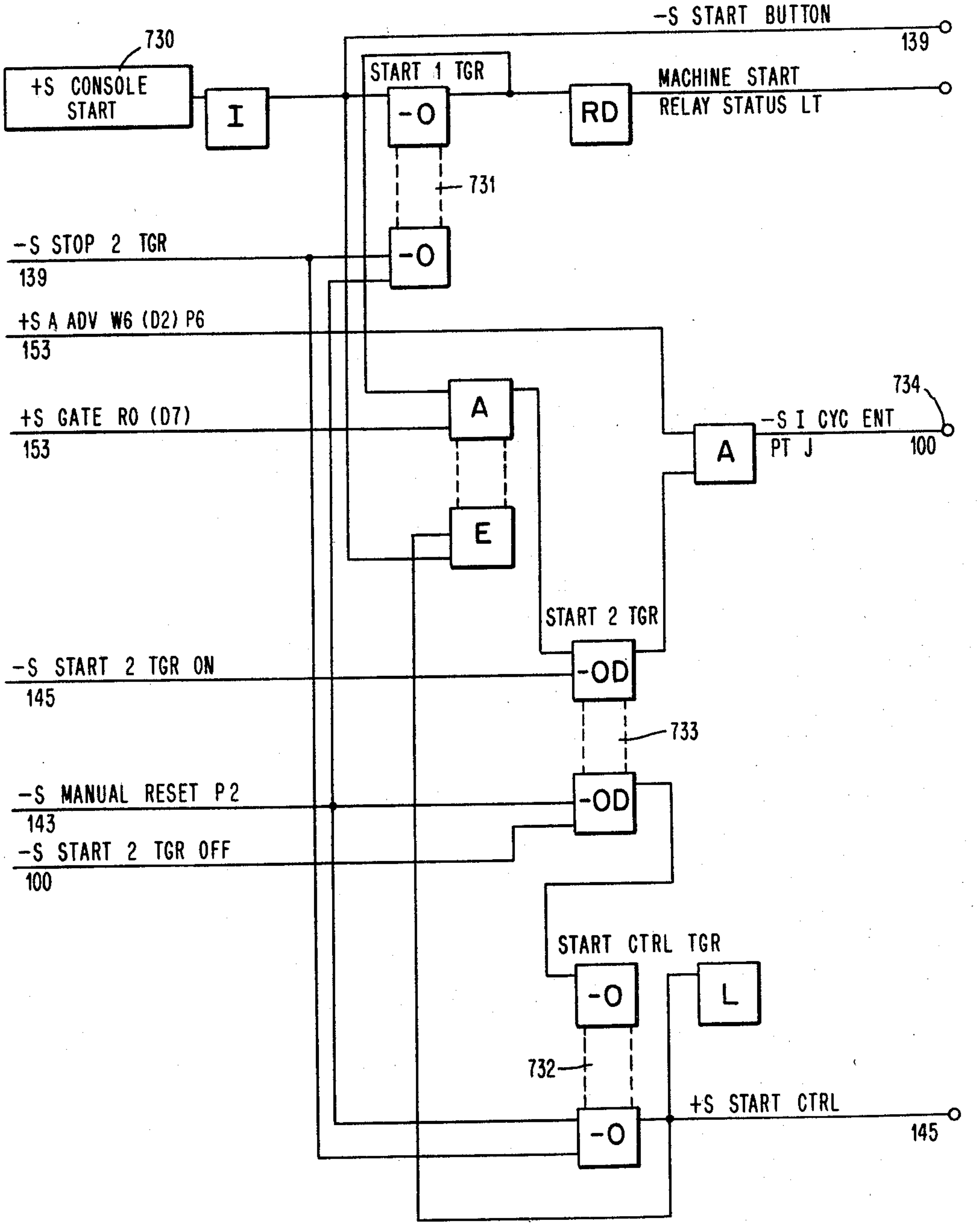

FIG. 142 illustrates Console Start, involving Console Start Button 730, Start 1 trigger 731, Start Control trigger 732 and Start 2 trigger 733. The Start 1 trigger is set from the Console Start button, setting Start 1 and Start 2 triggers. The Start Control trigger 732 is reset initially by MANUAL RESET or by a previous —S STOP 2 TGR signal, producing while reset a +S START CTRL signal which gates input to Start 2 trigger from Start 1 trigger. Start 2 trigger 723 sets Start Control trigger 732 and produces a gated —S I CYC ENT PT J signal at terminal 734. Ordinarily, a previous Console Insert operation has set IR1 and provided a minimum stored program.

Figure 143:
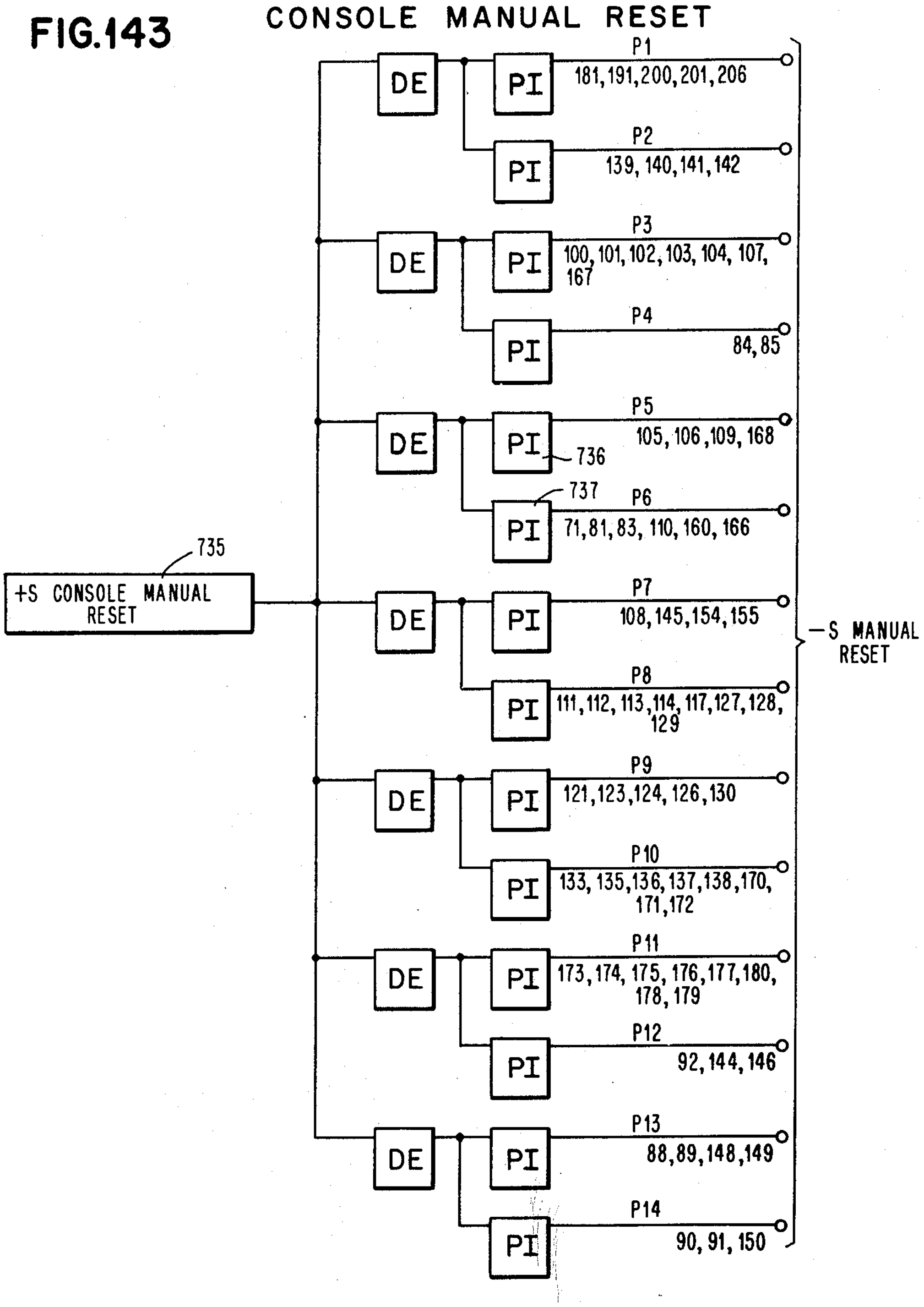

FIG. 143 illustrates Console Manual Reset, which involves Console Manual Reset button 735 and a group of PI blocks such as 736 and 737 which make —S MANUAL RESET signals generally available where needed.

Figure 144:
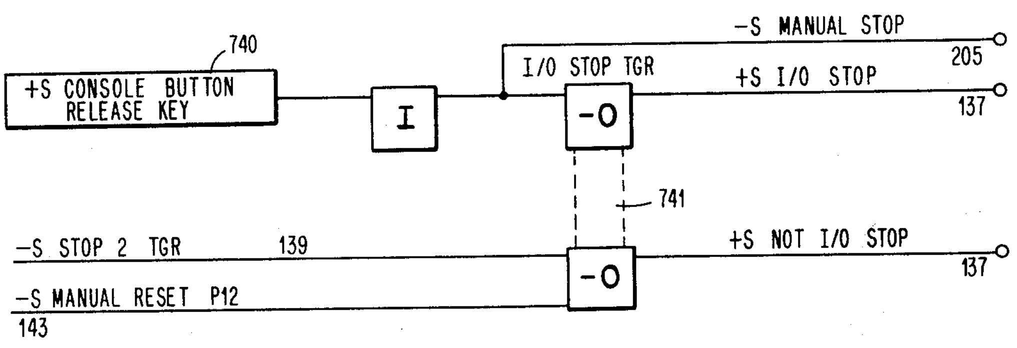

FIG. 144 illustrates Console I/O Stop, which includes Console Release Key 740 and I/O Stop trigger 741.

Figure 145:
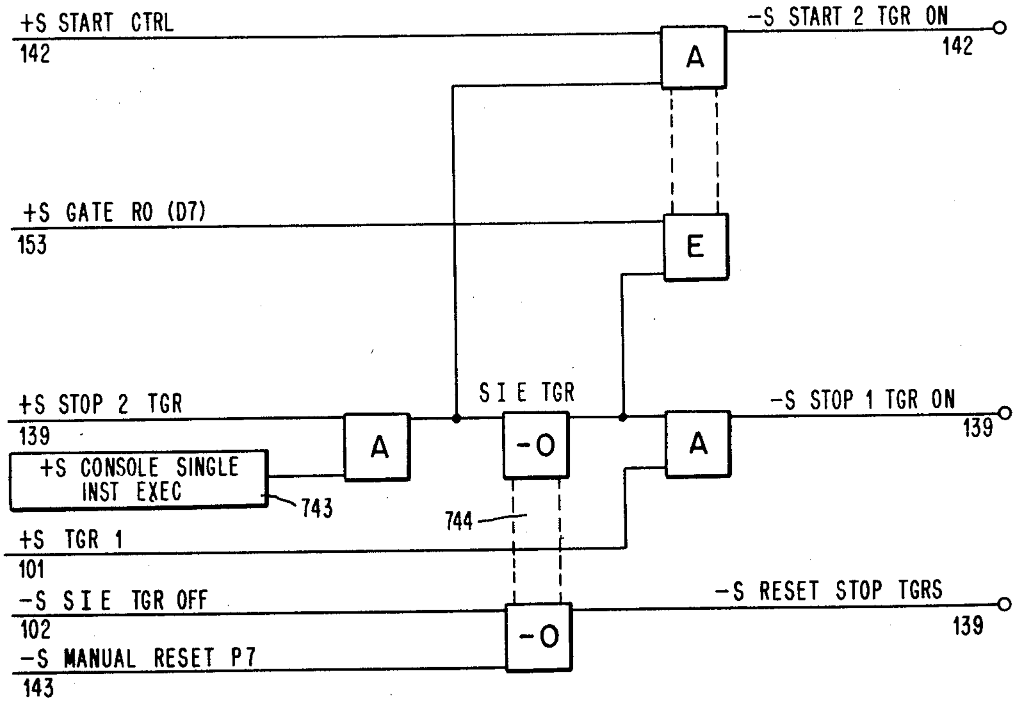

FIG. 145 illustrates Console Single Instruction circuits. Single Instruction Execute Key 743 sets S I E trigger 744 as the Stop 2 trigger is set, providing a —S STOP 1 TGR ON signal at I-cycle step 1 to cause a stop after the execution is completed.

Figure 146:
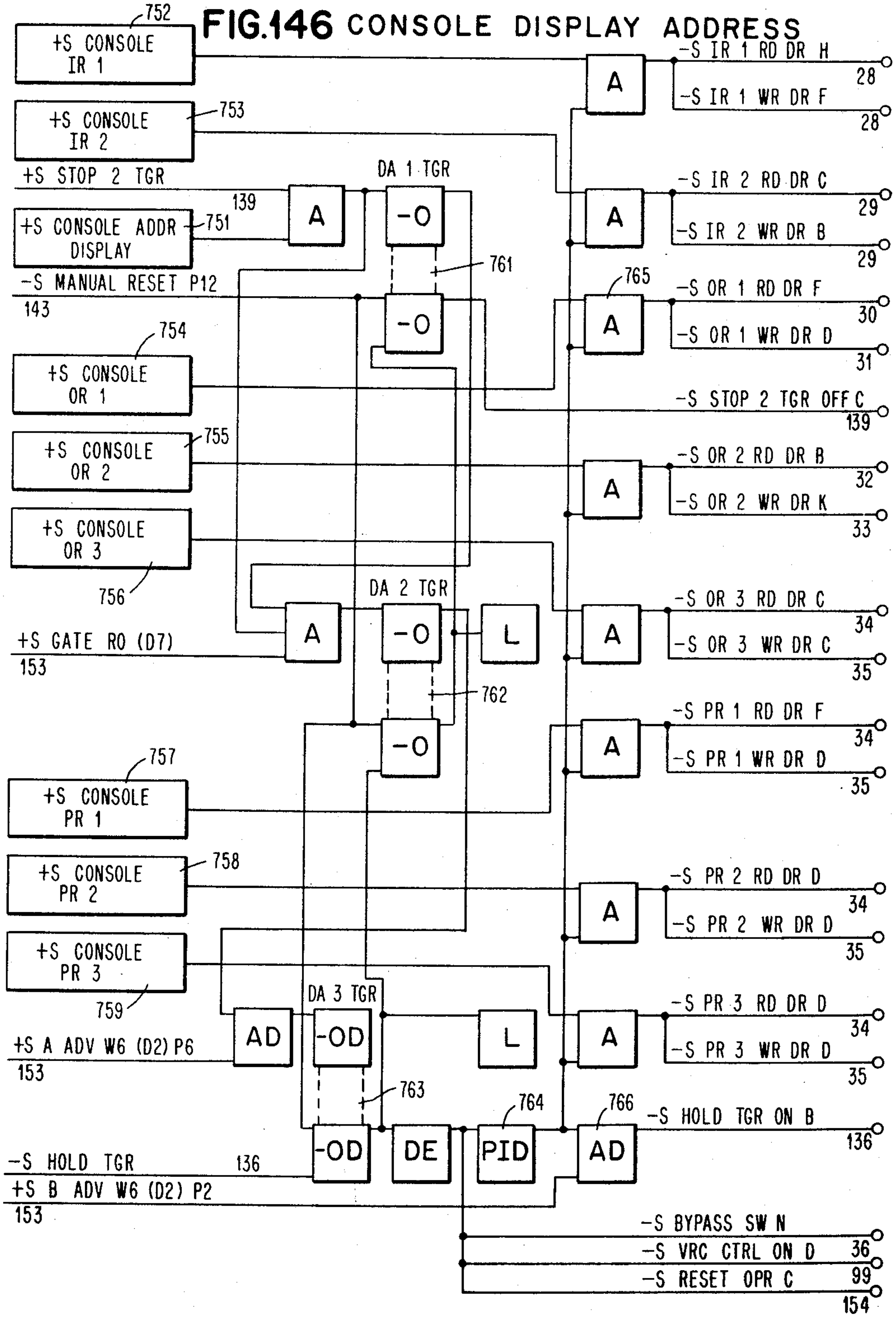
Figure 147:
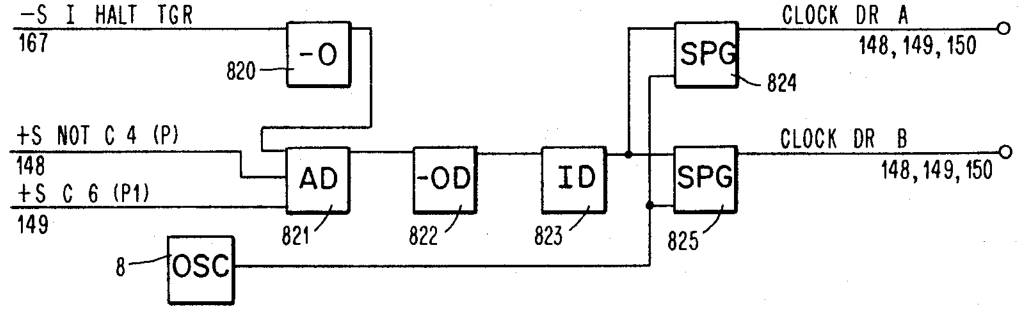
Figure 148:
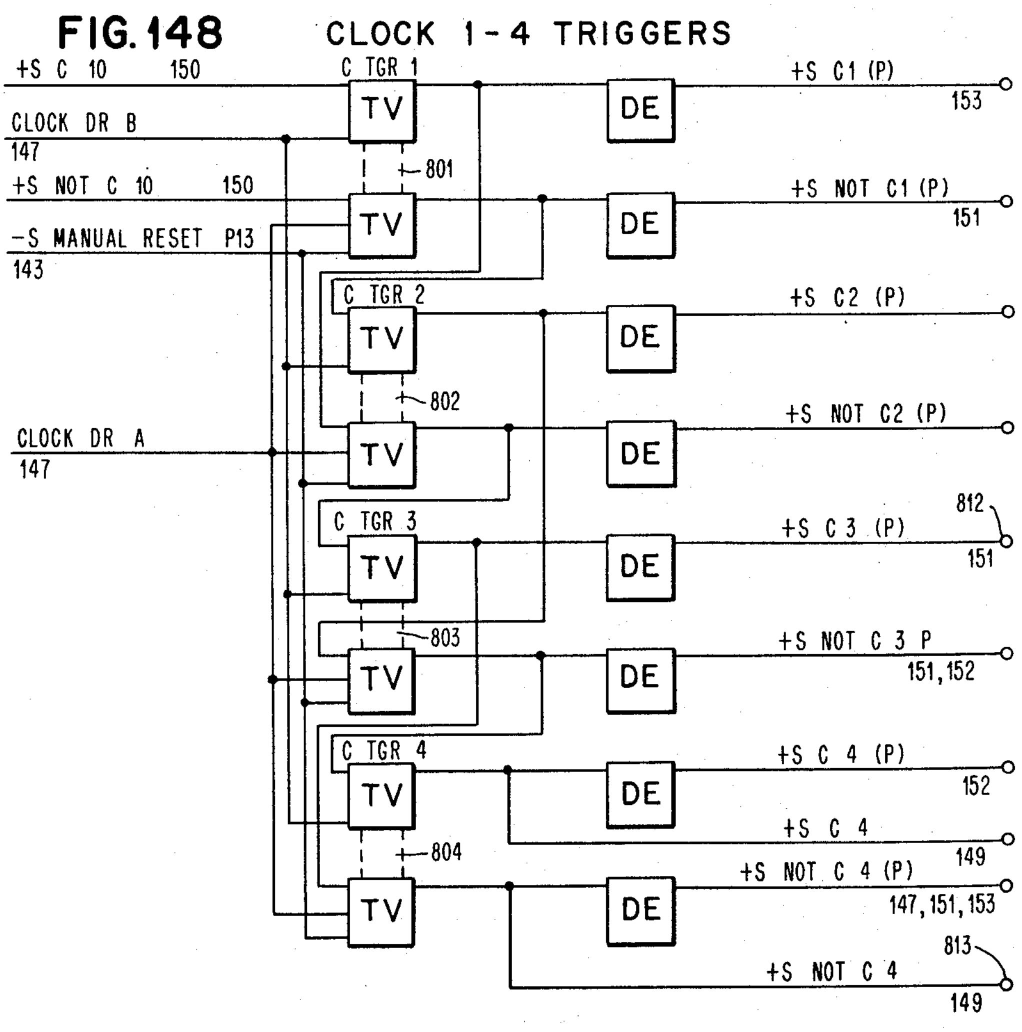
Figure 149:
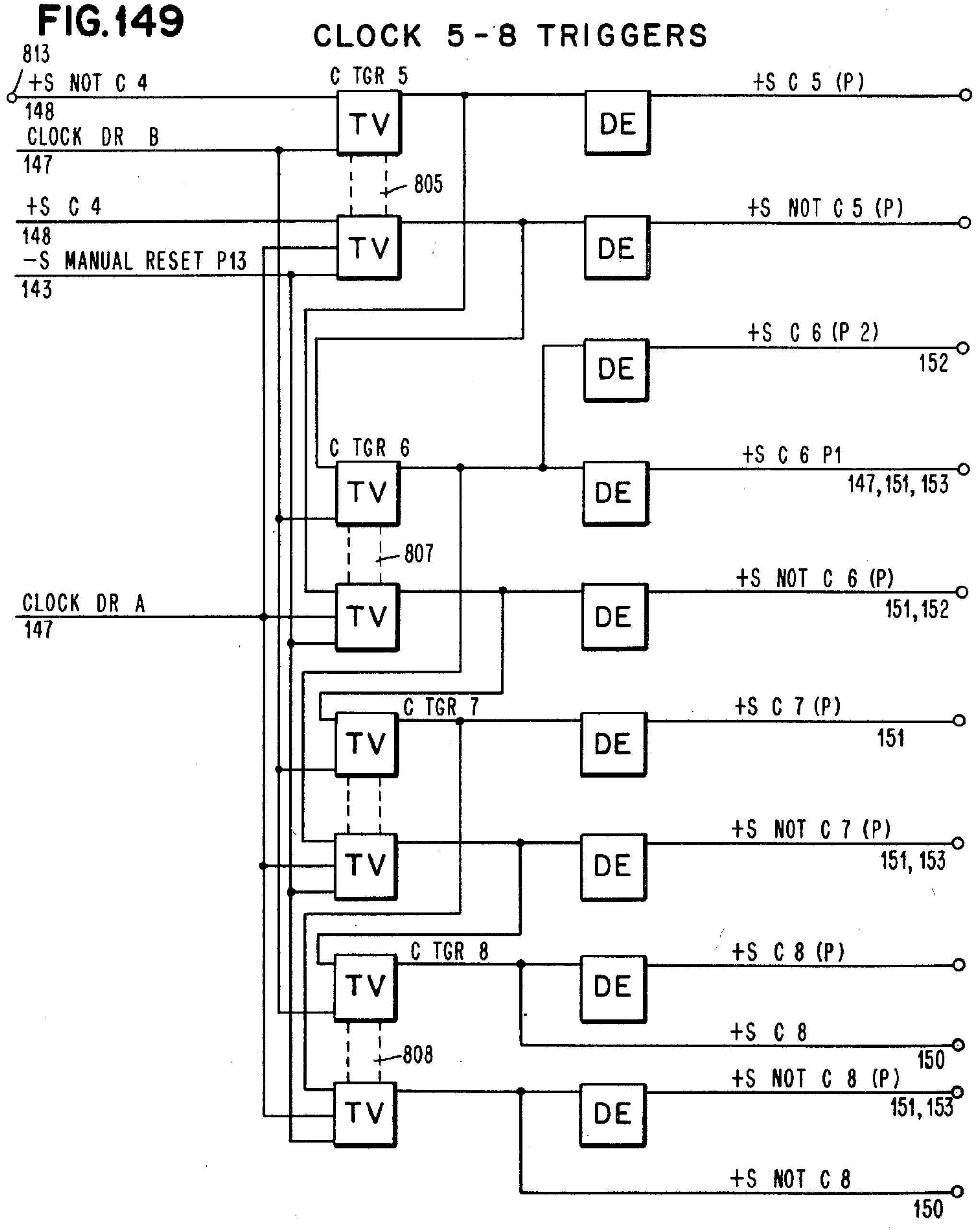
Figure 150:
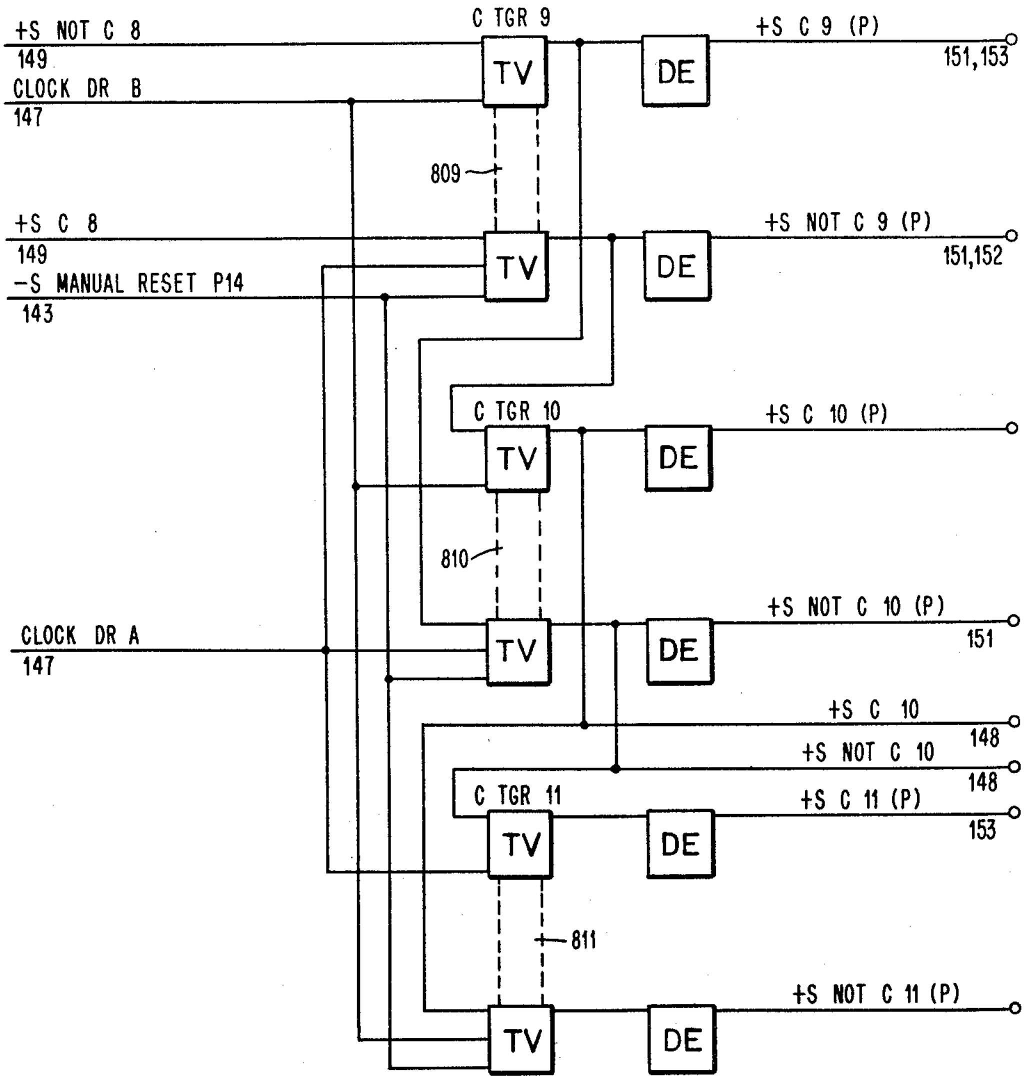

FIG. 146 illustrates Console Display Address mechanism. Console Address Display key 751 and any one of switches 752–759 provide display of the appropriate address register in MARS upon operation.. Upon operation of Stop 2 trigger, DA1 trigger 761 is set, setting DA2 trigger 762 at R0 time, which in turn sets DA3 trigger 763 at W6 time. The output of the off side of DA3 trigger produces —S signals BYPASS SW N, VRC CTRL ON and RESET OPR, and through PID-block 764 and a group of A-blocks such as 765, provides —S signals to read out and write the appropriate MARS register. AD-block 766 provides a —S signal HOLD TGR ON.

Figure 151:
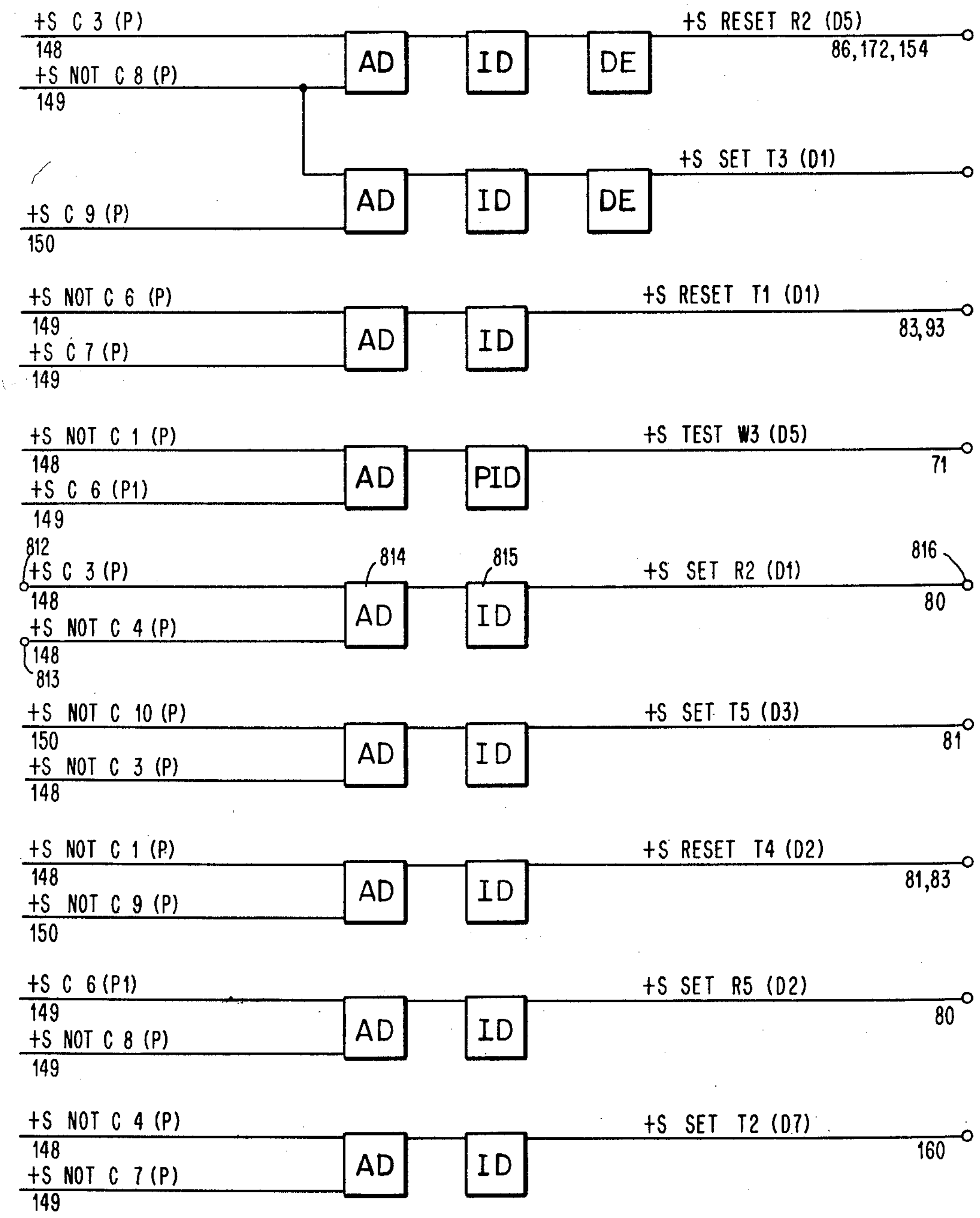
Figure 152:
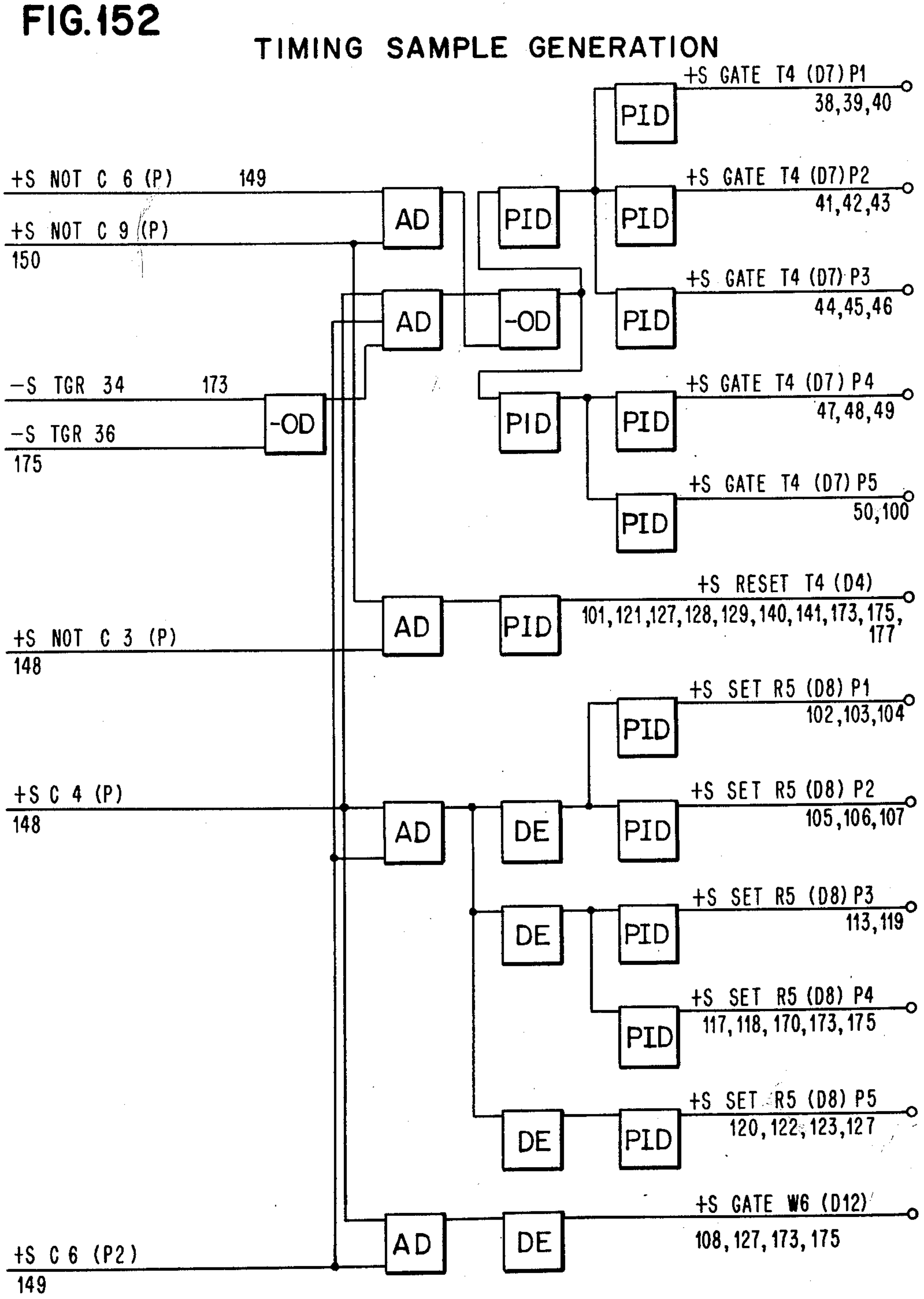

FIGS. 147–153 illustrate the timing control area 800 of FIG. 1*a*. Clock triggers 1 through 11, 801–811 respectively, appear in FIGS. 148, 149 and 150. Each clock trigger provides an in phase signal and an out of phase signal; for example, the +S C 3 signal from clock trigger 3 appears at terminal 812. The +S NOT 4 signal from clock trigger 4 off side appears at terminal 813 in FIG. 148. In FIG. 151, timing sample generation, +S C 3 and NOT C 4 signals are dual inputs to AD-block 814 which, upon coincidence of the two inputs, provides via ID-block 815 a +S set R2(D1) which means that it begins at R2 time of the cycle and has a duration of 1 microsecond. The R2(D1) signal coincides with MDR to MBR in FIGURE 5. Other timings are similarly generated by the coincidence of in phase or out of phase clock signals through AND circuits in FIGS. 151–153. The clock is the folded ring type.

Figure 5:
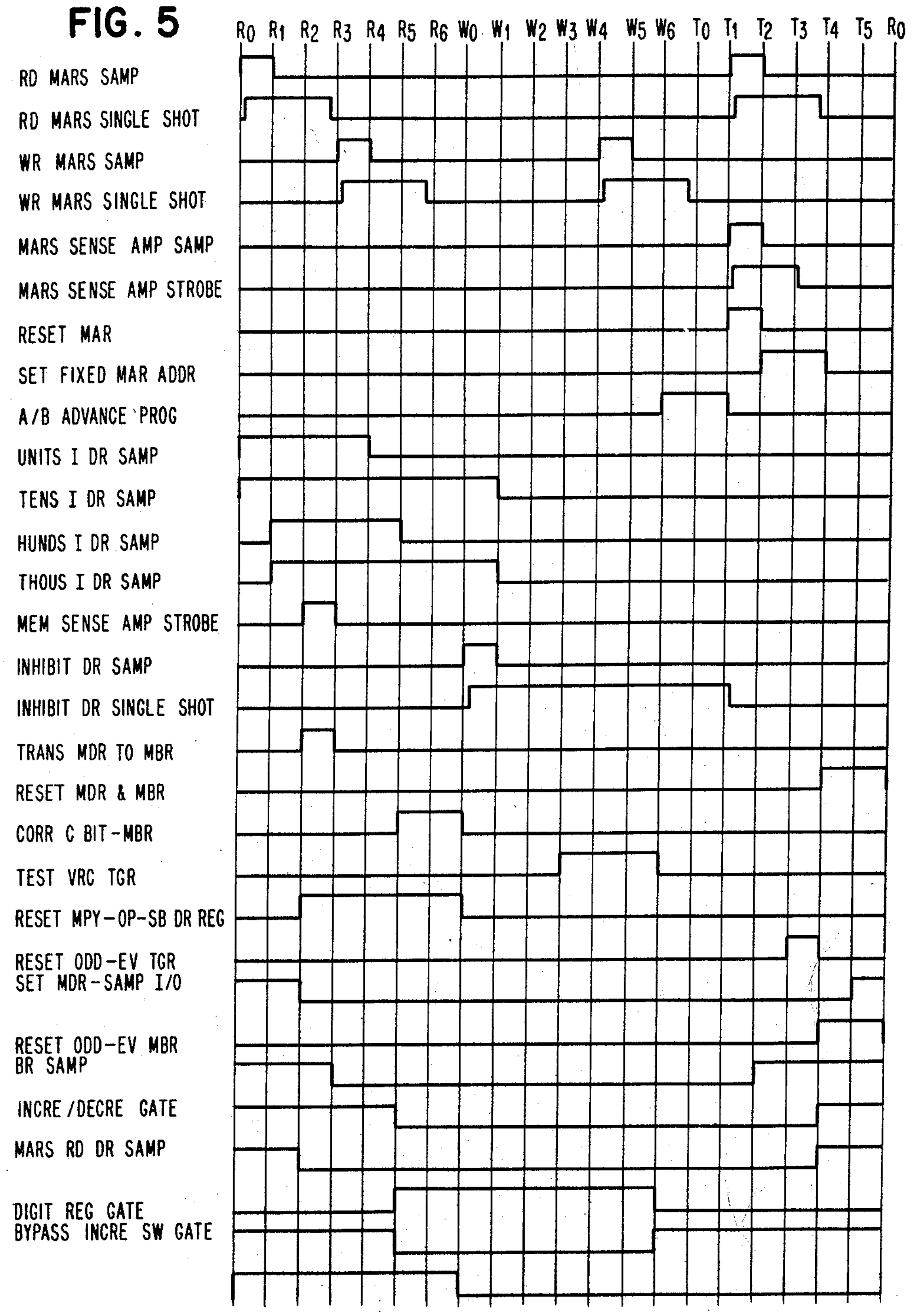
FIG. 5 is a timing chart.

Each trigger 1–11 is on for 10 microseconds and off for 10 microseconds. All triggers are reset initially. The on side of each trigger conditions the next higher numbered trigger for turn-on by the next clock drive pulse. The off side of each trigger similarly conditions the next trigger for turn-off by the clock drive pulse. Trigger 10 feeds back to trigger 1 in inverted sense—the on side of trigger 10 conditions trigger 1 for turn-off, and the off side of trigger 10 conditions trigger 1 for turn on. Ten advance pulses turn triggers 1–10 on. The 11th advance pulse turns on trigger 11 and turns off trigger 1. Advance pulses 12–20 turn off triggers 2–10 in sequence, the 20th pulse also turning off trigger 11. All combinations of timings appearing in the 20 microsecond scale of FIG. 5 are thus available upon need by the use of an AD-block and an ID-block in series with either in phase or out of phase inputs from selected block triggers.

Figure 153:
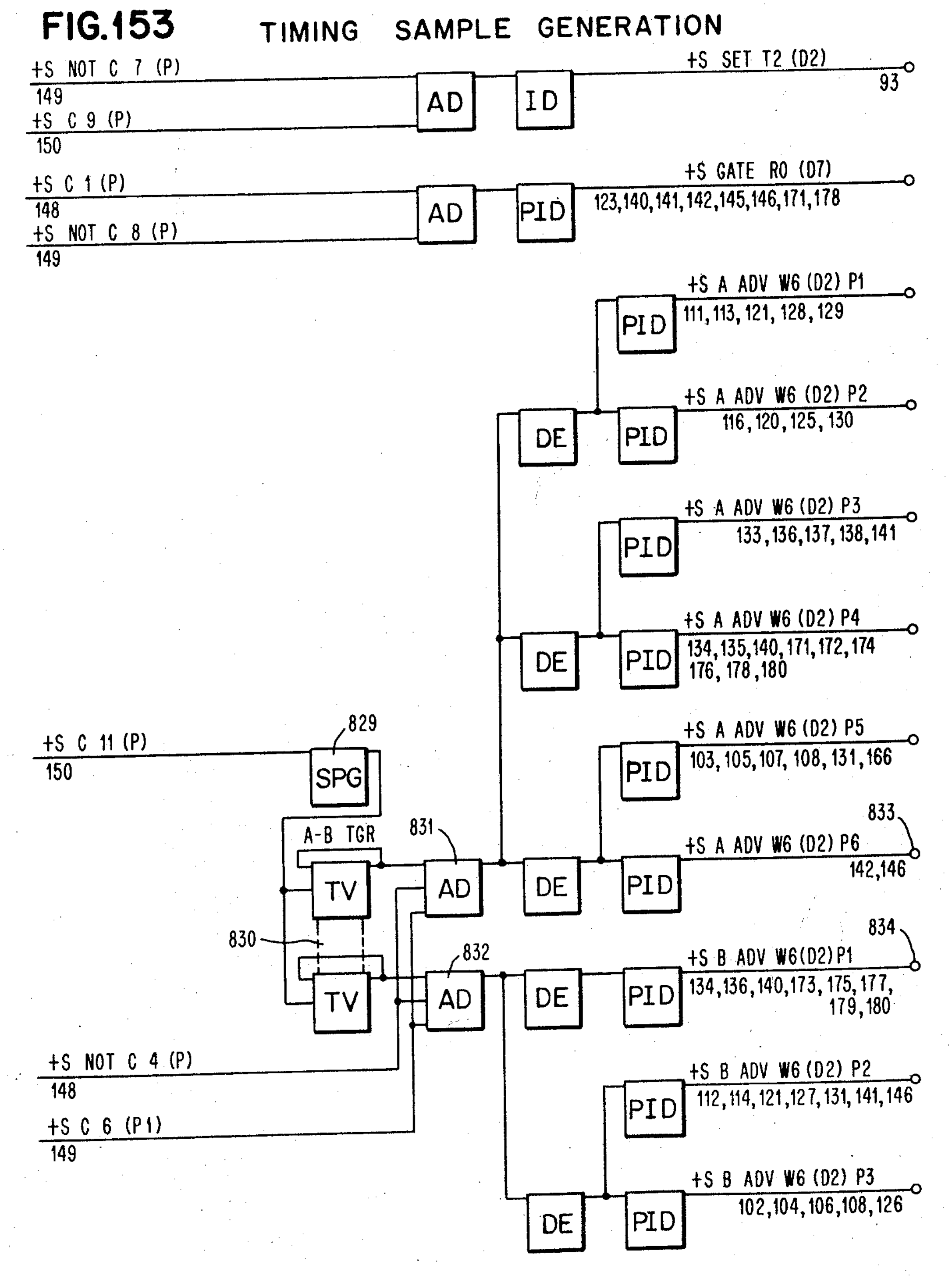

FIG. 153 illustrates the A–B timing sample generation circuits. Housekeeping within the machine requires in some cases that two successive signals be easily separated. A special overriding A–B cycle is provided for this purpose.

SPG-block 829, upon receipt of the C 11 signal (which occurs only once per 20 microsecond cycle), produces a sample pulse to operate A–B trigger 830. The A–B trigger is a binary trigger, which in the A state conditions AD-block 831 and in the B state conditions AD-block 832. AD-block 831, via mesne DE and PID-blocks produces a +S A ADV +6 (D2) signal at terminal 833 when gated by coincident Not C 4 and C 6 pulses. AD-block 832 similarly conditions terminal 834 with a +S B ADV W6(DZ) signal when appropriate. These signals are available throughout the preferred embodiment.

Figure 154:
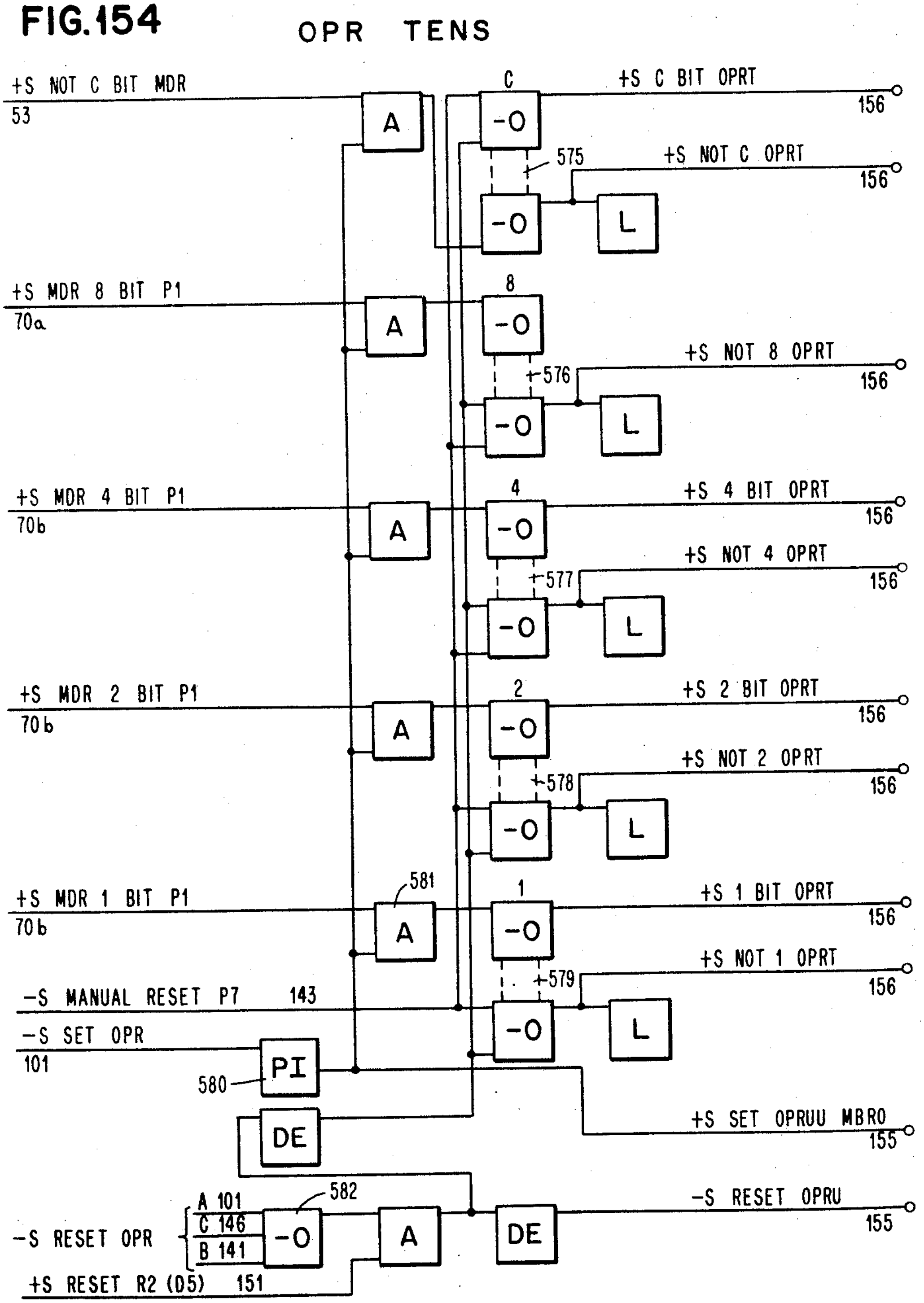
Figure 156:
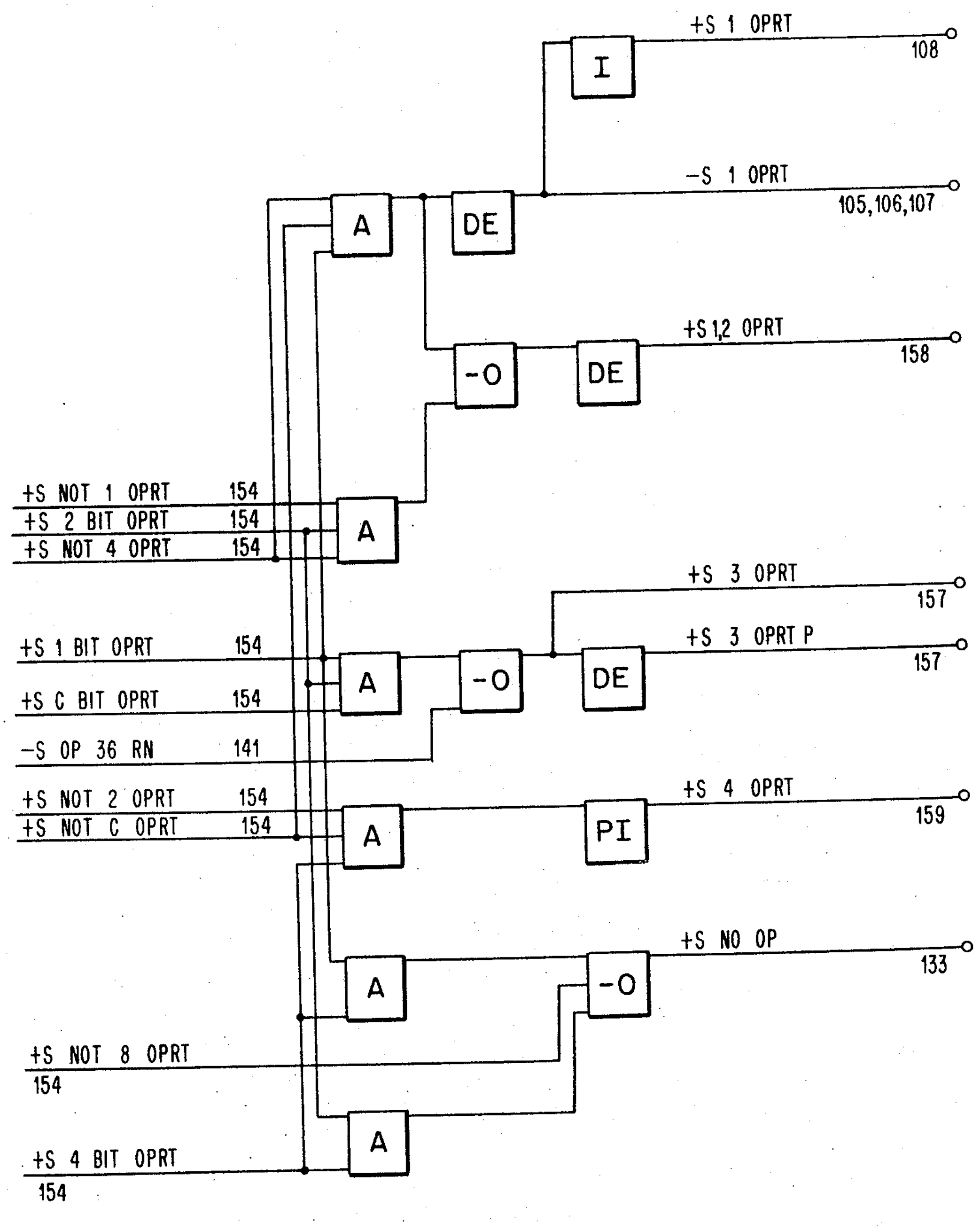
Figure 157:
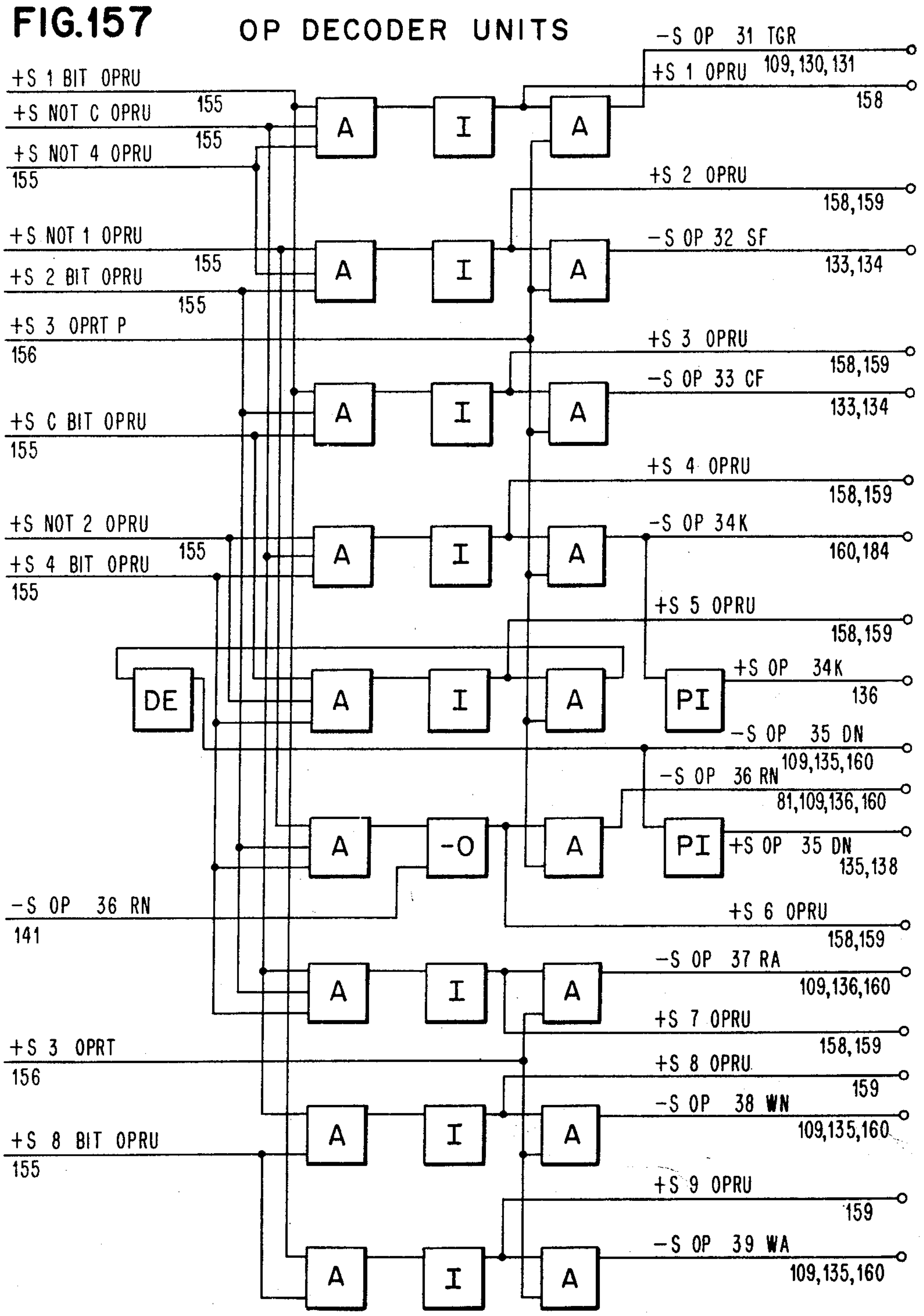
Figure 158:
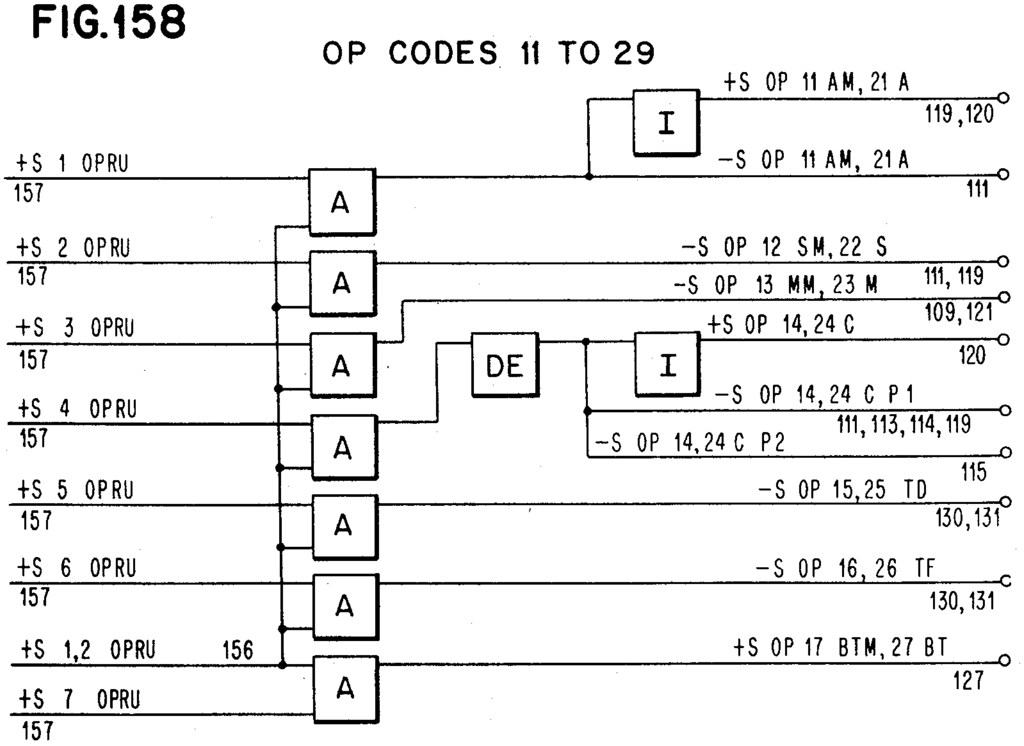
Figure 159:
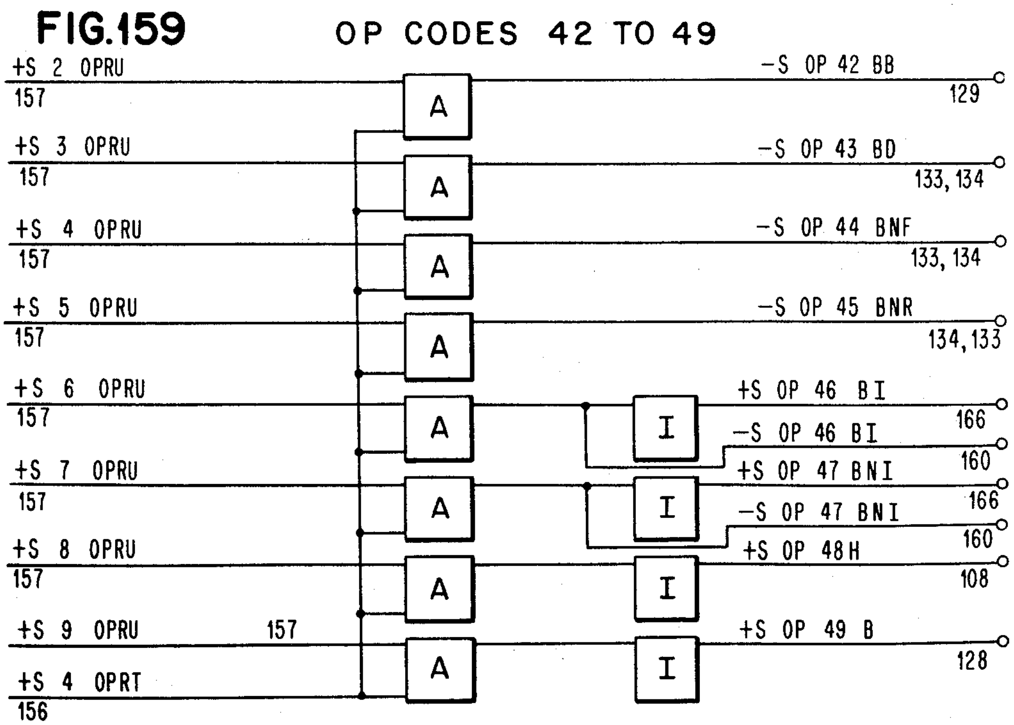

FIG. 154 illustrates the operation register tens order which is designated OPR TENS 501 in FIG. 1*a*. Five bit triggers 575 through 579 are settable upon gating via PI-block 580 of respective bit signals from MDR through A-blocks such as 581 which gates the +S MDR 1 bit signal from FIG. 70*b* to the ON side of 1 bit trigger 579. Each operation register trigger provides function and not function signals which pass to FIG. 156, the OP decoder tens position. The OP register is reset when necessary by -O-block 582 which connects to the off side of each OP register trigger.

Figure 155:
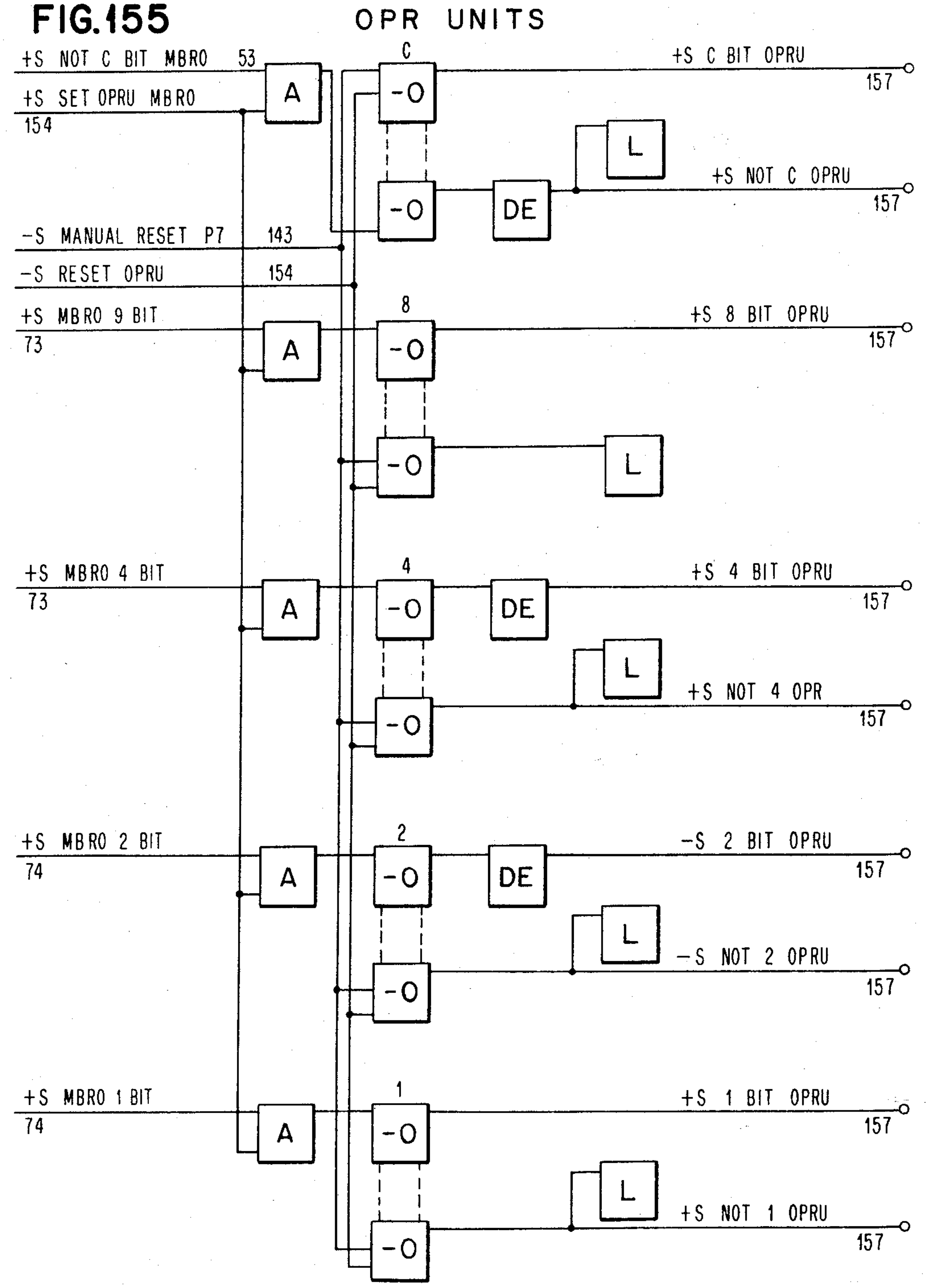

FIG. 155 illustrates OPR UNITS, which is similar to the OPR TENS with the difference that the bit signals come from MBRO rather than MDR.

FIGS. 156–159 illustrate the operation decoder which produces —S functional signals on individual lines for the individual instructions according to the bit values presented from the operation registers OPR.

Figure 160:
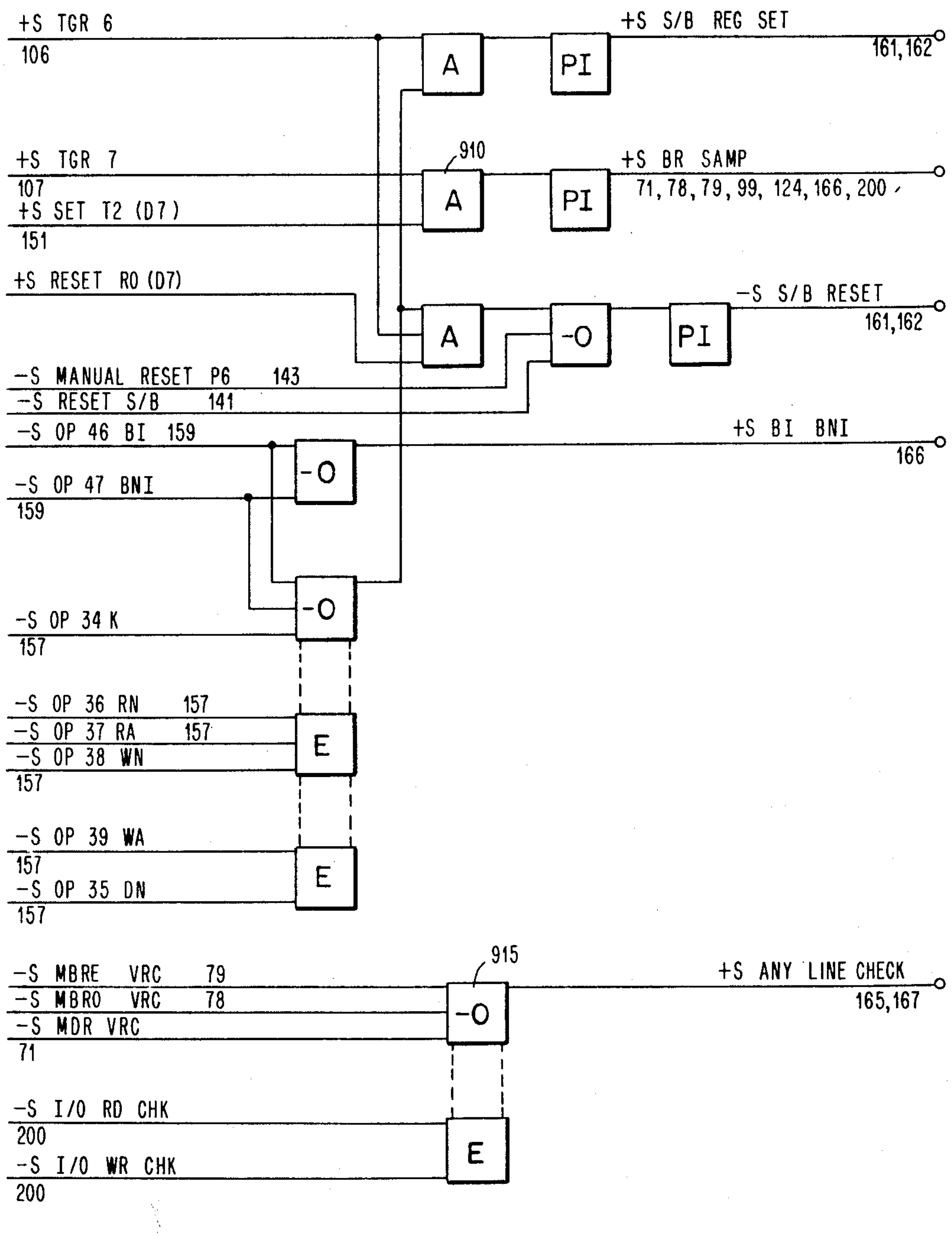

FIG. 160 illustrates sense and branch register control circuits which, in response to appropriate instruction decoding, set the S/B register. A-block 910, via a power inverter, produces a +S BR SAMP pulse at P 2 of the I-cycle step 7.

-O-block 915 accepts —S check functional signals and produces a +S ANY LINE CHECK signal, which can be used to control a branch.

Figure 161:
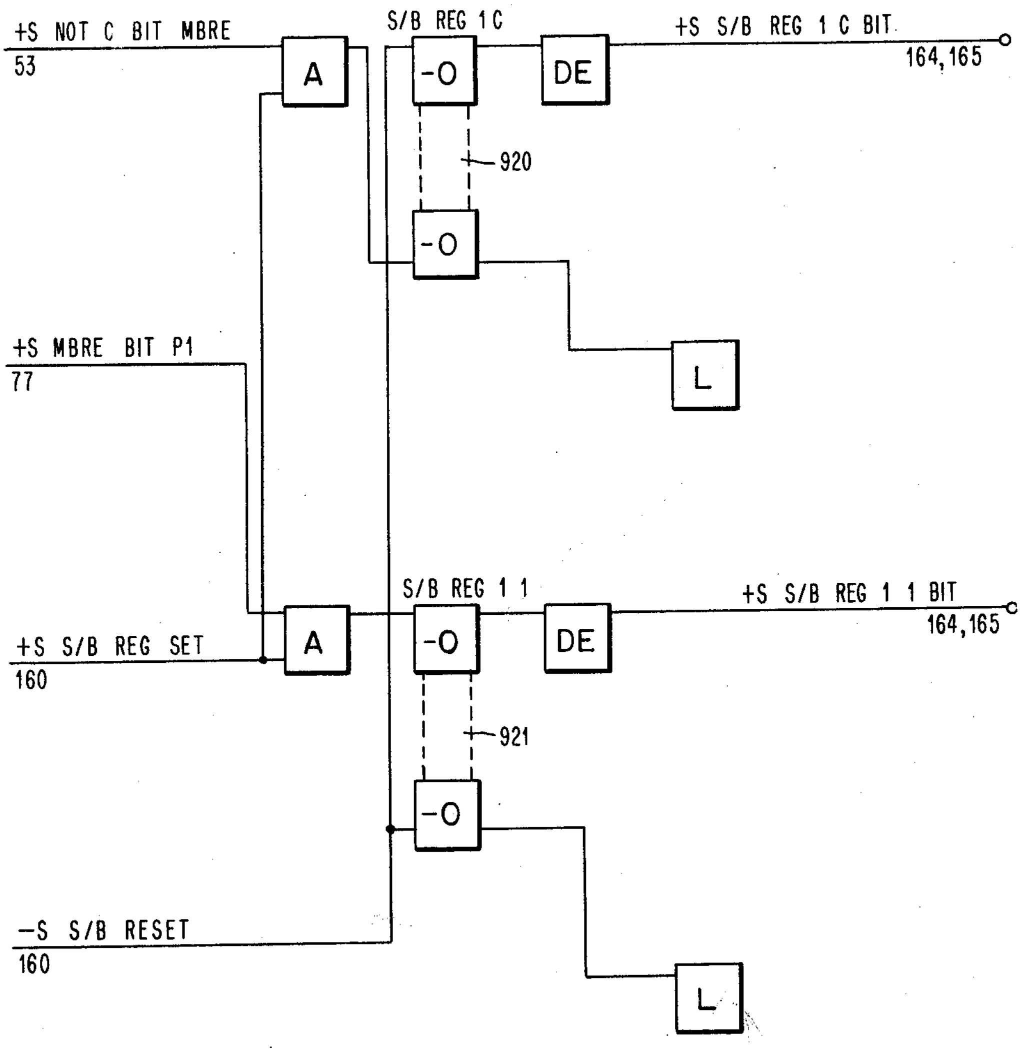

FIG. 161 illustrates sense and branch register 1 C-bit trigger 920 and 1-bit trigger 921. Sense and branch register 1 merely differentiates between the 1 and 0 values of MBRE.

Figure 162:
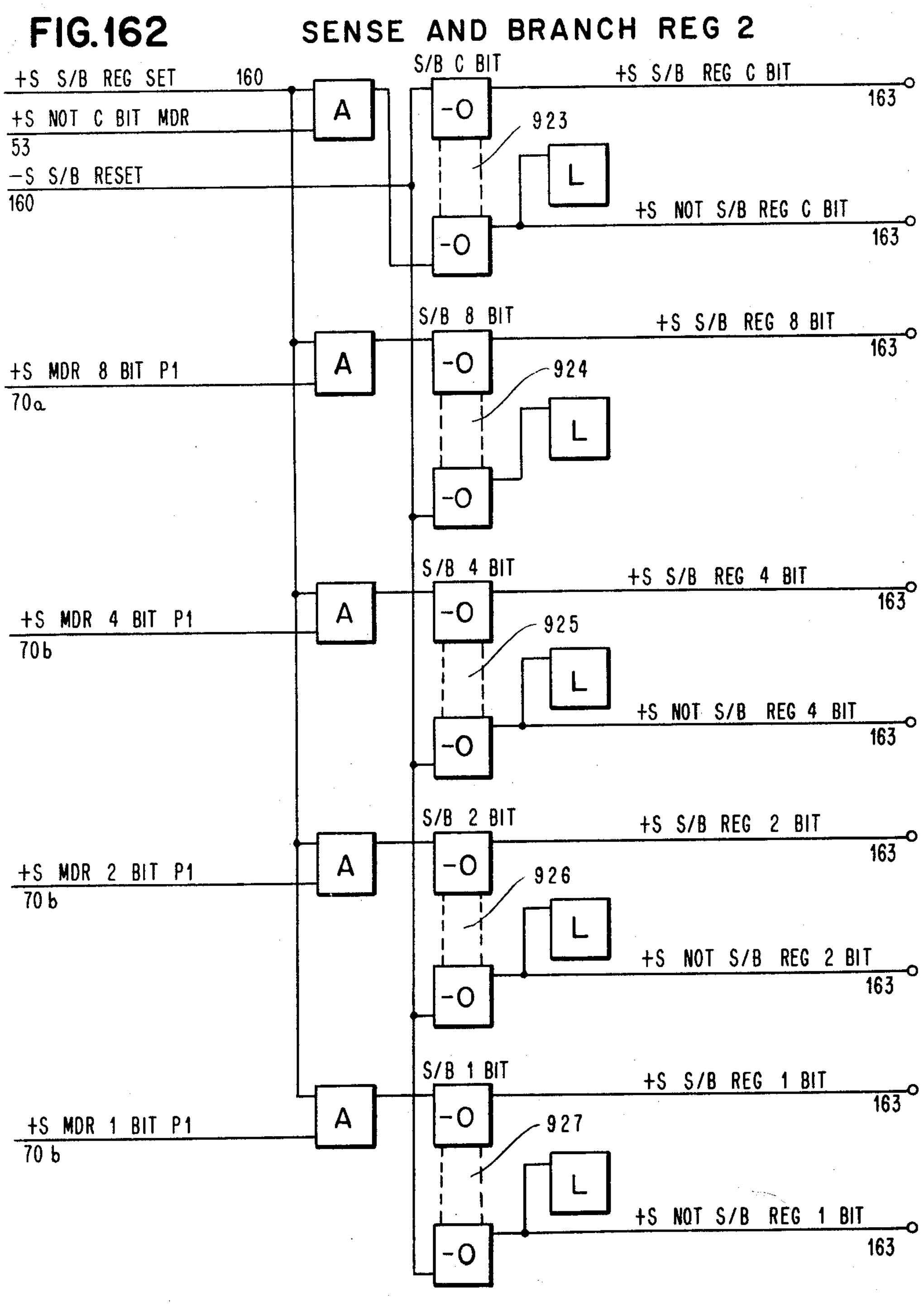

FIG. 162 illustrates sense and branch register 2, which includes a full set of bit triggers 923–927 which are settable according to data in MDR.

Figure 163:
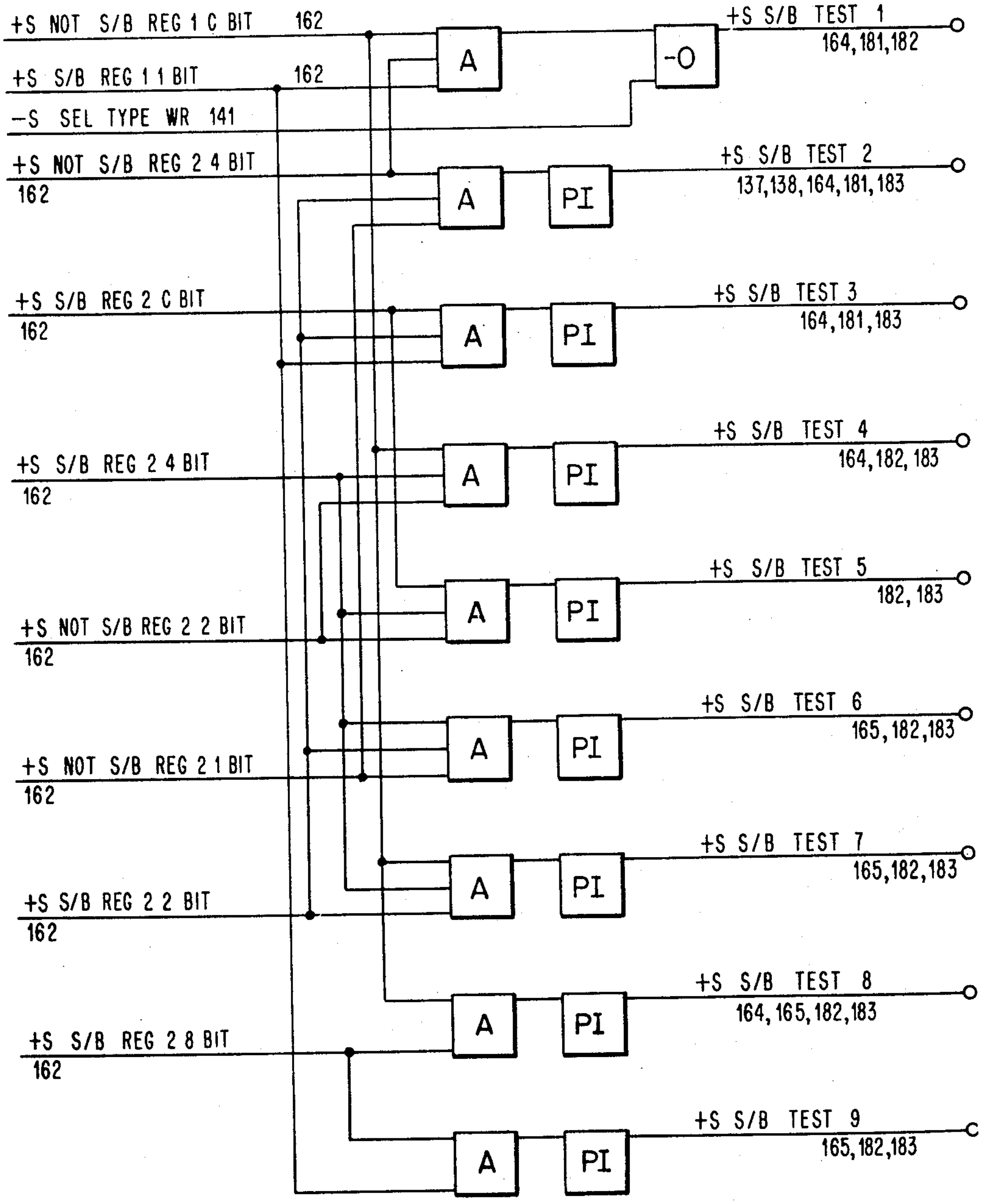

FIG. 163 illustrates the sense and branch decoder which accepts bit values from the sense and branch registers and produces a set of nine S/B test functional signals at separate terminals.

Figure 164:
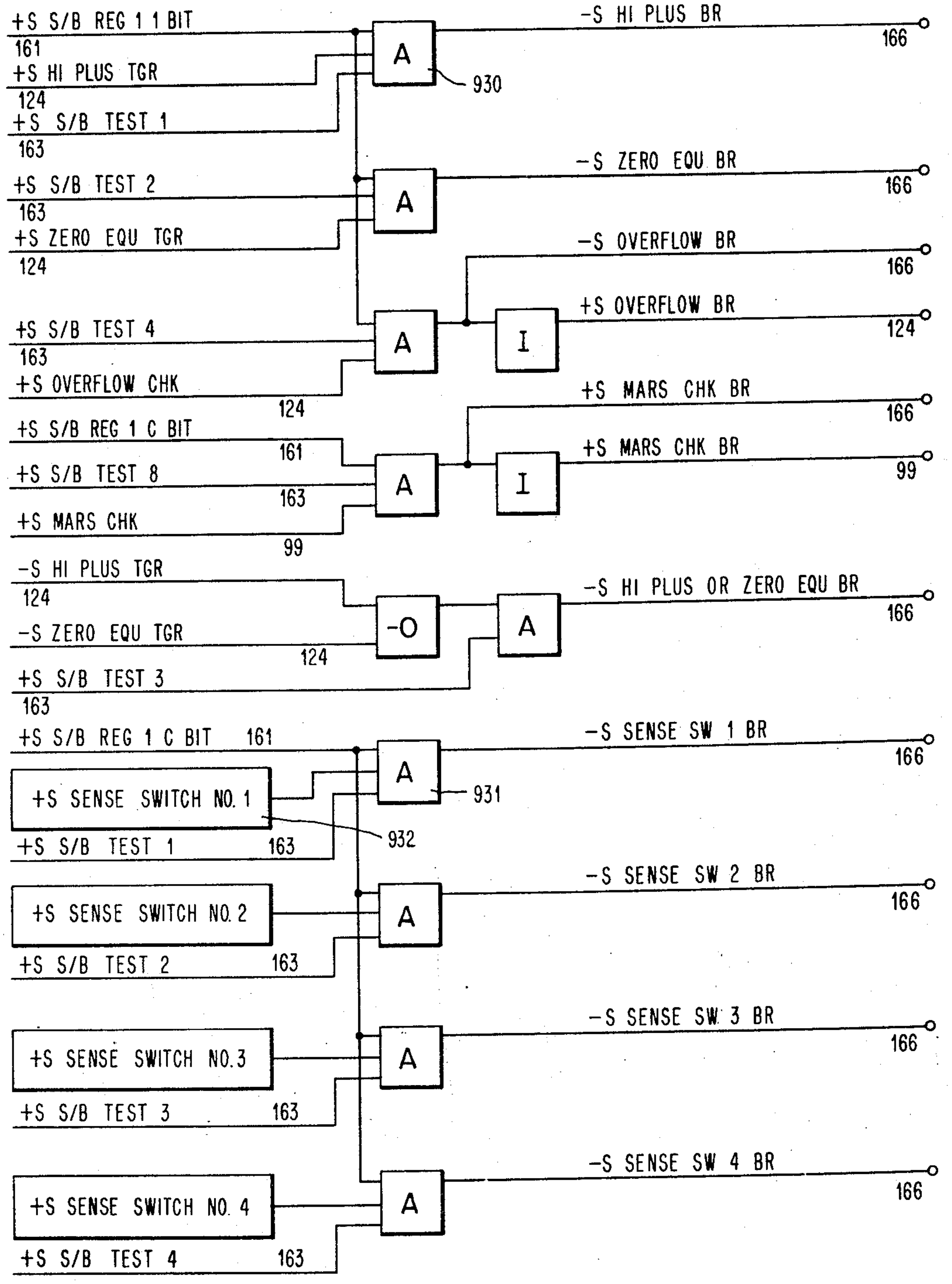

FIG. 164 illustrates sense and branch test circuits, which generally include A-blocks such as 930 which produces a —S HI PLUS BR functional signal upon coincidence of +S functional signals S/B REG 1 1 bit, HIGH PLUS TGR, and S/B TEST 1. A-block 931 produces a —S SENSE SWitch 1 BRanch signal upon coincidence of +S functional signals S/B REG 1 C BIT and +S sense switch #1 932.

Figure 165:
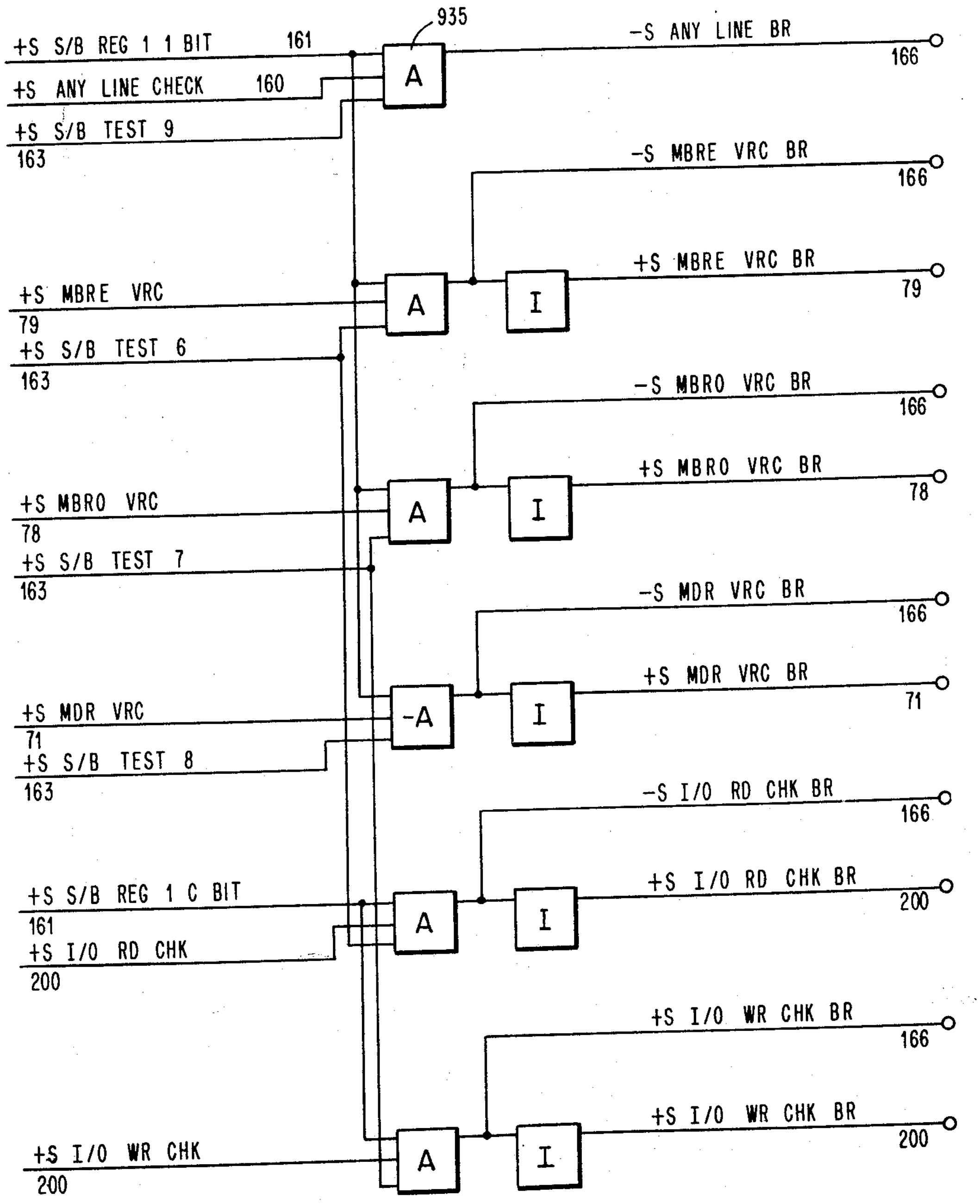

FIG. 165 illustrates the data check test circuits. A-block 935 produces a —S ANY LINE BR functional signal upon coincidence of +S signals S/B REG 1 1 BIT, ANY LINE CHECK and S/B TEST 9. Other functional signals are available to provide an MBRE VRC BR, an MBRO VRC BR, an MDR VRC BR, an I/O RD CHK branch, and an I/O WR CHK BR. These circuits effectively allow branching on any parity check to allow the machine to continue running by going back to a check point in the program and re-doing the portion of the program in which the error occurred. The actual branch in such an operation must be provided for in the program.

Figure 166:
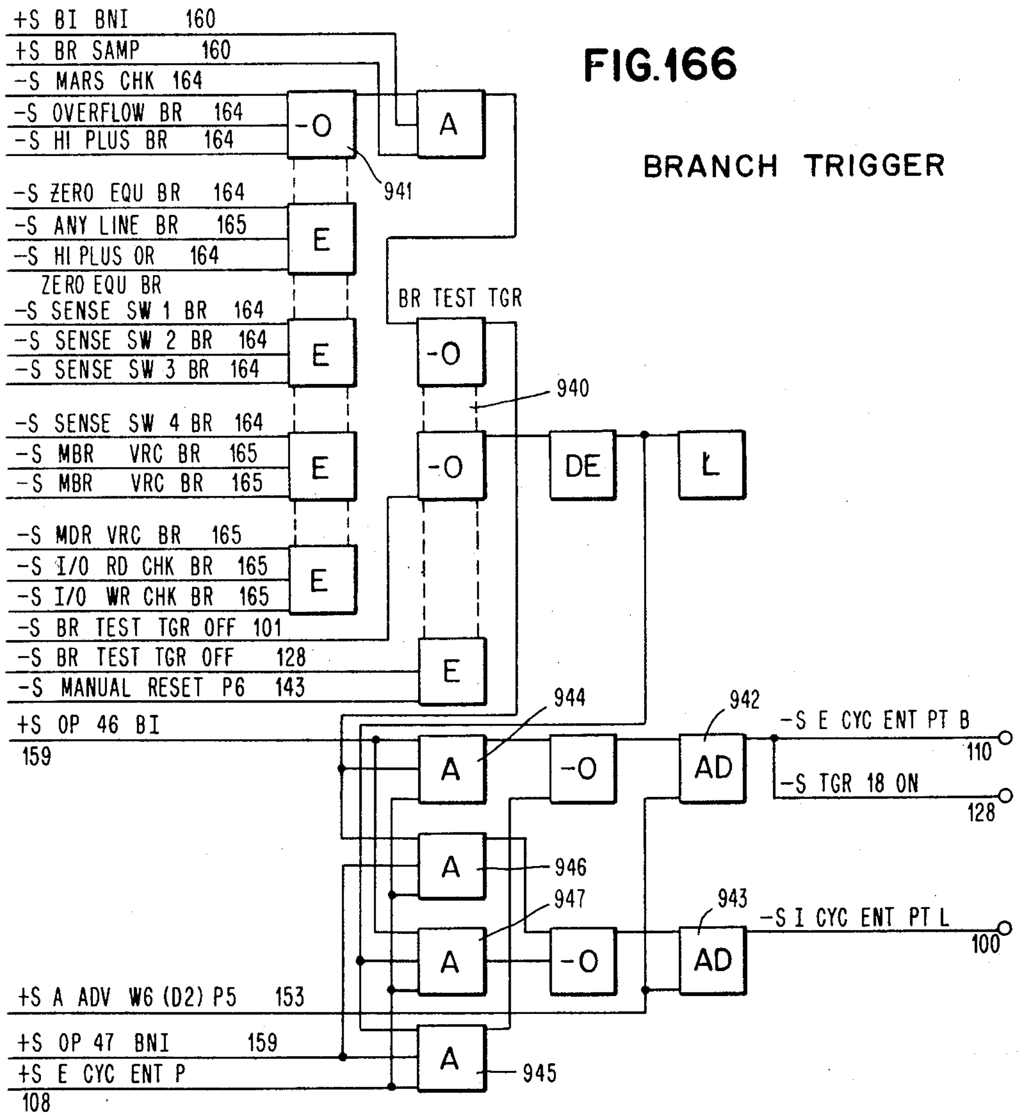

FIG. 166 illustrates branch test trigger 940, which is set by any of the number of —S functional signals applied to -O-block 941. Depending on the setting of branching indicator switches, AD-blocks 942 or 943 are conditioned in response to the branch test trigger. AD-block 942 produces a —S E CYC ENT PT functional signal upon conditioning of A-block 944 or A-block 945. A-block 944 is responsive to the +S set output of the branch test trigger 940, OP 46 BI and E-CYC ENT PT P. Accordingly, the branch will be carried out as the E-cycle is entered. A-block 945 causes entry into the E-cycle on coincidence of +S E-CYC ENT PT P, OP 47 BNI, and a +S signal taken from the not side of the branch test trigger.

AD-block 943, when conditioned, produces a —S I-CYC ENT PT functional signal. AD-block 943 is subject to A-blocks 946 and 947. A-block 946 causes entry into the I-cycle when the branch test trigger of 940 is set, the machine is in OP 47 BNI (branch no inidcator) and the E-cycle entry point signal is available. A-block 947 causes entry into the I-cycle upon coincidence of +S E-CYC ENT PT, BR TEST TGR OFF, and OP 46 BI.

Figure 167:
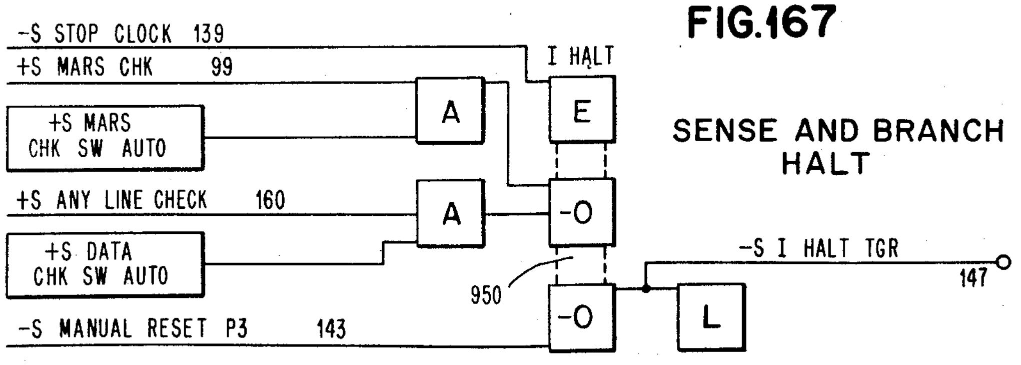

FIG. 167 illustrates the sense and branch halt circuit, which centers around I halt trigger 950. Halt trigger 950 produces a —S I HALT TGR upon being set by a —S stop clock signal, by coincidence of +S MARS check and +S MARS check switch 0 signals, or by coincidence of +S ANY LINE CHECK and +S DATA CHECK SW AUTO signals.

MULTIPLY

Figure 168:
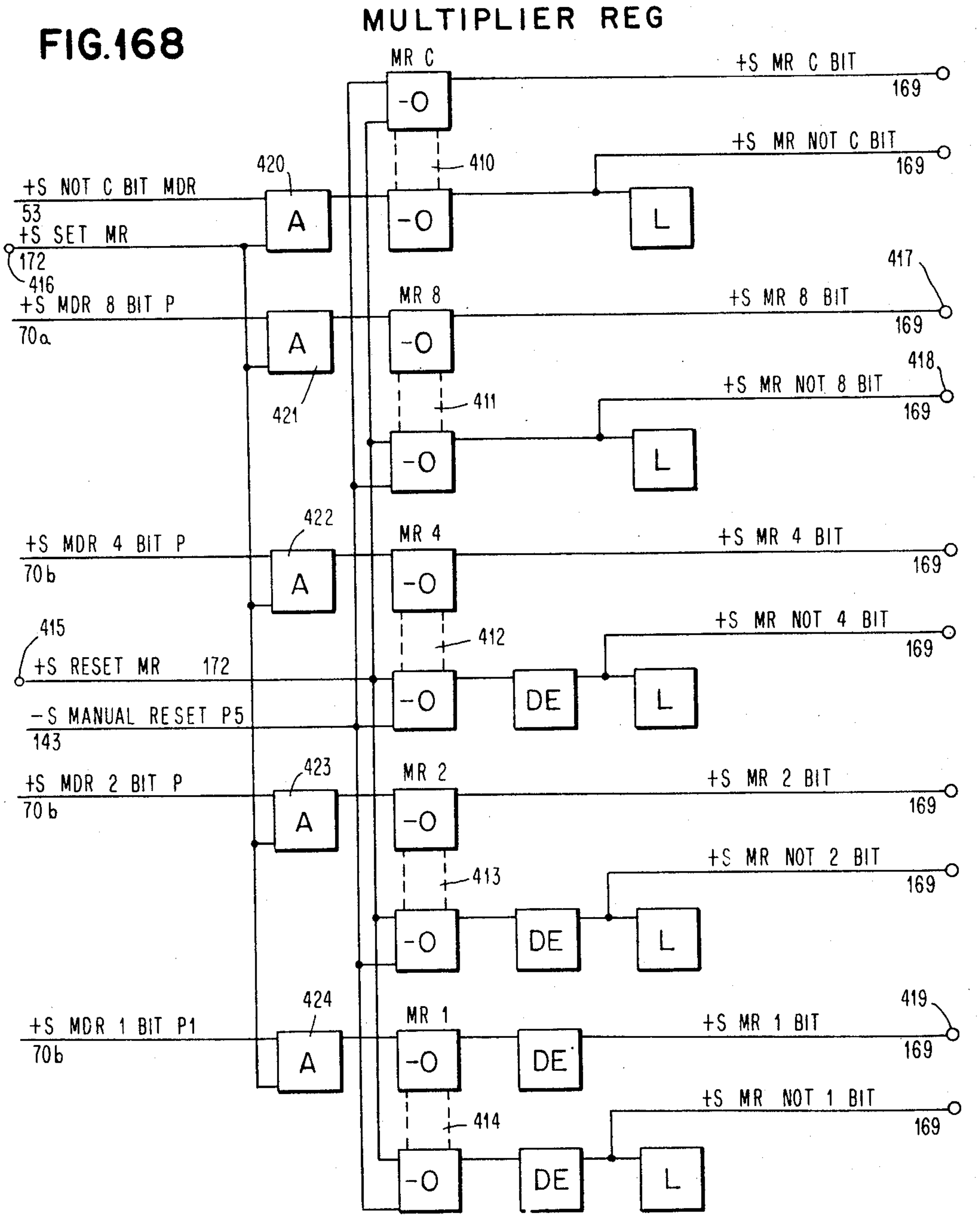

FIG. 168 illustrates the multiplier register which comprises five bit triggers 410–414, functionally designated MRC, MR 8, MR 2 and MR 1. The multiplier register is reset to the "C bit only" condition by a —S RESET MR signal at terminal 415. The multiplier register is then set to a particular digit value according to bit signals from MDR via A-blocks 420–424 upon conditioning of terminal 416 with a +S functional signal SET MR. MR bit signals are continuously available at terminals including 417 (+S MR 8 bit), 418 (+S MR not 8 bit) and 419 (+S MR 1 bit). All bit and not bit signals pass to the doubler.

Figure 169:
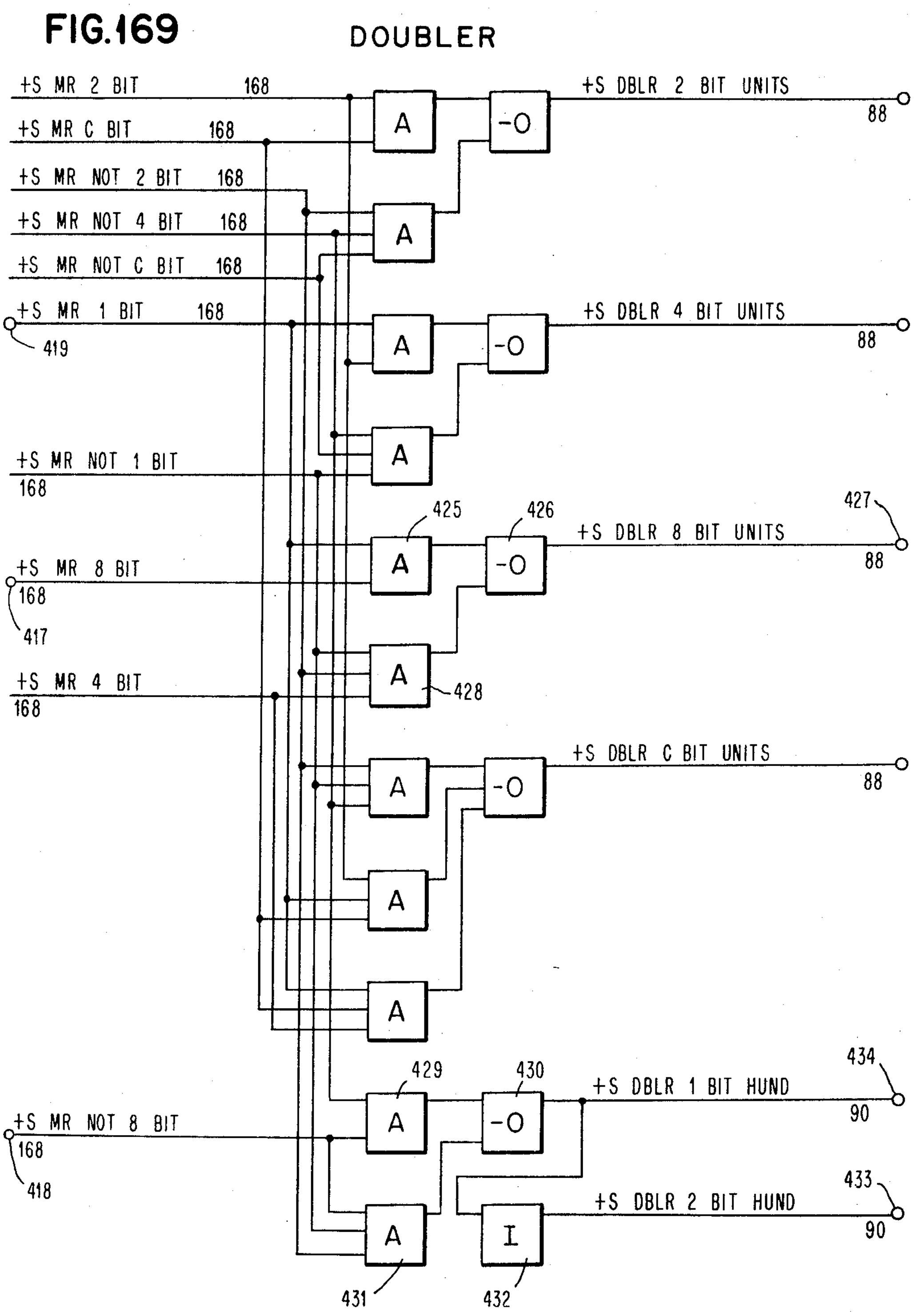

FIG. 169 illustrates the doubler, which accepts a group of bits forming a decimal digit and produces a group of bits forming the units decimal digit of double the input as well as a signal indicative of the carry for doubler of 5–9. The carry or not carry signal is incremented by 1 to cause addressing of the multiply table 00100–00299 in memory. Inputs such as 417–419 from the multiplier register provide an output value double the input value. A-block 425, for example, is conditioned by the 8 bit and 1 bit (decimal 9) to condition -O-block 426 to produce the +S DBLR 8 BIT UNITS functional signal at terminal 427. A-block 428 is conditioned by the 4 bit, not 1 bit, and not 2 bit functional signals (decimal 4) to condition -O-block 426 to provide the +S DBLR 8 BIT UNITS functional signal at terminal 427. The +S MR NOT 8 BIT functional signal at terminal 418 coincident with a not 4 bit functional signal conditions A-block 429 for all decimal values which contain neither 8 nor 4 bits (decimal 0–3.) A-block 431 is conditioned by coincident +S functional signals MR NOT 8 BIT, MR NOT 1 BIT and MR NOT 2 BIT to provide a +S functional signal for decimal value 4. Accordingly, -O-block 430 is conditioned by two +S inputs when the MR decimal digit values are 0, 1, 2, 3, or 4; these values when doubled do not produce a carry. -O-block 430, being conditioned, provides a +S DBLR 1 BIT HUNDreds. For decimal values 5–9, -O-block 430 is deconditioned by either of A-blocks 429 and 431; I-block 432 forms the +S functional signal DBLR 2 BIT HUNDS at terminal 434. Functionally, the doubler provides a bit structure for the two digit doubled value of its input bit structure, split into a units digit and hundreds digit (carry plus 1).

Figure 170:
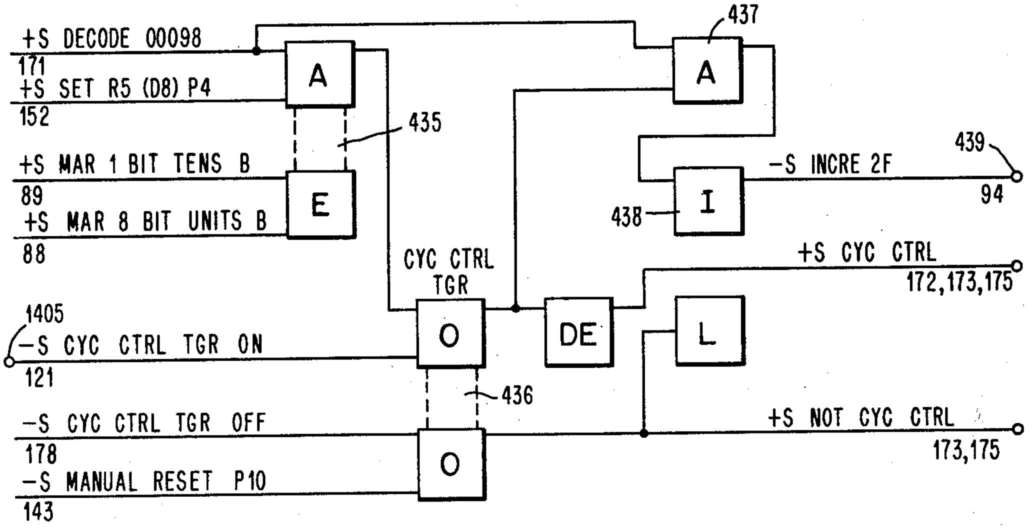

FIG. 170 illustrates multiply cycle control trigger 436 and its associated circuits. The cycle control trigger is reset prior to multiply; it is set on by coincidence at A-block 435 of +S functional signals DECODE 00098, set R5(D8), MAR 1 BIT TENS and MAR 8 BIT UNITS. The cycle control trigger conditions A-block 437 to provide via I-block 438 a −S INCRE 2 functional signal at terminal 439. A-block 435 can decode 00098 by merely anding the 1 bit tens with the 8 bit units, since this bit structure appears only in numbers ending in 98 and since the operation is known to have started at address 00080. The cycle control trigger has the function of ending multiply program stage 1, in which the accumulator area in memory is cleared.

Figure 171:
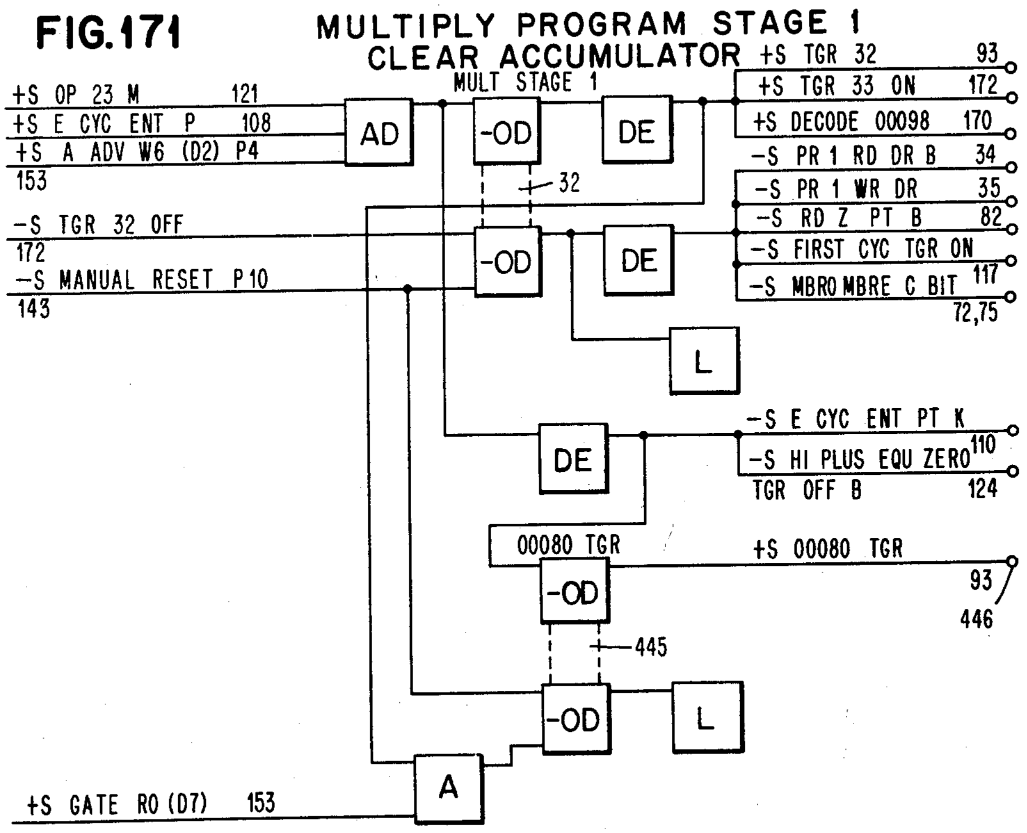

FIG. 171 illustrates multiply program stage 1 trigger 32 and its associated circuits. Multiply stage 1 trigger 32 is set at the beginning of a multiply instruction execute cycle. When set, trigger 32 produces +S functional signals TGR 32, TGR 33 ON and DECODE 00098. Its off side produces −S functional signals PR 1 RD DR B, PR 1 WR DR RD Z PT B, FIRST CYC TGR ON and MBRO MBRE C BIT. At the same time that multiply stage 1 trigger 32 is turned on, 00080 trigger 445 is also turned on to produce a +S functional signal 00080 TGR at terminal 446. The effect of multiply program stage 1 is to start clearing the accumulator area in the memory at address 00080; stage 1 is illustrated functionally as block 551 in FIG. 8. Stage 1 clear accumulator steps are taken repetitively until the cycle control trigger 436 in FIG. 170 is turned on upon recognition of address 00098. The cycle control trigger turns on trigger 33 in FIG. 172 which in turn turns off trigger 32 in FIG. 171.

Figure 172:
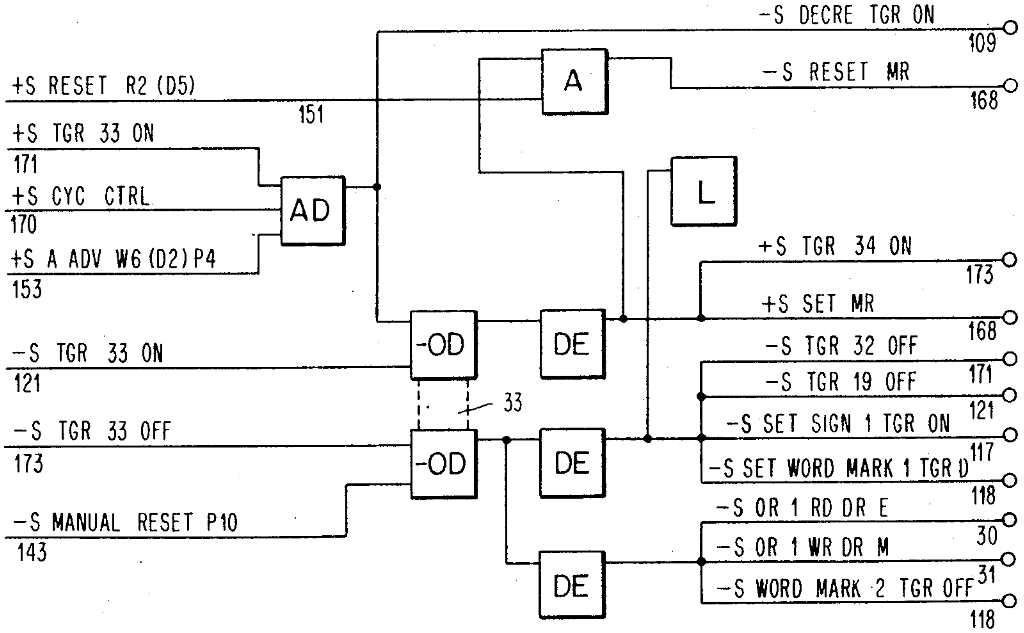

FIG. 172 illustrates multiply program stage 2, read multiplier digit. Multiply program stage 2 trigger 33 is set on by the cycle control trigger and produces +S SET MR and TGR 34 ON, and −S TGR 32 OFF, TGR 19 OFF, SET SIGN 1 TGR ON, SET WORD MARK 1 TGR, OR 1 RD DR E, OR 1 WR DR M and WORD MARK 2 TGR OFF functional signals. This provides the multiplier register with the low order digit of the multiplier, and sets up sign and word mark housekeeping circuits. The doubler provides MAR with the doubled digit, in the units and hundreds position.

Figure 173:
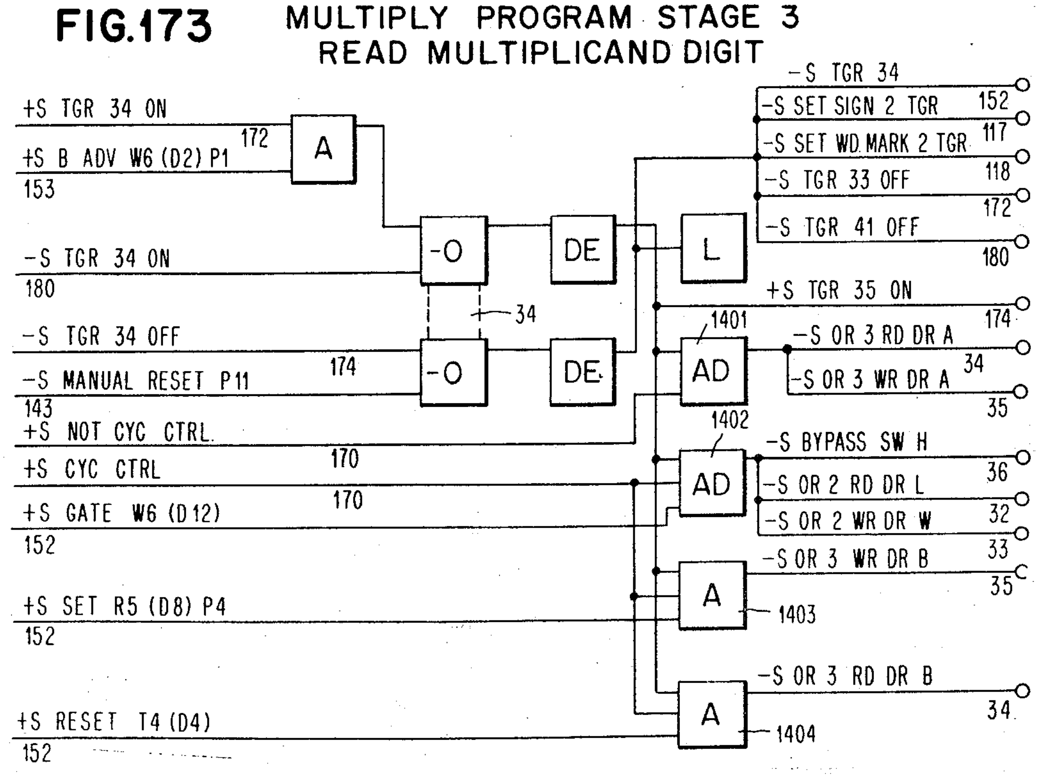

FIG. 173 illustrates multiply program stage 3, read multiplicand digit. Multiply program stage 3 trigger 34 is turned on following trigger 33. It produces −S functional signals TGR 34, SET SIGN 2 TGR, SET WORD MARK 2 TGR, TGR 33 OFF and TGR 41 OFF. It also produces a +S TGR 35 ON functional signal and conditions a set of AND circuits to produce control signals to read the multiplicand digit. AD-block 1401 under control of trigger 34 and the +S NOT CYC CTRL functional signal produces −S OR 3 RD DR and OR 3 WR DR signals.

AD-block 1402 is conditioned by trigger 34 and a +S cycle control signal to produce −S functional signals bypass switch, OR2 read driver and OR2 write driver. A-block 1403 is conditioned earlier in the cycle to produce a −S OR 2 write driver signal. A-block 1404 is conditioned later in the cycle to provide a −S OR 3 read driver signal. MAR is thus provided with the multiplicand digit in the tens position.

Figures 174, 175, 176:
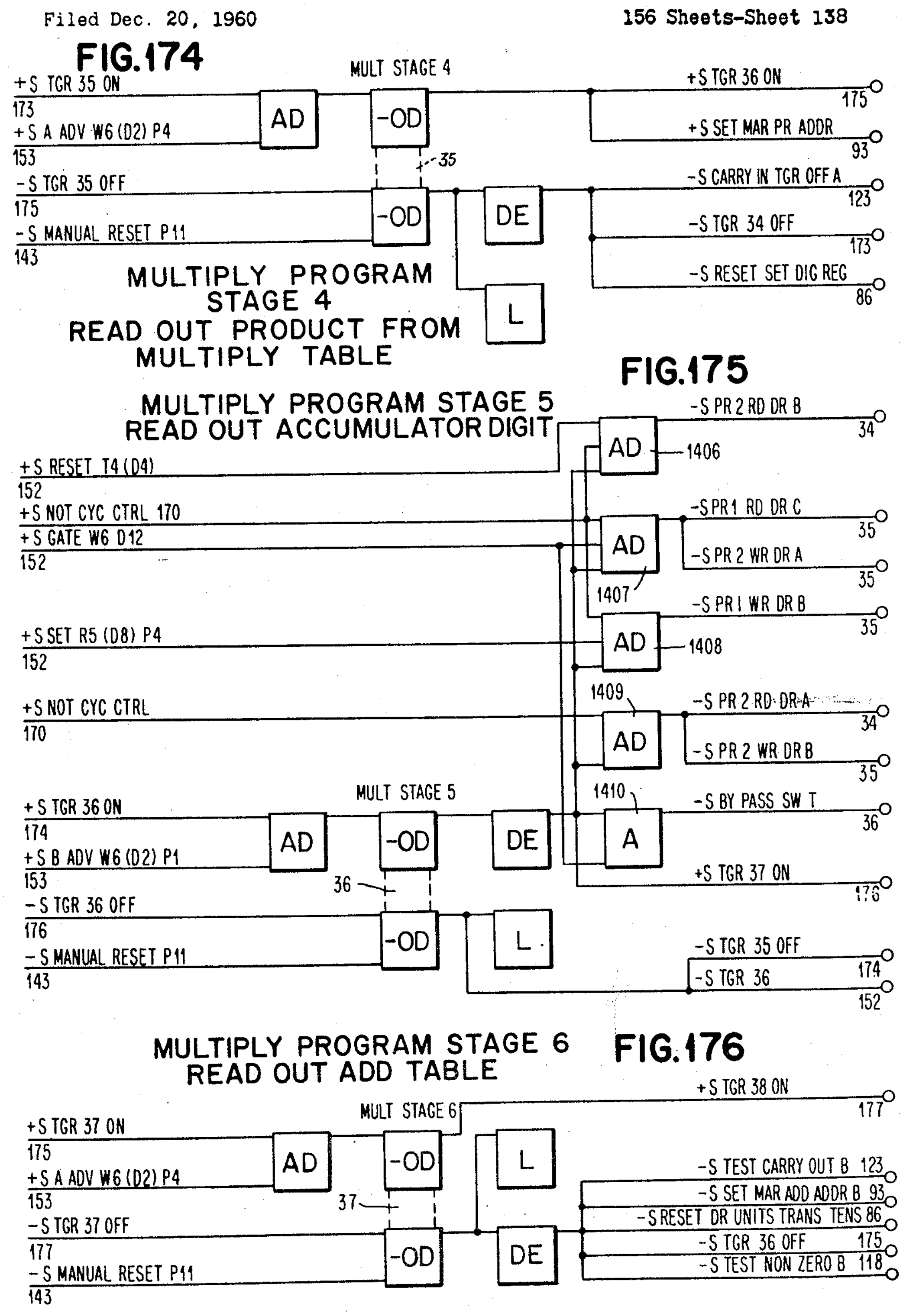

FIG. 174 illustrates multiply program stage 4, read out product from multiply table. Multiply stage 4 trigger 35 controls this stage by producing +S functional signals TGR 36 ON and SET MAR PR ADDR and −S functional signals CARRY IN TGR OFF, TGR 34 OFF and RESET SET DIG REG. The product address, built up during multiply stages 2 and 3, provides access to the actual two-digit partial product of the multiplier and multiplicand digits.

The two-digit partial product, which appears transposed in the multiply table (i.e., 5×7=53) passes to the digit registers and is re-transposed in passing. Each multiply table address is even, because of the doubling; the addressed digit (units order) is read out from an even address via MBRE to MDR. This digit (5 in 5×7=53) passes along bus 609 (FIG. 1*a*) to DRU 611. The tens digit (3 in 5×7=53), which is carried along with the addressed table position (an even numbered memory location carries along its higher adjacent odd numbered location), passes from MBRO 603 to DRT 610.

FIG. 175 illustrates multiply program stage 5, read out accumulator digit, which centers around multiply stage 5 trigger 36. Trigger 36 is turned on by an advance pulse on the cycle following program stage 4 and produces functional signals −S TGR 35 OFF and TGR 36 TIME and +S TGR 37 ON. Trigger 36 "on" output also conditions AD-blocks 1406–1409 and A-block 1410 to produce under gating and cycle control −S functional signals PR 2 RD DR B, PR 1 RD DR C, PR 2 WR DR A, PR 1 WR DR B, PR 2 WR DR A, PR 2 WR DR B and BYPASS SW J. If the +S CYC CTRL functional signal is available, AD-blocks 1406–1408 produce functional signals to read out and write PR1 and PR2. If the +S NOT CYC CTRL functional signal is available, AD-block 1409 reads out PR2 only. The cycle control trigger is set by A-block 435 prior to the first multiply cycle by a −S CYC CTRL TGR ON functional signal at terminal 1405 if there is a not carry out situation.

Accordingly, the appropriate digit of the product area (accumulator) in memory is read out per PR2 (PR1 on the first multiply cycle associated with a new multiplier digit) to the tens position of MAR. Simultaneously the units digit of the two-digit product in the digit registers is read to the units position of MAR. This manufactures an address (a three is forced into the hundreds position of MAR) which is the address of the add table box containing the sum of the product area digit and the new partial product digit.

FIG. 176 illustrates multiply program stage 6, read out add table, which is controlled by trigger 37. Trigger 37 turns off trigger 36 and conditions trigger 38 for turn on in the next cycle, and provides the following −S functional signals: TEST CARRY OUT B, SET MAR ADD ADDR, RESET DR UNITS TRANS TENS and TEST NON-ZERO B. Program stage 6 produces the accumulated sum and carry flag of the product area digit and the new partial product digit from the add table and places them in MDR.

FIG. 177 illustrates multiply program stage 7, write sum digit into accumulator. Trigger 38 controls circuits to write the low order digit and accumulator digit sum into the appropriate position of the accumulator per PR2 and decrement the address contained in PR2. On the first cycle, A-blocks 1427 and 1428 provide sign control. If one operand only is minus, either A-block 1427 or A-block 1428 is conditioned to provide, via intervening circuits including A-block 1431, a −S functional signal SET F BIT D. A-blocks 1429 and 1430 produce −S functional signals HIGH PLUS TGR ON and CLEAR F BIT if both operands have the same sign. Trigger 38 controls A-blocks 1429–1432 to handle sign control as well as to read out PR3. The off side of trigger 38 produces −S functional signals RD Y PT F, TRANS CO to CI, PR 2 RD DR C, PR 2 WR DR C and PR 3 WR DR A which provide for addition to a previously built up accumulated partial product in the accumulator area.

FIG. 178 illustrates multiply program stage 8, read out accumulator digit. Trigger 39 controls this stage which is similar in most respects to the stage 5 circuitry in FIG. 175. This stage prepares to accumulate the high order of the partial product. Trigger 39 is effective to turn off trigger 38 and turn on trigger 40 and to produce the following −S functional signals; RESET CO TGR, CYC CTRL TGR OFF, TGR 19 OFF, FIRST CYCLE TGR OFF, BYPASS SW K, PR 3 RD DR B and PR 3 WR DR B. Accordingly, during stage 8, the next order digit of the accumulator area, the address of which was read out per PR2 to MARS on the preceeding cycle, is loaded into the tens position of MAR. Simultaneously, the tens digit of the two-digit product in the digit registers is read to the units position of MAR via the bypass switch.

Figure 179:
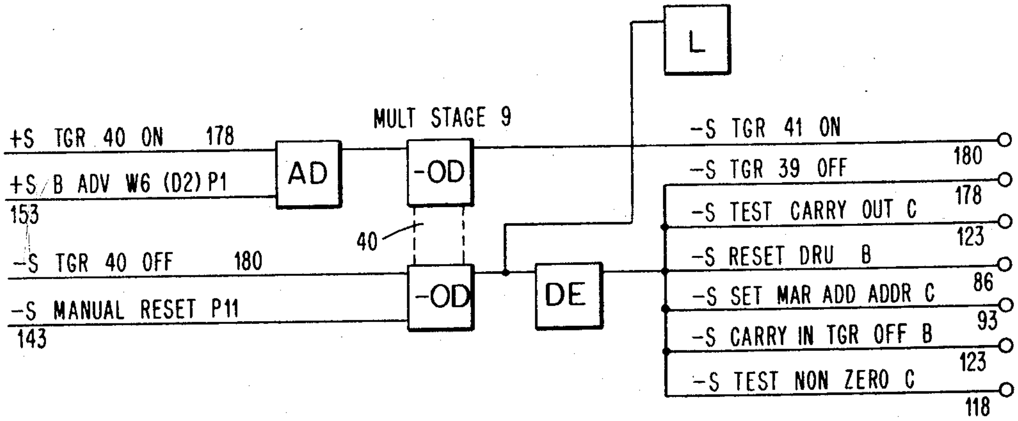

FIG. 179 illustrates multiplier program stage 9, read out add table, which is controlled by trigger 40. Trigger 40 turns off trigger 39 and conditions trigger 41 for turn on during the next cycle. It produces —S functional signals TEST CARRY OUT, RESET DRU, set MAR ADD ADDR C, CARRY IN TGR OFF and TEST NON ZERO. Acordingly, multiply program stage 9 sets a 3 into the hundreds position of MAR and reads out the add table location specified by the accumulator digit and the partial product tens digit. The add table sum remains in MDR as a digit and, where appropriate, an F bit signifying carry.

Figure 180:
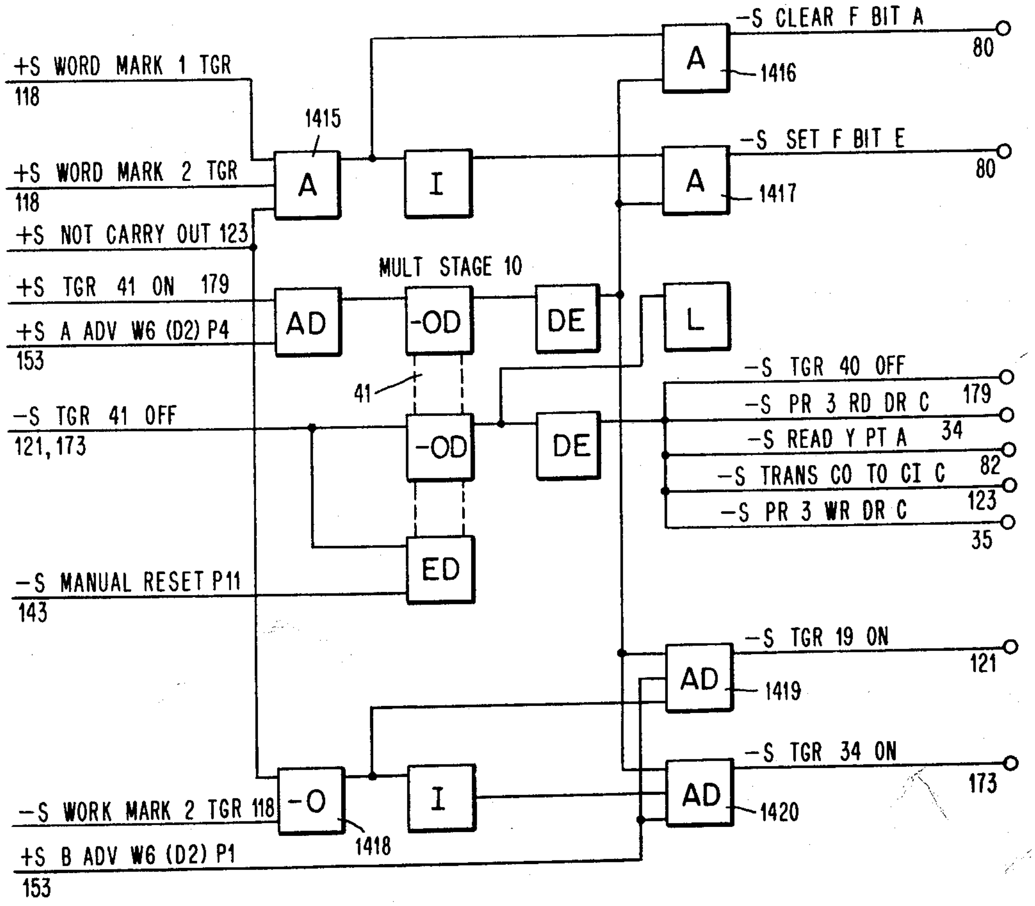
Figure 181:
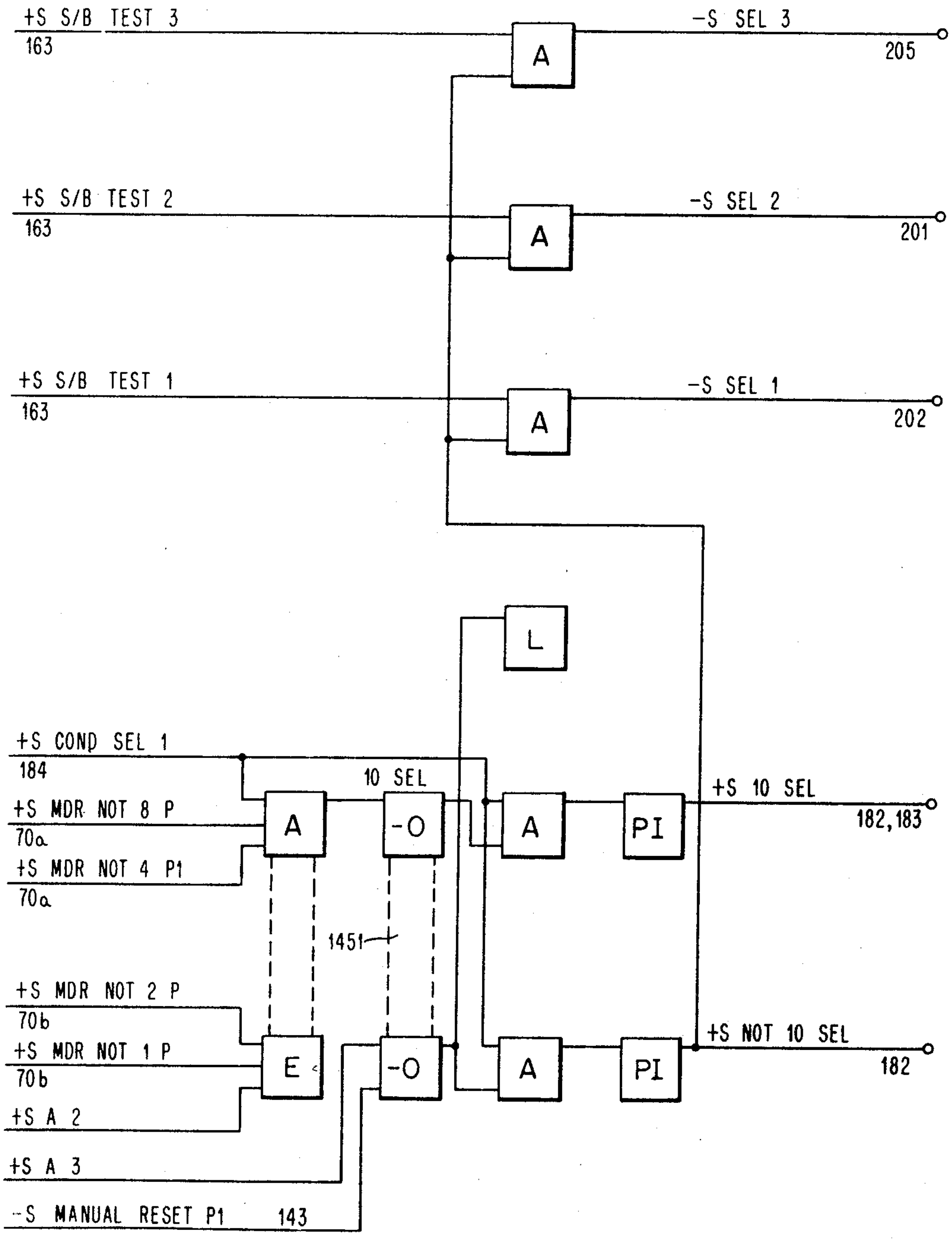
Figure 182:
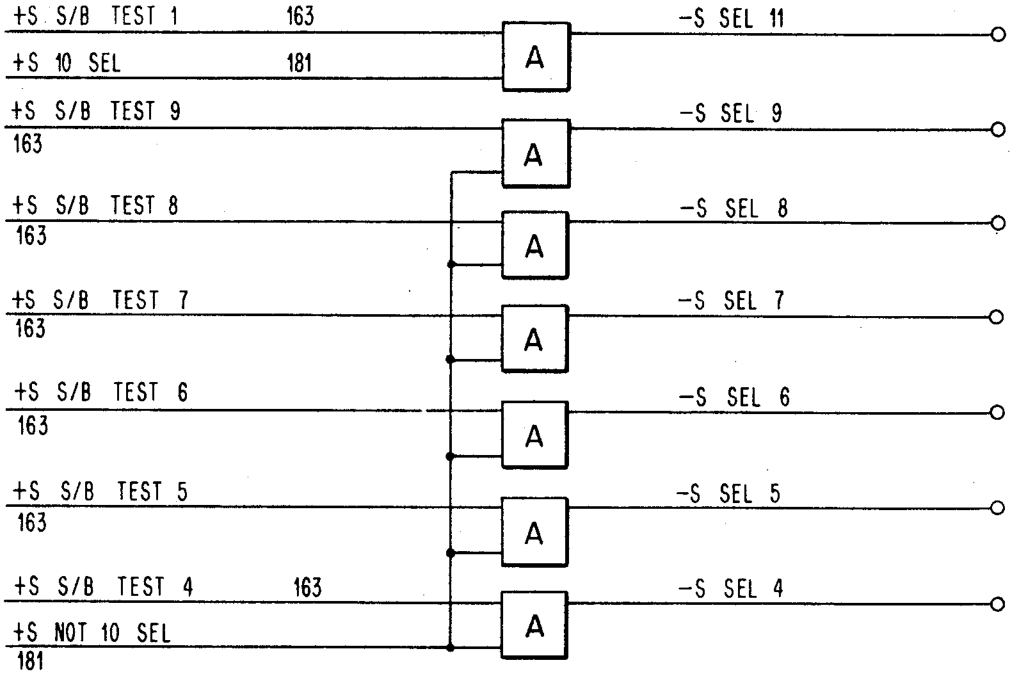
Figure 183:
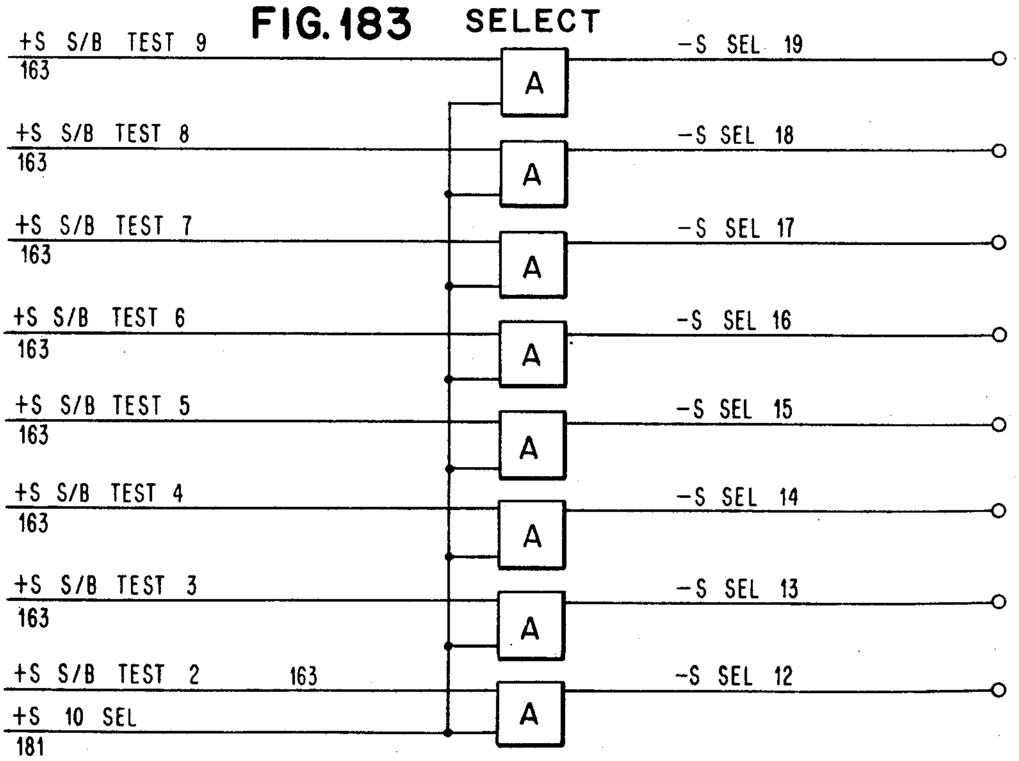
Figure 191:
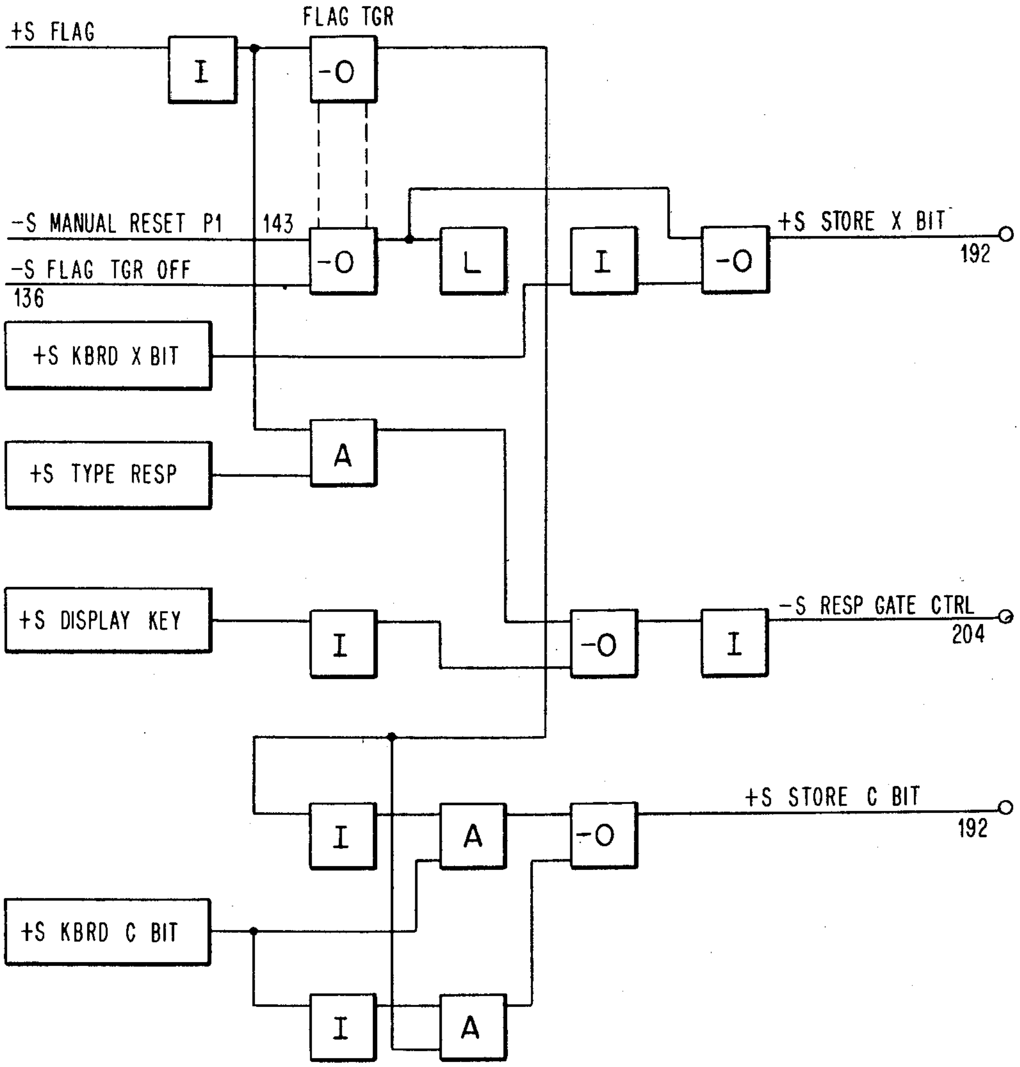
Figure 192:
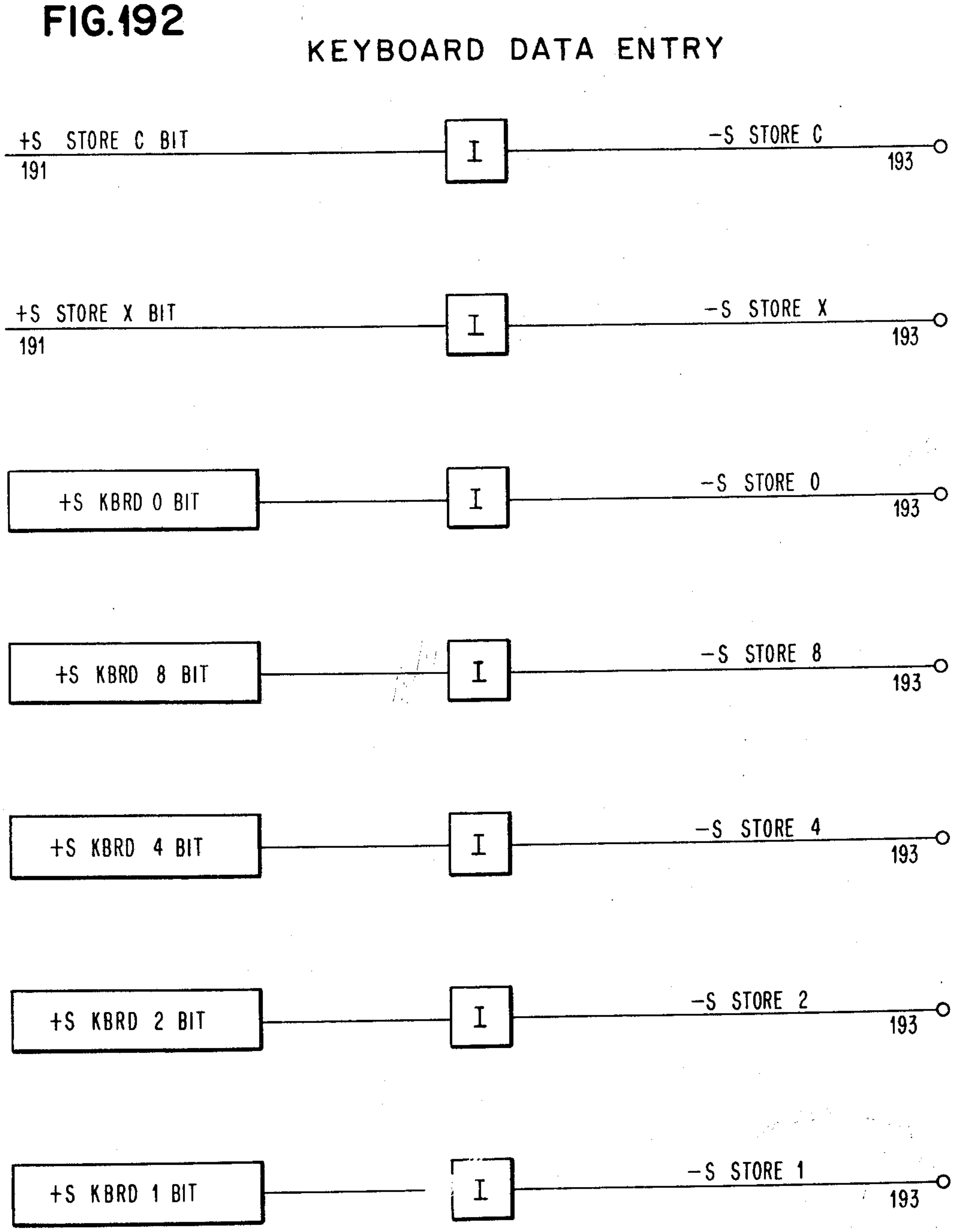
Figure 193:
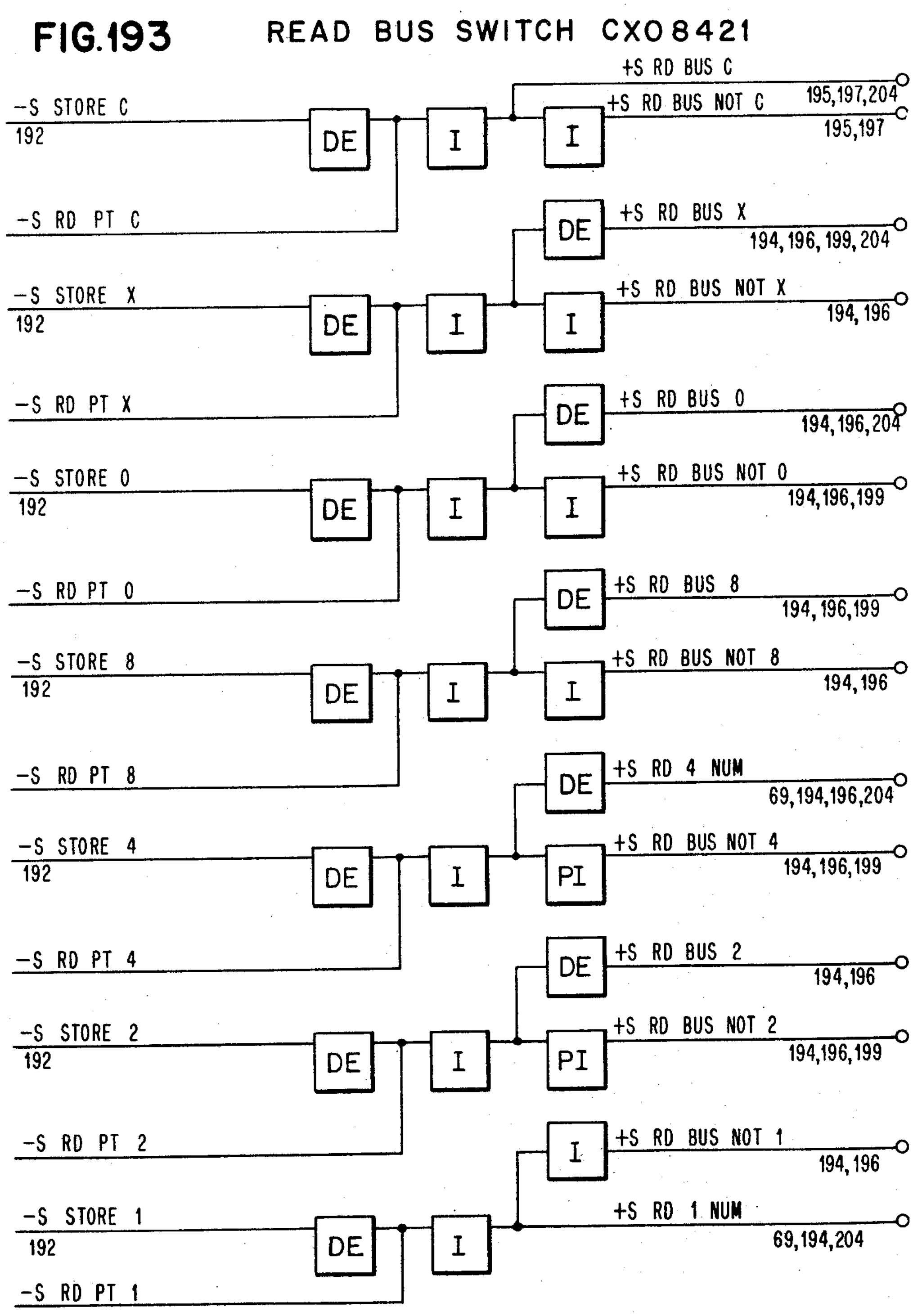
Figure 194:
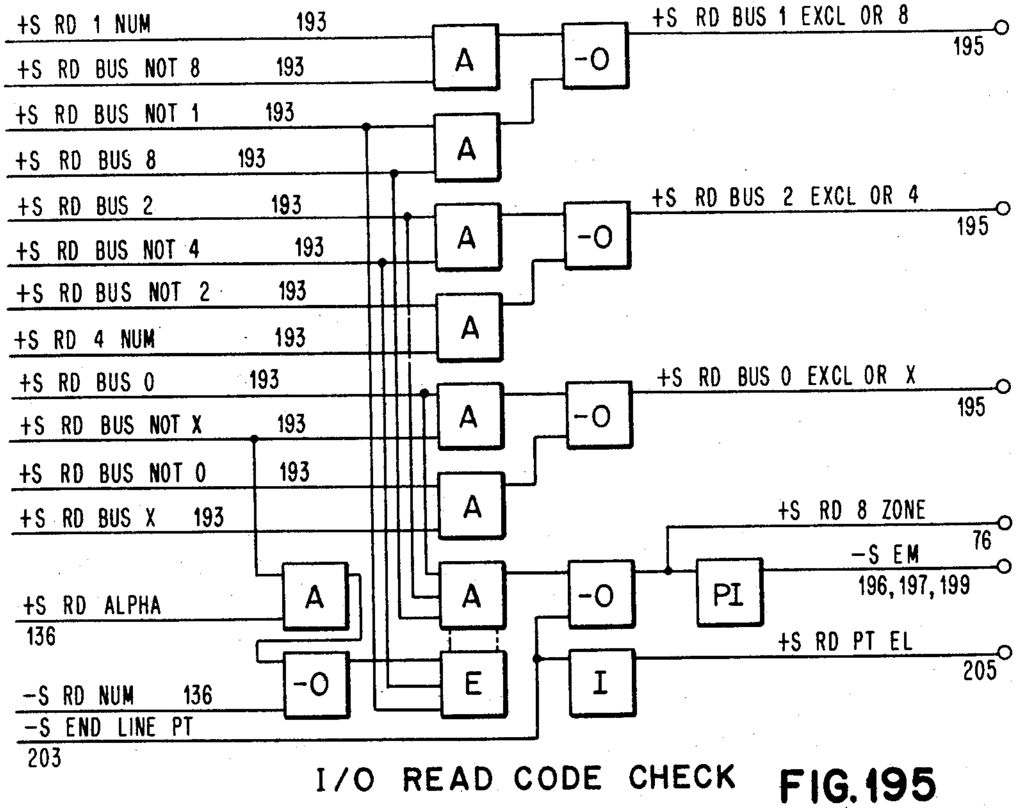
Figure 195:
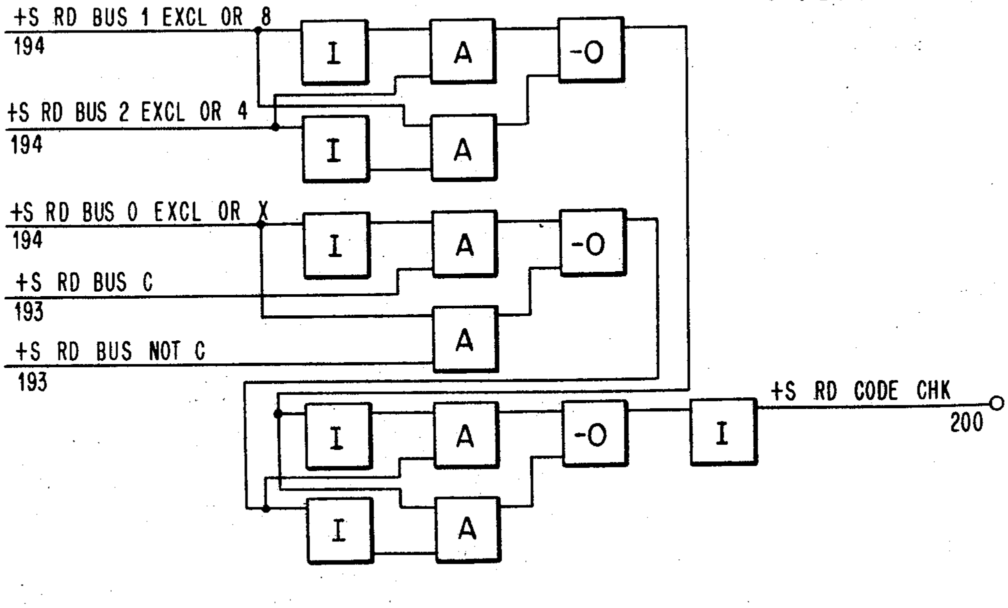
Figure 196:
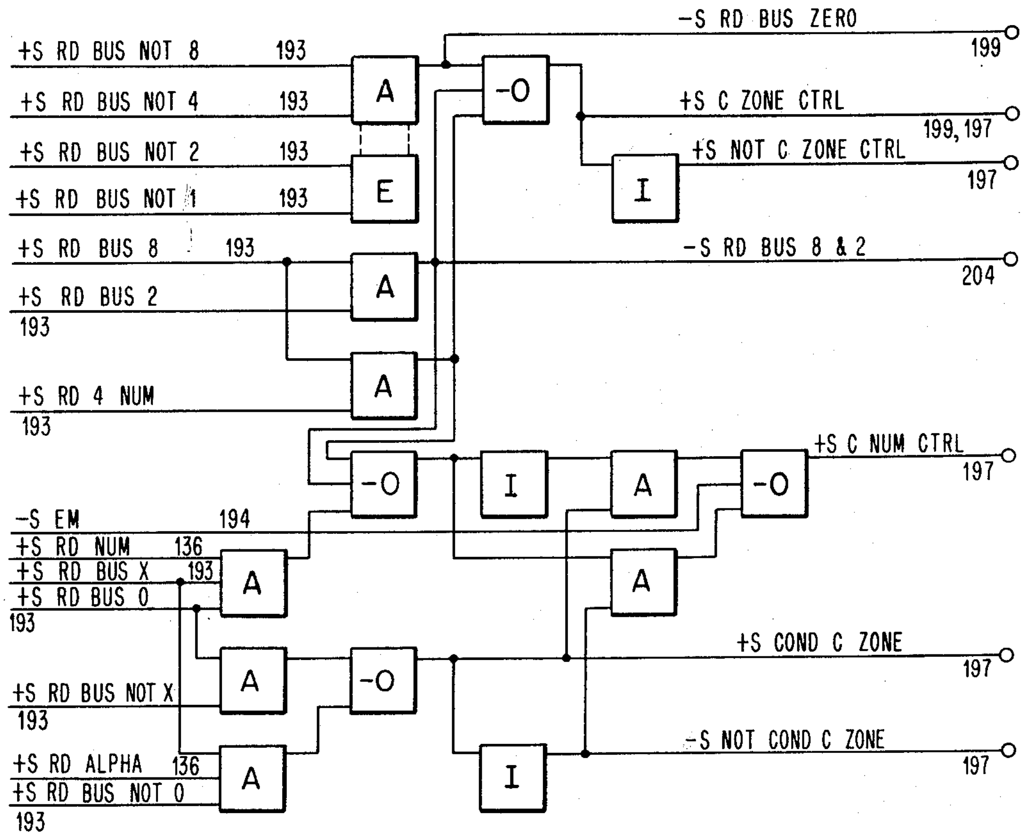
Figure 197:
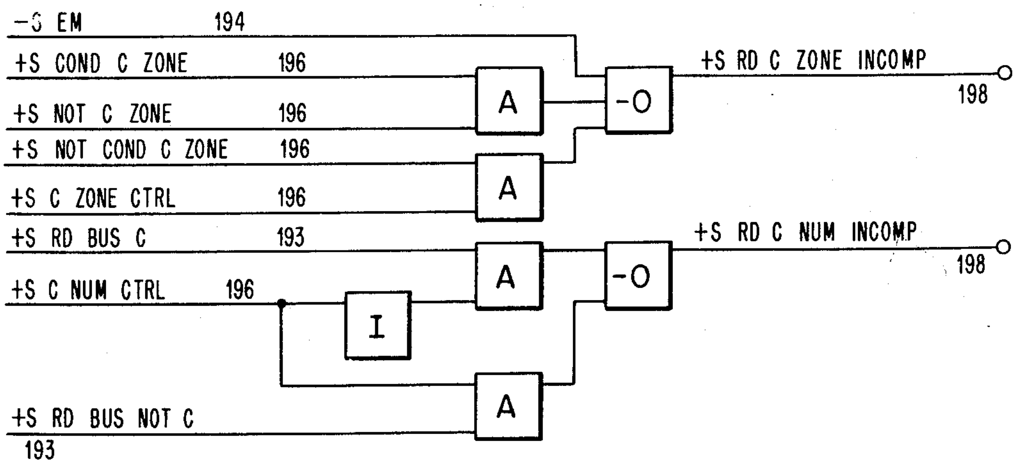
Figure 198:
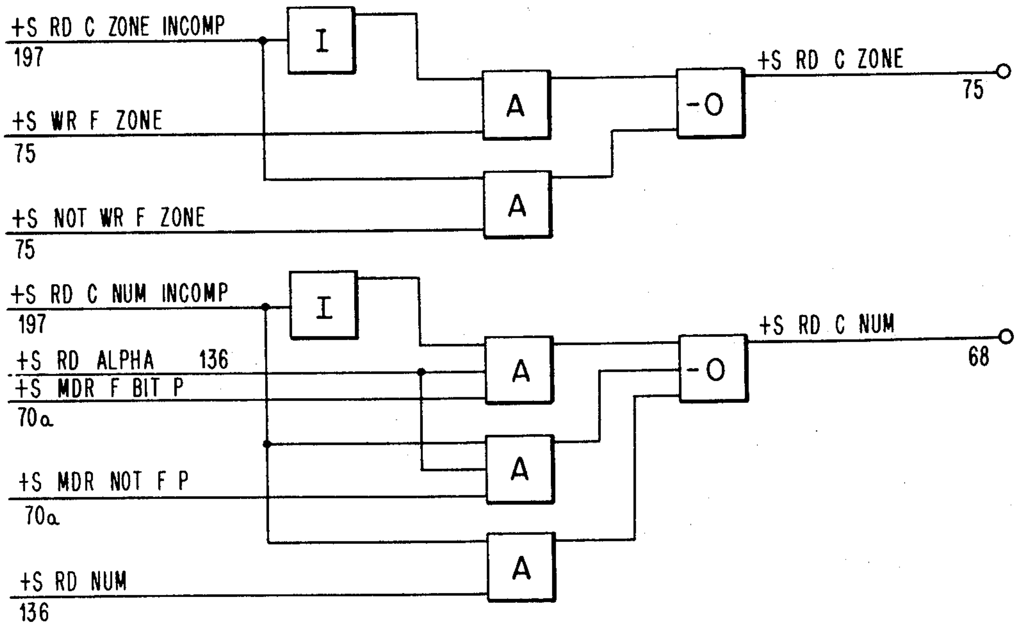
Figure 199:
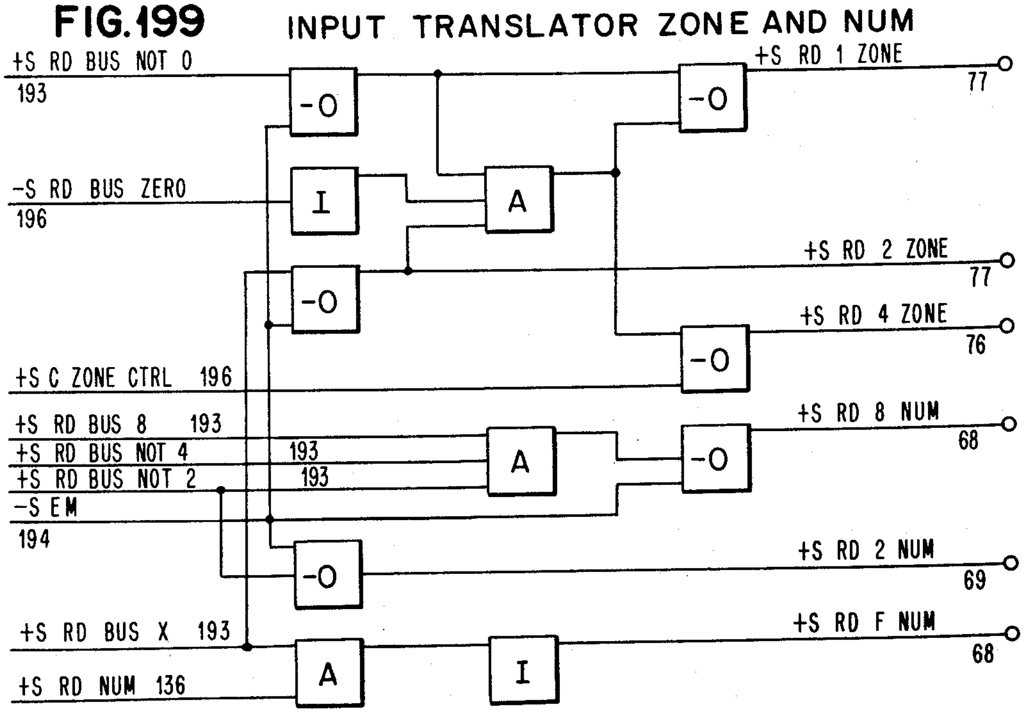
Figure 202:
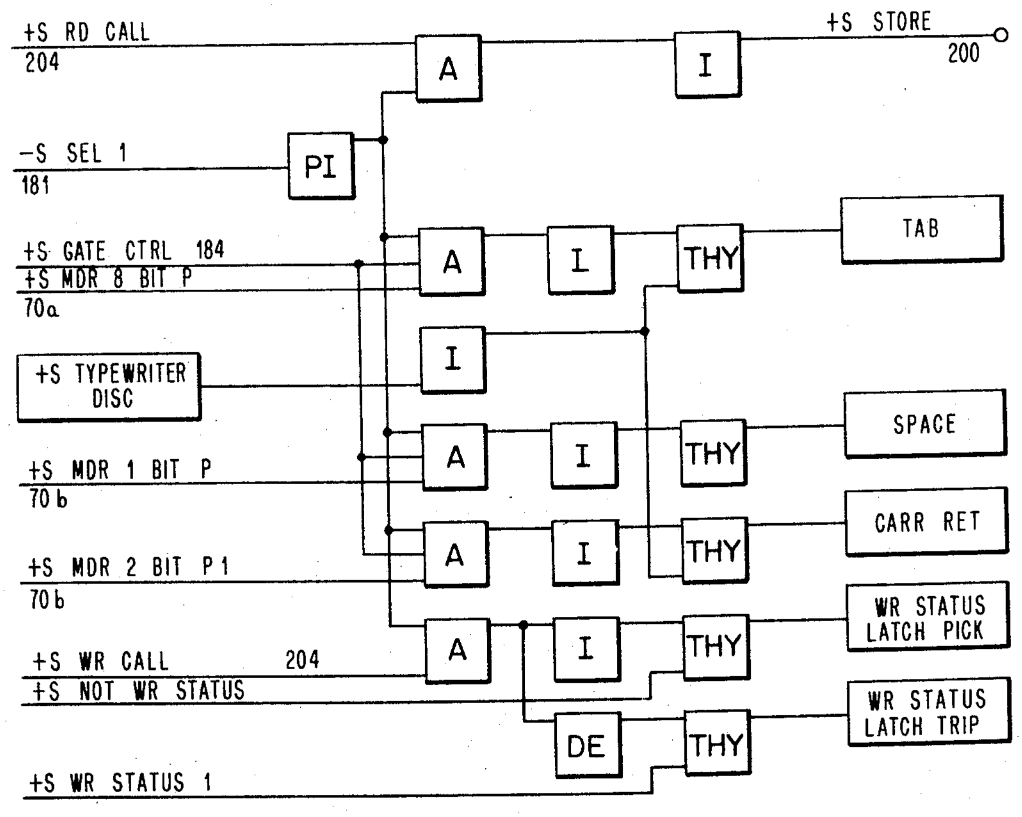
Figure 203:
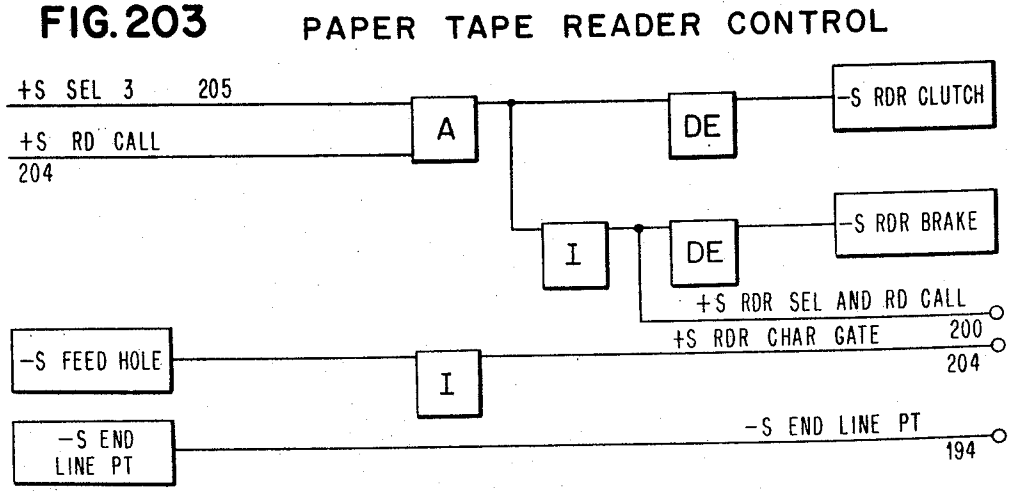
Figure 206:
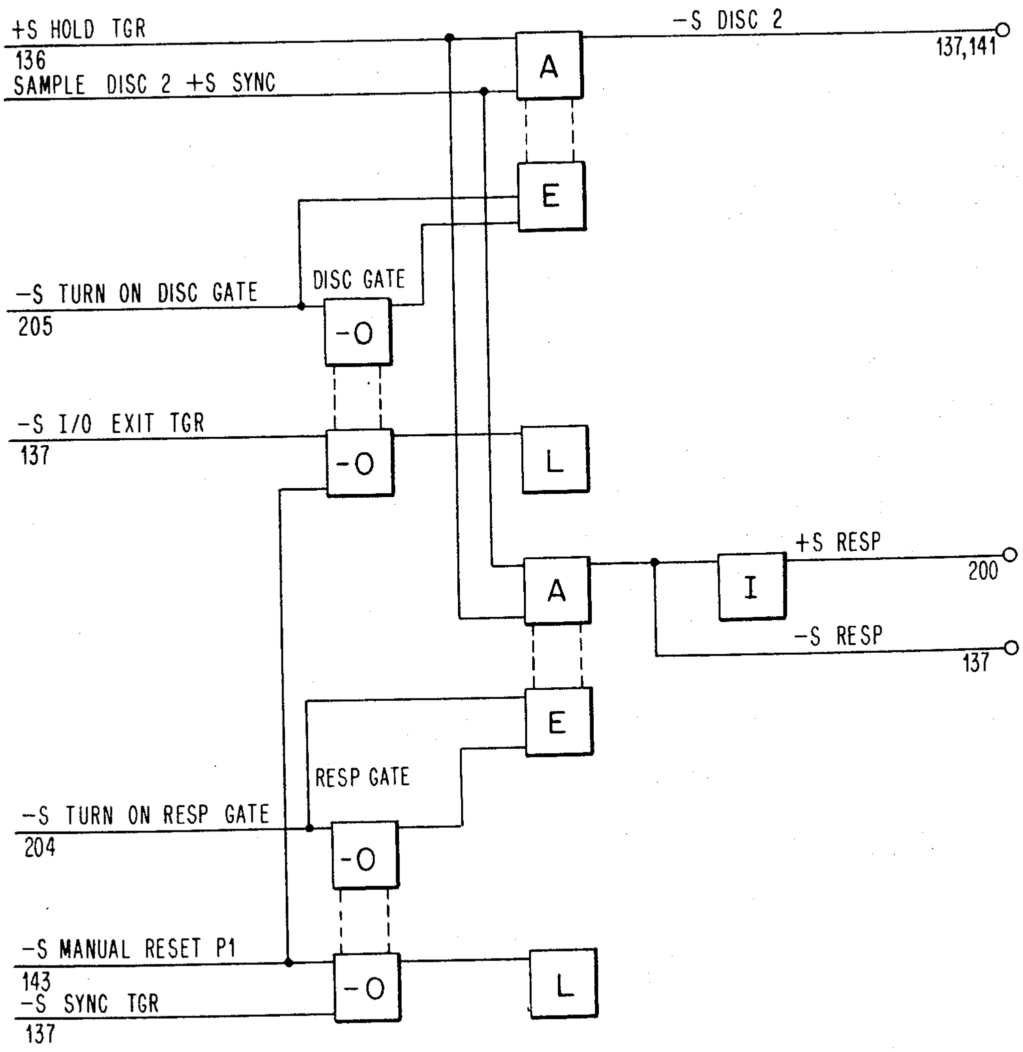

FIG. 180 illustrates multiply program stage 10, write sum digit into accumulator. Trigger 41 produces —S functional signals TGR 40 OFF, PR 3 RD DR C, RD Y PT, TRANS CO TO CI, and PR 3 WR DR C. It also provides LOOPER block 572 of FIG. 8 for controlling the accumulator high order F bit and for returning to either program stage 2 or program stage 3 according to the need for a new multiplier digit.

A-block 1415 ascertains the high order position in the product by coincidence of +S functional signals WORD MARK 1, WORD MARK 2 and NOT CARRY OUT. A-block 1415, when not conditioned by the triple coincidence which determines the high order digit of the product, produces a —S functional signal which deconditions A-block 1416 to provide the —S CLEAR F BIT functional signal. A-block 1415, when conditioned for the high order product digit, produces via an inverter a —S input to A-block 1417 to provide the —S functional signal SET F BIT E. O-block 1418 is conditioned by a —S WORD MARK 2 TGR functional signal or by a —S CARRY OUT signal to condition AD-block 1419 to produce a —S functional signal TGR 19 on. Trigger 19, in FIG. 121, in turn sets the cycle control trigger in FIG. 170, trigger 33 (multiply stage 2) or trigger 39 (multiply stage 8), whichever is appropriate. If inputs to O-block 1418 are NOT WORD MARK 2 and NOT CARRY OUT, the —S output is inverted to condition AD-block 1420 and provide —S functional signal TGR 34 ON; the multiply program returns to trigger 34, multiply program stage 3 in FIG. 173. Accordingly the looper returns the multiply program to stage 2, stage 3, stage 8 or to the succeeding I-cycle according to work marks and carries.

SUMMARY OF MULTIPLICATION

The multiply instruction sets up the program timer for a multiply operation and sets up MARS to produce the operands and to control the multiply operation. At the end of the multiply I-cycle, IR1 contains the address of the next instruction; IR2 is not used; OR1 contains the address of the units position of the multiplier; OR2 contains the address of the units order of the multiplicand; OR3 also contains the address of the units digit of the multiplicand; PR1, PR2 and PR3 are reset to zeros.

At the beginning of the multiply program execution cycle, 00080 trigger 445 and multiply stage 1 trigger 32 in FIG. 171 start the clear accumulator cycle. The accumulator is cleared two digits at a time under control of the —S INCRE 2 output of I-block 438 in FIG. 170 until address 00098 is decoded at A-block 435 to turn on cycle control trigger 436. Multiply program stage 1 clears the accumulator under control of PR1, which is set by the 00080 trigger at beginning of the clear accumulator routine and contains 00099, the units order address of the accumulator, as the program proper is entered at stage 2. The cycle control trigger is now on. Multiply program stage 2 reads the multiplier digit from memory per PR1 and stores the digit in the multiplier register where it is retained for use with each digit of the multiplicand. Multiply program stage 3 reads the multiplicand digit per OR2 and places the digit in the tens position of MAR. Simultaneously, the multiplier digit is passed through the doubler to form a digit and a carry which are entered into the units position and hundreds position of MAR respectively. The digit entering the hundreds position of MAR is increased by one to address the multiplication table properly. At this point an address has been manufactured to read the two digit product (whose digits are in reverse order from the multiplication table stored in memory locations 00100 to 00299 to the memory buffer register. On multiply stage 4 the two-digit partial product is read from the memory multiply table and stored in proper order in the digit registers DRU and DART.

The partial product is stored in DRT and DRU. On multiply program stage 5 the appropriate digit of the accumulator in memory is obtained per PR1 (PR2 on multiply cycles other than the first cycle associated with a new multiplier digit) to the tens position of MAR. Simultaneously, the digit in DRU is read to the units position of MAR. Multiply program stage 6 is a table lookup add according to the manufactured address in MAR which is 003 and the digits previously loaded into MAR tens and MAR units. The sum of the units digit of the partial product and the units digit of the accumulation of partial products (0 at this stage) is placed in MBR. Multiply program stage 7 writes the sum digit from MBR into the accumulator per PR2 and decrements PR2. PR2 then contains the address of the tens order in the accumulator (on the subsequent cycle PR2 contains the address of the higher of the two orders involved on the first cycle, which accomplishes the equivalent of a shift of partial products).

Multiply program stage 8 reads out the tens order accumulator digit per PR2 to the tens position of MAR. Simultaneously, the tens digit of the two-digit product in DRT is read out to the units position of MAR. Multiply program stage 9 performs a table lookup add operation on the digits just previously loaded into MAR, with a 3 forced into the hundreds position to provide access to the add table. Multiply program stage 10 writes the sum digit into the accumulator tens order per PR2.

A carry out at this point on the first pass through the multiply program is not possible since the accumulator area has been reset at the beginning of the multiply operation. AD-block 1420 in FIG. 180 is conditioned to return the multiply program to trigger 34, multiply program stage 3. On the next cycle, the new multiplicand digit is read from memory per OR2 and the process is repeated through program steps 4–10. At this point, a carry out is still not possible even though there was possibly a finite number in the accumulator. Even if the multiplication was all 9's, the maximum number which could be in the accumulator at this point is 891, which does not cause a carry out at this point. Accordingly, the multiply program returns to program stage 3 (FIG. 173) to obtain another multiplicand digit. AD-block 1401 is conditioned at this point to produce —S functional signals OR 3 RD DR and OR 3 WR DR. AD-block 1402 is deconditioned since the cycle control trigger is reset; OR2 is not affected. Upon obtaining the high order multiplicand digit, the word mark 2 trigger is set and, upon processing through stage 10, AD-block 1419 (FIG. 180) sets trigger 19 (FIG. 121) which conditions one input each of AD-blocks 1549 and 1550. No carry out has yet occurred; AD-block 1550 is not fully conditioned. AD-block 1549, however, turns trigger 33 on (FIG. 172) and sets the cycle control trigger (FIG. 170) which was reset during multiply program stage 8 of the pass through the multiply program for the first multiplicand digit.

Trigger 33 in FIG. 172 controls multiply program stage 2 which causes readout of a second multiplier digit and passes control of the multiply program to trigger 34 in FIG. 173. Since the cycle control trigger is set, AD-block 1402 is conditioned, causing OR2 to be set from OR3 which had retained the units position of the multiplicand address. Accordingly, the entire muliplicand is to be multiplied by the new multiplier digit. When the multiply program reaches stage 10, at this point, carry out signals are to be expected. The carry out conditions AD-block 1419 which sets trigger 10 in FIG. 121, which in turn conditions AD-block 1550 to produce the —S trigger 39 on. Trigger 39 controls multiply program stage 8, readout accumulator digit, to provide for the carry loop shown in FIG. 8. When the no carry situation is reached, control returns to stage 2 or 3 as appropriate for continuation of the multiply operation.

FIGS. 181–184 are used to select a particular input/output device according to the Q address. Some of the Q address digits are sent to the sense and branch register for decoding and for use by the input/output control. Only one device is selected at one time and the device remains selected only until the execution of the instruction is completed.

FIG. 185–186 illustrate input/output control and correction circuits to provide an interface between the input/output devices and the computer. The circuit in FIG. 185 corrects the C bit in instances where a flag is dropped before the data passes to an output device. FIG. 186 circuit merely recognizes the Zero value.

FIG. 187 shows a translating network to convert to the output device code of CXO8421 from the two-decimal-digit-per character alphameric form of the computer.

FIG. 188 illustrates a parity checker for the I/O code.

FIGS. 189–190 show drivers for output devices.

FIGS. 191–199 illustrate input circuits. The keyboard S BIT, TYPEwriter RESPonse, DISPLAY and KBRD C BIT buttons are involved. Depending upon the condition of the flag, the X BIT and C BIT either are stored always or upon operation of the associated key. Keyboard data entry via the read bus switch can be followed through FIGS. 192 and 193. A parity check is taken by circuits in FIGS. 194 and 195. The C bit is tested and corrected by circuits of FIGS. 196–199.

FIG. 200 illustrates Read-Write Check circuits including a read check trigger and write check trigger. The triggers are settable by a variety of error conditions, some of which are detected in the I/O equipment.

FIGS. 201–206 illustrate I/O equipment control response and disconnect circuits. Since the operation of I/O equipment is not mulitiplex, there is no priority hierarchy. Straightforward call, response and disconnect circuits switch I/O units on line when needed, one at a time.

While the invention has been particularly shown and described with references to a preferred embodiment thereof, it will be understood by those skilled in the art that various changes in form and details may be made therein without departing from the spirit and scope of the invention.

What is claimed is:

1. A memory centered computer comprising:

(*a*) a memory having a multiplicity of consecutively addressable locations, each even addressed location and its adjacent higher odd addressed location forming a pair, both locations of the pair being available upon any memory reference when either is referenced;

(*b*) a memory address register;

(*c*) means connecting said memory address register with said memory to address the memory location pair identified by the number currently stored in said memory address register;

(*d*) memory address retaining storage means having a plurality of address registers for retaining a plurality of memory addresses and presenting, upon demand, the address content of a particular register to said memory address register;

(*e*) address modification means connecting said memory address register back to said memory address retaining storage means;

(*f*) a single digit multiplier register;

(*g*) a doubler connected to said multiplier register (*f*) to provide a plural digit number corresponding to a multiple of the multiplier digit;

(*h*) means connecting said doubler to said memory address register, whereby said plural digit number provides a plurality of digits of a memory address in said memory address register;

(*i*) multiplicand digit means for entering a single digit multiplicand into said memory address register; and (*j*) program timing means connected to said other means (*b, c, d, e, f, h, i*) for controlling the sequence of operations to provide a multiply sequence.

2. A memory centered multiplying computer according to claim 1 in which multiplication is performed by repetitive memory references, a certain group of memory locations being reserved for a multiply table; said memory address retaining storage means (*d*) includes operand address storage registers OR1, OR2 and OR3 and product storage registers PR1 and PR2; and said program timing means controls multiplication in the following steps:

(1) clear accumulator;
(2) read multiplier digit;
(3) read multiplicand digit;
(4) read multiply table;
(5) read accumulator digit;
(6) read add table;
(7) write sum into accumulator;
(8) read accumulator digit;
(9) read add table;
(10) write sum into accumulator.

3. A multiplying computer according to claim 2 wherein said program timing means (*j*) includes a looper which follows mutliply step 10 and provides for carry propagation looping to step 8, new multiplicand digit looping to step 3, and new multiplier digit-new multiplicand digit looping to step 2.

4. A memory centered multiplying computer having a memory with a multiplicity of consecutively addressable locations and a memory address register connected to address the memory location identified by the number currently stored in the memory address register, characterized by:

(*a*) a pairing of memory locations whereby an even-addressed location and the next higher odd-addressed location are read out together regardless of which is addressed by the memory address register;

(*b*) a memory buffer register odd and a memory buffer register even connected to the memory, to which a pair of memory locations transmit their data contents when referenced according to the memory address register contents;

(*c*) a certain group of locations in memory set aside for a multiply table of two digit products which result from multiplication of two single-digit operands, each of said two digit products being made available as the result of addressing the appropriate even-address location in memory;

(*d*) an accumulator area set aside in memory;

(*e*) a multiplier register for storing a multiplier digit;

(*f*) a doubler connected to said multiplier register (*e*) for doubling the multiplier digit to form an even 2-digit number;

(*g*) a data register for storing the multiplicand digit;

(*h*) and means connecting said doubler and said data register to the memory address register, whereby two single-digit operands are effective to form three digits of the address in memory of the even-addressed memory location which, together with its paired odd-addressed location, is assigned the product of the two single-digit operands, to prepare for readout of the two-digit product from the memory to said memory buffer register odd and said memory buffer register even (*b*).

5. A multiplying computer according to claim 4, in which an add table is set aside in memory, and comprising:

(a) a memory address retaining storage means comprising a plurality of address retaining storage registers, including operand registers OR1, OR2 and OR3 and product registers PR1, PR2 and PR3, (b) a digit register tens, (c) a digit register units, and (d) a program timer which controls multiplication in the following stages—

Stage 2—read multiplier digit to multiplier register per OR1;

Stage 3—read multiplicand digit to data register per OR2;

Stage 4—set up the memory address register to address the multiply table in memory by doubling the multiplier digit and passing the resulting even units digit to said memory address register, passing the carry of the doubled multiplier digit to said memory address register, and the multiplicand digit to said memory address register to form a 3-digit table address and thereby address the multiply table area in memory to produce the product at digit registers units and tens;

Stage 5—read out accumulator per PR1 to data register;

Stage 6—produce the sum and carry of the digits in said digit register tens and said data register by addressing the add table area in memory according to the digit values and store the sum in said data register;

Stage 7—store the sum digit in the accumulator per PR2;

Stage 8—read out accumulator higher order digit per PR3 to data register;

Stage 9—transmit content of digit register tens to digit register units to produce the sum of the digits in digit register tens and data register by addressing the add table area in memory according to their digit values and presence or absence of a carry from stage 6: and Stage 10—store the sum digit in the accumulator area in memory per PR2.

6. A multiplying computer according to claim 5, wherein each digit position in memory provides a flag bit, which flag bit is effective to indicate the high order of an operand, and comprising:

(a) a word mark 1 trigger responsive to a flag in a currently effective digit in operand 1 to produce a word mark 1 functional signal;

(b) a word mark 2 trigger responsive to a flag in operand 2 to produce a word mark 2 trigger functional signal;

(c) a carry out trigger responsive to a flag read out from said memory add table to retain carry effectiveness from a lower order; and (d) circuit means responsive to coincidence of functional signals word mark 1, word mark 2, and not carry out to set the flag indicating the end of multiply and the high order of the product, to produce a functional signal clear flag following multiply stage 10 upon anticoincidence of signals word mark 1, word mark 2 and not carry out.

7. A multiplier comprising:

(a) a memory having a multiplicity of digit storage locations, which locations, although uniquely addressed, read out in pairs when one location of the pair is addressed, the memory being settable to values within respective pairs to correspond to a multiply table of products;

(b) a multiplier register;

(c) a multiplicand register;

(d) table addressing means connected to said memory (a), said multiplier register (b) and said multiplicand register (c), responsive to value settings of a position in said multiplier register and of a position in said multiplicand register for addressing the location pair in the multiply table at which the product of the multplier position and multplicand position is stored;

(e) product storage means connected to said memory (a); and (f) program means connected to said means (b, c, d, e) for controlling read in and read out of the partial product from the addressed location pair in said memory (a) to said product storage means (e).

8. A multiplier according to claim 7, wherein said table addressing means (d) comprises:

(a) a multi-position memory address register;

(b) a doubler;

(c) multiplier connecting means connecting a multiplier position value from said multiplier register via said doubler to a plurality of positions of said memory address register; and (d) multiplicand connecting means connecting a multiplicand position value from said multiplicand register to a position of said memory address register.

9. A multiplier according to claim 7, wherein said program means (f—claim 7) comprises:

(a) an operation register;

(b) a program decoder connected to said operation register (a);

(c) a program timer for controlling a sequence of operations;

(d) a plurality of memory address retaining storage registers responsive to said program timer for producing addresses of new multiplier and multiplicand positions and for producing accumulator product addreses as directed by the program timer; and (e) looper means connected to said program timer (c), responsive to characteristics of the multiplier, multiplicand and carries developed during the multiply for modifying the sequence of said program timer.

10. A multiplier for a partial multiplier and a partial multiplicand, comprising:

(a) a location-addressable memory in which a multiply table of partial products is stored at regular positions in a table area, each partial product position of the multiply table encompassing a plurality of memory locations but being addressable by the address of one such location, the partial product address location;

(b) table addressing means responsive to the values of the partial multiplier and the partial multiplicand for producing the respectively associated partial product address; and (c) table read out means connected to said memory (a) and to said table addressing means (b) for reading out the partial product value according to the partial product address.

11. A multiplier according to claim 10, wherein said table addressing means (b—claim 10) comprises modifying means for increasing the order size of said partial multiplier to encompass the address spread of the multiply table.

12. A multiplier according to claim 11, comprising program means connected to said table addressing means (b—claim 10) and table readout means (c—claim 10) for producing multiplication by:

(a) setting said table addressing means (b—claim 10) according to the modified multiplier digit and multiplicand digit to address the multiply table area in memory, (b) reading out the partial product from memory, and (c) accumulating the partial product.

13. A multiplier comprising:

(a) a memory having a multiplicity of digit storage locations, which locations although uniquely addressed, are read out in pairs when one location of the pair is addressed, the respective pairs within the memory being settable to binary coded decimal values to correspond to a multiply table of partial products with digits transposed;

(*b*) a multiplier register for receiving a single multiplier digit;

(*c*) a memory data register for receiving a single address digit of the multiplicand from memory;

(*d*) table addressing means connected to said memory (*a*), said multiplier register (*b*) and said memory data register (*c*), responsive to a binary coded decimal value setting in said multiplier register and to a binary coded decimal value setting of said memory data register for addressing the location pair in the multiply table at which the partial product of the multiplier digit and multiplicand digit is stored as a binary coded decimal digit pair with digits transposed;

(*e*) an accumulator area in said memory, a known order of which appears at a fixed address location; and (*f*) control means connected to said table addressing means (*d*) for controlling read in and read out of the partial product from the addressed location pair to said accumulator area in memory.

14. A multiplier according to claim 13 wherein said program means comprises interconnected multiply cycle control means, a plurality of multiply stage controlling elements associated respectively with operations in the multiply sequence, and looper means associated with the final stage of the multiply sequence to control repetitions of selected portions of the multiply sequence.

15. A multiplier according to claim 14 wherein said looper comprises a group of logical AND circuits responsive to respective conditionings of functional inputs related to carry out, word mark 1, word mark 2, and the multiply operation signal to cause looping of the multiply program to respectively associated stages to accomplish the multiply operation in the following fashion:

(I) Clear accumulator routine;

(II) New multiplier digit—new multiplicand digit loop;

(III) New multiplicand digit only loop; and (IV) Carry loop.

16. A multiplier according to claim 13, wherein said control means includes a digit register tens and digit register units connected to said memory respectively to receive the units digit and tens digit of the transposed partial product from memory, whereby the transposed partial product is returned to the standard format.

17. A table lookup multiplier comprising:

(*a*) a memory in which a multiply table and an add table are storable;

(*b*) a memory buffer register even and memory buffer register odd, which accept the data contents of a pair of memory locations whenever either location is addressed by an effective memory address;

(*c*) even-odd means selectively settable to even or odd according to the even or odd condition of the effective memory address;

(*d*) a memory data register responsive jointly to said memory buffer registers and said even-odd means to accept the data content of the addressed memory location;

(*e*) a data bus for transmitting data from said memory data register;

(*f*) a digit register units connected to said data bus;

(*g*) a digit register tens connected to said memory buffer registers;

(*h*) a multiplier register connected to said data bus;

(*i*) a doubler connected to said multiplier register;

(*j*) a memory address register connected to said doubler and said data bus to receive a three-digit multiply table partial product address; and (*k*) control means connected to said means (*b, d, f, g, h, j*) to control a multiply sequence of operations.

18. A table lookup multiplier according to claim 17 wherein said control means includes:

(*a*) a plurality of memory address retaining storage registers connected to said memory address register (*j*); and (*b*) a sequence control mechanism connected to said memory address retaining storage registers for initiating multiply sequence of memory references directed to memory locations specified by respective said memory address retaining storage registers.

19. A table lookup multiplier according to claim 18 wherein said memory address retaining storage registers encompass at least the following registers:

IR1—Instruction address

OR1—Multiplier address (working)

OR2—Multiplicand address (working)

OR3—Multiplicand address (initial)

PR1—Product address (working—accumulated product low order)

PR2—Product address (working—storage address)

PR3—Product address (working—accumulated product high order)

wherein said sequence control mechanism includes ten stages as follows:

Stage 1—Clear accumulator

Stage 2—Read out multiplier digit per OR1

Stage 3—Read out multiplicand digit per OR2

Stage 4—Set up said memory address register to address the multiply table to provide the partial product of the multiplier digit and multiplicand digit Stage 5—Read out accumulator per PR1 to said memory data register Stage 6—Add accumulation digit from said memory data register to partial product units digit in said digit register units and provide sum to said memory data register Stage 7—Store sum in accumulator per PR2

Stage 8—Read out accumulator per PR3 to said memory data register

Stage 9—Transmit content of said digit register tens to said digit register units, add and provide sum to said memory data register Stage 10—Store sum in accumulator per PR2; and said looper follows stage 10 to return control to stage 2 for both a new multiplier digit and new multiplicand digit, to stage 3 for a new multiplicand digit, to stage 8 to propagate carries through the accumulator, or out of the multiply sequence to end multiply.

20. A memory centered multiplying computer having a memory with a multiplicity of addressable locations and a memory address register connected to address the memory location identified by the number currently stored in the memory address register, a portion of the memory location forming a multiply table in which are storable the respective products (partial product values) of pluralities of digits used to reference the locations, characterized by:

(*a*) multiplicand term development means;

(*b*) multiplier term development means;

(*c*) memory address development means connected to and responsive to the content of said multiplicand term development means (*a*) and said multiplier term development means (*b*) to place in the memory address register a value to reference the memory table location where a partial product value of the multiplier term and the multiplicand term are storable;

(*d*) readout means connected to the memory for accepting the partial product value from the table location referenced by the address developed in the memory addressing register by said memory address development means (*c*); and (*e*) accumulation means connected to said readout means (*d*) to accumulate the partial product values to form a final product.

21. A memory centered multiplying computer having storage for multiplier and multiplicand, characterized by:

(*a*) a memory having a multiplicity of addressable locations settable to partial product values which form a multiply table;

(*b*) memory addressing means for referencing the content of a memory location according to a developed address having plural bit groups; and (*c*) program means connected to said memory addressing means (*b*) to control in sequence the following actions—

(1) forming a table address by assembling a multiplicand bit group and a multiplier bit group in said memory addressing means (*b*), (2) fetching the partial product from said memory (*a*) per said memory addressing means (*b*), and (3) adding the partial product values to an accumulation of partial products to form the final product.

No references cited.